US012733646B2

(12) United States Patent
Hubert et al.

(10) Patent No.: US 12,733,646 B2
(45) Date of Patent: Sep. 15, 2026

(54) ENDOPHYTE COMPOSITIONS AND METHODS FOR IMPROVED PLANT HEALTH

(71) Applicant: Indigo Ag, LLC, Boston, MA (US)

(72) Inventors: David A. Hubert, Durham, NC (US); Brandon M. Satinsky, Brookline, MA (US); Shib Basu, Apex, NC (US)

(73) Assignee: Indigo Ag, LLC, Boston, MA (US)

( * ) Notice: Subject to any disclaimer, the term of this patent is extended or adjusted under 35 U.S.C. 154(b) by 158 days.

(21) Appl. No.: 18/556,542

(22) PCT Filed: Apr. 22, 2022

(86) PCT No.: PCT/US2022/026051
§ 371 (c)(1),
(2) Date: Oct. 20, 2023

(87) PCT Pub. No.: WO2022/226376
PCT Pub. Date: Oct. 27, 2022

(65) Prior Publication Data

US 2024/0180164 A1 Jun. 6, 2024

Related U.S. Application Data

(60) Provisional application No. 63/201,305, filed on Apr. 22, 2021.

(51) Int. Cl.

| | |
|---|---|
| ***A01N 63/22*** | (2020.01) |
| ***A01N 25/08*** | (2006.01) |
| ***A01N 25/24*** | (2006.01) |
| ***A01N 63/27*** | (2020.01) |
| ***A01N 63/38*** | (2020.01) |
| ***A01P 3/00*** | (2006.01) |
| *C12R 1/07* | (2006.01) |
| *C12R 1/38* | (2006.01) |
| *C12R 1/885* | (2006.01) |

(52) U.S. Cl.
CPC ............. *A01N 63/22* (2020.01); *A01N 25/08* (2013.01); *A01N 25/24* (2013.01); *A01N 63/27* (2020.01); *A01N 63/38* (2020.01); *A01P 3/00* (2021.08); *C12R 2001/07* (2021.05); *C12R 2001/38* (2021.05); *C12R 2001/885* (2021.05)

(58) Field of Classification Search
None
See application file for complete search history.

(56) References Cited

U.S. PATENT DOCUMENTS

| | | | |
|---|---|---|---|
| 2,200,532 | A | 5/1940 | Bond |
| 4,628,633 | A | 12/1986 | Nilsson |
| 4,642,131 | A | 2/1987 | Hoitink |
| 4,940,834 | A | 7/1990 | Hurley et al. |
| 5,041,290 | A | 8/1991 | Gindrat et al. |
| 5,113,619 | A | 5/1992 | Leps et al. |
| 5,229,291 | A | 7/1993 | Nielsen et al. |
| 5,292,507 | A | 3/1994 | Charley |
| 5,300,127 | A | 4/1994 | Williams |
| 5,415,672 | A | 5/1995 | Fahey et al. |
| 5,730,973 | A | 3/1998 | Morales et al. |
| 5,919,447 | A | 7/1999 | Marrone et al. |
| 5,989,543 | A | 11/1999 | Davide et al. |
| 5,994,117 | A | 11/1999 | Bacon et al. |
| 6,004,774 | A | 12/1999 | Marrone et al. |
| 6,072,107 | A | 6/2000 | Latch et al. |
| 6,077,505 | A | 6/2000 | Parke et al. |
| 6,337,431 | B1 | 1/2002 | Tricoli et al. |
| 6,495,133 | B1 | 12/2002 | Xue |
| 6,569,425 | B2 | 5/2003 | Drahos et al. |
| 6,602,500 | B1 | 8/2003 | Kharbanda et al. |
| 6,681,186 | B1 | 1/2004 | Denisov et al. |
| 6,689,880 | B2 | 2/2004 | Chen et al. |
| 6,823,623 | B2 | 11/2004 | Minato et al. |
| 7,037,708 | B1 | 5/2006 | Runge et al. |
| 7,037,879 | B2 | 5/2006 | Imada et al. |
| 7,080,034 | B1 | 7/2006 | Reams |
| 7,084,331 | B2 | 8/2006 | Isawa et al. |
| 7,335,816 | B2 | 2/2008 | Kraus et al. |
| 7,341,868 | B2 | 3/2008 | Chopade et al. |
| 7,435,411 | B2 | 10/2008 | Park et al. |
| 7,485,451 | B2 | 2/2009 | VanderGheynst et al. |
| 7,555,990 | B2 | 7/2009 | Beaujot |
| 7,632,985 | B2 | 12/2009 | Malven et al. |
| 7,763,420 | B2 | 7/2010 | Stritzker et al. |
| 7,906,313 | B2 | 3/2011 | Henson et al. |
| 7,977,550 | B2 | 7/2011 | West et al. |

(Continued)

FOREIGN PATENT DOCUMENTS

| | | |
|---|---|---|
| AU | 2015201322 | 4/2015 |
| CA | 1041788 A | 11/1978 |

(Continued)

OTHER PUBLICATIONS

Jaklitsch, W. M., and H. Voglmayr. "Biodiversity of Trichoderma (Hypocreaceae) in southern Europe and macaronesia." Studies in mycology 80 (2015): 1-87 (Year: 2015).*
Studholme, David J., et al. "Investigating the beneficial traits of Trichoderma hamatum GD12 for sustainable agriculture—insights from genomics." Frontiers in plant science 4 (2013): 258. (Year: 2013).*
Harman, G.E., et al: "Factors affecting Trichoderma hamatum applied to seeds as a biocontrol agent", Phytopathology, Jun. 1, 1981 (Jun. 1, 1981), pp. 569-572 (Year: 1981).*
John, Rojan P., et al. "Mycoparasitic Trichoderma viride as a biocontrol agent against *Fusarium oxysporum* f. sp. adzuki and Pythium arrhenomanes and as a growth promoter of soybean." Crop protection 29.12 (2010): 1452-1459 (Year: 2010).*

(Continued)

*Primary Examiner* — Weihua Fan
(74) *Attorney, Agent, or Firm* — K&L Gates LLP

(57) ABSTRACT

This invention relates to compositions and methods for improving plant health, wherein a plant is heterologously disposed to one or more endophytes, or derived from a plant element heterologously disposed to one or more endophytes.

20 Claims, 6 Drawing Sheets

Specification includes a Sequence Listing.

(56) References Cited

U.S. PATENT DOCUMENTS 8,019,694 B2 9/2011 Fell et al.
8,143,045 B2 3/2012 Miasnikov et al.
8,455,198 B2 6/2013 Gao et al.
8,455,395 B2 6/2013 Miller et al.
8,465,963 B2 6/2013 Rolston et al.
8,728,459 B2 5/2014 Isawa et al.
8,975,489 B2 3/2015 Craven
9,049,814 B2 6/2015 Marx et al.
9,113,636 B2 8/2015 von Maltzahn et al.
9,277,751 B2 3/2016 Sword
9,288,995 B2 3/2016 von Maltzahn et al.
9,295,263 B2 3/2016 von Maltzahn et al.
9,364,005 B2 6/2016 Mitter et al.
9,408,394 B2 8/2016 von Maltzahn et al.
9,532,572 B2 1/2017 von Maltzahn et al.
9,532,573 B2 1/2017 von Maltzahn et al.
9,545,111 B2 1/2017 Sword
9,622,485 B2 4/2017 von Maltzahn et al.
9,652,840 B1 5/2017 Shriver et al.
9,687,001 B2 6/2017 Vujanovic et al.
9,756,865 B2 9/2017 Sword
10,058,101 B2 8/2018 von Maltzahn et al.
10,076,120 B2 9/2018 von Maltzahn et al.
10,104,862 B2 10/2018 Vujanovic et al.
10,136,646 B2 11/2018 Von Maltzahn et al.
10,212,911 B2 2/2019 von Maltzahn et al.
10,212,912 B2 2/2019 Vujanovic et al.
10,212,940 B2 2/2019 Ambrose et al.
10,212,944 B2 2/2019 Ambrose et al.
10,271,554 B2 4/2019 Mitter et al.
10,306,890 B2 6/2019 Mitter et al.
10,362,787 B2 7/2019 Mitter et al.
10,375,966 B2 8/2019 Sword
10,492,497 B2 12/2019 von Maltzahn et al.
10,499,652 B2 12/2019 von Maltzahn et al.
10,499,653 B2 12/2019 von Maltzahn et al.
10,499,654 B2 12/2019 von Maltzahn et al.
10,624,351 B2 4/2020 Riley et al.
10,640,783 B2 5/2020 Riley
10,645,938 B2 5/2020 Riley
10,667,523 B2 6/2020 Ambrose et al.
10,721,936 B2 7/2020 White, Jr. et al.
10,750,711 B2 8/2020 Djonovic et al.
10,813,359 B2 10/2020 Sword
10,912,303 B2 2/2021 von Maltzahn et al.
10,932,469 B2 3/2021 Mitter et al.
11,064,673 B2 7/2021 Vujanovic et al.
11,064,702 B2 7/2021 Ambrose et al.
11,076,573 B2 8/2021 Vujanovic et al.
11,119,086 B2 9/2021 Mitter et al.
11,151,379 B2 10/2021 Freitag et al.
11,166,465 B2 11/2021 von Maltzahn et al.
11,178,876 B2 11/2021 Riley et al.
11,197,457 B2 12/2021 Ambrose et al.
11,254,908 B2 2/2022 Mitter et al.
11,570,993 B2 2/2023 von Maltzahn et al.
11,747,316 B2 9/2023 Mitter et al.
11,751,515 B2 9/2023 Von Maltzahn
11,751,571 B2 9/2023 Ambrose et al.
11,753,618 B2 9/2023 Mitter et al.
11,754,553 B2 9/2023 Von Maltzahn et al.
11,766,045 B2 9/2023 Riley et al.
11,771,090 B2 10/2023 Sword
11,793,202 B2 10/2023 von Maltzahn et al.
11,807,586 B2 11/2023 Sword
11,819,027 B2 11/2023 Djonovic et al.
11,882,838 B2 1/2024 Franco
11,985,931 B2 5/2024 Riley
12,075,786 B2 9/2024 Goldman et al.
12,241,054 B2 3/2025 White, Jr. et al.
12,490,744 B2 12/2025 von Maltzahn et al.
2001/0032162 A1 10/2001 Alsberg et al.
2002/0059091 A1 5/2002 Hay et al.
2002/0120555 A1 8/2002 Lerner
2002/0142917 A1 10/2002 Triplett et al.
2002/0147670 A1 10/2002 Lange
2003/0050901 A1 3/2003 Jester et al.
2003/0195822 A1 10/2003 Tatge et al.
2003/0236738 A1 12/2003 Lange et al.
2005/0008619 A1 1/2005 Park et al.
2005/0060930 A1 3/2005 Kiss et al.
2005/0070435 A1 3/2005 Chopade et al.
2005/0072047 A1 4/2005 Conkling et al.
2006/0029995 A1 2/2006 Inze et al.
2006/0046246 A1 3/2006 Zeng et al.
2006/0178269 A1 8/2006 Medina-Vega
2006/0185207 A1 8/2006 Mitcheltree
2007/0028318 A1 2/2007 Livore et al.
2007/0055456 A1 3/2007 Raftery et al.
2007/0142226 A1 6/2007 Franco
2007/0292953 A1 12/2007 Mankin et al.
2008/0229441 A1 9/2008 Young et al.
2008/0282425 A1 11/2008 Frank et al.
2008/0289060 A1 11/2008 De Beuckeleer et al.
2009/0155214 A1 6/2009 Isawa et al.
2009/0175837 A1 7/2009 Yuki et al.
2009/0300781 A1 12/2009 Bancroft et al.
2009/0300794 A1 12/2009 Plesch et al.
2009/0324564 A1 12/2009 Maeda
2010/0064392 A1 3/2010 Yang et al.
2010/0095396 A1 4/2010 Voeste et al.
2010/0114753 A1 5/2010 Osmanski et al.
2010/0130365 A1 5/2010 Notten et al.
2010/0205690 A1 8/2010 Blasing et al.
2010/0227357 A1 9/2010 Redman et al.
2011/0033436 A1 2/2011 Chen et al.
2011/0067144 A1 3/2011 Schweizer et al.
2011/0182862 A1 7/2011 Green et al.
2011/0195406 A1 8/2011 Sorenson et al.
2012/0028799 A1 2/2012 Martin, Jr. et al.
2012/0108431 A1 5/2012 Williams et al.
2012/0116943 A1 5/2012 Abramson
2012/0131696 A1 5/2012 Aayal et al.
2012/0144533 A1 6/2012 Craven
2012/0149571 A1 6/2012 Kloepper et al.
2012/0178624 A1 7/2012 Kaminskyj et al.
2012/0324599 A1 12/2012 Kerns et al.
2013/0031673 A1 1/2013 Grandlic et al.
2013/0071425 A1 3/2013 Vidal et al.
2013/0079225 A1 3/2013 Smith et al.
2013/0150240 A1 6/2013 Newman et al.
2013/0233501 A1 9/2013 Van Zyl et al.
2014/0020136 A1 1/2014 Van Der Wolf et al.
2014/0109249 A1 4/2014 Turner et al.
2014/0115731 A1 4/2014 Turner et al.
2014/0134629 A1 5/2014 Turner et al.
2014/0147425 A1 5/2014 Henn et al.
2014/0273109 A1 9/2014 Smolke et al.
2014/0342905 A1 11/2014 Bullis et al.
2015/0020239 A1 1/2015 von Maltzahn et al.
2015/0033420 A1 1/2015 Rodriguez et al.
2015/0126365 A1 5/2015 Sword
2015/0218568 A1 8/2015 Jones et al.
2015/0230478 A1 8/2015 Vujanovic et al.
2015/0242970 A1 8/2015 Avey et al.
2015/0282490 A1 10/2015 Wachendorff-Neumann et al.
2015/0289518 A1 10/2015 Andersch et al.
2015/0296802 A1 10/2015 Wachendorff-Neumann et al.
2015/0296803 A1 10/2015 Andersch et al.
2015/0296804 A1 10/2015 Andersch et al.
2015/0305348 A1 10/2015 Andersch et al.
2015/0320050 A1 11/2015 von Maltzahn et al.
2015/0320051 A1 11/2015 Wachendorff-Neumann et al.
2015/0335029 A1 11/2015 Mitter et al.
2015/0342199 A1 12/2015 Carrion Villanovo et al.
2015/0366217 A1 12/2015 Vujanovic et al.
2015/0368607 A1 12/2015 Arnold et al.
2015/0370935 A1 12/2015 Starr
2015/0373993 A1 12/2015 von Maltzahn et al.
2016/0000091 A1 1/2016 Andersch et al.
2016/0021891 A1 1/2016 von Maltzahn et al.
2016/0081351 A1* 3/2016 Jackson .................. C12N 1/04
435/256.7
2016/0150796 A1 6/2016 von Maltzahn et al.

(56) References Cited

U.S. PATENT DOCUMENTS

2016/0174570 A1 6/2016 Vujanovic et al.
2016/0192662 A1 7/2016 Sword
2016/0205947 A1 7/2016 Sword
2016/0235074 A1 8/2016 von Maltzahn et al.
2016/0255844 A1 9/2016 Mitter et al.
2016/0260021 A1 9/2016 Marek
2016/0286821 A1 10/2016 Sword
2016/0290918 A1 10/2016 Xu et al.
2016/0316760 A1 11/2016 Ambrose et al.
2016/0316763 A1 11/2016 Sword
2016/0330976 A1 11/2016 Mitter et al.
2016/0338360 A1 11/2016 Mitter et al.
2016/0350855 A1 12/2016 Lerner
2016/0366892 A1 12/2016 Ambrose et al.
2017/0020138 A1 1/2017 Von Maltzahn et al.
2017/0161560 A1 6/2017 Itzhaky et al.
2017/0164619 A1 6/2017 von Maltzahn et al.
2017/0164620 A1 6/2017 von Maltzahn et al.
2017/0215358 A1 8/2017 Franco et al.
2017/0223967 A1 8/2017 Mitter et al.
2017/0238552 A1 8/2017 Raizada et al.
2017/0273309 A1 9/2017 Raizada et al.
2018/0020672 A1 1/2018 White, Jr. et al.
2018/0020677 A1 1/2018 Ambrose et al.
2018/0060771 A1 3/2018 Mangin
2018/0092365 A1 4/2018 Sword
2018/0153174 A1 6/2018 Riley et al.
2018/0177196 A1 6/2018 Sword
2018/0189564 A1 7/2018 Freitag et al.
2018/0213800 A1 8/2018 Djonovic et al.
2018/0249716 A1 9/2018 Riley
2018/0251776 A1 9/2018 Riley
2018/0322426 A1 11/2018 Schmaltz et al.
2019/0002924 A1 1/2019 Xing et al.
2019/0021337 A1 1/2019 Von Maltzahn et al.
2019/0085352 A1 3/2019 Goldman et al.
2019/0130999 A1 5/2019 Oppenheim et al.
2019/0382714 A1 12/2019 Wigley et al.
2020/0255355 A1 8/2020 Venkatramesh et al.
2021/0000121 A1 1/2021 White, Jr. et al.
2021/0076685 A1 3/2021 Ambrose et al.
2021/0310017 A1 10/2021 White, Jr. et al.
2021/0321621 A1 10/2021 Gordon et al.
2021/0353691 A1 11/2021 Dai et al.
2021/0372997 A1 12/2021 Von Maltzahn et al.
2022/0053770 A1 2/2022 Fuenzalida et al.
2023/0276765 A1 9/2023 Riley
2023/0288391 A1 9/2023 Mitter et al.
2023/0329244 A1 10/2023 von Maltzahn et al.
2023/0332168 A1 10/2023 White, Jr. et al.
2024/0074440 A1 3/2024 von Maltzahn et al.
2024/0081340 A1 3/2024 Sword
2024/0101492 A1 3/2024 Sword
2024/0110903 A1 4/2024 Mitter et al.
2024/0180164 A1 6/2024 Hubert et al.
2024/0255494 A1 8/2024 Von Maltzahn et al.
2025/0169509 A1 5/2025 Knight-Connoni et al.
2025/0261649 A1 8/2025 von Maltzahn et al.
2025/0314631 A1 10/2025 Mitter et al.
2025/0351831 A1 11/2025 Basu et al.
2025/0353797 A1 11/2025 von Maltzahn et al.
2026/0013509 A1 1/2026 Maloney et al.

FOREIGN PATENT DOCUMENTS

CA 1229497 A 11/1987
CA 2562175 A1 4/2008
CA 2916678 A1 12/2014
CA 2960032 A1 3/2015
CA 2935218 A1 7/2015
CA 2953466 A1 12/2015
CA 2953697 A1 12/2015
CN 1604732 A 4/2005
CN 1948459 A 4/2007
CN 101311262 A 11/2008
CN 101423810 A 5/2009
CN 101570738 A 11/2009
CN 101693881 A 4/2010
CN 102010835 A 4/2011
CN 102123596 A 7/2011
CN 102168022 A 8/2011
CN 102352327 A 2/2012
CN 102533601 A 7/2012
CN 102586218 A 7/2012
CN 103642725 A 3/2014
CN 103865837 6/2014
CN 104250616 A 12/2014
CN 104388356 A 3/2015
CN 104560742 A 4/2015
CN 105274008 A 1/2016
CN 105886428 8/2016
CN 106434493 2/2017
CN 108558581 A 9/2018
CN 111286480 A 6/2020
CN 111893075 A 11/2020
CN 111961631 A 11/2020
CN 113214029 A 8/2021
CN 113355254 A 9/2021
CN 113652359 A 11/2021
EP 0192342 A2 8/1986
EP 0223662 A1 5/1987
EP 0378000 A2 7/1990
EP 0494802 A1 7/1992
EP 0818135 A1 1/1998
EP 1389767 2/2004
EP 1621632 A1 2/2006
EP 1935245 A1 6/2008
EP 1967057 9/2008
EP 2114118 9/2012
EP 2676536 A1 12/2013
EP 2821490 A2 1/2015
EP 2959779 12/2015
EP 3041338 7/2016
EP 3659414 6/2020
HU 206029 B * 8/1992
JP 2003300804 A 10/2003
JP 2009/072168 A 4/2009
KR 20050039979 5/2005
KR 20100114806 A 10/2010
KR 101056546 B1 8/2011
KR 101066283 9/2011
KR 101091151 B1 12/2011
KR 20120004958 1/2012
KR 20120110292 A 10/2012
KR 20130023491 A 3/2013
RU 2043028 C1 9/1995
WO 1988/009114 1/1988
WO 1994/016076 7/1994
WO 98/35017 8/1998
WO 99/59412 11/1999
WO 2000/029607 A1 5/2000
WO 2001/046774 12/2000
WO 2001/083697 A2 11/2001
WO 2001/083818 A2 11/2001
WO 2002/065836 A2 8/2002
WO 2003/038066 5/2003
WO 2004/046357 A1 6/2004
WO 2005/003328 A1 1/2005
WO 2006017361 A1 2/2006
WO 2007/021200 A1 2/2007
WO 2007/107000 A1 9/2007
WO 2008025097 A1 3/2008
WO 2008056234 A2 5/2008
WO 2008/103422 A2 8/2008
WO 2008/107097 9/2008
WO 2009/012480 A2 1/2009
WO 2009/078710 A1 6/2009
WO 2009091557 A1 7/2009
WO 2009/126473 A1 10/2009
WO 2010/109436 A1 9/2010
WO 2010/115156 A2 10/2010
WO 2011/001127 A1 1/2011
WO 2011/011627 A1 1/2011
WO 2011/082455 A1 7/2011

(56) References Cited

FOREIGN PATENT DOCUMENTS

| | | | |
|---|---|---|---|
| WO | 2011/112781 | A2 | 9/2011 |
| WO | 2011/117351 | A1 | 9/2011 |
| WO | 2012/016140 | | 2/2012 |
| WO | 2012/034996 | A1 | 3/2012 |
| WO | 2013/016361 | A2 | 1/2013 |
| WO | 2013/029112 | A1 | 3/2013 |
| WO | 2013/054272 | | 4/2013 |
| WO | 2013/090628 | A1 | 6/2013 |
| WO | 2013/122473 | A1 | 8/2013 |
| WO | 2013/148290 | | 10/2013 |
| WO | 2013/177615 | A1 | 12/2013 |
| WO | 2013/190082 | A1 | 12/2013 |
| WO | 2014028520 | A1 | 2/2014 |
| WO | 2014/046553 | A1 | 3/2014 |
| WO | 2014/079728 | | 5/2014 |
| WO | 2014/082950 | A1 | 6/2014 |
| WO | 2014/086747 | | 6/2014 |
| WO | 2014/086749 | | 6/2014 |
| WO | 2014/086750 | | 6/2014 |
| WO | 2014/086752 | | 6/2014 |
| WO | 2014/086753 | | 6/2014 |
| WO | 2014/086756 | | 6/2014 |
| WO | 2014/086758 | | 6/2014 |
| WO | 2014/086759 | | 6/2014 |
| WO | 2014/086764 | | 6/2014 |
| WO | 2014/086776 | | 6/2014 |
| WO | 2014/121366 | A1 | 8/2014 |
| WO | 2014/206953 | A1 | 12/2014 |
| WO | 2014/210372 | A1 | 12/2014 |
| WO | 2015/035099 | A1 | 3/2015 |
| WO | 2015/069938 | A1 | 5/2015 |
| WO | 2015069708 | A1 | 5/2015 |
| WO | 2015/100431 | A2 | 7/2015 |
| WO | 2015/100432 | A2 | 7/2015 |
| WO | 2015/114552 | | 8/2015 |
| WO | 2015/116838 | | 8/2015 |
| WO | 2015/192172 | A1 | 12/2015 |
| WO | 2015/200852 | A2 | 12/2015 |
| WO | 2015/200902 | A2 | 12/2015 |
| WO | 2016020371 | | 2/2016 |
| WO | 2016044954 | A1 | 3/2016 |
| WO | 2016/050726 | | 4/2016 |
| WO | 2016/057991 | A1 | 4/2016 |
| WO | 2016/090212 | A1 | 6/2016 |
| WO | 2016/109758 | A2 | 7/2016 |
| WO | 2016/179046 | A1 | 11/2016 |
| WO | 2016/179047 | A1 | 11/2016 |
| WO | 2016/200987 | A1 | 12/2016 |
| WO | 2016210238 | A1 | 12/2016 |
| WO | 2017087939 | A1 | 5/2017 |
| WO | 2017112827 | A1 | 6/2017 |
| WO | 2017131821 | A1 | 8/2017 |
| WO | 2018017106 | A1 | 1/2018 |
| WO | 2018045004 | A1 | 3/2018 |
| WO | 2018094027 | | 5/2018 |
| WO | 2018/119419 | | 6/2018 |
| WO | 2018102733 | A1 | 6/2018 |
| WO | 2018160244 | A1 | 9/2018 |
| WO | 2018160245 | A1 | 9/2018 |
| WO | 2018195603 | A1 | 11/2018 |
| WO | 2019018840 | A1 | 1/2019 |
| WO | 2019028355 | A1 | 2/2019 |
| WO | 2019/046909 | | 3/2019 |
| WO | 2019055968 | A2 | 3/2019 |
| WO | 2019084380 | | 5/2019 |
| WO | 2019113468 | | 6/2019 |
| WO | 2019155252 | A1 | 8/2019 |
| WO | 2020005845 | A1 | 1/2020 |
| WO | 2020214843 | A1 | 10/2020 |
| WO | 2022226376 | A2 | 10/2022 |
| WO | 2023168448 | A1 | 9/2023 |
| WO | 2024015884 | A1 | 1/2024 |
| WO | 2024015944 | A1 | 1/2024 |
| WO | 2024020353 | A1 | 1/2024 |
| WO | 2024168313 | A1 | 8/2024 |

OTHER PUBLICATIONS

Li, J., et al., "Antitumour and antimicrobial activities of endophytic stretomycetes from pharmaceutical plants in rainforest", Lett Appl Microbiol. Dec. 2008; 47(6): 574-80. (Year: 2008).

Hamayun, M., et al., "Gibberellin production and plant growth promotion from pure cultures of *Cladosporium* sp. MH-6 isolated from cucumber (*Cucumis sativus* L.)", Mycologia, 102 (5), 2010, pp. 989-995.

Shupeng, T., et al. "Advances in Study of Interactions between Mycorrhizal Fungi and Bacteria", Journal of Qingdao Agricultural University (Natural Science Edition), vol. 30, Issue 4, pp. 240-246, Dec. 31, 2013.

Kim, S., et al., "Physiological and proteomic analyses of Korean F1 maize (*Zea mays* L.) hybrids under water-deficit stress during flowering", Appl. Biol. Chem. (2019) 62:32.

Halligan, B., et al., "Cloning of the murine cDNA encoding VDJP, a protein homologous to the large subunit of replication factor C and bacterial DNA ligases", Gene (1995) 217-222.

Arend, J., et al., "Hydroquinone: O-glucosytransferase from cultivated Rauvolfia cells: enrichment and partial amino acid sequences", Phytochemistry (2000) 53:187-193.

Enchev, R., et al., "Protein neddylation: beyond cullin-RING ligases", (Nature Reviews: Molecular Cell Biology (2015) 16:30-44.

Bais, H., et al., "The Role of Root Exudates in Rhizophere Interactions with Plants and Other Organisms", Annual Review. Plant Biol. (2006) 57:233-266.

Goepfert, S., et al., "Molecular Identification and Characterization of the Arabidopsis D3,5, D2,4-Dienoyl-Coenzyme A Isomerase, a Peroxisomal Enzyme Participating in the b-Oxidation Cycle of Unsaturated Fatty Acids1", Plant Physiology (2005) 138:1947-1956.

Thomas, P., et al: "Endophytic Bacteria Associated with Growing Shoot Tips of Banana (*Musa* sp.) cv. Grand Naine and the Affinity of Endophytes to the Host", Microbial Ecology, Springer-Verlag, NE, vol. 58, No. 4, Jul. 25, 2009 (Jul. 25, 2009), pp. 952-964, XP019757395, ISSN: 1432-184X, DOI: 10.1007 /S00248-009-9559-Z.

Database Geneseq [Online] Sep. 30, 2010 (Sep. 30, 2010), "Cellulomonas fermentans 16s rRNA gene Seq ID:39.", retrieved from EBI accession No. GSN:AWL84299 Database accession No. AWL84299; & JP 2009 072168 A (Univ of Occupational & Environ) Apr. 9, 2009 (Apr. 9, 2009).

European Patent Office, Partial European Search Report, European Patent Application No. 20171870.7, Nov. 20. 2020, 18 Pages.

European Patent Office, European Search Report, European Patent Application No. 20171870.7, dated Mar. 1, 2021, 15 Pages.

GenBank Accession NR_041978, dated Aug. 8, 2011. (Year: 2011).

GenBank Accession AF394537, dated Jul. 2, 2002. (Year: 2002).

Andreolli, M., et al., "Endophytic Burkholderia fungorum DBT1 can improve phytoremediation efficiency of polycyclic aromatic hyrocarbons", Chemosphere, Pergamon Press, Oxford, GB, vol. 92, No. 6, May 21, 2013, pp. 688-694.

Extended European Search Report for EP 20202875.9, 16 pages.

Douglas, G., et al., "PICRUSt2 for prediction of metagenome functions", Nature Biotechnology, vol. 38, No. 6, Jun. 1, 2020, pp. 685-688.

Kemp, N., et al., "Sarocladium zeae is a systemic endophyte of wheat and an effective biocontrol agent against Fusarium head blight", Biological Control, vol. 149, Publication No. 104329, 10 pages (2020).

Wicklow, D., et al., "A protective endophyte of maize: Acremonium zeae antibiotics inhibitory to Aspergillus flavus and Fasarium verticillioides", Mycol. Res. 109 (5):610-618 (May 2005).

Pan, J., et al., "Effects of host plant environment and Ustilago maydis infection on the fungal endophyte community of maize (*Zea mays*)", New Phytologist, vol. 178, pp. 147-156 (2008).

Wicklow, D., et al., "Occurrence of pyrrocidine and dihydroresorcylide production among Acremonium zeae populations from maize grown in different regions", Canadian Journal of Plant Pathology, vol. 30, pp. 425-433 (2008).

(56) References Cited

OTHER PUBLICATIONS

European Patent Office, Partial European Search Report, European Patent Application No. 18791606.9, Jul. 26, 2021, 16 Pages.
Abaid-Ullah, M., et al., "Plant Growth Promoting Rhizobacteria: An Alternate Way to Improve Yield and Quality of Wheat (*Triticum aestivum*)", International Journal of Agriculture and Biology, vol. 17, No. 1, Jan. 1, 2015, pp. 51-60.
Colla, G., et al., "Coating seeds with endophytic fungi enhances growth, nutrient uptake, yield and grain quality of winter wheat", International Journal of Plant Production, vol. 9, No. 2, Apr. 1, 2015, pp. 171-190.
Larran, S., et al., "Endophytes from wheat as biocontrol agents against tan spot disease", Biological Control, vol. 92, Sep. 11, 2015, pp. 17-23.
European Patent Office, Search Report, European Patent Application No. 17825317.5, Oct. 12, 2021, 9 Pages.
Yuan, J., et al., "Roots from distinct plant developmental stages are capable of rapidly selecting their own microbiome without the influence of environmental and soil edaphic factors", Soil Biology and Biochemistry 89 (2015): 206-209.
Frichot, E., et al., "Testing for Associations between loci and environmental gradients using latent factor mixed models", Mol. Biol. Evol. 30:7 1687-1699 (Year: 2013).
Bicego, M., et al., "Investigating Topic Models' Capabilities in Expression Microarray Data Classification", IEEE/transactions on computational biology and bioinformatics, 9:8 1831-1836 (Year: 2012).
Gerber, G., et al., "Inferring Dynamic Signatures of Microbes in Complex Host Ecosystems", PLOS Computational Biology 8:8 e1002624, 14 pages (Year: 2012).
Holmes, I., et al., "Dirichlet Multinomial Mixtures: Generative Models for Microbial Metagenomics", PLoSONE 7:2, e30126, 15 pages (Year: 2012).
Kim, Y., et al., "Deciphering the human microbiome using next-generation sequencing data and bioinformatics approaches", Methods 79-80, p. 52-59 (Year: 2015).
Anesi, A., et al., "Towards a scientific interpretation of the terrior concept: platicisity of the grape berry metabolome", BMP plant biology 15:191, 17 pages (Year: 2015).
Hill, S.T., The pursuit of hoppiness: propelling hop into the genomic era. Thesis, Oregon State University, 80 pages (Year: 2016).
Li, M., et al., "Persistent homology and the branching topologies of plants", American Journal of Botany, 104:3, 349-353 (Year: 2017).
Schuerger, A., "Microbial Ecology of a Crewed Rover Traverse in the Arctic: Low Microbial Dispersal and Implications for Planetary Protection on Human Mars Missions", Astrobiology, vol. 15, No. 6, 2015, pp. 478-491.
Timmusk, S., "Paenibacillus polymyxa antagonizes oomycete plant pathogens *Phytophthora palmivora* and *Pythium aphanidermatum*", Journal of Applied Microbiology, GB, vol. 105, No. 5, Jan. 5, 2009, pp. 1473-1481.
Fatima, Z., "Antifungal activity of plant growth-promoting rhizobacteria isolates against Rhizoctonia solani in wheat", African Journal of Biotechnology, vol. 8(2), pp. 219-225, Jan. 19, 2009, pp. 219-225.
Sato, I., et al., "Suppressive Potential of Paenibacillus Strains Isolated from the Tomato Phyllosphere against Fusarium Crown and Root Rot of Tomato", Microbes Environ, vol. 29, No. 2, 168-177, 2014.
Combined printouts of term definitions from world wide web, performed by mkz Oct. 19, 2022 (Year: 2022).
Sarangi, S., et al., "Agricultural Activity Recognition with Smart-shirt and Crop Protocol", IEEE global humanitarian technology conference, p. 298-305 (Year: 2015).
Gibbs, A., et al., "Chemical Diversity: Definition and Quantification", IN Exploiting chemical diversity for drug discovery, Bartlett et al EDS. eIBSN 978-1-84755-255-6 p. 137-160.
Peiffer, J., et al., "The Genetic Architecture of Maize Height", Genetics, vol. 196, p. 1337-1356 (Year: 2015).
Kazemian, M., et al., "Improved accuracy of supervised CRM discovery with interpolated Markov models and cross-specieis comparison", Nucleic Acids Research, 2011, vol. 39, No. 22, 9463-9472.
Yeh, J.H., "Protein Remote Homology Detection Based on Latent Topic Vector Model", International conference on Networking and information technology, p. 456-460, (Year: 2010).
Heydari, A., "A Review on Biological Control of Fungal Plant Pathogens Using Microbial Antagonists", Journal of Biological Sciences, vol. 10 (4) 273-290 (Year: 2010).
Sessitsch, A., et al., "Functional Characteristics of an Endophyte Community Colonizing Rice Roots as Revealed by Metagenomic Analysis", MPMP vol. 25, No. 1, 2012, pp. 28-36.
Muhammad, N., et al., "Endophytes in biotechnology and agriculture", E-COST FA1103 Working Group Meeting in Trento/S. Michele, Italy Nov. 2012. (poster).
Hurek, T., et al., "*Azoarcus* sp. strain BH72 as a model for nitrogen-fixing grass endophytes", Journal of Biotechnology 106 (2003) 169-178.
Castillo Lopez, D. et al. "The Entomopathogenic Fungal Endophytes Purpureocillium lilacinum (formerly Paecilomyces lilacinus) and Beauveria bassiana Negatively Affect Cotton Aphid Reproduction under Both Greenhouse and Field Conditions," Plos One (2014) vol. 9, No. 8, e103891, pp. 1-8.
Yang,E.J. & Chang,H.C. "Bacillus subtilis strain MJP1 16S ribosomal RNA gene, partial sequence." GenBank Accession No. EU024822.1, deposited Jul. 10, 2007.
Ying,W. "Bacillus subtilis strain LC-4 16S ribosomal RNA gene, partial sequence." GenBank Accession No. GQ262726.1, deposited Jun. 11, 2009.
Zhou, W. et al., "A fungal endophyte defensive symbiosis affects plant-nematode interactions in cotton," Plant Soil, vol. 422, Dec. 21, 2016, pp. 251-266.
Zuccaro, A., et al., "Endophytic Life Strategies Decoded by Genome and Transcriptome Analyses of the Mutualistic Root Symbiont Piriformospora indica," PLOS Pathogens, 2011, vol. 7, No. 10, e1002290.
Gaussian process model definition from towarddatascience.com downloaded May 17, 2023 (Year: 2023).
Gaussian process model definition from wikipedia.com, downloaded May 17, 2023 (Year: 2023).
Ghahramani, Z. (2013) Bayesian non-parametrics and the probabilistic approach to modeling. Philosophical transactions of the royal society A, vol. 371, 20110553, 20 pages.
Donahue, J. et al. Adversarial feature learning. arXiv: 1605. 09782V7, Apr. 3, 2017.
Buee, et al. ("The rhizosphere zoo: an overview of plant-associated communities of microorganisms, including phages, bacteria, archaea, and fungi, and of some of their structuring factors." (2009): 189-212). (Year: 2009).
Hanapi, et al. ("Biofertilizer: Ingredients for Sustainable Agriculture." Biotechnology Development in Agriculture, Industry and Health: Current Industrial Application and Future Trends 1 (2012): 359-385). (Year: 2012).
Singh ("Screening and characterization of plant growth promoting rhizobacteria (PGPR): An overview." Bulletin of Environmental and Scientific Research 4.1-2 (2015): 1-2). (Year: 2016).
Database accession No. JQ759107, European Nucleotide Archive [Online] EMBL's European Bioinformatics Institute; Mar. 7, 2012, U'ren J M et al: "*Sordariomycetes* sp.genotype 60 isolate AK0688 internal transcribed spacer."
Database accession No. MG917011, European Nucleotide Archive [Online] EMBL's European Bioinformatics Institute; Feb. 21, 2019, Lagarde A. et al: "*Coniochaeta* sp.isolate Gir_07 internal transcribed spacer 1, partial sequence."
Database accession Nos. MZ267873, MZ267979, MZ267926, MZ267820; European Nucleotide Archive [Online] EMBL's European Bioinformatics Institute; Sep. 11, 2021, Arnold A E: "Coniochaeta nivea isolate LG0013 various submissions."
Database accession Nos. MZ267874, MZ267980, MZ267927, MZ267821; European Nucleotide Archive [Online] EMBL's European Bioinformatics Institute; Sep. 11, 2021, Arnold A E: "Coniochaeta nivea isolate LG0023."

(56) References Cited

OTHER PUBLICATIONS

Arnold, A. Elizabeth et al; "*Coniochaeta elegans* sp. nov., *Coniochaeta montana* sp. nov. and *Coniochaeta nivea* sp. nov., three new species of endophytes with distinctive morphology and functional traits", Int J Syst Evolu Microb vol. 71 No. 11, p. 5003.
Kokaew, J. et al; "Coniochaeta ligniaria an endophytic fungus from *Baeckea frutescens* and its antagonistic effects against plant pathogenic fungi", Thai Journal of Agricultural Science, vol. 44, Jun. 1, 2011, pp. 123-131.
Lagarde A. et al: "Antiproliferative and antibiofilm potentials of endolichenic fungi associated with the lichen Nephroma laevigatum", Journal of Applied Microbiology, vol. 126, No. 4, Jan. 30, 2019, pp. 1044-1058.
Nilsson et al; "Correspondence: Intraspecific ITS Variability in the Kingdom Fungi as Expressed in the International Sequence Databases and Its Implications for Molecular Species Identification", Evolutionary Bioinformatics, Jan. 1, 2008, pp. 193-201.
Trifonova, R. et al; "Interactions of plant-beneficial bacteria with the ascomycete Coniochaeta ligniaria", Journal of Applied Microbiology, vol. 106, No. 6, Jun. 1, 2009, pp. 1859-1866.
U'Ren, Jana M., et al.; "Community Analysis Reveals Close Affinities Between Endophytic and Endolichenic Fungi in Mosses and Lichens", Microbial Ecology, vol. 60, No. 2,Jul. 13, 2010, pp. 340-353.
Shah, S., et al: "Colonization with non-mycorrhizal culturable endophytic fungi enhances orchid growth and indole acetic acid production", BMC Microbiology, vol. 22, No. 1, Jan. 1, 2022, pp. 1-13.
Natsume, Y. "Gaussian Process Models: Simple Machine Learning Models Capable of Modelling Complex Behaviours, " Towards Data Science (2021) downloaded May 17, 2023, 19 pages.
Abss, N_Geneseq, Jun. 17, 2024, Result 1 comparison with SEQ ID No. 303, pp. 1-4, Jul. 1, 2024.
Abss, N_Geneseq, Jun. 17, 2024, Result 11 comparison with SEQ ID No. 303, pp. 1-4, Jul. 1, 2024.
Albert, S. "Vegetable Seeds per Ounce/per Gram" Seed Starting—Harvest to Table, downloaded from the website http://www.harvesttotable.com/2011/05/vegetable_seeds_per_ounce_per/ on Mar. 27, 2017, 5 pages.
Amatuzzi, R.F., et al., "Universidade Federal Do Parana," Jan. 1, 2014, 52 Pages. (With English Abstract).
Amiet-Charpentier, C. et al. "Microencapsulation of rhizobacteria by spray-drying: formulation and survival studies." Journal of Microencapsulation vol. 15,5 (1998): 639-59.
Castro, R. et al. "Isolation and enzyme bioprospection of endophytic bacteria associated with plants of Brazilian mangrove ecosystem." SpringerPlus vol. 3,382 (2014).
Elarabi, Nagwa I et al. "Bacillus aryabhattai Facu: A promising bacterial strain capable of manipulate the glyphosate herbicide residues." Saudi Journal of Biological Sciences vol. 27,9 (2020): 2207-2214.
Elshafie, H. S. et al. "In vitro antifungal activity of Burkholderia gladioli pv. agaricicola against some phytopathogenic fungi." International Journal of Molecular Sciences vol. 13, 12 (2012): 16291-302.
Elshafie, H.S. et al. "Biochemical characterization of volatile secondary metabolites produced by Burkholderia gladioli pv. agaricicola." International Journal of Drug Discovery, vol. 5, (2013):181-184.
Failor, K.C. et al. "Pseudomonas syringae strain BAV3981 16S ribosomal RNA gene, partial sequence," NCBI GenBank, Accession No. KY074468, Dec. 20, 2016 (Dec. 20, 2016), pp. 1of 1. Retrieved from the Internet: <www.ncbi.nlm.nih.gov/nuccore/KY074468> on Sep. 21, 2018 (Sep. 21, 2018).
Fiedler, Z. et al. "Nematophagous fungus Paecilomyces lilacinus (Thom) Samson is also a biological agent for control of greenhouse insects and mite pests," BioControl (2007) vol. 52, pp. 547-558.
Gaiero, N.R. et al. "Inside the Root Microbjome: Bacterial Root Endophytes and Plant Growth Promotion." American Journal of Botany vol. 100,9 (2013): 1738-1750.
Giannantonio, et al. "Molecular characterizations of microbial communities fouling painted and unpainted concrete structures." International Biodeterioration & Biodegradation vol. 63,1 (2009):30-40.
Han, Q. et al. "Endophytic bacterium 41P-2 16S ribosomal RNA gene, partial sequence," NCBI GenBank, Accession No. JF901350, Dec. 7, 2012 (Dec. 7, 2012), pp. 1-2. Retrieved from the Internet: <www.ncbi.nlm.nih.gov/nuccore/JF901350> on Sep. 21, 2018 (Sep. 21, 2018).
Hattingh et al., Gen Bank: JX968501.1; Direct submission, Microorganisms isolated from barley, Dec. 31, 2012.
Herzner, A. M. et al. "Expression of the lantibiotic mersacidin in Bacillus amyloliquefaciens FZB42." PloS one vol. 6,7 (2011) e22389.
Houston, K. et al. "The Plant Cell Wall: A Complex and Dynamic Structure as Revealed by the Responses of Genes under Stress Conditions." Frontiers in Plant Science vol. 7,984 (2016): 1-18.
Hoy, M.A. et al. "Enterobacter endosymbiont of Metaseiulus occidentalis clone pAJ240 16S ribosomal RNA gene, partial sequence," NCBI GenBank, Accession No. AY753173, pp. 1-2. Retrieved from the Internet:<www.ncbi.nlm.nih.gov/nuccore/AY753173> on Sep. 21, 2018 (Sep. 21, 2018).
Huang, S. et al. "Spray drying of probiotics and other food-grade bacteria: A review." Trends in Food Science & Technology 63 (2017): 1-17.
International Search Report and Written Opinion for International Patent Application No. PCT/CA2015/050970 mailed Jan. 7, 2016, 12 pages.
International Search Report and Written Opinion in International Patent Application No. PCT/US2016/043408 dated Oct. 19, 2016.
International Search Report and Written Opinion in International Patent Application No. PCT/US2018/043259 dated Oct. 4, 2018.
International Search Report and Written Opinion in International Patent Application No. PCT/US2018/045173 dated Oct. 30, 2018.
International Search Report and Written Opinion in International Patent Application No. PCT/US2019/038754 dated Sep. 24, 2019.
International Search Report and Written Opinion in International Patent Application No. PCT/US2023/063741 dated Jun. 5, 2023.
International Search Report and Written Opinion in International Patent Application No. PCT/US2023/070091 dated Nov. 8, 2023.
International Search Report and Written Opinion in International Patent Application No. PCT/US2023/070181 dated Nov. 6, 2023.
International Search Report and Written Opinion in International Patent Application No. PCT/US2023/070356 dated Dec. 20, 2023.
International Search Report and Written Opinion in International Patent Application No. PCT/US2024/015273 dated May 27, 2024.
International Search Report and Writtien Opinion in International Patent Application No. PCT/US2023/070356 dated Nov. 13, 2023.
Irie, H. et al. "Pseudomonas graminis gene for 16S rRNA, partial sequence, strain: KF701," NCBI Genbank, Accession No. AB109886, Jul. 29, 2009 (Jul. 29, 2009), pp. 1-2. Retrieved from the Internet:<www.ncbi.nlm.nih.gov/nuccore/AB109886> on Sep. 21, 2018 (Sep. 21, 2018).
Irizarry, I., & White, J. F. "Application of bacteria from non-cultivated plants to promote growth, alter root architecture and alleviate salt stress of cotton." Journal of Applied Microbiology, vol. 122,4 (2017):1110-1120.
Islam, Md Rezuanul et al. "Isolation and Identification of Antifungal Compounds from Bacillus subtilis C9 Inhibiting the Growth of Plant Pathogenic Fungi." Mycobiology vol. 40,1 (2012): 59-66.
Jaspers, E., and Overmann, J. "Ecological significance of microdiversity: identical 16S rRNA gene sequences can be found in bacteria with highly divergent genomes and ecophysiologies." Applied and Environmental Microbiology vol. 70,8 (2004): 4831-9.
Kim, Young-Sook et al. "*Bacillus* sp. BS061 Suppresses Powdery Mildew and Gray Mold." Mycobiology vol. 41,2 (2013): 108-11.
Kishore, G. K. et al. "Biological control of collar rot disease with broad-spectrum antifungal bacteria associated with groundnut." Canadian Journal of Microbiology vol. 51,2 (2005): 123-32.
Lan, Y. et al. "Marker genes that are less conserved in their sequences are useful for predicting genome-wide similarity levels between closely related prokaryotic strains." Microbiome vol. 4,18 (2016): 1-13.

(56) References Cited

OTHER PUBLICATIONS

Moore, F.P. et al. "Endophytic bacterial diversity in poplar trees growing on a BTEX-contaminated site: the characterisation of isolates with potential to enhance phytoremediation." Systematic and Applied Microbiology vol. 29,7 (2006): 539-56.
Mputu K.J. & Thonart P. "Optimisation of Production, Freeze-drying and Storage of Pseudomonas fluorescens BTP1." International Journal of Microbiology Research vol. 5, 1 (2013): 370-373.
NCBI Blast, Sequence Comparison—SEQ ID No. 303 to Escherichia hermannii strain MH7, performed Jul. 23, 2025.
Proenca, D.N. "*Pseudomonas* sp. M47tronco1 16S ribosomal RNA gene, partial sequence," NCBI GenBank, Accession No. HQ538790, May 2, 2012 (May 2, 2012), pp. 1-2. Retrieved from the Internet:<www.ncbi.nlm.nih.gov/nuccore/HQ538790> on Sep. 21, 2018 (Sep. 21, 2018).
Proença, D.N. et al. "Diversity of bacteria associated with Bursaphelenchus xylophilus and other nematodes isolated from Pinus pinaster trees with pine wilt disease." PloS one, vol. 5,1, e15191 (2010): 1-9.
Rani, H., and R.D. Bhardwaj. "Quality attributes for barley malt: "The backbone of beer"." Journal of Food Science vol. 86,8 (2021): 3322-3340.
Raza, W. et al. "Paenibacillus Polymyxa: Antibiotics, Hydrolytic Enzymes and Hazard Assessment." Journal of Plant Pathology, vol. 90, 3 (2008): 419-430.
Rodriguez, R.J. et al. "Fungal endophytes: diversity and functional roles," New Phytologist, vol. 182, 2 (2009): 314-330.
Soares, M. et al. "Functional Role of Bacteria from Invasive Phragmites australis in Promotion of Host Growth," Microbial Ecology, vol. 72, 2, (2016): 407-417.
Soares, M.A. et al. "*Microbacterium oxydans* strain B2 16S ribosomal RNA gene, partial sequence," NCBI GenBank, Accession No. KP860310, Jun. 8, 2016 (Jun. 8, 2016), pp. 1-2. Retrieved from the Internet:<www.ncbi.nlm.nih.gov/nuccore/KP860310> on Sep. 21, 2018 (Sep. 21, 2018).
Vetrovský, T., and Baldrian, P. "The variability of the 16S rRNA gene in bacterial genomes and its consequences for bacterial community analyses." PloS One vol. 8,2 (2013): e57923.
White, J.F. et al. "Collaboration Between Grass Seedlings and Rhizobacteria to Scavenge Organic Nitrogen in Soils." AoB Plants vol. 7 (2015): 1-11.
White, J.F. et al. "How Do Endophytes Function to Enhance Host Plant Growth and Survival." AACC the Future of Food Sustainability and Safety Symposium. Presentation. May 2016, pp. 1-93.
Won, S. et al. "rRNA operon improves species-level classification of bacteria and microbial community analysis compared to 16S rRNA." Microbiology Spectrum vol. 12,11 (2024): e0093124.
Zhang, L. et al. "Global analysis of gene expression profiles in physic nut (*Jatropha curcas* L.) seedlings exposed to salt stress." PloS one vol. 9,5 (2014): e97878.
PCT International Search Report and Written Opinion, Application No. PCT/AU2015/000360, Aug. 5, 2015, 12 Pages.
PCT Invitation to Pay Additional Fees, PCT Application No. PCT/US2015/038110, Sep. 22, 2015, 8 Pages.
PCT Invitation to Pay Additional Fees, PCT Application No. PCT/US2015/038187, Oct. 14, 2015, 5 Pages.
PCT International Search Report and Written Opinion, PCT Application No. PCT/US2015/038187, Jan. 22, 2016, 36 Pages.
PCT Invitation to Pay Additional Fees, PCT Application No. PCT/US2015/068206, Apr. 12, 2016, 5 Pages.
PCT International Search Report and Written Opinion, PCT Application No. PCT/US2015/068206, Jun. 27, 2016, 20 Pages.
PCT International Search Report and Written Opinion, PCT Application No. PCT/US2016/030292, Aug. 12, 2016, 20 Pages.
PCT International Preliminary Report on Patentability, PCT Application No. PCT/US2016/030292, Aug. 2, 2017, 23 Pages.
PCT International Search Report and Written Opinion, PCT Application No. PCT/US2016/030293, Aug. 11, 2016, 23 Pages.
PCT International Search Report and Written Opinion, PCT Application No. PCT/US2016/036504, Nov. 4, 2016, 18 Pages.
PCT International Search Report and Written Opinion, PCT Application No. PCT/US2016/039191, Nov. 29, 2016. 20 Pages.
PCT International Search Report and Written Opinion, PCT Application No. PCT/US2016/068144, May 18, 2017, 30 Pages.
Djordjevic, D., et al., "Microtiter Plate Assay for Assessment of Listeria monocytogenes Biofilm Formation," Annl Environ Microbiol., 2002, pp. 2950-2958, vol. 68, No. 6.
European Patent Office, Supplementary Partial European Search Report, European Patent Application No. 13874703.5, Jun. 21, 2016, 3 Pages.
European Patent Office, Supplementary European Search Report, European Patent Application No. 13874703.5, Oct. 21, 2016, 16 Pages.
European Patent Office, Communication Pursuant to Article 94(3) EPC for European Patent Application No. 13874703.5, Jan. 5, 2018, 4 Pages.
European Patent Office, Supplementary European Search Report, European Patent Application No. 14860187.5, May 24, 2017, 9 Pages.
European Patent Office, Supplementary European Search Report, European Patent Application No. 14874589.6, dated Jul. 11, 2017, 9 Pages.
European Patent Office, Communication Pursuant to Article 94(3) EPC for European Patent Application No. EP 14748326.7, Feb. 15, 2018, 7 Pages.
European Patent Office, Examination Report, European Patent Application No. 14748326.7, dated Jul. 19, 2017, 4 Pages.
European Patent Office, Examination Report for European Patent Application No. EP 14777213.1, Oct. 20, 2017, 12 Pages.
European Patent Office, Supplementary European Search Report, European Patent Application No. EP 15809264.3, Dec. 4, 2017, 16 Pages.
European Patent Office, Communication Pursuant to Article 94(3) EPC for European Patent Application No. 15810847.2, Nov. 17, 2017, 17 Pages.
European Patent Office, Supplementary European Search Report, European Patent Application No. EP 15812324.0, Nov. 2, 2017, 19 Pages.
United States Patent Office, Non-Final Office Action, U.S. Appl. No. 15/436,592, Aug. 30, 2017, 17 Pages.
United States Patent Office, Non-Final Office Action, U.S. Appl. No. 15/436,609, Aug. 30, 2017, 21 Pages.
Abarenkov, K., et al., "The UNITE Database for Molecular Identification of Fungi—Recent Updates and Future Perspectives," New Phytol., 2010, pp. 281-285, vol. 186.
Abdellatif, L., et al., "Endophytic hyphal compartmentalization is required for successful symbiotic Ascomycota association with root cells," Mycological Research, 2009, pp. 782-791, vol. 113.
Abdou, R., et al., "Botryorhodines A-D, antifungal and cytotoxic depsidones from Botryosphaeria rhodina, an endophyte of the medicinal plant *Bidens pilosa*," Phytochemistry, 2010, vol. 71, pp. 110-116.
Adhikari, M., et al., "A New Record of Pseudeurotium bakeri from Crop Field Soil in Korea," The Korean Journal of Mycology, 2016, pp. 145-149, vol. 44.
Ahmad, F., et al., "Screening of Free-Living Rhizospheric Bacteria for Their Multiple Plant Growth Promoting Activities," Microbiol Res., 2008, pp. 173-181, vol. 163.
Amann, R., et al., "The Identification of Microorganisms by Fluorescence in Situ Hybridisation," Curr Opin Biotechnol., 2001, pp. 231-236, vol. 12.
Apel, K., et al., "Reactive Oxygen Species: Metabolism, Oxidative Stress, and Signal Transduction," Annu Rev Plant Biol., 2004, pp. 373-399, vol. 55.
Arendt, K. R., et al., "Isolation of endohyphal bacteria from foliar Ascomycota and in vitro establishment of their symbiotic associations," Appl. Environ. Microbiol., 2016, pp. 2943-2949, vol. 82, No. 10.
Ashrafuzzaman, M., et al., "Efficiency of plant growth-promoting rhizobacteria (PGPR) for the enhancement of rice growth," African Journal of Biotechnology, 2009, pp. 1247-1252, vol. 8, No. 7.

(56) References Cited

OTHER PUBLICATIONS

Bacon, C. W, et al., "Isolation, In Planta Detection, and Uses of Endophytic Bacteria for Plant Protection," Manual of Environmental Microbiology, 2007, pp. 638-647.
Baker, K. F., et al., "Dynamics of Seed Transmission of Plant Pathogens," Annu Rev. Phytopathol., 1966, pp. 311-334, vol. 4.
Baltruschat, H., et al., "Salt tolerance of barley induced by the root endophyte Piriformospora indica is associated with a strong increase in antioxidants," New Phytologist., 2008, pp. 501-510, vol. 180.
Bensch, K., et al., "Species and ecological diversity within the Cladosporium cladosporioides complex (Davidiellaceae, Capnodiales)," Studies in Mycology, 2010, pp. 1-94, vol. 67.
Block, C. C., et al., "Seed Transmission of Pantoea stewartii in Field and Sweet Corn," Plant Disease, 1998, pp. 775-780, vol. 82.
Brinkmeyer, R., et al., "Uncultured Bacterium Clone ARKMP-100 16S Ribosomal RNA Gene, Partial Sequence," NCBI GenBank Accession No. AF468334, Submitted Jan. 14, 2002.
Brodie, E.L., et al., "Uncultured Bacterium Clone BANW722 16S Ribosomal RNA Gene, Partial Sequence," NCBI GenBank Accession No. DQ264636, Submitted Oct. 25, 2005, 1 Page.
Bulgarelli, D., et al., "Structure and Functions of the Bacterial Microbiota of Plants," Annu Rev Plant Biol., 2013, pp. 807-838, vol. 64.
Büttner, D., et al., "Regulation and secretion of Xanthomonas virulence factors," FEMS Microbiology Reviews, 2010, pp. 107-133, vol. 34, No. 2.
Caporaso, J.G., et al., "Ultra-High-Throughput Microbiol Community Analysis on the Illumina HiSeq and MiSeq Platforms," ISME J., 2012, pp. 1621-1624, vol. 6.
Castillo, D., et al., "Fungal Entomopathogenic Endophytes: Negative Effects on Cotton Aphid Reproduction in Greenhouse and Field Conditions," Power Point Presentation dated Mar. 23, 2013, 21 Pages.
Cavalier-Smith, T., "A Revised Six-Kingdom System of Life," Biol Rev Camb Philos Soc., 1998, pp. 203-266, vol. 73.
Chagas, F., et al., "A Mixed Culture of Endophytic Fungi Increases Production of Antifungal Polyketides," J. Chem Ecol., Oct. 2013, pp. 1335-1342, vol. 39.
Clark, E. M., et al., "Improved Histochemical Techniques for the Detection of Acremonium coenophilum in Tall Fescue and Methods of in vitro Culture of the Fungus," J Microbiol Methods, 1983, pp. 149-155, vol. 1.
Clarridge, J., "Impact of 16S rRNA Gene Sequence Analysis for Identification of Bacteria on Clinical Microbiology and Infectious Diseases," Clinical Microbiology Reviews, Oct. 2004, pp. 840-862, vol. 17, No. 4.
Gitaitis, R., et al., "The Epidemiology and Management of Seedborne Bacterial Diseases," Annu Rev Phytopathol., 2007, pp. 371-397, vol. 45.
Grondona, I., et al., "TUSAL®, a commercial biocontrol formulation based on Trichoderma," Bulletin OILB/SROP, 2004, pp. 285-288, vol. 27, No. 8.
Haake, V., et al., "Transcription Factor CBF4 is a Regulator of Drought Adaptation in *Arabidopsis*, " Plant Physiol., 2002, pp. 639-648, vol. 130.
Haas, D., et al., "R Factor Variants with Enhanced Sex Factor Activity in Pseudomonas aeruginosa," Mol Gen Genet., 1976, pp. 243-251, vol. 144.
Hahm, M-S., et al., "Biological Control and Plant Growth Promoting Capacity of Rhizobacteria and Pepper Under Greenhouse and Field Conditions," The Journal of Microbiology, The Microbiological Society of Korea, Heidelberg, Jun. 30, 2012, pp. 380-385, vol. 50, No. 3.
Hallman, J., et al., "Bacterial Endophytes in Agricultural Crops," Canadian J Microbiol., 1997, pp. 895-914, vol. 43.
Hanson, L.E., "Reduction of Verticillium Wilt Symptoms in Cotton Following Seed Treatment with Trichoderma virens," The Journal of Cotton Science, 2000, pp. 224-231, vol. 4, No. 4.
Hanson, LE., "Reduction of Verticillium Wilt Symptoms in Cotton Following Seed Treatment with Trichoderma virens," Proceedings Beltwide Cotton Conferences, 2000, vol. 1. (Abstract), 1 Page.
Hardegree, S. P. et al., "Effect of Polyethylene Glycol Exclusion on the Water Potential of Solution—Saturated Filter Paper," Plant Physiol., 1990, pp. 462-466, vol. 92.
Hardoim, P. R., et al., "Assessment of Rice Root Endophytes and Their Potential for Plant Growth Promotion," In: Hardoim, P.R., Bacterial Endophytes of Rice—Their Diversity, Characteristics and Perspectives, Groningen, 2011, pp. 77-100.
Harman, G.E., et al., "Symposium: biocontrol and biotechnological methods for controlling cotton pests," Proceedings of the Beltwide Cotton Production Research Conf., 1989, Memphis, Tennessee, USA, pp. 15-20. (Abstract).
Hepler, P. K., et al., "Polarized Cell Growth in Higher Plants," Annu Rev Cell Dev Biol., 2001, pp. 159-187, vol. 17.
Hibbett, D.S., et al., "A Higher-Level Phylogenetic Classification of the Fungi," Mycol Res., 2007, pp. 509-547, vol. 111.
Hill, N. S., et al., "Endophyte Survival during Seed Storage: Endophyte-Host Interactions and Heritability," Crop Sci., 2009, pp. 1425-1430, vol. 49.
Hill N. S., et al., "Endophyte Survival during Seed Storage: Endophyte-Host Interactions and Heritability," PowerPoint, Dept. Crop Soil Sciences, University of Georgia, Nov. 16, 2012, 3 Pages.
Hinton, D. M., et al., "Enterobacter cloacae is an endophytic symbiont of corn," Mycopathologia, 1995, pp. 117-125, vol. 129.
Howell, C.R., et al., "Induction of Terpenoid Synthesis in Cotton Roots and Control of Rhizoctonia solani by Seed Treatment with Trichoderma virens," Phytopathology, 2000, pp. 248-252, vol. 90, No. 3.
Hubbard, M., et al., "Fungal Endophytes Improve Wheat Seed Germination Under Heat and Drought Stress," Botany, 2012, pp. 137-149, vol. 90.
Humann, J., et al., "Complete genome of the onion pathogen Enterobacter cloacae EcWSU1 ," Standard in Genomic Sciences, Dec. 31, 2011, vol. 5, No. 3, pp. 279-286.
Hung, P.Q., et al., "Isolation and Characterization of Endophytic Bacteria in Soybean (*Glycine* Sp.)," Omonrice, 2004, pp. 92-101, vol. 12.
Idris, A., et al., "Efficacy of Rhizobacteria for Growth Promotion in Sorghum Under Greenhouse Conditions and Selected Modes of Action Studies," J Agr Sci., 2009, pp. 17-30, vol. 147.
Ikeda, S., et al., "The Genotype of the Calcium/Calmodulin-Dependent Protein Kinase Gene (CCaMK) Determines Bacterial Community Diversity in Rice Roots Under Paddy and Upland Field Conditions," Applied and Environmental Microbiology, 2011, pp. 4399-4405, vol. 77, No. 13.
Imoto, K., et al., "Comprehensive Approach to Genes Involved in Cell Wall Modifications in *Arabidopsis thaliana*," Plant Mol Biol., 2005, pp. 177-192, vol. 58.
Jalgaonwala, R., et al., "A Review on Microbiol Endophytes from Plants: A Treasure Search for Biologically Active Metabolites," Global Journal of Research on Medicinal Plants & Indigenous Medicine, 2014, pp. 263-277, vol. 3, No. 6.
Janda, J.M., et al., "16S rRNA Gene Sequencing for Bacterial Identification in the Diagnostic Laboratory: Pluses, Perils, and Pitfalls," Journal of Clinical Microbiology, 2007, pp. 2761-2764, vol. 45, No. 9.
Johnston-Monje, D., et al., "Plant and Endophyte Relationships: Nutrient Management," Comprehensive Biotechnol., 2011, pp. 713-727, vol. 4.
Jones, K.L., "Fresh Isolates of Actinomycetes in which the Presence of Sporogenous Aerial Mycelia is a Fluctuating Characteristic," J Bacteriol., 1949, pp. 141-145, vol. 57, No. 2.
Kaga, H., et al., "Rice Seeds as Sources of Endophytic Bacteria," Microbes Environ., 2009, pp. 154-162, vol. 24, No. 2.
Kalns, L., et al., "The Effects of Cotton Fungal Endophytes in the Field on Arthropod Community Structure," Power Point Presentation dated Jan. 7, 2013, 17 Pages.
Kang, B. H., et al., "Members of the *Arabidopsis* Dynamin-Like Gene Family, ADL1, are Essential for Plant Cytokinesis and Polarized Cell Growth," Plant Cell, 2003, pp. 899-913, vol. 15.

(56) References Cited

OTHER PUBLICATIONS

Khan, A.L., et al., "Salinity Stress Resistance Offered by Endophytic Fungal Interaction Between Penicillium minioluteum LHL09 and Glycine max. L," J. Microbiol. Biotechnol., 2011, pp. 893-902, vol. 21, No. 9.
Kruger, M., et al., "DNA-Based Species Level Detection of Glomeromycota: One PCR Primer Set for All Arbuscular Mycorrhizal Fungi," New Phytol., 2009, pp. 212-223, vol. 183.
Kuklinsky-Sobral, J., et al., "Isolation and Characterization of Endophytic Bacteria from Soybean (*Glycine max*) Grown in Soil Treated with Glyphosate Herbicide," Plant and Soil, 2005, pp. 91-99, vol. 273.
Kuklinsky-Sobral, J., et al., "Isolation and characterization of soybean-associated bacteria and their potential for plant growth promotion," Environmental Microbiology, 2004, pp. 1244-1251, vol. 6, No. 12.
Kumar, S., et al., "MEGA7: Molecular Evolutionary Genetics Analysis version 7.0 for bigger datasets," Molecular Biology and Evolution, Mar. 22, 2016, vol. 33, pp. 1870-1874.
Labeda, D.P., et al., "Phylogenetic study of the species within the family Streptomycetaceae," Antonie van Leeuwenhoek, 2012, vol. 101, pp. 73-104, Springer.
Lanver, D., et al., "Sho1 and Msb2-Related Proteins Regulate Appressorium Development in the Smut Fungus *Ustilago aydis*," Plant Cell, 2010, pp. 2085-2101, vol. 22.
Le, X.H., et al., "Isolation and characterisation of endophytic actinobacteria and their effect on the early growth and nodulation of lucerne (*Medicago sativa* L.)," 17th Australian Nitrogen Fixation Conference 2014 Proceedings, Sep. 29, 2014, ed. Gupta, V.V.S.R., Unkovich, M. and Kaiser, B. N., Asnf, University of Adelaide, pp. 134-136.
Lehman, S.G., "Treat Cotton Seed," Review of Applied Mycology, 1945, 24, 369, 16 Pages.
Lehman, S.G., "Treat Cotton Seed," Research and Farming III, Progr. Rept., 1945, 3, 5, 16 Pages.
Leonard, C. A., et al., "Random Mutagenesis of the Aspergillus oryzae Genome Results in Fungal Antibacterial Activity," Int J Microbiol., 2013, vol. 2013, Article ID 901697, 6 Pages.
Li, H. M., et al., "Expression of a Novel Chitinase by the Fungal Endophyte in Poa ampla," Mycologia, 2004, pp. 526-536, vol. 96, No. 3.
Li, H., et al., "Endophytes and their role in phytoremediation," Fungal Diversity, 2012, pp. 11-18, vol. 54.
Liu, M., et al., "A Novel Screening Method for Isolating Exopolysaccharide-Deficient Mutants," Appl Environ Microbiol., 1998, pp. 4600-4602, vol. 64, No. 11.
Liu, Y., et al., "Investigation on Diversity and Population Succession Dynamics of Endophytic Bacteria from Seeds of Maize (*Zea mays* L., Nongda108) at Different Growth Stages," Ann Microbiol., 2013, pp. 71-79, vol. 63.
Liu, D., et al., "Osmotin Overexpression in Potato Delays Development of Disease Symptoms," Proc Natl Acad Sci USA, 1994, pp. 1888-1892, vol. 91.
Liu, Y., et al., "Study on Diversity of Endophytic Bacterial Communities in Seeds of Hybrid Maize and their Parental Lines," Arch Microbiol., 2012, pp. 1001-1012, vol. 194.
Long, H. H., et al., "The Structure of the Culturable Root Bacterial Endophyte Community of Nicotiana attenuata is Organized by Soil Composition and Host Plant Ethylene Production and Perception," New Phytol., 2010, pp. 554-567, vol. 185.
Lopez-Lopez, A., et al., "Phaseolus vulgaris Seed-Borne Endophytic Community with Novel Bacterial Species such as *Rhizobium endophyticum* sp. nov.," Systematic Appl Microbiol., 2010, pp. 322-327, vol. 33.
Lorck, H., "Production of Hydrocyanic Acid by Bacteria," Physiol Plant, 1948, pp. 142-146, vol. 1.
Zhao, Y., et al., "Bacillus amyloliquefaciens strain BGP14 16S ribosomal RNA gene, partial sequence", Accession No. JQ734536, deposited May 2012.
Allard, G. et al., "SPINGO: a rapid species-classifier for microbial amplicon sequences," BMC Bioinformatics, 2015, vol. 16, No. 324, 8 pages.
Anders, S. et al., "Differential expression analysis for sequence count data," Genome Biology, 2010, vol. 11, No. 11, pp. R106.
Ansari, M.A.; Brownbridge, M.; Shah, F.A.; Butt, T.M. Efficacy of entomopathogenic fungi against soil-dwelling life stages of western flower thrips, Frankliniella occidentalis, in plant-growing media. Entomol. Exp. Appl. 2008, 127, 80-87.
Asaff, A.; Cerda-García-Rojas, C.; De la Torre, M. Isolation of dipicolinic acid as an insecticidal toxin from Paecilomyces fumosoroseus. Appl. Microbiol. Biotechnol. 2005, 68, 542-547.
BB-CBI, "Beauveria bassiana (white muscardine fungus)," Invasive Species Compendium, 2021, pp. 1-68.
Beris, E.I.; Papachristos, D.P.; Fytrou, A.; Antonatos, S.A.; Kontodimas, D.C. Pathogenicity of three entomopathogenic fungi on pupae and adults of the Mediterranean fruit fly, Ceratitis capitata (Diptera: Tephritidae). J. Pest Sci. 2013, 86, 275-284.
Chen, F. et al., "Assessing Performance of Orthology Detection Strategies Applied to Eukaryotic Genomes," PLoS One, Apr. 2007, No. 4, pp. e383.
Cole, J.R. et al., "Ribosomal Database Project: data and tools for high throughput rRNA analysis," Nucleic Acids Research, 2014, vol. 42, pp. D633-D642.
Deshpande, V. et al., "Fungal identification using a Bayesian classifier and the Warcup training set of internal transcribed spacer sequences," Mycologia, 2016, vol. 108, No. 1, pp. 1-5.
Djian, C. et al., Acetic acid: A selective nematicidal metabolite from culture filtrates of Paecilomyces lilacinus (Thom) Samson and Trichoderma longibrachiatum Rifai. Nematologica 1991, 37, 101-112.
Doster, M.A. et al., "Biocontrol of Aflatoxins in Figs," Proceedings of the Third International Symposium on Fig, 798, 2008, pp. 223-226.
Eberhardt, C. et al., "Proteomic Analysis of Kveim Reagent Identifies Targets of Cellular Immunity in Sarcoidosis," PLOS One, Jan. 23, 2017, vol. 12, No. 1, pp. 1-16.
Edgar, R.C., "UNOISE2: Improved Error-Correction for Illumina 16S and ITS Amplicon Sequncing," BioRxiv, 2016, No. 081257, 21 pages.
Ehteshamul-Haque, S. et al., "Biological control of root rot diseases of okra, sunflower, soybean and mungbean," Pakistan Journal of Botany, vol. 22, No. 2, Jun. 1990, pp. 121-124.
Enright, A.J. et al., "An efficient algorithm for large-scale detection of protein families," Nucleic Acids Research, 2002, vol. 30, No. 7, pp. 1575-1584.
Enright, A.J. et al., "Protein families and TRIBES in genome sequence space," Nucleic Acids Research, 2003, vol. 31, No. 15, pp. 4632-4638.
Faria, M.; Wraight, S.P. Biological control of Bemisia tabaci with fungi. Crop Prot. 2001, 20, 767-778.
Fiedler, Z.; Sosnowska, D. Nematophagous fungus *Paecilomyces lilacinus* (Thom) Samson is also a biological agent for control of greenhouse insects and mite pests. BioControl 2007, 52, 547-558.
Friedman, J. et al., "Regularization Path for Generalized Linear Models via Coordinate Descent," Journal of Statistical Software, 2010, vol. 33, No. 1, pp. 1-22.
Hoy, M.A.; Singh, R.; Rogers, M.E. Evaluations of a novel isolate of Isaria fumosorosea for control of the Asian citrus psyllid, Diaphorina citri (Hemiptera: Psyllidae). Fla. Entomol. 2010, 93, 24-32.
Kepenekci, I. et al., "Pathogenicity of the Entomopathogenic Fungus, *Purpureocillium lilacinum* TR1 Against the Black Cherry Aphid, Myzus Cerasi Fabricus (Hemiptera: Aphididae)," Mun. Ent. Zool., vol. 10, No. 1, Jan. 2015, pp. 53-60.
Koljalg. U. et al., "Towards a unified paradigm for sequence-based identification of fungi," Molecular Ecology, 2013, vol. 22, pp. 5271-5277.
Kozich, J.J. et al., "Development of a Dual-Index Sequencing Strategy and Curation Pipeline for Analyzing Amplicon Sequence Data on the MiSeq Illumina Sequencing Platform," Applied and Environmental Microbiology, Sep. 2013, vol. 79, No. 17, pp. 5112-5120.

(56) References Cited

OTHER PUBLICATIONS

Li, W. et al., "Ultrafast clustering algorithms for metagenomic sequence analysis," Briefings in Bioinformatics, Nov. 1, 2012, vol. 13, No. 6., pp. 656-668.
McMurdie, P.J. et al., "Waste Not, Want Not: Why Rarefying Microbiome Data Is Inadmissible," PLOS Computational Biology, 2014, vol. 10, No. 4, pp. e1003531.
Mezeal, I.A.; Mizil, S.N.; Hussin, M.S. Researching biocontrol of Trichoderma viride, Paecilomyces lilacinus in contradiction of effectiveness of fungi insulated as of selected therapeutic herbals. Plant Arch. 2018, 18, 1631-1637.
NCBI, "Purpureocillium lilacinum," Taxonomy ID: 33203, 2021, three pages, [Online] [Retrieved on Feb. 27, 2021] Retrieved from the Internet <URL: https://www.ncbi.nlm.nih.gov/Taxonomy/Browser/wwwtax.cgi?id=33203>.
Needleman, S.B. et al., "A General Method Applicable to the Search for Similarities in the Amino Acid Sequence of Two Proteins," Journal of Molecular Biology, 1970, vol. 28, No. 3, pp. 443-453.
O'Callaghan, M., "Microbial inoculation of seed for improved crop performance: issues and opportunities," Applied Microbiology and Biotechnology, vol. 100, May 2016, pp. 5729-5746.
Pandey, R. K. et al., "Effect of different bioformulations of Paecilomyces lilacinus against root-knot nematode (*Meloidogyne incognita*) infecting tomato (*Solanum esculentum*)," Indian Journal of Agricultural Sciences, vol. 81, No. 3, Mar. 2011, pp. 261-267.
Panyasiri, C.; Attathom, T.; Poehling, H.M. Pathogenicity of entomopathogenic fungi-potential candidates to control insect pests on tomato under protected cultivation in Thailand. J. Plant Dis. Prot. 2007, 114, 278-287.
Paul, N.C.; Deng, J.X.; Lee, J.H.; Yu, S.H. New records of endophytic Paecilomyces inflatus and Bionectria ochroleuca from chili pepper plants in Korea. Mycobiology 2013, 41, 18-24.
Perveen, Z.; Shahzad, S.A. Comparative study of the efficacy of *Paecilomyces species* against root-knot nematode Meloidogyne incognita. Pak. J. Nematol. 2013, 31, 125-131.
Piatkowski, J.; Krzyzewska, U.; Nawrot, U. Antifungal activity of *enthomopathogenic* species of the genus *Paecilomyces*. Mikol. Lek. 2003, 10, 93-99 (with copy of abstract).
Quast, C. et al., "The SILVA ribosomal RNA gene database project: improved data processing and web-based tools," Nucleic Acids Research, 2013, vol. 41, pp. D590-D596.
Raafat, I. et al., "Nezara viridula (Hemiptera: Pentatomidae) Cuticle as a Barrier for Beauveria bassiana and *Paecilomyces* sp. Infection," African Entomology, vol. 23, Iss. 1, Mar. 2015, pp. 75-87.
Rajinikanth, R. et al., "Management of nematode induced disease complex in seedlings of cauliflower (*Brsassica pleraceae* var. botrytis) using bio-pesticides," Pest Management in Horticultural Ecosystems, vol. 19, No. 2, Dec. 2013, pp. 203-210.
Ratnalikar, K.K. et al., "Biological management of root-rot of cotton caused by Rhizoctonia bataticola," Indian Phytopathol. 44-45, Suppl., XV, 1993, pp. 1-2.
Rideout, J.R. et al., "Subsampled open-reference clustering creates consistent, comprehensive OTU definitions and scales to billions of sequences," PeerJ, 2014, 2:e545.
Roth, A.C.J. et al., "Algorithm of OMA for large-scale orthology inference," BMC Bioinformatics, 2008, vol. 9, pp. 518.
Shenoy, B.D. et al., "Impact of DNA sequence-data on the taxonomy of anamorphic fungi," Fungal Diversity, 2007, vol. 26, No. 10, pp. 1-54.
Shibuya, H. et al., "Transformation of Cinchona Alkaloids into 1-N-Oxide Derivatives by *Endophytic xylaria* sp. Isolated from Chinchona pubescens," Chem Pharm Bull, 2003, vol. 41, No. 1, pp. 71-74.
Singh, S. et al., "Bio-control activity of Purpureocillium lilacinum strains in managing root-knot disease of tomato caused by *Meloidogyne incognita*," Biocontrol Science and Technology, vol. 23, No. 12, Sep. 2013, pp. 1469-1489.
Sivakumar, T.; Eswaran, A.; Balabaskar, P. Bioefficacy of antagonists against for the management of *Fusarium oxysporum* f. sp. lycopersici and Meloidogyne incognita disease complex of tomato under field condition. Plant Arch. 2008, 8, 373-377 (with copy of abstract).
Smith, T.F. et al., "Identification of Common Molecular Subsequences," Journal of Molecular Biology, 1981, vol. 147, pp. 195-197.
Spurgeon, D.W., "Efficacy of Beauveria bassiana Against Lygus hesperus (Hemiptera: Miridae) at Low Temperatures," Journal of Entomological Science, vol. 45, Iss. 3, Jul. 2010, pp. 211-219.
Sword, G. A. et al., "Endophytic fungi alter sucking bug responses to cotton reproductive structures," Insect Science, vol. 24, Mar. 22, 2017, pp. 1003-1014.
Yeo, H.; Pell, J.K.; Alderson, P.G.; Clark, S.J.; Pye, B.J. Laboratory evaluation of temperature effects on the germination and growth of entomopathogenic fungi and on their pathogenicity to two aphid species. Pest Manag. Sci. 2003, 59, 156-165.
Zhang, X-Y. et al., "Diversity and Antimicrobial Activity of Culturable Fungi Isolated from Six Species of the South China Sea Gorgonians," Microbial Ecology, vol. 64, Apr. 2012, pp. 617-627.
Clay, K., "Effects of fungal endophytes on the seed and seedling biology of Lolium perenne and Festuca arundinacea," Oecologia, 1987, pp. 358-362, vol. 73.
Clough, S. J., et al., "Floral Dip: A Simplified Method for Agrobacterium-mediated Transformation of *Arabidopsis thaliana*," Plant J., 1998, pp. 735-743, vol. 16, No. 6.
Compant, S., et al., "Endophytes of Grapevines Flowers, Berries, and Seeds: Identification of Cultivable Bacteria, Comparison with Other Plant Parts, and Visualization of Niches of Colonization," Microbial Ecology, 2011, pp. 188-197, vol. 62.
Cottyn, B., et al., "Phenotypic and genetic diversity of rice seed-associated bacteria and their role in pathogenicity and biological control," Journal of Applied Microbiology, 2009, pp. 885-897, vol. 107.
Cox, C. D., "Deferration of Laboratory Media and Assays for Ferric and Ferrous lons," Methods Enzymol., 1994, pp. 315-329, vol. 235.
Craine, J. M., et al., "Global Diversity of Drought Tolerance and Grassland Climate-Change Resilience," Nature Climate Change, 2013, pp. 63-67, vol. 3.
Dalal, J.M., et al., "Utilization of Endophytic Microbes for Induction of Systemic Resistance (ISR) in Soybean (*Glycine max* (L) Merril) Against Challenge Inoculation with R. solani," Journal of Applied Science and Research, 2014, pp. 70-84, vol. 2, No. 5.
Danhorn, T., et al., "Biofilm Formation by Plant-Associated Bacteria," Annu Rev Microbiol., 2007, pp. 401-422, vol. 61.
Daniels, R., et al., "Quorum Signal Molecules as Biosurfactants Affecting Swarming in Rhizobium etli," PNAS, 2006, pp. 14965-14970, vol. 103, No. 40.
Darsonval, A., et al., "The Type III Secretion System of *Xanthomonas fuscans* subsp. fuscans is involved in the Phyllosphere Colonization Process and in Transmission to Seeds of Susceptible Beans," Applied and Environmental Microbiology, 2008, pp. 2669-2678, vol. 74, No. 9.
Dbget, "Orthology: K14454," 2005, 2 pages, can be retrieved at <URL:http://www.genome.jp/dbget-bin/wwwbget?ko:K14454>.
De Freitas, J. R., et al., "Phosphate-Solubilizing Rhizobacteria Enhance the Growth and Yield but not Phosphorus Uptake of Canola (*Brassica napus* L.)," Biol Fertil Soils, 1997, pp. 358-364, vol. 24.
De Lima Favaro, L. C., et al., "Epicoccum nigrum P16, a Sugarcane Endophyte, Produces Antifungal Compounds and Induces Root Growth," PLoS One, 2012, pp. 1-10, vol. 7, No. 6.
De Souza, J. J., et al., "Terpenoids from Endophytic Fungi," Molecules, 2011, pp. 10604-10618, vol. 16, No. 12.
Dennis, C., et al., "Antagonistic Properties of Species Groups of Trichoderma," Trans Brit Mycol Soc, 1971, pp. 25-39, vol. 57, No. 1.
Desiro, A., et al., "Detection of a novel intracellular microbiome hosted in arbuscular mycorrhizal fungi," ISME Journal, 2014, pp. 257-270, vol. 8.
Don, R.H., et al., "Properties of Six Pesticide Degradation Plasmids Isolated From Alcaligenes Paradoxus and Alcaligenes eutrophus," J Bacteriol., 1981, pp. 681-686, vol. 145, No. 2.

(56) References Cited

OTHER PUBLICATIONS

Dunbar, J, et al., "Uncultured Bacterium Clone NT42a2_20488 16S Ribosomal RNA Gene, Partial Sequence," NCBI GenBank Accession No. JQ378705. Submitted Nov. 8, 2012, 2 Pages.
Eberhard, A., et al., "Structural Identification of Autoinducer of Photobacterium fischeri Luciferase," Biochem., 1981, pp. 2444-2449, vol. 20.
Edgar, R. C., "Search and Clustering Orders of Magnitude Faster than BLAST," Bioinformatics, 2010, pp. 2460-2461, vol. 26, No. 19.
Ek-Ramos, M. J., "Ecology, Distribution and Benefits of Fungal Endophytes Isolated from Cultivated Cotton (*Gossypium hirsutum*) in Texas," Power Point Presentation dated Nov. 7, 2012, 27 Pages.
Ek-Ramos, M. J., et al., "Spatial and Temporal Variation in Fungal Endophyte Communities Isolated from Cultivated Cotton (*Gossypium hirsutum*)," PLoS ONE, 2013, vol. 8, No. 6, 13 Pages, e66049.
Ek-Ramos, M. J., et al., "Spatial and Temporal Variation in Fungal Endophyte Communities Isolated from Cultivated Cotton (*Gossypium hirsutum*)," Power Point Presentation dated Jan. 7, 2013.
El-Shanshoury, A. R., "Growth Promotion of Wheat Seedlings by *Streptomyces atroolivaceus*," Journal of Agronomy and Crop Science, 1989, pp. 109-114, vol. 163.
Emerson, D., et al., "Identifying and Characterizing Bacteria in an Era of Genomics and Proteomics," BioScience, 2008, pp. 925-936, vol. 58, No. 10.
Endre, G., et al., "A Receptor Kinase Gene Regulating Symbiotic Nodule Development," Nature, 2002, pp. 962-966, vol. 417.
Faria, D. C., et al., "Endophytic Bacteria Isolated from Orchid and Their Potential to Promote Plant Growth," World J Microbiol Biotechnol., 2013, pp. 217-221, vol. 29.
Ferrando, L., et al., "Molecular and Culture-Dependent Analyses Revealed Similarities in the Endophytic Bacterial Community Composition of Leaves from Three Rice (*Oryza sativa*) Varieties," FEMS Microbiol Ecol., 2012, pp. 696-708, vol. 80.
Fiehn, O., et al., "Metabolite Profiling for Plant Functional Genomics," Nature Biotechnol., 2000, pp. 1157-1161, vol. 8.
Fierer, N., et al., "Cross-Biome Metagenomic Analyses of Soil Microbiol Communities and Their Functional Attributes," Proc Natl Acad Sci USA, 2012, pp. 21390-21395, vol. 109, No. 52.
Fincher, G. B., "Molecular and Cellular Biology Associated with Endosperm Mobilization in Germinating Cereal Grains," Annu Rev Plant Physiol Plant Mol Biol., 1989, pp. 305-346, vol. 40.
Fisher, P. J., et al., "Fungal saprobes and pathogens as endophytes of rice (*Oryza sativa* L.)," New Phytol., 1992, pp. 137-143, vol. 120.
Fisher, P.R., et al., "Isolation and Characterization of the Pesticide-Degrading Plasmid pJP1 from Alcaligenes paradoxus," J Bacteriol., 1978, pp. 798-804, vol. 135, No. 3.
Franco, C., et al., "Actinobacterial Endophytes for Improved Crop Performance," Australasian Plant Pathology, 2007, pp. 524-531, vol. 36.
Fulthorpe, R. R., et al., "Distantly Sampled Soils Carry Few Species in Common," ISME J., 2008, pp. 901-910, vol. 2.
Gantner, S., et al., "Novel Primers for 16S rRNA-based Archaeal Community Analyses in Environmental Samples," J Microbiol Methods, 2011, pp. 12-18, vol. 84.
Gao, Z., et al., "Quantitation of Major Human Cutaneous Bacterial and Fungal Populations," J Clin Microbiol., 2010, pp. 3575-3581, vol. 48, No. 10.
Garazzino, S., et al., "Osteomyelitis Caused by Enterobacter cancerogenus Infection following a Traumatic Injury: Case Report and Review of the Literature," J Clin Microbiol., Mar. 2005, vol. 43, No. 3, pp. 1459-1461.
Gasser, I., et al., "Ecology and Characterization of Polyhydroxyalkanoate-Producing Microorganisms on and in Plants," FEMS Microbiol Ecol., 2010, pp. 142-150, vol. 70.
Gavrish, E, et al., "*Lentzea* sp. MS6 16S Ribosomal RNA Gene, Partial Sequence," NCBI GenBank Accession No. EF599958. Submitted May 9, 2007, 1 Page.
Gebhardt, J., et al., "Characterization of a single soybean cDNA encoding cytosolic and glyoxysomal isozymes of aspartate aminostransferase," Plant Molecular Biology, 1998, pp. 99-108, vol. 37.
GenBank: AF034210.1 "Glycine max aspartate aminotransferase glyoxysomal isozyme AAT1 precursor and aspartate aminotransferase cytosolic isozyme AAT2 (AAT) mRNA, complete eds," NCBI, May 26, 1998, 2 Pages, can be retrieved at <URL:https://www.ncbi.nlm.nih.gov/nuccore/AF034210>.
GenBank: NP_001237541.1, "aspartate aminotransferase glyoxysomal isozyme AAT1 precursor [Glycine max]," NCBI, Oct. 29, 2016, 2 Pages, can be retrieved at <URL:https://www.ncbi.nlm.nih.gov/protein/NP_001237541.1 >.
GenEmbl Database, GenEmbl Record No. KF673660, Sandberg, et al., "Fungal endophytes of aquatic macrophytes: diverse host-generalists characterized by tissue preferences and geographic structure," 2013, 35 Pages.
GenEmbl Database, GenEmbl Record No. KP991588, Huang, et al., "Pervasive effects of wildfire on foliar endophyte communities in montane forest trees," Mar. 2015, 35 Pages.
GenEmbl database, GenEmbl Record No. EU 977189, Jan. 21, 2009, 4 pages, Smith, S.A., et al., "Bioactive endophytes warrant intensified exploration and conservation," PloS One 3(8):E3052, 2008.
GenEmbl database, GenEmbl Record No. KF011597, Paenibacillus strain No. HA 13, Aug. 26, 2013, 5 Pages, Park, H.J., et al., "Isolation and characterization of humic substances-degrading bacteria from the subarctic Alaska grasslands," J Basic Microbiol, 2013.
Database Geneseq Database accession No. BAP97938 "Pantoea dispersa strain KACC91642P 16S rDNA sequence, SEQ ID 1." Aug. 15, 2013, 1 Page.
Gilmour, S. J., et al., "Overexpression of the Arabidopsis CBF3 Transcriptional Activator Mimics Multiple Biochemical Changes Associated with Cold Acclimation," Plant Physiol., 2000, pp. 1854-1865, vol. 124.
Giraldo, A., et al., "Phylogeny of Sarocladium (Hypocreales)," Persoonia, 2015, pp. 10-24, vol. 34.
Lugtenberg, B., et al., "Plant-Growth-Promoting Rhizobacteria," Ann. Rev. Microbiol., 2009, pp. 541-556, vol. 63.
Lundberg, D.S., et al., "Practical Innovations for High-Throughput Amplicon Sequencing," Nat Methods, 2013, pp. 999-1002, vol. 10, No. 10.
Ma, Y., et al., "Plant Growth Promoting Rhizobacteria and Endophytes Accelerate Phytoremediation of Metalliferous Soils," Biotechnology Advances, 2011, pp. 248-258, vol. 29.
Madi, L. et al., "Aggregation in Azospirillum brasilense Cd: Conditions and Factors Involved in Cell-to-Cell Adhesion," Plant Soil, 1989, pp. 89-98, vol. 115.
Mannisto, M.K., et al., "Characterization of Psychrotolerant Heterotrophic Bacteria From Finnish Lapland," Syst Appl Microbiol., 2006, pp. 229-243, vol. 29.
Mano, H., et al., "Culturable Surface and Endophytic Bacterial Flora of the Maturing Seeds of Rice Plants (*Oryza saliva*) Cultivated in a Paddy Field," Microbes Environ., 2006, vol. 21, No. 2.
Manter, D. K., et al., "Use of the ITS Primers, ITSIF and ITS4, to Characterize Fungal Abundance and Diversity in Mixed-Template Samples by qPCR and Length Heterogeneity Analysis," J Microbiol Methods, 2007, pp. 7-14, vol. 71.
Mao, W., et al., "Seed Treatment with a Fungal or a Bacterial Antagonist for Reducing Corn Damping-off Caused by Species of Pythium and Fusarium," Plant Disease, 1997, pp. 450-454, vol. 81, No. 5.
Marasco, R., et al., "A Drought Resistance-Promoting Microbiome is Selected by Root System Under Desert Farming," PLoS ONE, 2012, vol. 7, No. 10, 14 Pages.
Marquez, L. M., et al., "A Virus in a Fungus in a Plant: Three-Way Symbiosis Required for Thermal Tolerance," Science, 2007, pp. 513-515, vol. 315.
Mastretta, C., et al., "Endophytic Bacteria from Seeds of *Nicotiana tabacum* Can Reduce Cadmium Phytotoxicity," Intl J Phytoremediation, 2009, pp. 251-267, vol. 11.

(56) References Cited

OTHER PUBLICATIONS

Mateos, P. F., et al., "Cell-Associated Pectinolytic and Cellulolytic Enzymes in Rhizobium leguminosarum biovartrifolii," Appl Environ Microbiol., 1992, pp. 816-1822, vol. 58, No. 6.
McDonald, D., et al., "An Improved Greengenes Taxonomy with Explicit Ranks for Ecological and Evolutionary Analyses of Bacteria and Archaea," ISME J., 2012, pp. 610-618, vol. 6.
McGuire, K.L., et al., "Digging the New York City Skyline: Soil Fungal Communities in Green Roofs and City Parks," PloS One, 2013, vol. 8, No. 3, 13 Pages.
Medina, P., et al., "Rapid Identification of Gelatin and Casein Hydrolysis Using TCA," J Microbiol Methods, 2007, pp. 391-393, vol. 69.
Mehnaz, S., et al., "Growth Promoting Effects of Corn (*Zea mays*) Bacterial Isolates Under Greenhouse and Field Conditions," Soil Biology and Biochemistry, 2010, pp. 1848-1856, vol. 42.
Mehnaz, S., et al., "Isolation and 16S rRNA sequence analysis of the beneficial bacteria from the rhizosphere of rice," Canada Journal of Microbiology, 2001, pp. 110-117, vol. 47, No. 2.
Mei, C., et al., "The Use of Beneficial Microbial Endophytes for Plant Biomass and Stress Tolerance Improvement," Recent Patents on Biotechnology, 2010, pp. 81-95, vol. 4.
Michel, B. E., et al., "The Osmotic Potential of Polyethylene Glycol 6000," Plant Physiol., 1973, pp. 914-916, vol. 51.
Misk, A., et al., "Biocontrol of chickpea root rot using endophytic actinobacteria", Biocontrol, vol. 56, No. 5, Mar. 12, 2011, pp. 811-822, XP036215297.
Moe, L. A., "Amino Acids in the Rhizosphere: From Plants to Microbes," American Journal of Botany, 2013, pp. 1692-1705, vol. 100, No. 9.
Mohiddin, F. A., et al., "Tolerance of Fungal and Bacterial Biocontrol Agents to Six Pesticides Commonly Used in the Control of Soil Borne Plant Pathogens," African Journal of Agricultural Research, 2013, pp. 5331-5334, vol. 8, No. 43.
Mousa, W. K., et al., "The Diversity of Anti-Microbial Secondary Metabolites Produced by Fungal Endophytes: An Interdisciplinary Perspective," Front Microbiol., 2013, vol. 4, No. 65, 18 Pages.
Mundt, J.O., et al., "Bacteria Within Ovules and Seeds," Appl Environ Microbiol., 1976, pp. 694-698, vol. 32, No. 5.
Naik, B. S., et al., "Study on the diversity of endophytic communities from rice (*Oryza sativa* L.) and their antagonistic activities in vitro," Microbiological Research, 2009, pp. 290-296, vol. 164.
Naveed, M., "Maize Endophytes—Diversity, Functionality and Application Potential," University of Natural Resources and Life Sciences, 2013, pp. 1-266 and 81-87; Tables 1-3; Figure 2.
Nejad, P. et al., "Endophytic Bacteria Induce Growth Promotion and Wilt Disease Suppression in Oilseed Rape and Tomato," Biological Control, 2000, pp. 208-215, vol. 18.
Nelson, E.B., "Microbial Dynamics and Interactions in the Spermosphere," Ann. Rev. Phytopathol., 2004, pp. 271-309, vol. 42.
Nikolcheva, L.G., et al., "Taxon-Specific Fungal Primers Reveal Unexpectedly High Diversity During Leaf Decomposition in a Stream," Mycological Progress, 2004, pp. 41-49, vol. 3, No. 1.
Nimnoi, P., et al., "Co-Inoculation of Soybean (*Glycin Max*) wtth Actinomycetes and Bradyrhizobium Japonicum Enhances Plant Growth, Nitrogenase Activity and Plant Nutrition," Journal of Plant Nutrition, 2014, pp. 432-446, vol. 37.
Nishijima, K.A., et al., "Demonstrating Pathogenicity of Enterobacter cloacae on Macadamia and Identifying Associated Volatiles of Gray Kernel of Macadamia in Hawaii," Plant Disease, Oct. 2007, vol. 91, No. 10, pp. 1221-1228.
Normander, B., et al., "Bacterial Origin and Community Composition in the Barley Phytosphere as a Function of Habitat and Presowing Conditions," Appl Environ Microbiol., Oct. 2000, pp. 4372-4377, vol. 66, No. 10.
Okunishi, S., et al., "Bacterial Flora of Endophytes in the Maturing Seeds of Cultivated Rice (*Oryza sativa*)," Microbes and Environment, 2005, pp. 168-177, vol. 20, No. 3.
Op De Beeck, M., et al., "Comparison and Validation of Some ITS Primer Pairs Useful for Fungal Metabarcoding Studies," Plos One, Jun. 2014, vol. 9, Issue 6, e97629, pp. 1-11.
Orole, O. O., et al., "Bacterial and fungal endophytes associated with grains and roots of maize," Journal of Ecology and the Natural Environment, 2011, pp. 298-303, vol. 3, No. 9.
Partida-Martinez, L.P., et al., "The Microbe-Free Plant: Fact or Artifact?" Front Plant Sci., 2011, vol. 2, No. 100, 16 Pages.
Pearson, W.R., et al., "Rapid and Sensitive Sequence Comparison With FASTP and FASTA," Methods Enzymol., 2011, pp. 63-98, vol. 183.
Perez-Fernandez, M.A., et al., "Simulation of Germination of Pioneer Species Along an Experimental Drought Gradient," J Environ Biol., 2006, pp. 669-685, vol. 27, No. 4.
Perez-Miranda, S., et al., "O-CAS, A Fast and Universal Method for Siderophore Detection," J Microbiol Methods, 2007, pp. 127-131, vol. 70.
Petti, C. A., "Detection and Identification of Microorganisms by Gene Amplification and Sequencing," Clinical Infectious Diseases, 2007, pp. 1108-1114, vol. 44.
Phalip, V., et al., "A Method for Screening Diacetyl and Acetoin-Producing Bacteria on Agar Plates," J Basic Microbiol., 1994, pp. 277-280, vol. 34.
Philippot, L., et al., "Going Back to the Roots: The Microbial Ecology of the Rhizosphere," Nat Rev Microbiol., Nov. 2013, pp. 789-799, vol. 11.
Philrice Batac, Philippine Rice R&D Highlights, 2012, Area-Based R&D Projects, [online][Retrieved Aug. 11, 2016] Retrieved from the Internet URL:http://www.philrice.gov.ph/2012-rd-highlights/, 52 Pages.
Pillay, V. K., et al., "Inoculum Density, Temperature, and Genotype Effects on in vitro Growth Promotion and Epiphytic and Endophytic Colonization of Tomato (*Lycopersicon esculentum* L.) Seedlings Inoculated with a Pseudomonad Bacterium," Can J Microbiol., 1997, pp. 354-361, vol. 43.
Powell, W. A., et al., "Evidence of Endophytic Beauveria Bassiana in Seed-Treated Tomato Plants Acting as a Systemic Entomopathogen to Larval Helicoverpa zea (*Lepidoptera: noctuidae*)," J. Entomol. Sci., 2009, pp. 391-396, vol. 44, No. 4.
Quadt-Hallmann, A, et al., "Bacterial Endophytes in Cotton: Mechanisms of Entering the Plant," Can J Microbiol., 1997, pp. 577-582, vol. 43.
Rasmussen, S., et al., "Grass-endophyte interactions: a note on the role of monosaccharide transport in the Neotyphodium lolii-Lolium perenne symbiosis," New Phytologist, 2012, pp. 7-12, vol. 196.
Ravel, C., et al., "Beneficial effects of Neotyphodium lolii on the growth and the water status in perennial ryegrass cultivated under nitrogen deficiency or drought stress," Agronomie, 1997, pp. 173-181, vol. 17.
Reiter, B., et al., "Response of Endophytic Bacterial Communities in Potato Plants to Infection with *Erwinia carotovora* subsp. atroseptica," Appl Environ Microbiol., 2001, pp. 2261-2268, vol. 68, No. 5.
Ren, Y., et al., "Complete Genome Sequence of Enterobacter cloacae subsp. cloacae Type Strain ATCC 13047," J. Bacteriol. May 2010, vol. 192, No. 9, pp. 2463-2464.
Compant, S., et al., "Endophytic colonization of Vitis vinfera L. by Burkholderia phytofirmans strain PsJN: from the rhizosphere to inflorescence tissues, " FEMS Microbiol Ecol, 2008, pp. 84-93, vol. 63.
NCBI GenBank: CP000653.1 "*Enterobacter* sp. 638, complete genome" Jan. 28, 2014, 5 Pages, Can be retrieved at<URL:https://www.ncbi.nlm.nih.gov/nuccore/CP000653.1>.
NCBI GenBank: EU340965.1 "*Enterobacter* sp. 638 16S ribosomal RNA gene, partial sequence" Jan. 30, 2009, 1 Page, Can be retrieved at <URL:https://www.ncbi.nlm.nih.gov/nuccore/EU340965.1>.
NCBI GenBank: EBI accession No. EM STD:GU055658, "Uncultured Periconia clone NG R 806 18S ribosomal RNA gene, partial sequence; internal transcribed spacer 1, 5.8S ribosomal RNA gene, and internal transcribed spacer 2, complete sequence; and 28S ribosomal RNA gene, partial sequence," Oct. 27, 2009, 2 Pages.
Database EMBL [Online] Oct. 1, 2001, 2 Pages, "Setosphaeria monoceras 28S ribosomal RNA gene, partial sequence," XP002777918,

(56) References Cited

OTHER PUBLICATIONS retrieved from EBI accession No. EM_STD:AY016368 Database accession; No. AY016368 sequence.

Hamayun, M., et al., "Cladosporium sphaerospermum as a new plant growth-promoting endophyte from the roots of *Glycine max* (L.) Merr," World Journal of Microbiology and Biotechnology, Kluwer Academic Publishers, DO, vol. 25, No. 4, Feb. 15, 2009 (Feb. 15, 2009), pp. 627-632.

Hoffman, M., et al., "Diverse Bacteria Inhabit Living Hyphae of Phylogenetically Diverse Fungal Endophytes," Applied and Environmental Microbiology, Jun. 2010, p. 4063-4075, vol. 76, No. 12.

Hoffman, M., et al., "Endohyphal Bacterium Enhances Production of Indole-3-Acetic Acid by a Foliar Fungal Endophyte," PLOS One, Sep. 24, 2013, pp. 1-8, vol. 8, Issue 9, e73132.

Hubbard, M., et al., 2011. "Agricultural Potential of Fungal Endophytes of Grasses, Cereals and Wheat," In: Wheat: Genetics, Crops and Food Production. Nova Science Publishers Hauppauge, pp. 333-345.

Impullitti, A.E., et al., "Fungal endophyte diversity in soybean", Journal of Applied Microbiolog, vol. 114, No. 5, May 1, 2013, pp. 1500-1506.

Jung, C., et al., "The Effects of Endohyphal Bacteria on Anti-Cancer and Anti-Malaria Metabolites of Endophytic Fungi," Honors Thesis, University of Arizona, May 2012, 15 Pages.

Kim, M., et al., "Towards a taxonomic coherence between average nucleotide identity and 16S rRNA gene sequence similarity for species demarcation of prokaryotes", Int J Systematic Evolutionary Microbiol., 2014, vol. 64, pp. 346-351.

Klaubauf, S., et al., "Molecular diversity of fungal communities in agricultural soils from Lower Austria," Fungal Diversity, Aug. 13, 2010, pp. 65-75, vol. 44, No. 1.

Knapp, D., et al., "Inter- and intraspecific functional diversity of fungal root endophytes of semiarid sandy grasslands," Acta Microbiologica et Immunologica Hungarica, Nov. 2017, vol. 64, Issue Supplement 1, pp. 1-101.

Kumar, A., et al., "Bio-control potential of *Cladosporium* sp. (MCPL-461), against a noxious weed *Parthenium hysterophorus* L.," J. Environ Biol., Mar. 2009, pp. 307-312, vol. 30, Issue 2.

Kusari, S., et al. "Chemical ecology of endophytic fungi: origins of secondary metabolites," Cell Press, Chem & Biol, vol. 19, pp. 792-798, 2012.

Liu, Y., et al., "Phylogenetic relationships among ascomycetes: evidence from an RNA polymerase II subunit," Mol. Biol. Evol. 1999. vol. 16, No. 12, pp. 1799-1808.

Mandyam, K., et al., "Mutualism-parasitism paradigm synthesized from results of root-endophyte models", Frontiers in Microbiology, vol. 5, Jan. 12, 2015, pp. 1-14.

Miyoshi-Akiyama, T., et al., "Multilocus Sequence Typing (MLST) for Characterization of Enterobacter cloacae," PLoS ONE, 2013, vol. 8, No. 6, 10 Pages, e66358.

Nassar, A., et al., "Promotion of plant growth by an auxin-producing isolate of the yeast *Williopsis saturnus* endophytic in maize (*Zea mays* L.) roots", Biology and Fertility of Soils; Cooperating Journal of International Society of Soil Science, Springer, Berlin, DE, vol. 42, No. 2, Nov. 1, 2005, pp. 97-108.

O'Hanlon, K., et al., "Exploring the potential of symbiotic fungal endophytes in cereal disease suppression", Biological Control, vol. 63, No. 2, Sep. 5, 2012, pp. 69-78.

Rae, R., et al., "A subset of naturally isolated Bacillus strains show extreme virulence to the free-living nematodes Caenorhabditis elegans and Pristionchus pacificus", Environmental Microbiology, vol. 12, No. 11, 2010, pp. 3007-3021.

Riess, K., et al., "High genetic diversity at the regional scale and possible speciation in Sebacina epigaea and S. incrustans," BMC Evolutionary Biology, 2013, vol. 13, No. 102, 17 Pages.

Samways, M.J., et al., "Assessment of the Fungus Cladosporium Oxyspoum (Berk. and Curt.) As a Potential BioControl Agent Against Certain Homoptera, " Elsevier Science Publishers B.V., Jan. 1, 1986, pp. 231-239.

Sarkar, S., et al., "New report of additional enterobacterial species causing wilt in West Bengal, India," Canadian Journal of Microbiology, 2015, vol. 61, No. 7, pp. 477-486.

Saunders, M., et al., "Host-Synthesized Secondary Compounds Influence the In Vitro Interactions between Fungal Endophytes of Maize", Applied and Environmental Microbiology, Nov. 9, 2007, pp. 136-142, vol. 74, No. 1.

Schneider, C., et al., "Endophytes for plant protection: the state of the art Proceedings," DPG Spectrum Phytomedizin, Proceedings of the 5th International Symposium on Plant Protection and Plant Health in Europe, May 26-29, 2013, 347 Pages.

Shiraishi, A., et al., "Nodulation in black locust by the ammaproteobacteria *Pseudomonas* sp. and the *Betaproteobacteria burkholderia* sp", Systematic and Applied Microbiology, vol. 33, No. 5, Aug. 2010, pp. 269-274.

Simola, L., et al., "The Effect of Some Protein and Non-Protein Amino Acids on the Growth of Cladosporium herbarum and Trichotheeium roseum," Effect of Amino Acids on Fungi, Physiologia Plantarum, 1979, vol. 46, pp. 381-387.

Stielow, J.B., et al., "One fungus, which genes? Development and assessment of universal primers for potential secondary fungal DNA barcodes," Persoonia: Molecular Phylogeny and Evolution of Fungi, 2015, vol. 35, pp. 242-263.

U'Ren, J.M., et al., "Host and geographic structure of endophytic and endolichenic fungi at the continental scale," American Journal of Botany, May 1, 2012, pp. 898-914, vol. 99, No. 5.

Valencia, E., et al., "Mini-review: Brazilian fungi diversity for biomass degradation," Fungal Genetics and Biology, 2013, pp. 9-18, vol. 60.

Vujanovic, V., et al., "Viability Testing of Orchid Seed and the Promotion of Colouration and Germination," Annals of Botany, Mar. 17, 2000, pp. 79-86, vol. 86.

Vujanovic, V., et al., "Endophytic hyphal compartmentalization is required for successful mycobiont-wheat interaction as revealed by confocal laser microscopy," The proceedings of the Soils and Crops conference in Saskatoon (2008) published 2009, 7 Pages.

Vujanovic, V., et al., "Orchid seed viability testing by fungal bioassays and molecular phylogeny," Floriculture, pramental and plant biotechnology, 2006, vol. 63, pp. 563-569.

Vujanovic, V., et al., "Mycovitality—a new concept of plant biotechnology," Canadian Journal Plant Pathol. 2007, vol. 29, p. 451.

Vujanovic, V., et al., "19th International Conference on *Arabidopsis*. Research Proceedings—ICAR13," Jul. 23-27, 2008, 264 Pages, Montreal, QC, Canada.

Vujanovic, V., et al., "Mycovitality and mycoheterotrophy: where lies dormancy in terrestrial orchid and plants with minute seeds?" Symbiosis, 2007, vol. 44, pp. 93-99.

Vujanovic, V., et al., "Seed endosymbiosis: a vital relationship in providing prenatal care to plants," Can. J. Plant Sci., NRC Research Press, Feb. 6, 2017, pp. 972-981, vol. 97.

Vujanovic, V., et al: "Fungal communities associated with durum wheat production system: A characterization by growth stage, plant organ and preceding crop", Crop Protection, Elsevier Science, GB, vol. 37, Feb. 19, 2012, pp. 26-34.

Yennamalli, R., et al., "Endoglucanases: insights into thermostability for biofuel applications", Biotech Biofuels, 2013, vol. 6, Issue 136, pp. 1-9.

Youssef, Y.A., et al., "Production of Plant Growth Substances by Rhizosphere Myoflora of Broad Bean and Cotton," Biologia Plantarum, 1975, pp. 175-181, vol. 17, No. 3.

Zhang, Y., et al., "BcGsl, a glycoprotein from Botrytis cinerea, elicits defence response and improves disease resistance in host plants. Biochemical and biophysical research communications," Biochemical and Biophysical Research Communications, 2015, vol. 457, No. 4, pp. 627-634.

Zhang, W., et al., Host range of Exserohilum monoceras, a potential bioherbicide for the control of *Echinochloa* species, Canadian Journal of Botany/ Journal Canadien De Botan, National Research Council, Ottawa, CA, vol. 75, Jan. 1, 1997, pp. 685-692.

Zhu et al., "Helminthosporium velutinum and *H. aquaticum* sp. nov. from aquatic habitats in Yunnan Province, China." Phytotaxa, 2016, vol. 253, No. 3, pp. 179-190.

(56) References Cited

OTHER PUBLICATIONS

Amatuzzi, R.F., et al., "Potential of endophytic fungi as biocontrol agents of Duponchelia fovealis (Zeller) (Lepidoptera:Crambidae," Brazilian Journal of Biology, Nov. 9, 2017, 7 Pages.
Artursson, V., et al., "Interactions between arbuscular mycorrhizal fungi and bacteria and their potential for stimulating plant growth", Environmental Microbiology, vol. 8, No. 1, Jan. 1, 2006, pp. 1-10.
Bing, LA, et al., "Suppression of Ostrinia nubilalis (Hübner) (Lepidoptera: Pyralidae) by endophytic Beauveria bassiana (Balsamo) Vuillemin", Environmental Entomol, Entomological Society of America, College Park, MD, US, vol. 20, Jan. 1, 1991, pp. 1207-1211.
NCBI GenBank: Accession No. JX880250.1, "Enterobacteriaceae bacterium Clero1 16S ribosomal RNA gene, partial sequence," NIH, Jun. 24, 2015, 2 Pages, can be retrieved at <URL:https://www.ncbi.nlm.nih.gov/nucleotidelJX880250.1?report=genbank&log$=nuclalign&blast_rank=80 &RID=KWUPBV08015>.
PCT International Search Report and Written Opinion, PCT Application No. PCT/US2015/038110, Dec. 11, 2015, 36 Pages.
Conn, V. M., "Effect of Microbial Inoculants on the Indigenous Actinobacterial Endophyte Population in the Roots of Wheats as Determined by Terminal Restriction Fragment Length Polymorphism," Applied and Environmental Microbiology, 2004, pp. 6407-6413, vol. 70, No. 11.
Darsonval, A., et al., "Adhesion and Fitness in the Bean Phyllosphere and Transmission to Seed of *Xanthomonas fuscans* subsp. fuscans," Molecular Plant-Microbe Interactions, 2009, pp. 747-757, vol. 22, No. 6.
Edgar, R. C., "Uparse: Highly Accurate OTU Sequences From Microbial Amplicon Reads," Nat. Methods, 2013, pp. 996-998, vol. 10, No. 10.
Gu, O., et al., "*Glycomyces sambucus* sp. nov., an endophytic actinomycete isolated from the stem of Sambucus adnata Wall," International Journal of Systematic and Evolutionary Microbiology, 2007, pp. 1995-1998, vol. 57.
Hardoim, P.R., et al., "Dynamics of Seed-Borne Rice Endophytes on Early Plant Growth Stages," PLoS ONE, 2012, vol. 7, No. 2, 13 Pages.
Kasana, R. C., et al., "A Rapid and Easy Method for the Detection of Microbial Cellulases on Agar Plates Using Gram's lodine," Curr Microbiol., 2008, pp. 503-507, vol. 57.
Lundberg, D.S., et al., "Defining the Core *Arabidopsis thaliana* Root Microbiome," Nature, 2012, pp. 86-90, vol. 488, No. 7409.
Hanshew, A., et al., "Characterization of Actinobacteria Associated with Three Ant-Plant Mutualisms", Microbiol Ecology, August, 6, 2014, vol. 69, No. 1, pp. 192-203.
Langille, M.G.I. et al., "Predictive functional profiling of microbial communities using 16S rRNA marker; gene sequences," Nature Biotechnology, 2013, vol. 31, No. 9, pp. 814-821.
Li, M., et al., "ATP Modulates the Growth of Specific Microbial Strains", Current Microbiology, May 30, 2010, vol. 62, No. 1, pp. 84-89.
PCT Invitation to Pay Additional Fees, PCT Application No. PCT/US2017/064351, Feb. 9, 2018, 18 Pages.
PCT International Search Report and Written Opinion, PCT Application No. PCT/US2017/064351, Apr. 9, 2018, 25 Pages.
PCT Invitation to Pay Additional Fees, PCT Application No. PCT/US2017/064361, Mar. 7, 2018, 18 Pages.
European Patent Office, Supplementary European Search Report for European Patent Application No. 15810847.2, Feb. 28, 2018, 19 Pages.
European Patent Office, Extended European Search Report, European Patent Application No. EP 15812324.0, Feb. 21, 2018, 23 Pages.
European Patent Office, Extended European Search Report, European Patent Application No. EP 15809264.3, Mar. 12, 2018, 14 Pages.
NCBI GenBank: CP000653.1 "*Enterobacter* sp. 638, complete genome" ASM1632v1, Apr. 18, 2007, 2 Pages, Can be retrieved at <URL:https://www.ncbi.nlm.nih.gov/assembly/GCA000016325.1>.
NCBI GenBank: EBI accession No. EM STD:JQ759988, "*Dothideomycetes* sp. genotype 226 isolate FL0175 internal transcribed spacer 1, partial sequence; 5.85 ribosomal RNA gene and internal transcribed spacer 2, complete sequence; and 285 ribosomal RNA gene, partial sequence," May 17, 2012, 2 Pages.
GenBank: JN210900.1, "*Enterobacter* sp. WS05 16S ribosomal RNA gene, partial sequence," NCBI, Sep. 24, 2012, 1 Page, can be retrieved at <URL:https://www.ncbi.nlm.nih.gov/nuccore/jn210900>.
PCT International Search Report and Written Opinion for PCT/US2017/064361, May 11, 2018, 22 Pages.
PCT International Search Report and Written Opinion, PCT Application No. PCT/US2017/064292, May 11, 2018, 20 Pages.
European Patent Office, Extended European Search Report, European Patent Application No. EP 15876324.3, Jun. 12, 2018, 9 Pages.
Vujanovic, V., et al., "A comparative study of endophytic mycobiota in leaves of *Acer saccharum* in eastern North America," Mycological Progress, May 2002, pp. 147-154, vol. 1, Issue 2.
United States Patent Office, Non-Final Office Action, U.S. Appl. No. 14/766,065, Oct. 27, 2017, 11 Pages.
Cha, C., et al., "Production of Acyl-Homoserine Lactone Quorum-Sensing Signals by Gram-Negative Plant Associated Bacteria," Mol Plant Microbe Interact., 1998, pp. 1119-1129, vol. 11, No. 11.
Chernin, L. S., et al., "Chitinolytic Activity in Chromobacterium violaceum: Substrate Analysis and Regulation by Quorum Sensing," J Bacteriol., 1998, pp. 4435-4441, vol. 180, No. 17.
Hain, T., et al., "Discrimination of Streptomyces albidoflavus strains based on the size and number of 16S-23S ribosomal DNA intergenic spacers", International Journal of Systematic Bacteriology, Jan. 1997, vol. 47, No. 1, pp. 202-206.
Johnston-Monje, D., "Microbial Ecology of Endophytic Bacteria in *Zea* Species as Influenced by Plant Genotype, Seed Origin, and Soil Environment," Thesis, University of Guelph, 2011, 230 Pages.
Orakçi GE et al., "Selection of antagonistic actinomycete isolates as biocontrol agents against root-rot fungi", Fresenius Environmental Bulletin, 2010, 19: 417-424 & GenBank Accession No. GQ475299, Oct. 5, 2009.
R Core Team, "R: A Language and Environment for Statistical Computing," R Foundation for Statistical Computing, Vienna, Austria, May 2013, ISBN: 3-900051-07-0. Available online at http://www.R-25project.org/, 3604 Pages.
NCBI, GenBankAccession No. KX641980.1, Jul. 29, 2017, Scott, M., et al., "*Dothideomycetes* sp. isolate FT14-6 Internal transcribed spacer 1, partial sequence; 5.8S ribosomal RNA gene and internal transcribed spacer 2, complete sequence; and large subunit ribosomal RNA gene, partial sequence," 2 Pages, Can be retrieved at<URL:https://www.ncbi.nlm.nih.gov/nuccore/KX641980>.
Weaver, P.F., et al., "Characterization of Rhodopseudomonas capsulata," Arch Microbiol., 1975, pp. 207-216, vol. 105.
Redman, R. S., et al., "Thermotolerance Generated by Plant/Fungal Symbiosis," Science, Nov. 2002, vol. 298, 1 Page (with 4 pages of supplemental material).
You, Y., et al., "Analysis of Genomic Diversity of Endophytic Fungal Strains Isolated from the Roots of *Suaeda japonica* and *S. maritima* for the Restoration of Ecosystems in Buan Salt Marsh," Korean Journal of Microbiology and Biotechnology, 2012, pp. 287-295, vol. 40, No. 4. (with English Abstract).
Invitation to Pay Additional Fees, PCT Application No. PCT/CA2013/000091, Mar. 27, 2013, 2 Pages.
International Search Report and Written Opinion for PCT/EP2013/062976, Dec. 22, 2014, 9 Pages.
International Search Report and Written Opinion, Application No. PCT/US2014/054160, Dec. 9, 2014, 21 Pages.
Invitation to Pay Additional Fees, PCT Application No. PCT/US2014/064411, Feb. 5, 2015, 2 Pages.
International Search Report and Written Opinion, International Application No. PCT/US2014/064411, Mar. 27, 2015, 15 Pages.
International Search Report and Written Opinion, International Application No. PCT/US2014/072399, Jun. 26, 2015, 22 Pages.
Invitation to Pay Additional Fees, PCT Application No. PCT/US2014/072400, Apr. 16, 2015, 6 Pages.
International Search Report and Written Opinion, Application No. PCT/US2014/072400, Jul. 8, 2015, 38 Pages.

(56) References Cited

OTHER PUBLICATIONS

Abarenkov, K., et al., "PlutoF-A Web Based Workbench for Ecological and Taxonomic Research, with an Online Implementation for Fungal ITS Sequences," Evol Bioinform Online, 2010, pp. 189-196, vol. 6.
Castillo, D., et al., "Fungal Endophytes: Plant Protective Agents Against Herbivores," Power Point Presentation dated Aug. 4, 2013.
Hiatt, E.E., et al., "Tall Fescue Endophyte Detection: Commerical Immunoblot Test Kit Compared with Microscopic Analysis," Crop Science, 1999, pp. 796-799, vol. 39.
Johnston-Monje, D., et al., "Conservation and Diversity of Seed Associated Endophytes in Zea Across Boundaries of Evolution, Ethnography and Ecology," PLoS ONE, 2011, vol. 6, No. 6, 22 Pages.
Pedraza, R.O., et al., "Azospirillum inoculation and nitrogen fertilization effect on grain yield and on the diversity of endophytic bacteria in the phyllosphere of rice rainfed crop," European Journal of Soil Biology, 2009, pp. 36-43, vol. 45.
Welty, R.E., et al., "Influence of Moisture Content, Temperature, and Length of Storage onSeed Germination and Survival of Endophytic Fungi in Seeds of Tall Fescue and Perennial Ryegrass," Phytopathyol., 1987, pp. 893-900, vol. 77, No. 6.
Xue, Q.Y., et al., "Evaluation of the Strains of Acinetobacter and Enterobacter as potential Biocontrol Agents Against Ralstonia Wilt of Tomato," Biological Control, 2009, vol. 48, pp. 252-258.
Li, Q., "Agrobacterium tumefaciens Strain TA-AT-10 16S Ribosomal RNA Gene, Partial Sequence: GenBank: KF673157.1," Submitted Dec. 16, 2013.
Invitation to Pay Additional Fees, PCT Application No. PCT/US2015/038110, Sep. 22, 2015, 8 Pages.
NCBI GenBank: Accession No. XP55670271, "*Enterobacter* sp. MLB05 16S ribosomal RNA gene, partial sequence —Nucleotide", Jun. 9, 2012, 1 Page, can be retreived at URL:https://www.ncbi.nlm.nih.gov/nuccore/J Q765415.1/.
NCBI GenBank: Accession No. XP55670274, "*Enterobacter* sp. CR 6-3 16S ribosomal RNA gene, partial sequence —Nucleotide", Mar. 27, 2013, 1 Page, can be retreived at URL:https://www.ncbi.nlm.nih.gov/nuccore/K C355340.
NCBI GenBank: Accession No. XP55670279, "Uncultured bacterium clone bb2s4 16S ribosomal RNA gene, partial seque—Nucleotide", May 6, 2005, 1 Page, can be retreived at URL:https://www.ncbi.nlm.nih.gov/nuccore/D Q068880.
European Patent Office, Communication Pursuant to Article 94(3) EPC for European Patent Application No. EP 14777213.1, Jun. 18, 2018, 4 Pages.
De Melo Pereira, G. V., et al. "A Multiphasic Approach for the Identification of Endophytic Bacterial in Strawberry Fruit and their Potential for Plant Growth Promotion," Microb. Ecology, 2012, pp. 405-417, vol. 63, No. 2.
Result 11 from a search in the GenEmbl database, GenEmbl Record No. EU 977189, Smith et al., "Bioactive endophytes warrant intensified exploration and conservation," PLoS ONE 3(8):E3052, 2008.
Result 3 from a search in the GenEmbl database, GenEmbl Record No. KF011597, Paenibacillus strain No. HA13, Park et al., "Isolation and characterization of humic substances-degrading bacteria from the subarctic Alaska grasslands," J Basic Microbiol, 2013.
PCT International Search Report and Written Opinion for PCT/US2018/051467, Feb. 4, 2019, 22 pages.
Chaves, J., et al., "Identification and Phylogeny of Streptomyces Based on Gene Sequences", Research Journal of Microbiology, vol. 13, No. 1, Dec. 15, 2017, pp. 13-20, XP055675917.
Girard, G., et al., "A novel taxonomic marker that discriminates between morphologically complex actinomycetes", Open Biology, vol. 3, No. 10, Oct. 2013, p. 130073,XP055675916.
Guo, Y., et al. "A multi locus phylogeny of the Streptomyces griseus 16S rRNA gene clade: use of multilocus sequence analysis for streptomycete systematics", International Journal of Systematic and Evolutionary Microbiology, vol. 58, No. 1, 2008, pp. 149-159, XP055675936.
PCT Invitation to Pay Additional Fees, PCT Application No. PCT/US2017/064292, Mar. 6, 2018, 15 Pages.
PCT International Search Report and Written Opinion, PCT Application No. PCT/US2017/068255, Mar. 19, 2018, 14 Pages.
PCT International Search Report and Written Opinion PCT/AU2018/050387, Jul. 12, 2018 (Filing date is Apr. 27, 2018).
PCT International Search Report and Written Opinion for PCT/US2017/064292, May 11, 2018, 20 Pages.
Bentley, S.D., et al, Complete genome sequence of the model actinomycete Streptomyces coelicolor A3(2), Nature. May 9, 2002;417(6885):141-7. (Year: 2002).
Gabor, J., et al., "*Mycorrhizal* fungi effects on nutrient composition and yield of soybean seeds," Journal of Plant Nutrition, 20:4-5, 581-591, 1997.
Gopalakrishnan, S. et al., "Plant growth-promoting activities of *Streptomyces* spp. In sorghum and rice", SpringerPlus, 2/1/574, pp. 1-8, http://www.springerplus.com/content/2/1/574, 2013.
Groppe, K., et al., "Interaction between the endophytic fungus *Epichloe bromicola* and the grass *Bromus erectus*: effects of endophyte infection, fungal concentration and environment on grass growth and flowering," Mol Ecol., 8:1827-1835, 1999.
Hubbard, M., "Fungal Endophytes that Confer Heat and Drought Tolerance to Wheat," Doctoral dissertation, University of Saskatchewan, 2012.
Ikeda, H., et al., "Complete genome sequence and comparative analysis of the industrial microorganism Streptomyces avermitilis," Nat Biotechnol. May 2003;21 (5) :526-31. Epub Apr. 14, 2003. (Year: 2003).
Lee, J., et al., "*Streptomyces koyangensis* sp. nov., a novel actinomycete that produces 4-phenyl-3-butenoic acid," Int J Syst Evol Microbial. Jan. 2005;55(Pt 1):257-62. (Year: 2005).
Lind, A., et al., "Drivers of genetic diversity in secondary metabolic gene clusters within a fungal species", PLOS Biology, Nov. 17, 2017, 26 pages.
Pacovsky, R., "Carbohydrate, protein and amino acid status of Glycine-Glomus-Bradyrhizobium symbioses," Physiologia Pantarium; 75:346-354, 1989).
Sha, T. et al., "Genetic diversity of the endemic gourmet mushroom *Thelephora ganbajun* from southwestern China", Microbiology (2008), 154, 3460-3468.
Sugita, T. et al., "Intraspecies Diversity of Cryptococcus laurentii as Revealed by Sequences of Internal Transcribed Spacer Regions and 28S rRNA Gene and Taxonomic Position of C. laurentii Clinical Isolates", Journal of Clinical Microbiology, Apr. 2000, p. 1468-1471.
Wiebold, M., et al., "Agriculture Experiment Station, College of Agriculture, Food & Natural Resources, University of Missouri, Special Report 589, pp. 1-124)."
Le, X.H., et al., "Effects of endophytic Streptomyces on the lucerne (*Medicago sativa* L.) symbiosis at different levels of nitrogen," 17th Australian Nitrogen Fixation Conference 2014 Proceedings, Sep. 29, 2014, ed. Gupta, V.V.S.R., Unkovich, M. and Kaiser, B. N., ASNF, University of Adelaide, pp. 66-67.
Alvarez-Perez, S., et al., "Zooming-in on floral nectar: a first exploration of nectar-associated bacteria in wild plant communities," FEMS Microbiol. Ecol., 2012, vol. 80, No. 3, pp. 591-602.
European Patent Office, Supplementary European Search Report, European Patent Application No. 13874703.5, Jun. 21, 2016, 3 Pages.
Invitation to Pay Additional Fees, PCT Application No. PCT/US2015/038187, Oct. 14, 2015, 5 Pages.
Coombs, J. T., et al., "Isolation and Identification of Actinobacteria from Surface-Sterilized Wheat Roots," Applied and Environmental Microbiology, 2003, pp. 5603-5608, vol. 69, No. 9.
Laus, M. C., et al., "Role of Cellulose Fibrils and Exopolysaccharides of Rhizobium leguminosarum in Attachment to and Infection of Vicia sativa Root Hairs," Mol Plant Microbe Internet., 2005, pp. 533-538, vol. 16, No. 6.
PCT International Search Report and Wlitten Opinion, PCT Application No. PCT/US2015/068206, Jun. 27, 2016, 20 Pages.
PCT International Search Report and Wlitten Opinion, PCT Application No. PCT/US2016/036504, Nov. 4, 2016, 18 Pages.
GenEmbl Database, GenEmbl Record No. JN872548.1, 2 Pages.

(56) References Cited

OTHER PUBLICATIONS

Soe, K.M, et al, "Evaluation of effective Myanmar Bradyrhizobium strains isolated from Myanmar soybean and effects of coinoculation with Streptomyces griseoglavus P4 for nitrogen fixation", Soil science and plant nutrition 59.3 (2013): 361-370 (Year: 2013).
Ngom, A et al., "A novel symbiotic nitrogen-fixing member of the Ochrobactrum clade isolated from root nodues of Acacia mangium". J. Gen. Appl. Microbiol. (2004) 50: 17-27.
Trujillo, M.E et al., "Nodulation of Lupinus albus by strins of *Ochrobactrum lupini* sp. nov." Appl. Environ Microbiol Mar. 2005; 71(3): 1318-1327.
Bal, H.B et al., "Isolation of ACC deaminase producting PGPR from rice rhizosphere and evaluating their plant growth promoting activity under salt stress". Plant Soil (2013) 366: 93-105 doi: 10/1007/s11104-012-1402-5.
Chakraborty et al., "Evaluation of Ochrobactrum anthropi TRS-2 and its talcbased formulation for enhancement of growth of tea plants and management of brown root rot disease." Journal of Applied Microbiology, 2009, 107 (2):625-634 DOI: 10.1111/j.1365-2672.2009.04242.x <https://doi.org/10.1111/j.1365-2672.2009.04242.x.
Sulistiyani, et al., "Population and Diversity of Endophytic Bacteria Associated with Medicinal Plan Curumma zedoaria ", Microbiology Indonesia 8.2 (2014):4.
Bevivino, A., et al., "Characerization of free-living maize rhizosphere populatin of Burkholderia cepacia: effect of seed treatment on disease suppresssion and growth promotion of maize", FEMS Microbiology Ecology 27 (1998) 225-237.
Ciccillo, F., et al., Effects of two different application methods of Burkholderia ambifaria MCI 7 on plant growth and hizospheric bacterial diversity.
Estrada, P., et al., "A N2- fixing endophytic *Burkholderia* sp. associated with maize plants culitvated in Mexico", Canadian Journal of Microbiology (2002), vol. 48(4), pp. 528-536.
Sharma, V.K., et al., "Enhancement of verticillium wilt resistance in tomato transplants by in vitro co-culture of seedlings with a plant growth promoting rhizobacterium (*Pseudomonas* sp. strain PsJN)", Canadian Journal of Microbiology (1998), vol. 44(6), pp. 285-294.
Grady, E., et al., "Current knowledge and perspectives of Paenibacillus: a review" Microb Cell Fact (2016) 15:203.
Engelhard, M., et al., "Preferential occurrence of diazotrophic endophytes, *Azoarcus* spp., in wild rice species and and races of *Oryza sativa* in comparison with moder races", Environmental Microbiology (2000) 2(2), 131-141.
Sessitsch, A., et al., "Endophytic bacterial communities of field-grown potato plants and their plant-growth-promoting and antagonistic abilities", Can. J. Microbiol. 50: 239-249 (2004).
Sessitsch, A., et al., "Cultivation-independent poplulation analysis of bacterial endophytes in three potato varieties based on eubacterial and Actinomycetes-specific PCR of 16S rRNA genes", FEMS Microbiology Ecology 39 (2002) 23-32.
Minamisawa K., et al., "Anaerobic Nitrogen-Fixing Consortia Consisting of Clostridia Isolated from Gramineous Plants", Applied and Environmental Microbiology, May 2004, p. 3096-3102, vol. 70, No. 5.
Seghers, D., et al., "Impact of Agricultural Practices on the *Zea mays* L. Endophytic Community", Applied and Environmental Microbiology, Mar. 2004, p. 1475-1482, vol. 70, No. 3.
Bulgari, D., et al., "Endophytic Bacterial Diversity in Grapevine (*Vitis vinifera* L.) Leaves Described by 16S rRNA Gene Sequence Analysis and Length Beterogeneity-PCR", The Journal of Microbiology, Aug. 2009, p. 393-401, vol. 47, No. 4.
Amann, R., et al., "Single-cell identification in microbial communities by improved fluorescence in situ hybridization techniques", Nature Reviews Microbiology, 6: 339-348 (2008).
Chelius, M.K., et al., "The Diversity of Archaea and Bacteria in Association with the Roots of *Zea mays* L.", Microb Ecol (2001) 41:252-263.
Edwards, U., et al., "Isolation and direct complete nucleotide determination of entire genes. Characterization of a gene coding for 16S ribosomal RNA", Nucleic Acids Research 17: 7843-7853 (1989).
Prischl, M., et al., "Genetically modified Bt maize lines containing cry3Bb1, cry1A105 or cry1Ab2 do not affect the structure and functioning of root-associated endophyte communities", Applied Soil Ecology 54 (2012) 39-48.
Naveed, M., et al., "The endophyte Enterobacter sp. FD17: a maize growth enhancer selected based on rigorous testing of plant beneficial traits and colonization characteristics", Biol Fertil Soils (2014) 50:249-262.
Rashid, M., et al., "Inorganic polyphosphate is needed for swimming, swarming, and twitching motilities of Pseudomonas aeruginosa", PNAS vol. 97, No. 9, Apr. 25, 2000, pp. 4885-4890.
Mehta, S., et al., "An Efficient Method for Qualitative Screening of Phosphate-Solubilizing Bacteria", Current Microbiology vol. 43 (2001), pp. 51-56.
Dunn,R., et al., "Home Life: Factors Structuring the Bacterial Diversity Found within and between Homes", PLoS One, vol. 8, Issue 5, May 2013.
Massol-Deya, A., et al., "Bacterial community fingerprinting of amplified 16S and 16-23S ribosomal DNA gene sequences and restriction endonuclease analysis (ARDRA)", Molecular Microbial Ecology Manual 3.3.2: 1-8, 1995.
Extended European Search Report for Application No. 22190659,7, dated Feb. 10, 2023, 8 pages.
GenBank Accession No. AY148074 published Nov. 30, 2002.
GenBank Accession No. FM998026 published Feb. 10, 2011.
GenBank Accession No. KJ494315 published May 3, 2014.
International Search Report and Written Opinion for PCT/US2022/026051, 38 pages.
Langner Dos Santos Miriam et al: "Benefits Associated with the Interaction of Endophytic Bacteria and Plants", Brazilian Archives of Biology and Technology, vol. 61, No. 0, Jan. 1, 2018 (Jan. 1, 2018), pp. 18160431-2018.
Database GenBank [Online] NIH; Jan. 29, 2016 (Jan. 29, 2016), Wu JR: "Chitinophaga pinensis strain CSB3-50 16S ribosomal RNA gene", XP055948434, accession No. KU305719 Database accession No. KU305719.1 abstract.
Database GenBank [Online] NIH; Mar. 10, 2017 (Mar. 10, 2017), Shaffer JP et al: "Uncultured bacterium clone EHB-PS0362 16S ribosomal RNA gene", XP055948435,accession No. KU978322 Database accession No. KU978322.1 abstract.
Database GenBank [Online] NIH; Jan. 15, 2019 (Jan. 15, 2019), Hu C. J. et al: "*Chitinophaga* sp. strain N15203 16S ribosomal RNA gene", XP055948438,accession No. MK389338 Database accession No. MK389338.1 abstract.
Database GenBank [Online] NIH; Nov. 26, 2014 (Nov. 26, 2014), Han J. H. et al: "*Chitinophaga* sp. NR 1-07 16S ribosomal RNA gene", XP055948440,accession No. KM253104 Database accession No. KM253104.1 abstract.
Database GenBank [Online] NIH; Sep. 2, 2017 (Sep. 2, 2017), Jiayu T. J.: "*Chitinophaga* sp. strain PRd7 16S ribosomal RNA gene", XP055948441, accession No. KY203972 Database accession No. KY203972.1 abstract.
Database GenBank [Online] NIH; Oct. 1, 2010 (Oct. 1, 2010), Aslam Z. et al: "*Chitinophaga* sp. Z2-YC6856 16S ribosomal RNA gene", XP055948442,accession No. GQ369124 Database accession No. GQ369124.1 abstract.
Database GenBank [Online] NIH; Jun. 10, 2014 (Jun. 10, 2014), Zhang B. G.: "Chitinophaga oryziterrae strain ZBGKL4 16S ribosomal RNA gene", XP055948443,accession No. KJ734873 Database accession No. KJ734873.1 abstract.
Chung, E., et al: *Chitinophaga oryziterrae* sp. nov., isolated from the rhizosphere soil of rice (*Oryza sativa* L.) II, International Journal of Systematic and Evolutionary Microbiology, vol. 62, No. Pt_12, Dec. 1, 2012 (Dec. 1, 2012), pp. 3030-3035.
Proença Diogo Neves et al: "*Chitinophaga costaii* sp. nov., an endophyte of Pinus pinaster, and emended description of Chitinophaga niabensis", International Journal of Systematic and Evolutionary Microbiology, vol. 64, No. Pt_4, Apr. 1, 2014 (Apr. 1, 2014), pp. 1237-1243.

(56) References Cited

OTHER PUBLICATIONS

Elad, Y., et al: "Control of Rhizoctonia solani in cotton by seed-coating with *Trichoderma* spp. spores", Plant and Soil, vol. 66, No. 2, Jun. 1, 1982 (Jun. 1, 1982), pp. 279-281.
Harman, G.E., et al: "Trichoderma hamatum effects on seed and seedling disease induced in radish and pea by *Pythium* spp. or Rhizoctonia solani", Phytopathology, Dec. 1, 1980 (Dec. 1, 1980), pp. 1167-1172.
Harman, G.E., et al: "Factors affecting Trichoderma hamatum applied to seeds as a biocontrol agent", Phytopathology, Jun. 1, 1981 (Jun. 1, 1981), pp. 569-572.
Giczey, G., et al: "Homologous transformation of Trichoderma hamatum with an endochitinase encoding gene, resulting in increased levels of chitinase activity", FEMS Microbiology Letters, Jan. 1, 1998 (Jan. 1, 1998), pp. 247-252.
Freitas, R., et al: "Cloning and characterization of a protein elicitor Sml gene from Trichoderma harzianum", Biotechnology Letters, vol. 36, No. 4, Dec. 10, 2013 (Dec. 10, 2013), pp. 783-788.
Database Genbank [Online] NIH; Jan. 1, 2008 (Jan. 1, 2008), Hanada RE et al: "Trichoderma hamatum strain Dis 65G 18S ribosomal RNA gene, partial sequence; internal transcribed spacer 1", XP055973221, Database accession No. EU264000 abstract.
Database Genbank [Online] NIH; Sep. 6, 2013 (Sep. 6, 2013), Samuels G J et al: "Trichoderma hamatum strain Dis 240j actin (act) gene, partial eds", XP055973271, Database accession No. EU856256 abstract.
Database Genbank [Online] NIH; May 23, 2005 (May 23, 2005), Steyaert J M et al: "Trichoderma hamatum alkaline proteinase (prbl) gene, complete eds", XP055973243, Database accession No. AY258899 abstract.
Database Genbank [Online] NIH; Apr. 11, 2019 (Apr. 11, 2019), Chaverri P et al: "Trichoderma hamatum strain GJS 04-207 calmodulin (CAL) gene, partial eds" , XP055973272, Database accession No. FJ442285 abstract.
Aerts A et al: "NCBI Reference Sequence: XP_024757499.1: glycoside hydrolase family 18 protein [Trichoderma asperellum CBS 433. 97]", Apr. 26, 2018 (Apr. 26, 2018), pp. 1-2, XP055973177.
Database Genbank [Online] NIH; Jul. 25, 2016 (Jul. 25, 2016), Steyaert J M et al: "Trichoderma hamatum endochitinase (chit42) gene, partial eds", XP055973252, Database accession No. AY258898 abstract.
Database Genbank [Online] NIH; Sep. 25, 1998 (Sep. 25, 1998), Giczey G et al: "endochitinase [Trichoderma hamatum] ", XP055973364, Database accession No. AAC60385 abstract.
Database Genbank [Online] NIH; Sep. 25, 1998 (Sep. 25, 1998), Giczey G et al: "Trichoderma hamatum endochitinase gene, complete eds", XP055973251, Database accession No. U88560 abstract.
Liu, H.J., et al., "Bacillus subtilis strain A2-9 16S ribosomal RNA gene, partial sequence", Accession No. JF496331, deposited Aug. 2011.
Li, C., "Bacillus subtilis strain B2-1 16S ribosomal RNA gene, partial sequence", Accession No. JN256114, deposited Sep. 2011.
Jiang, L., "Bacillus subtilis strain jllsy 16S ribosomal RNA gene, partial sequence", Accession No. FJ793201, deposited Apr. 2009.
Li, C., et al., "Bacillus subtilis strain B2-1 16S ribosomal RNA gene, partial sequence", Accession No. JN256114, deposited Sep. 2011.
Choi, N.S., et al., "Bacillus licheniformis strain DJ-2 16S ribosomal RNA gene, partial sequence", Accession No. FJ435676, deposited Jan. 2009.
Peng, S., et al., "Bacillus subtilis strain CCM9 16S ribosomal RNA gene, partial sequence", Accession No. HQ536000, deposited Dec. 2010.
Jee, H., et al., "Bacillus subtilis strain R2-1 16S ribosomal RNA gene, partial sequence", Accession No. EU852929, deposited Jul. 2009.
Riken, GI No. GMFL01-01-D03, 2 Pages, [online] [Retrieved on Dec. 18, 2017] Retrieved from the internet <URL:http://spectra.psc.riken.jp/menta.cgi/rsoy/datail?id=GMFL01-01-D03>.
Rodriguez, H., et al., "Expression of a Mineral Phosphate Solubilizing Gene From Erwinia herbicola in Two Rhizobacterial Strains," J Biotechnol., 2001, pp. 155-161, vol. 84.
Rodriguez, R.J., et al., "Stress Tolerance in Plants via Habitat-Adapted Symbiosis," ISME J., 2008, pp. 404-416, vol. 2.
Rodriguez-Navarro, D., et al., "Soybean Interactions with Soil Microbes, Agronomical and Molecular Aspects," Agronomy for Sustainable Development, 2011, pp. 173-190, vol. 31, No. 1.
Roessner, U., et al., "Metabolic Profiling Allows Comprehensive Phenotyping of Genetically or Environmentally Modified Plant Systems," Plant Cell, 2001, pp. 11-29, vol. 13.
Rosado, A. S., et al., "Phenotypic and Genetic Diversity of Paenibacillus azotofixans Strains Isolated from the Rhizoplane or Rhizosphere Soil of Different Grasses," J App Microbiol., 1998, pp. 216-226, vol. 84.
Rosenblueth, A., et al., "Seed Bacterial Endophytes: Common Genera, Seed-to-Seed Variability and Their Possible Role in Plants," Acta Hort., 2012, pp. 39-48, vol. 938.
Rosenblueth, M., et al., "Bacterial Endophytes and Their Interactions With Host," Molecular Plant-Microbe Interactions, 2006, pp. 827-837, vol. 19, No. 8.
Ross, P.L., et al., "Multiplexed Protein Quantitation in *Saccharomyces cerevisiae* Using Amine—Reactive Isobaric Tagging Reagents," Mol Cell Proteomics, 2004, pp. 1154-1169, vol. 3, No. 12.
Saleem, M., et al., "Perspective of Plant Growth Promoting Rhizobacteria (PGPR) Containing ACC Deaminase in Stress Agriculture," J Ind Microbiol Biotechnol., Oct. 2007, pp. 635-648, vol. 34.
Samac, D.A., et al., "Recent Advances in Legume-Microbe Interactions: Recognition, Defense Response, and Symbiosis from a Genomic Perspective," Plant Physiol., 2007, pp. 582-587, vol. 144.
Sardi, P , et al., "Isolation of Endophytic Streptomyces Strains from Surface Sterilized Roots," Applied and Environmental Microbiology, 1992, pp. 2691-2693, vol. 58, No. 8.
Sarwar, M., et al., "Tryptophan Dependent Biosynthesis of Auxins in Soil," Plant Soil, 1992, pp. 207-215, vol. 147.
Schmieder, R., et al., "Quality Control and Preprocessing of Metagenomic Datasets," Bioinformatics, 2011, pp. 863-864, vol. 27, No. 6.
Schoch, C. L., et al., "Nuclear Ribosomal Internal Transcribed Spacer (ITS) Region as a Universal DNA Barcode Marker for Fungi," Proc Natl Acad Sci USA, 2012, pp. 6241-6246, vol. 109, No. 16.
Schwyn, B. et al., "Universal Chemical Assay for the Detection and Determination of Siderophores," Analytical Biochemistry, 1987, pp. 47-56, vol. 160.
Senthilkumar, M., et al., "Biocontrol Potential of Soybean Bacterial Endophytes Against Charcoal Rot Fungus, Rhizoctonia batatiola," Current Microbiology, 2009, vol. 58, pp. 288-293.
Sessitsch, A., et al., "*Burkholderia phytofirmans* sp. Nov., a novel plant-associated bacterium with plant-beneficial properties," International Journal of Systematic and Evoluntary Microbiology, 2005, pp. 1187-1192, vol. 55.
Shapiro-Ilan, D.I., et al., "The Potential for Enhanced Fungicide Resistance in Beauveria Bassiana Through Strain Discovery and Artificial Selection," Journal of Invertebrate Pathology, 2002, pp. 86-93, vol. 81.
Shankar, M., et al., "Root colonization of a rice growth promoting strain of Enterobacter cloacae," Journal of Basic Microbiology, 2011, pp. 523-530, vol. 51.
Singh, A K., et al., "Uncultured *Actinomyces* sp. Clone EMLACT 80 IV (New) 16S Ribosomal RNA Gene, Partial Sequence," NCBI GenBank Accession No. JQ285908. Submitted Dec. 13, 2011, 1 page.
Soares, M. M. C. N., et al., "Screening of Bacterial Strains for Pectinolytic Activity: Characterization of the Polygalacturonase Produced by Bacillus SP," Revista de Microbiolgia, 1999, pp. 299-303, vol. 30.
Soe, K.M., et al., "Effects of endophytic actinomycetes and Bradyrhizobium japonicum strains on growth, nodulation, nitrogen fixation and seed weight of different soybean varieties," Soil Science and Plant Nutrition, 2012, pp. 319-325, vol. 58, No. 3.

(56) References Cited

OTHER PUBLICATIONS

Soe, K.M., et al., "Low-Density Co-Inoculation of Myanmar Bradyrhizobium yuanmingense MAS34 and Streptomyces griseoflavus P4 to Enhance Symbiosis and Seed Yield in Soybean Varieties," American Journal of Plant Sciences, 2013, pp. 1879-1892, vol. 4.

Sogonov, M.V., et al., "The hyphomycete *Teberdinia hygrophila* gen. nov., sp. nov. and related anamorphs of *Pseudeurotium* species," Mycologia, May 2005, pp. 695-709, vol. 97, No. 3.

Song, M., et al., "Effects of Neotyphodium Endophyte on Genmination of Hordeum brevisubulatum under Temperature and Water Stress Conditions," Acta Agrestia Sinica, 2010, pp. 834-837, vol. 18, No. 6. (English Abstract).

Souleimanov, A., et al., "The Major Nod Factor of Bradyrhizobium japonicum Promotes Early Growth of Soybean and Corn," J. Exp. Bot., 2002, pp. 1929-1934, vol. 53, No. 376.

Spiekermann, P., et al., "A Sensitive, Viable-Colony Staining Method Using Nile Red for Direct Screening of Bacteria that Accumulate Polyhydroxyalkanoic Acids and Other Lipid Storage Compounds," Arch Microbiol., 1999, pp. 73-80, vol. 171.

Staudt, A. K., et al., "Variations in Exopolysaccharide Production by Rhizobium tropici," Arch Microbiol., 2012, pp. 197-206, vol. 194.

Strobel, G. A., "Endophytes as Sources of Bioactive Products," Microbes and Infection, 2003, pp. 535-544, vol. 5.

Sturz, A. V., et al., "Weeds as a Source of Plant Growth Promoting Rhizobacteria in Agricultural Soils," Can J Microbiol., 2001, pp. 1013-1024, vol. 47, No. 11.

Surette, M.A., et al. "Bacterial Endophytes in Processing Carrots (*Daucus carota* L. var. sativus): Their Localization, Population Density, Biodiversity and Their Effects on Plant Growth," Plant and Soil, 2003, pp. 381-390, vol. 253, No. 2.

Suto, M., et al., "Endophytes as Producers of Xylanase," J Biosci Bioeng., 2002, pp. 88-90, vol. 93, No. 1.

Sword, G., "Manipulating Fungal Endophytes to Protect Plants from Insects and Nematodes," Power Point Presentation dated Aug. 7, 2013, 48 Pages.

Sword, G., et al., "Manipulating Fungal Endophytes for the Protection of Cotton in the Field," Power Point Presentation dated Jan. 7, 2013.

Sword, G., et al., "Field Trials of Potentially Beneficial Fungal Endophytes in Cotton," Power Point Presentation dated Jan. 7, 2013, 17 Pages.

Sword, G., "Fungal Endophytes to Protect Cotton from Insects and Nematodes," Power Point Presentation dated Dec. 7, 2012, 20 Pages.

Sword, G., "Natural Enemies—The Forgotten Basis of IPM?," Power Point Presentation dated Sep. 6, 2013, 33 Pages.

Taghavi, S., et al., "Genome Survey and Characterization of Endophytic Bacteria Exhibiting a Beneficial Effect on Growth and Development of Poplar Trees," Applied and Environmental Microbiology, 2009, pp. 748-757, vol. 75, No. 3.

Taghavi, S., et al., "Genome Sequence of the Plant Growth promoting Endophytic Bacterium Enterobacter sp. 638", PLoS Genet., May 2010, vol. 6, Issue 5, e1000943, pp. 1-15.

Tamura, K., et al., "Estimation of the number of nucleotide substitutions in the control region of mitochondrial DNA in humans and chimpanzees, " Molecular Biology and Evolution, 1993, vol. 10, No. 3, pp. 512-526.

Taylor, A.G., et al., "Concepts and Technologies of Selected Seed Treatments," Annu. Rev. Phytopathol., 1990, pp. 321-339, vol. 28.

Teather, R. M., et al., "Use of Congo Red-Polysaccharide Interactions in Enumeration and Characterization of Cellulolytic Bacteria from the Bovine Rumen," Appl Environ Microbiol., 1982, pp. 777-780, vol. 43, No. 4.

Thakur, A., et al., "Detrimental effects of endophytic fungus *Nigrospora* sp. on survival and development of Spodoptera litura," Biocontrol Science and Technology, Feb. 1, 2012, pp. 151-161, vol. 22, No. 2.

Thakur, A., et al., "Enhanced Resistance to Spodoptera litura in Endophyte Infected Cauliflower Plants," Environmental Entomology, Apr. 1, 2013, pp. 240-246, vol. 42, No. 2.

Thakur, A., et al., "Suppression of Cellular Immune Response in Spodoptera litura (Lepidoptera: Noctuidae) Larvae by Endophytic Fungi *Nigrospora oryzae* and *Cladosporium uredinicola*,", Annals of the Entomological Society of America, May 1, 2014, pp. 674-679, vol. 107, No. 3.

Theis, K. R., et al., "Uncultured Bacterium Clone GM2GI8201A64RC 16S Ribosomal RNA Gene, Partial Sequence," NCBI GenBank Accession No. JX051943, Submitted May 14, 2012, 1 Page.

Thomas, L., et al., "Development of Resistance to Chlorhexidine Diacetate in Pseudomonas aeruginosa and the Effect of a "Residual" Concentration," J Hosp Infect., 2000, pp. 297-303, vol. 46.

Thomashow, M. F., "So What's New in the Field of Plant Cold Acclimation? Lots!," Plant Physiol., 2001, pp. 89-93, vol. 125.

Tokala, R. T., et al., "Novel Plant-Microbe Rhizosphere Interaction Involving Streptomyces Lydicus WYEC108 and the Pea Plant (*Pisum Sativum*)," Applied and Environmental Microbiology, May 2002, pp. 2161-2171, vol. 68, No. 5.

Trichoderma definition, 2016, 6 Pages, [online] [Retrieved on Sep. 16, 2016,] Retrieved from the Internet <URL: https://en.wikipedia.org/wiki/Trichoderma>.

Trotel-Aziz, P., et al., "Characterization of New Bacterial Biocontrol Agents *Acinetobacter, Bacillus, Pantoea* and *Pseudomonas* spp. Mediating Grapevine Resistance Against Botrytis cinerea," Environmental and Experimental Botany, 2008, pp. 21-32, vol. 64.

Truyens, S., et al., "Changes in the Population of Seed Bacteria of Transgenerationally Cd-Exposed *Arabidopsis thaliana*," Plant Biol., 2013, pp. 971-981, vol. 15.

Usadel, B., et al., "The Plant Transcriptome-From Integrating Observations to Models," Front Plant Sci., 2013, pp. 1-3, vol. 4., Article 48, 3 Pages.

Vacheron, J., et al., "Plant Growth-Promoting Rhizobacteria and Root System Functioning," Frontiers Plant Sci., 2013, vol. 4, Article 356, 19 Pages.

Valencia, C. U., et al., "Endophytic Establishment as an Unintended Consequence of Biocontrol with Fungal Entomopathogens," Power Point Presentation dated Jan. 7, 2013, 10 Pages.

Van Der Lelie, D., et al., "Poplar and its Bacterial Endophytes: Coexistence and Harmony," Critical Rev Plant Sci., 2009, pp. 346-358, vol. 28.

Verkley, G., et al., "Paraconiothyrium, a new genus to accommodate the mycoparasite Coniothyrium minitans, anamorphs of Paraphaeosphaeria, and four new species," Studies in Mycology, 2004,; pp. 323-335, vol. 50.

Vining, K., et al., "Methylome Reorganization During in vitro Dedifferentiation and Regeneration of Populus trichocarpa," BMC Plant Biol., 2013, vol. 13, No. 92, 15 Pages.

Viruel, E., et al., "Pseudomonas thiveralensis Strain IEHa 16S Ribosomal RNA Gene, Partial Sequence," NCBI GenBankAccession No. GQ169380.1, Submitted May 15, 2009, 1 Page.

Visagie, C.M., et al., "Identification and nomenclature of the genus Penicillium," Studies in Mycology, Jun. 2014, pp. 343-371, vol. 78.

Waller, F., et al., "The Endophytic Fungus Piriformospora indica Reprograms Barley to Salt-Stress Tolerance, Disease Resistance, and Higher Yield," PNAS, 2005, pp. 13386-13391, vol. 102, No. 38.

Wang, B., et al., "Fungal endophytes of native *Gossypium* species in Australia," Mycological Research, 2007, pp. 347-354, vol. 111, No. 3.

Wang, K., et al., "Monitoring in Planta Bacterial Infection at Both Cellular and Whole-Plant Levels Using the Green Fluorescent Protein Variant GFPuv," New Phytol., 2007, pp. 212-223, vol. 174.

Wang, Q., et al., "Naive Bayesian Classifier for Rapid Assignment of rRNA Sequences into the New Bacterial Taxonomy," Appl. Environ. Microbiol., 2007, pp. 5261-5267, vol. 73, No. 16.

Waqas, M., et al., "Endophytic Fungi Produce Gibberellins and Indoleacetic Acid and Promotes Host-Plant Growth during Stress, " Molecules, 2012, pp. 10754-10773, vol. 17.

Weindling, R., "Relation of dosage to control of cotton seedling diseases by seed treatment," Plant Disease Reporter, 1943, 27, pp. 68-70.

White, J. F., et al., "A Proposed Mechanism for Nitrogen Acquisition by Grass Seedlings Through Oxidation of Symbiotic Bacteria," Symbiosis, 2012, pp. 161-171, vol. 57.

(56) References Cited

OTHER PUBLICATIONS

Wiegand, I., et al., "Agar and Broth Dilution Methods to Determine the Minimal Inhibitory Concentration (MIC) of AntiMicrobiol Substances," Nature Protocols, 2008, pp. 163-175, vol. 3, No. 2.
Xu, M., et al., "Bacterial Community Compositions of Tomato (*Lycopersicum esculentum* Mill.) Seeds and Plant Growth Promoting Activity of ACC Deaminase Producing Bacillus subtilis (HYT-12-1) on Tomato Seedlings" World J Microbiol Biotechnol., 2014, pp. 835-845, vol. 30.
Xu, Y., et al., "Biosynthesis of the Cyclooligomer Despipeptide bassianolide, an Insecticidal Virulence Factor of Beauveria bassiana," Fungal Genetics and Biology, 2009, pp. 353-364, vol. 46.
Yandigeri, M. S., et al., "Drought-tolerant endophytic actinobacteria promote growth of wheat (*Triticum aestivum*) under water stress conditions," Plant Growth Regulation, 2012, pp. 411-420, vol. 68.
Yezerski, A., et al., "The Effects of the Presence of Stored Product Pests on the Microfauna of a Flour Community," Journal of Applied Microbiology, 2005, pp. 507-515, vol. 98.
Zhang, J., et al. "Isolation and Characterization of Plant Growth-Promoting Rhizobacteria from Wheat Roots by Wheat Germ Agglutinin Labeled with Fluorescein Isothiocyanate", The Journal of Microbiology, Apr. 27, 2012, vol. 50, No. 2, pp. 191-198, GenBank Accession No. JN210900.
Zhao, J.H., et al., "Bioactive secondary metabolites from *Nigrospora* sp. LLGLM003, an endophytic fungus of the medicinal plant *Moringa oleifera* Lam." World Journal of Microbiology and Biotechnology, Kluwer Academic Publishers, Feb. 12, 2012, pp. 2107-2112, vol. 28, No. 5.
Zhou, W., et al., "Effects of the Fungal Endophyte *Paecilomyces* sp. in Cotton on the Roo-Knot Nematode Meloidogyne incognita," poster dated Jan. 7, 2013.
Zimmerman, N.B., et al., "Fungal Endophyte Communities Reflect Environmental Structuring Across a Hawaiian Landscape," Proc Natl Acad Sci USA, 2012, pp. 13022-13027, vol. 109, No. 32.
Zuniga, A., et al., "Quorum Sensing and Indole-3-Acetic Acid Degradation Play a Role in Colonization and Plant Growth Promotion of *Arabidopsis thaliana* by Burkholderia phytofirmans PsJN," Mol Plant Microbe Interact., 2013, pp. 546-553, vol. 26, No. 5.
Abello, J., et al., "Agrobacterium-mediated transformation of the endophytic fungus *Acremonium implicatum* associated with Brachiaria grasses", Mycological Research, pp. 407-413, vol. 112, Pt 3.
Antony-Badu, S., et al., "Multiple *Streptomyces* species with distinct secondary metabolomes have identical 16S rRNA gene sequences." Scientific Reports 7.1, Sep. 2017, No. 7, 11089, pp. 1-8.
Bandara, WM.M.S., et al., "Interactions among endophytic bacteria and fungi: effects and potentials" Journal of Biosciences, Dec. 2006, vol. 31, No. 5, pp. 645-650.
Bragantia, et al, "Identificaqao E Avaliaqao De Rizobacterias Isoladas De Raizes De Milho," Jan. 1, 2010, pp. 905-911, Retrieved from the Internet: URL:http://www.scielo.br/pdf/brag/v69n4/v69n4a17.pdf (With English Abstract).
De Medeiros, L., et al., "Evaluation of Herbicidal Potential of Depsides from Cladosporium uredinicola an Endophytic Fungus found in *Guava* Fruit," J. Braz. Chem. Soc., 2012, vol. 23, No. 8, p. 1551-1557.
Fox, G., et al., "How close is close: 16S rRNA sequence identity may not be sufficient to guarantee species identity." International Journal of Systematic and Evolutionary Microbiology 42.1, 1992, pp. 166-170.
NCBI, GenBankAccession No. XP_002568042, Aug. 14, 2009, 4 Pages, Berg, V.D., et al., "Genome sequencing and analysis of the filamentous fungus," Nat. Biotechnol. 26 (10), 1161-1168 (2008).
Goudjal, Y., et al., "Biocontrol of Rhizoctonia solani damping-off and promotion of tomato plant growth by endophytic actinomycetes isolated from native plants of *Algerian sahara*", Microbiological Research, 2014, vol. 169, No. 1, pp. 59-65.
Guo, X., et al., "Red Soils Harbor Diverse Culturable Actinomycetes That Are Promising Sources of Novel Secondary Metabolites", Applied and Environmental Microbiology, Feb. 27, 2015, vol. 81, No. 9, pp. 3086-3103.
Hjort, K., et al., "Chitinase genes revealed and compared in bacterial isolates, DNA extracts and a metagenomic library from a phytopathogen-suppressive soil", FEMS Microbiology Ecology, Feb. 2010, vol. 71, No. 2, pp. 197-207.
Kanbar, A., et al., "Relationship between Root and Yield Morphological Characters in Rainfed Low Land Rice (*Oryza sativa* L.)," Cereal Research Communications, 2009, vol. 37, No. 2, pp. 261-268.
Ogbo, F., et al., "Some Characteristics of a Plant Growth Promoting; iEnterobacter/isp. Isolated from the Roots of Maize", Advances in Microbiology, Jan. 1, 2012, vol. 02, No. 03, pp. 368-374.
Partida-Martinez, L.P., et al., "Endosymbiont-Dependent Host Reproduction Maintains Bacterial-Fungal Mutualism", Current Biology, May 1, 2007, vol. 17, No. 9, pp. 773-777.
"Sequence Alignment of JQ047949 with Instant SEQ ID No. 2," Search conducted on Jan. 2, 2019, 2 pages.
Sharma et al., "Detection and identification of bacteria intimately associated with fungi of the order Sebacinales", Cellular Microbiology, Aug. 5, 2008, pp. 2235-2246, vol. 10, No. 11.
Yashiro et al., "Effect of Streptomycin Treatment on Bacterial Community Structure in the Apple Phyllosphere," Plos One, May 21, 2012, vol. 7, No. 5, 10 pages.
Abdellatif, L., et al., "Characterization of virulence and PCR-DGGE profiles of Fusarium avenaceum from western Canadian Prairie Ecozone of Saskatchewan," Canadian Journal of Plant Pathology, 2010, pp. 468-480.
Abou-Shanab, R.A., et al: "Characterization of Ni-resistant bacteria in the rhizosphere of the hyperaccumulator Alyssum murale by 16S rRNA gene sequence analysis", World Journal of Microbiology and Biotechnology, vol. 26, No. 1, Aug. 15, 2009, pp. 101-108.
Aveskamp, M., et al., "DNA phylogeny reveals polyphyly of Phoma section Peyronellaea and multiple taxonomic novelties," Mycologia, 2009, vol. 101, No. 3, pp. 363-382.
Azcon, R., et al., "Selective interactions between different species of *mycorrhizal fungi* and Rhizobium meliloti strains, and their effects on growth, N2-fixation (15N) and nutrition of Medicago sativa L.," New Phytol., 1991, vol. 117, pp. 399-404.
Bethlenfalvay, G., et al., "*Mycorrhizal fungi* effects on nutrient composition and yield of soybean seeds", Journal of Plant Nutrition, vol. 20, pp. 4-5, Apr. 1, 1997, pp. 581-591.
PCT International Search Report and Written Opinion for PCT/AU2018/050387, mailed Jul. 12, 2018, 8 pages.
PCT International Search Report and Written Opinionfor PCT/US2018/051467, Mar. 25, 2019 26 pages.
Al-Askar AA, "Microbiological studies on the in vitro inhibitory effect of Streptomyces collinus albescens against some phytopathogenic fungi", African Journal of Microbiology Research, 2012, 6: 3277-3283 & GenBank Accession No. AB184101, May 20, 2008.
Ardakani, M.R. et al., "Absorption of N, P, K thorugh triple inoculation of wheat (*Triticum aestivum* L.) by *Azospirillum brasilense, Streptomyces* sp., Glomus intraradices and manure application," Physiol Mol Biol Plants, 2011, vol. 17, No. 2, pp. 181-192.
Barnett, S., et al., "Selection of microbes for control of Rhizoctonia root rot on wheat using a high throughput pathosystem", Biological Control, Jul. 6, 2017, 113: 45-57.
Bashan, Yoav Ed, et al., "Inoculants of plant growth-promoting bacteria for use in agriculture," Biotechnology Advances, Elsevier Publishing, Barking, GB, vol. 16, No. 4, Jul. 1, 1998, pp. 729-770, XP004123985.
Bashan, Yoav E., et al., "Alginate Beads as Synthetic Inoculant Carriers for Slow Release of Bacteria that Affect Plant Growth," Applied and Environmental Microbiology, pp. 1089-1098, May 1986.
Chenhua Li , et al., "Change in deep soil microbial communities due to long-term fertilization," Soil Biology and Biochemistry, vol. 75, Mar. 5, 2014, pp. 264-272, XP055530941.
Cheow, W.S., et al., "Biofilm-like Lactobacillus rhamnosus Probiotices Encapsulated in Algiinate and Carrageenan Microcapsules Exhibiting Enhanced Thermotolerance and Freeze-drying Resistance," Biomacromolecules 2013, vol. 14(9):3214-3222.

(56) References Cited

OTHER PUBLICATIONS

De Santi, M. et al., "A combined morphologic and molecular approach for characterizing fungal microflora from a traditional Italian cheese (Fossa cheese)," Inter. Dairy J., 2010, vol. 10, No. 7, pp. 465-471.

Fatima Z et al, "Antifungal activity of plant growth-promoting rhizobacteria isolates against Rhizoctonia solani in wheat", African Journal of Biotechnology, 2009, 8: 219-225.

GenBank Accession No. KY643705, Feb. 27, 2017.

GenBank Accession No. KF951483, Jan. 5, 2014.

GenBank Accession No. KJ152029, May 6, 2015.

GenBank Accession No. KJ162248, Apr. 8, 2014.

Govindarajan, M. et al., "Effects of the Inoculation of Burkholderia vietnamensis and Related Endophytic Diaztrophic Bacteria on Grain Yield of Rice", Microbiol Ecology, Apr. 4, 2007, 17 Pages.

Iverson, C., et al, "The taxonomy of Enterobacter sakazakii: proposal of a new genus *Cronobacter* gen. nov. and descriptions of Cronobacter sakazakii comb. nov. *Cronobacter sakazakii* subsp. sakazakii, comb. nov., *Cronobacter sakazakii* subsp. *malonaticus* subsp. nov., *Cronobacter turicensis* sp. nov., *Cronobacter muytjensii* sp. nov., *Cronobacter dublinensis* sp. nov. and *Cronobacter genomospecies* I", BMC Evolutionary Biology 2007, Apr. 17, 2017, 11 pages.

Joe, M.M. et al., "Development of alginate-based aggregate inoculants of *Methylobacterium* sp. and Azospirillum prasilense tested under in vitro conditions to promote plant growth," Journal of Applied Microbiology 2013, 116 (2):408-423, XP055225426, Nov. 22, 2013.

Manoharan, M. J. et. al., "Survival of flocculated cells in alginate and its inoculatin effect on growth and yield of maize under water deficit conditions," EP J of Soil Biology, Gauthier-Villars, Montrouge, FR, vol. 50, Mar. 7, 2012, pp. 198-206, XP028421147.

Murali, Gopal, et al., "Microbiome Selection Could Spur Next-Generation Plant Breeding Strategies, " Frontiers in Microbiology, vol. 7, Dec. 7, 2016, XP055531064.

United States Patent Office, Non-Final Office Action, U.S. Appl. No. 14/964,429, Aug. 9, 2016, 6 Pages.

United States Patent Office, Final Office Action, U.S. Appl. No. 14/964,429, May 31, 2017, 9 Pages.

United States Patent Office, Non-Final Office Action, U.S. Appl. No. 15/212,038, Sep. 21, 2016, 10 Pages.

United States Patent Office, Non-Final Office Action, U.S. Appl. No. 15/063,350, Nov. 10, 2016, 18 Pages.

United States Patent Office, Final Office Action, U.S. Appl. No. 14/614,193, Dec. 22, 2016, 13 Pages.

United States Patent Office, Final Office Action, U.S. Appl. No. 14/614,193, Jul. 18, 2017, 14 Pages.

United States Patent Office, Final Office Action, U.S. Appl. No. 14/614,193, May 3, 2018, 10 Pages.

United States Patent Office, Non-Final Office Action, U.S. Appl. No. 15/107,973, filed Apr. 10, 2017, 39 Pages.

United States Patent Office, Final Office Action, U.S. Appl. No. 15/107,973, Jan. 26, 2018, 20 Pages.

United States Patent Office, Final Office Action, U.S. Appl. No. 14/410,537, May 5, 2017, 9 Pages.

United States Patent Office, Non-Final Office Action, U.S. Appl. No. 15/034,862, May 19, 2017, 8 Pages.

United States Patent Office, Final Office Action, U.S. Appl. No. 15/034,862, Jan. 12, 2018, 14 Pages.

United States Patent Office, Non-Final Office Action, U.S. Appl. No. 14/916,514, Sep. 20, 2017, 31 Pages.

United States Patent Office, Non-Final Office Action, U.S. Appl. No. 15/143,398, Sep. 22, 2017, 17 Pages.

United States Patent Office, Non-Final Office Action, U.S. Appl. No. 15/143,394, Sep. 25, 2017, 15 Pages.

United States Patent Office, Non-Final Office Action, U.S. Appl. No. 15/107,965, Jun. 21, 2018, 27 Pages.

Wang, L. et al. Application of Bioorganic Fertilizer Significantly Increased Apple Yields and Shaped Bacterial Community Structure in Orchard Soil.

Whelehan, et al., "Microencapsulation using vibrating technology," Journal of Microencapsulation 2011, vol. 28(8), pp. 669-688.

Zhao, Jun, et al., "Effects of organic-inorganic compound fertilizer with reduced chemical fertilizer application on crop yields, soil biological activity and bacterial community structure in a rice-wheat cropping system," Applied Soil Ecology, vol. 99, Nov. 28, 2015, pp. 1-12, XP055530937.

PCT Invitation to Pay Additional Fees, PCT Application No. PCT/CA2013/000091, Mar. 27, 2013, 2 Pages.

PCT International Search Report and Written Opinion for PCT/CA2013/000091, Sep. 20, 2013, 17 Pages.

PCT International Search Report and Written Opinion for PCT/EP2013/062976, Dec. 22, 2014, 9 Pages.

PCT International Search Report, Application No. PCT/US2014/044427, Dec. 3, 2014, 9 Pages.

PCT International Search Report and Written Opinion, Application No. PCT/US2014/054160, Dec. 9, 2014, 21 Pages.

PCT Invitation to Pay Additional Fees, PCT Application No. PCT/US2014/064411, Feb. 5, 2015, 2 Pages.

PCT International Search Report and Written Opinion, International Application No. PCT/US2014/064411, Mar. 27, 2015, 15 Pages.

PCT Invitation to Pay Additional Fees, PCT Application No. PCT/US2014/072399, Apr. 14, 2015, 2 Pages.

PCT International Search Report and Written Opinion, International Application No. PCT/US2014/072399, Jun. 26, 2015, 22 Pages.

PCT Invitation to Pay Additional Fees, PCT Application No. PCT/US2014/072400, Apr. 16, 2015, 6 Pages.

PCT International Search Report and Written Opinion, Application No. PCT/US2014/072400, Jul. 8, 2015, 38 Pages.

* cited by examiner

SEQUENCE LISTING

```
<160> NUMBER OF SEQ ID NOS: 136

<210> SEQ ID NO 1
<211> LENGTH: 20
<212> TYPE: DNA
<213> ORGANISM: Unknown
<220> FEATURE:
<223> OTHER INFORMATION: 27f,16S, 16S rRNA gene

<400> SEQUENCE: 1

agagtttgat ymtggctcag                                                    20


<210> SEQ ID NO 2
```

<211> LENGTH: 19
<212> TYPE: DNA
<213> ORGANISM: Unknown
<220> FEATURE:
<223> OTHER INFORMATION: 1492r,16S, 16S rRNA gene

<400> SEQUENCE: 2
ggttaccttg ttacgactt 19

<210> SEQ ID NO 3
<211> LENGTH: 19
<212> TYPE: DNA
<213> ORGANISM: Unknown
<220> FEATURE:
<223> OTHER INFORMATION: 515f,16S, 16S rRNA gene

<400> SEQUENCE: 3
gtgycagcmg ccgcggtaa 19

<210> SEQ ID NO 4
<211> LENGTH: 20
<212> TYPE: DNA
<213> ORGANISM: Unknown
<220> FEATURE:
<223> OTHER INFORMATION: 806r,16S, 16S rRNA gene
<220> FEATURE:
<221> NAME/KEY: misc_feature
<222> LOCATION: (8)..(8)
<223> OTHER INFORMATION: n is a, c, g, or t

<400> SEQUENCE: 4
ggactacnvg ggtwtctaat 20

<210> SEQ ID NO 5
<211> LENGTH: 22
<212> TYPE: DNA
<213> ORGANISM: Unknown
<220> FEATURE:
<223> OTHER INFORMATION: ITS1F,ITS, Internal transcribed spacer

<400> SEQUENCE: 5
cttggtcatt tagaggaagt aa 22

<210> SEQ ID NO 6
<211> LENGTH: 17
<212> TYPE: DNA
<213> ORGANISM: Unknown
<220> FEATURE:
<223> OTHER INFORMATION: LR5,ITS, Internal transcribed spacer

<400> SEQUENCE: 6
tcctgaggga aacttcg 17

<210> SEQ ID NO 7
<211> LENGTH: 20
<212> TYPE: DNA
<213> ORGANISM: Unknown
<220> FEATURE:
<223> OTHER INFORMATION: ITS2,ITS, Internal transcribed spacer

<400> SEQUENCE: 7
gctgcgttct tcatcgatgc 20

<210> SEQ ID NO 8
<211> LENGTH: 20
<212> TYPE: DNA
<213> ORGANISM: Unknown

<220> FEATURE:
<223> OTHER INFORMATION: ITS3,ITS, Internal transcribed spacer

<400> SEQUENCE: 8
gcatcgatga agaacgcagc 20

<210> SEQ ID NO 9
<211> LENGTH: 19
<212> TYPE: DNA
<213> ORGANISM: Unknown
<220> FEATURE:
<223> OTHER INFORMATION: ACT512f,ACT, Actin

<400> SEQUENCE: 9
atgtgcaagg ccggtttcg 19

<210> SEQ ID NO 10
<211> LENGTH: 20
<212> TYPE: DNA
<213> ORGANISM: Unknown
<220> FEATURE:
<223> OTHER INFORMATION: ACT783r,ACT, Actin

<400> SEQUENCE: 10
tacgagtcct tctggcccat 20

<210> SEQ ID NO 11
<211> LENGTH: 28
<212> TYPE: DNA
<213> ORGANISM: Unknown
<220> FEATURE:
<223> OTHER INFORMATION: CA14,ACT, Actin

<400> SEQUENCE: 11
aactgggatg acatggagaa gatctggc 28

<210> SEQ ID NO 12
<211> LENGTH: 28
<212> TYPE: DNA
<213> ORGANISM: Unknown
<220> FEATURE:
<223> OTHER INFORMATION: CA5R,ACT, Actin

<400> SEQUENCE: 12
gtgaacaatg gatggaccag attcgtcg 28

<210> SEQ ID NO 13
<211> LENGTH: 20
<212> TYPE: DNA
<213> ORGANISM: Unknown
<220> FEATURE:
<223> OTHER INFORMATION: Cmd5,CMD, Calmodulin

<400> SEQUENCE: 13
ccgagtacaa ggargccttc 20

<210> SEQ ID NO 14
<211> LENGTH: 21
<212> TYPE: DNA
<213> ORGANISM: Unknown
<220> FEATURE:
<223> OTHER INFORMATION: Cmd6,CMD, Calmodulin

<400> SEQUENCE: 14
ccgatrgagg tcatracgtg g 21

<210> SEQ ID NO 15
<211> LENGTH: 17
<212> TYPE: DNA
<213> ORGANISM: Unknown
<220> FEATURE:
<223> OTHER INFORMATION: 5.8S,ITS, Internal transcribed spacer

<400> SEQUENCE: 15
cgctgcgttc ttcatcg 17

<210> SEQ ID NO 16
<211> LENGTH: 18
<212> TYPE: DNA
<213> ORGANISM: Unknown
<220> FEATURE:
<223> OTHER INFORMATION: 5.8SR,ITS, Internal transcribed spacer

<400> SEQUENCE: 16
tcgatgaaga acgcagcg 18

<210> SEQ ID NO 17
<211> LENGTH: 19
<212> TYPE: DNA
<213> ORGANISM: Unknown
<220> FEATURE:
<223> OTHER INFORMATION: ITS1,ITS, Internal transcribed spacer

<400> SEQUENCE: 17
tccgtaggtg aacctgcgg 19

<210> SEQ ID NO 18
<211> LENGTH: 20
<212> TYPE: DNA
<213> ORGANISM: Unknown
<220> FEATURE:
<223> OTHER INFORMATION: ITS4,ITS, Internal transcribed spacer

<400> SEQUENCE: 18
tcctccgctt attgatatgc 20

<210> SEQ ID NO 19
<211> LENGTH: 22
<212> TYPE: DNA
<213> ORGANISM: Unknown
<220> FEATURE:
<223> OTHER INFORMATION: ITS5,ITS, Internal transcribed spacer

<400> SEQUENCE: 19
ggaagtaaaa gtcgtaacaa gg 22

<210> SEQ ID NO 20
<211> LENGTH: 22
<212> TYPE: DNA
<213> ORGANISM: Unknown
<220> FEATURE:
<223> OTHER INFORMATION: LS266,ITS, Internal transcribed spacer

<400> SEQUENCE: 20
gcattcccaa acaactcgac tc 22

<210> SEQ ID NO 21
<211> LENGTH: 20
<212> TYPE: DNA
<213> ORGANISM: Unknown
<220> FEATURE:
<223> OTHER INFORMATION: V9G,ITS, Internal transcribed spacer

<400> SEQUENCE: 21
ttacgtccct gccctttgta 20

<210> SEQ ID NO 22
<211> LENGTH: 20
<212> TYPE: DNA
<213> ORGANISM: Unknown
<220> FEATURE:
<223> OTHER INFORMATION: 5F_Eur,RPB2, Second largest subunit of RNA polymerase II

<400> SEQUENCE: 22
gaygaycgkg aycayttcgg 20

<210> SEQ ID NO 23
<211> LENGTH: 20
<212> TYPE: DNA
<213> ORGANISM: Unknown
<220> FEATURE:
<223> OTHER INFORMATION: 7CR_Eur,RPB2, Second largest subunit of RNA polymerase II

<400> SEQUENCE: 23
cccatrgcyt gyttrcccat 20

<210> SEQ ID NO 24
<211> LENGTH: 23
<212> TYPE: DNA
<213> ORGANISM: Unknown
<220> FEATURE:
<223> OTHER INFORMATION: bRPB2-7.1R,RPB2, Second largest subunit of RNA polymerase II

<400> SEQUENCE: 24
cccatrgcyt gyttmcccat dgc 23

<210> SEQ ID NO 25
<211> LENGTH: 20
<212> TYPE: DNA
<213> ORGANISM: Unknown
<220> FEATURE:
<223> OTHER INFORMATION: fRPB2-5F,RPB2, Second largest subunit of RNA polymerase II

<400> SEQUENCE: 25
gaygaymgwg atcayttygg 20

<210> SEQ ID NO 26
<211> LENGTH: 20
<212> TYPE: DNA
<213> ORGANISM: Unknown
<220> FEATURE:
<223> OTHER INFORMATION: fRPB2-7R,RPB2, Second largest subunit of RNA polymerase II

<400> SEQUENCE: 26
cccatwgcyt gcttmcccat 20

<210> SEQ ID NO 27
<211> LENGTH: 1417
<212> TYPE: DNA
<213> ORGANISM: Pseudomonas glycinis

<400> SEQUENCE: 27
ctcagattga acgctggcgg caggcctaac acatgcaagt cgagcggatg aaaggagctt 60

```
gctcctggat tcagcggcgg acgggtgagt aatgcctagg aatctgcctg gtagtggggg    120

acaacgtttc gaaaggaacg ctaataccgc atacgtccta cgggagaaag caggggacct    180

tcgggccttg cgctatcaga tgagcctagg tcggattagc tagttggtga ggtaatggct    240

caccaaggcg acgatccgta actggtctga gaggatgatc agtcacactg gaactgagac    300

acggtccaga ctcctacggg aggcagcagt ggggaatatt ggacaatggg cgaaagcctg    360

atccagccat gccgcgtgtg tgaagaaggt cttcggattg taaagcactt taagttggga    420

ggaagggttg tagattaata ctctgcaatt ttgacgttac cgacagaata agcaccggct    480

aactctgtgc cagcagccgc ggtaatacag agggtgcaag cgttaatcgg aattactggg    540

cgtaaagcgc gcgtaggtgg tttgttaagt tggatgtgaa atccccgggc tcaacctggg    600

aactgcatcc aaaactggca agctagagta tggtagaggg tggtggaatt tcctgtgtag    660

cggtgaaatg cgtagatata ggaaggaaca ccagtggcga aggcgaccac ctggactgat    720

actgacactg aggtgcgaaa gcgtggggag caaacaggat tagataccct ggtagtccac    780

gccgtaaacg atgtcaacta gccgttggga gccttgagct cttagtggcg cagctaacgc    840

attaagttga ccgcctgggg agtacggccg caaggttaaa actcaaatga attgacgggg    900

gcccgcacaa gcggtggagc atgtggttta attcgaagca acgcgaagaa ccttaccagg    960

ccttgacatc caatgaactt tccagagatg gattggtgcc ttcgggagca ttgagacagg   1020

tgctgcatgg ctgtcgtcag ctcgtgtcgt gagatgttgg gttaagtccc gtaacgagcg   1080

caacccttgt ccttagttac cagcacgtca tggtgggcac tctaaggaga ctgccggtga   1140

caaaccggag gaaggtgggg atgacgtcaa gtcatcatgg cccttacggc ctgggctaca   1200

cacgtgctac aatggtcggt acagagggtt gccaagccgc gaggtggagc taatcccaca   1260

aaaccgatcg tagtccggat cgcagtctgc aactcgactg cgtgaagtcg gaatcgctag   1320

taatcgcgaa tcagaatgtc gcggtgaata cgttcccggg ccttgtacac accgcccgtc   1380

acaccatggg agtgggttgc accagaagta gctagtc                            1417
```

<210> SEQ ID NO 28
<211> LENGTH: 284
<212> TYPE: PRT
<213> ORGANISM: Pseudomonas glycinis

<400> SEQUENCE: 28

```
Met Arg Leu Ile Ile Val Ser Gly Arg Ser Gly Ser Gly Lys Ser Thr
1               5                   10                  15

Ala Leu Asn Val Leu Glu Asp Asn Gly Tyr Tyr Cys Ile Asp Asn Leu
            20                  25                  30

Pro Ala Gly Leu Leu Pro Glu Leu Ala Glu Arg Ala Leu Ile His Thr
        35                  40                  45

Glu Leu Ala Gln Pro Leu Val Ala Val Ser Ile Asp Ala Arg Asn Leu
    50                  55                  60

Pro Ser His Leu Ser Arg Phe Pro Glu Leu Leu Glu Glu Val Arg Ala
65                  70                  75                  80

Arg His Ile Gln Cys Asp Val Leu Tyr Leu Asp Ala Asp Glu Glu Thr
                85                  90                  95

Leu Leu Lys Arg Phe Ser Glu Thr Arg Arg Arg His Pro Leu Ser Thr
            100                 105                 110

Ala Asn Arg Ser Leu Ala Glu Ala Ile Glu Asp Glu Thr Ala Leu Leu
        115                 120                 125
```

```
Gly Pro Ile Ala Asp Leu Ala Asp Leu Lys Val Asn Thr Thr Asn Leu
    130                 135                 140

Asn Leu Tyr Gln Leu Arg Asp Thr Ile Lys Leu Arg Leu Leu Asn Gln
145                 150                 155                 160

Pro Glu Pro Gly Thr Ala Phe Leu Val Glu Ser Phe Gly Phe Lys Arg
                165                 170                 175

Gly Met Pro Val Asp Ala Asp Leu Val Phe Asp Val Arg Cys Leu Pro
            180                 185                 190

Asn Pro Tyr Trp Lys Pro Glu Leu Arg Ala Gln Ser Gly Leu Asp Ala
        195                 200                 205

Pro Val Ala Glu Tyr Leu Ala Ala Gln Pro Glu Val Glu Glu Met Phe
    210                 215                 220

Gln Asp Ile Tyr Gly Tyr Leu Tyr Lys Trp Leu Pro Arg Phe Ala Ala
225                 230                 235                 240

Ser Asn Arg Ala Tyr Val Thr Ile Ala Ile Gly Cys Thr Gly Gly His
                245                 250                 255

His Arg Ser Val Tyr Leu Thr Glu Arg Leu Gly Gln Ala Leu Gln Lys
            260                 265                 270

Thr Leu Lys Asn Val Gln Val Arg His Arg Asp Leu
        275                 280


<210> SEQ ID NO 29
<211> LENGTH: 215
<212> TYPE: PRT
<213> ORGANISM: Pseudomonas glycinis

<400> SEQUENCE: 29

Met Arg Val Ile Leu Leu Gly Ala Pro Gly Ala Gly Lys Gly Thr Gln
1               5                   10                  15

Ala Lys Phe Ile Thr Glu Lys Phe Gly Ile Pro Gln Ile Ser Thr Gly
            20                  25                  30

Asp Met Leu Arg Ala Ala Val Lys Ala Gly Thr Pro Leu Gly Val Gln
        35                  40                  45

Ala Lys Ser Ile Met Asp Ala Gly Gly Leu Val Ser Asp Asp Leu Ile
    50                  55                  60

Ile Ala Leu Val Gln Asp Arg Ile Ala Gln Pro Asp Cys Ala Asn Gly
65                  70                  75                  80

Phe Leu Phe Asp Gly Phe Pro Arg Thr Ile Pro Gln Ala Glu Ala Leu
                85                  90                  95

Val Thr Ala Gly Val Glu Leu Asp Ala Val Val Glu Ile Ala Val Glu
            100                 105                 110

Asp Glu Glu Ile Val Gln Arg Ile Ala Gly Arg Arg Val His Glu Ala
        115                 120                 125

Ser Gly Arg Val Tyr His Ile Val Tyr Asn Pro Pro Lys Ile Ala Gly
    130                 135                 140

Lys Asp Asp Ile Thr Gly Glu Glu Leu Val Gln Arg Lys Asp Asp Thr
145                 150                 155                 160

Glu Glu Thr Val Arg His Arg Leu Ser Val Tyr His Ser Gln Thr Lys
                165                 170                 175

Pro Leu Val Glu Phe Tyr Gln Ser Leu Ser Ala Lys Ala Gly Lys Pro
            180                 185                 190

Lys Tyr Ser His Ile Pro Gly Val Gly Ser Val Glu Ala Ile Thr Ala
        195                 200                 205

Lys Val Leu Glu Ala Leu Ser
    210                 215
```

<210> SEQ ID NO 30
<211> LENGTH: 362
<212> TYPE: PRT
<213> ORGANISM: Pseudomonas glycinis

<400> SEQUENCE: 30

```
Met Ser Gly Asn Thr Tyr Gly Lys Leu Phe Thr Val Thr Thr Ala Gly
1               5                   10                  15

Glu Ser His Gly Pro Ala Leu Val Ala Ile Val Asp Gly Cys Pro Pro
            20                  25                  30

Gly Leu Glu Ile Ser Leu Glu Asp Leu Gln Arg Asp Leu Asp Arg Arg
        35                  40                  45

Lys Pro Gly Thr Ser Arg His Thr Thr Gln Arg Gln Glu Ala Asp Glu
    50                  55                  60

Val Glu Ile Leu Ser Gly Val Phe Glu Gly Arg Thr Thr Gly Cys Ser
65                  70                  75                  80

Ile Gly Leu Leu Ile Arg Asn Thr Asp Gln Lys Ser Lys Asp Tyr Ser
                85                  90                  95

Ala Ile Lys Asp Leu Phe Arg Pro Ala His Ala Asp Tyr Thr Tyr His
            100                 105                 110

His Lys Tyr Gly Glu Arg Asp Tyr Arg Gly Gly Gly Arg Ser Ser Ala
        115                 120                 125

Arg Glu Thr Ala Met Arg Val Ala Ala Gly Ala Ile Ala Lys Lys Tyr
    130                 135                 140

Leu Ala Ser Gln Gly Ile Val Ile Arg Gly Tyr Met Ser Gln Leu Gly
145                 150                 155                 160

Pro Ile Glu Ile Pro Phe Lys Thr Trp Asp Ser Val Glu Gln Asn Ala
                165                 170                 175

Phe Phe Ser Pro Asp Pro Asp Lys Val Pro Glu Leu Glu Ala Tyr Met
            180                 185                 190

Asp Gln Leu Arg Arg Asp Gln Asp Ser Val Gly Ala Lys Ile Thr Val
        195                 200                 205

Val Ala Glu Gly Val Met Pro Gly Leu Gly Glu Pro Ile Phe Asp Arg
    210                 215                 220

Leu Asp Ala Glu Leu Ala His Ala Leu Met Ser Ile Asn Ala Val Lys
225                 230                 235                 240

Gly Val Glu Ile Gly Ala Gly Phe Ala Cys Val Ala Gln Arg Gly Thr
                245                 250                 255

Glu His Arg Asp Glu Leu Thr Pro Gln Gly Phe Leu Ser Asn Asn Ala
            260                 265                 270

Gly Gly Ile Leu Gly Gly Ile Ser Ser Gly Gln Pro Ile Val Ala His
        275                 280                 285

Leu Ala Leu Lys Pro Thr Ser Ser Ile Thr Thr Pro Gly Arg Ser Ile
    290                 295                 300

Asp Ile His Gly Asn Pro Val Asp Val Ile Thr Lys Gly Arg His Asp
305                 310                 315                 320

Pro Cys Val Gly Ile Arg Ala Thr Pro Ile Ala Glu Ala Met Met Ala
                325                 330                 335

Ile Val Leu Met Asp His Leu Leu Arg His Arg Gly Gln Asn Ala Asp
            340                 345                 350

Val Arg Val Ser Thr Pro Val Leu Gly Leu
        355                 360
```

<210> SEQ ID NO 31
<211> LENGTH: 201
<212> TYPE: PRT
<213> ORGANISM: Pseudomonas glycinis

<400> SEQUENCE: 31

```
Met Thr Glu Pro Ala Leu Leu Pro Arg Pro Gln Leu Arg Arg Leu Leu
1               5                   10                  15

Arg Lys Ala Arg Arg Ser Leu Thr Pro Gly Glu Gln Arg Gln Ala Ala
            20                  25                  30

Lys Gly Leu Phe Arg Gln Leu Ala Gln Asp Pro His Phe Arg Arg Ala
        35                  40                  45

Lys His Ile Ser Leu Tyr Leu Pro Thr Asp Gly Glu Ile Asp Pro Arg
    50                  55                  60

Leu Leu Leu Arg Glu Ala Gln Arg Arg Gly Lys Ala Thr Tyr Leu Pro
65                  70                  75                  80

Val Leu Ser Ala Trp Pro Arg Thr Lys Met Val Phe Gln Arg Ile Arg
                85                  90                  95

Pro Gly Glu Lys Leu Lys Pro Asn Arg Phe Arg Ile Leu Glu Pro Arg
            100                 105                 110

Ala Asn Leu Ala Arg Gln Arg Lys Ile Trp Thr Leu Asp Leu Val Leu
        115                 120                 125

Leu Pro Leu Val Gly Phe Asp Asp Val Gly Gly Arg Leu Gly Met Gly
    130                 135                 140

Gly Gly Phe Tyr Asp Arg Ser Leu Ala Tyr Leu Ala Arg Arg Lys Asn
145                 150                 155                 160

Trp Arg Lys Pro Thr Leu Leu Gly Leu Ala His Glu Cys Gln Lys Val
                165                 170                 175

Glu Arg Leu Ala Gln Ala Ser Trp Asp Val Pro Leu Gln Gly Thr Val
            180                 185                 190

Thr Asp Lys Ala Trp Tyr Phe Ala Gly
        195                 200
```

<210> SEQ ID NO 32
<211> LENGTH: 570
<212> TYPE: DNA
<213> ORGANISM: Trichoderma hamatum

<400> SEQUENCE: 32

```
cggagggatc attaccgagt ttacaactcc caaacccaat gtgaacgtta ccaaactgtt     60

gcctcggcgg ggtcacgccc cgggtgcgta aaagccccgg aaccaggcgc ccgccggagg    120

aaccaaccaa actctttctg tagtcccctc gcggacgtat ttcttacagc tctgagcaaa    180

aattcaaaat gaatcaaaac tttcaacaac ggatctcttg gttctggcat cgatgaagaa    240

cgcagcgaaa tgcgataagt aatgtgaatt gcagaattca gtgaatcatc gaatctttga    300

acgcacattg cgcccgccag tattctggcg ggcatgcctg tccgagcgtc atttcaaccc    360

tcgaacccct ccgggggatc ggcgttgggg atcgggaccc ctcaccgggt gccggccctg    420

aaatacagtg gcggtctcgc cgcagcctct cctgcgcagt agtttgcaca actcgcaccg    480

ggagcgcggc gcgtccacgt ccgtaaaaca cccaacttct gaaatgttga cctcggatca    540

ggtaggaata cccgctgaac ttaagcatat                                      570
```

<210> SEQ ID NO 33
<211> LENGTH: 270
<212> TYPE: DNA
<213> ORGANISM: Trichoderma hamatum

<400> SEQUENCE: 33

```
atgaaaatgc ttattactgc cgctcttttc accctggccc tcgccgcccc tgtcgccgag     60

actaagcctc atagcattgc tgctcgcgat ccctttactt gccccggcgg cctgaccaac    120

agcaccccca tgtgctgcag cgttaatgtc cttggcctgc tagcccttga ttgccagcaa    180

cctggcgcgg acggctgtag tggcagctcc aagcccaatt gttgcaccct tggagcggcc    240

ggacagggtg ttatttgcaa cgcactgtaa                                     270
```

<210> SEQ ID NO 34
<211> LENGTH: 1917
<212> TYPE: DNA
<213> ORGANISM: Trichoderma hamatum

<400> SEQUENCE: 34

```
atgaagtcgg ccattcttct tgggctcact ggcctcgctg ccaatgtgaa tgcccatcct     60

gctaagcagc cagagaccgg caacggcctg actaagcgtg gcgttgatat tagcaagtat    120

agcttgccta atctttcaaa gtacacgtct tcgccaaaca tcgaacaaga ggcctctctg    180

cagtctttgg ctttcaagcg caactatgtg gatacagcca cacgagctgt caagaaagct    240

gcccccaagg ccgaattccg cgtcgtggat gaccactata tcgatgttga cggcattggt    300

cacgtccact ttaagcagac agtgcacgga attgacattg acaacggtga cttcaaggtt    360

aacattggca aagacggtag agtcttctct catggaaaca gcttcttttc tggcaagctg    420

ccccagcaga acccccttgag gaagcgtgat ttctctgacc ccaccactgc gctcaagggt    480

gcaattgata tcctgggcct cccggttcag gctgatggcg ccaccgccga agctcaggaa    540

ggcactgaga agtacacgtt gaagggtaca tccggagctg tcagcgatcc taaggctcac    600

ctcgtttacc tcgtcaaggg agacggaact ctggctctga cttggcgggt cgagaccgat    660

atcatggaca actggcttct cacctacgtt gacgcaacaa ccaaccaaga gattcatggt    720

gttgtagact acgtctccga ccttgccacc ttccaggttt accccctgggg cctcaatgac    780

cccaccgagg gagatcgtaa agtcctgacc gacccgtgga gaaccgatgc ctccccattc    840

acttggctca gcgacggaac caccaactat actgtaactc gcggaaacaa tgctattgcg    900

caggataatc cttctggggg ggacagttat ctcaataatc accgtccatc cagctcgact    960

cgggactttc aatatccctt tacgctgact cagaccaacc ctacagatta tagggatgct   1020

gccatcacac agctctttta cacagtcaac aagtaccacg atttgctata tgtccttggc   1080

ttcaacgagg tagcaggaaa cttccaagca aataacaacg gaaagggcgg caaggccaat   1140

gatttcgtta ttgttaacgc tcaagacggc agtggaacga acaatgccaa ctttgctacc   1200

ccggccgatg gaagcaatgg ccgtatgaga atgtacatct ggactactgc taaccccaag   1260

cgagatggcg atctcgaggc gggcattgtt atccacgaat acactcacgg attgtctacc   1320

cgtcttaccg gcggccctgc caactctgga tgccttactg gcactgaagc cggcggcatg   1380

ggtgaaggct ggggtgattt cttcgccacc gctatccgct taaaggctgg tgacacccgc   1440

agcaaggact atcctatggg agtctgggcc gataacaacg tcaagggtat ccgccagtat   1500

ccttattcaa caagccttac taccaatcct cttacttata aaaccgtcaa tacgcaaaat   1560

gaagtccact cagccggtac tacatgggcc accattttgt acgaagtcct gtggaacctc   1620

attgacaagt acggcaagaa tgacgacgat ttccctacct ttgatagcca gggcgtcccc   1680

accgacggca agtatcttac cttgaaactc gtcctcaatg gattggctct gcagccctgc   1740
```

acgccaactt ttgtttctgc ccgtgatgcc atcttggatg ctgatcgtgc tttgaccgga 1800
ggggagaatc tttgtgaatt atggacagga ttcgccaaga gaggtcttgg atccggcgcc 1860
aaatattctt ccaccgctcg cgttgaaagc ttcactatcc catctggggt ttgctaa 1917

<210> SEQ ID NO 35
<211> LENGTH: 297
<212> TYPE: DNA
<213> ORGANISM: Trichoderma hamatum

<400> SEQUENCE: 35
atgaagttct tcgccgccac cgctctcctt gccgccacta ccattgctgg acctcttgag 60
gttcgcactg gagacggtaa catttgtcct agcggcggcc tctacggcaa ccctcagtgc 120
tgctcctctc tcctccttgg tctcattggt cttgactgca acgtccccaa ccaaacgccc 180
cgtgacggcg ctgactttag aaacatctgc gctaagactg gtgacgaggc cctttgctgt 240
gttgctcccg ttgccggcca agctcttctc tgccaggtcg ccgttggtgc cagctaa 297

<210> SEQ ID NO 36
<211> LENGTH: 294
<212> TYPE: DNA
<213> ORGANISM: Trichoderma hamatum

<400> SEQUENCE: 36
atgaagttct ttgctgttgc cactctcttt gtcactggcg tcatctccgc cccgtcaccc 60
aatgccctaa attcccgcag tcttctttgc agccctggcc tttactccac cgcgcagtgc 120
tgtggtgttg atgtattggg agttgctgat ttggactgtg cggctcctac tggcactatt 180
accaacgccc aaggatttca ggctgcctgt gctaagaaag gccaagaggc tcgctgttgt 240
gttctacctg ttgccggcca agatgtcctg tgccaggacc cccctggttt gtaa 294

<210> SEQ ID NO 37
<211> LENGTH: 1230
<212> TYPE: DNA
<213> ORGANISM: Trichoderma hamatum

<400> SEQUENCE: 37
atgaccagca ttcgtcgtct tgctctctat ctcggagctt tgctcccggc tgtcctcgcc 60
gctccagcag cccttcacaa gaagcctgag gctgcaccta acaagtttat tgtcactctt 120
aaagagggcg cttcaattga taccgactct catctcgcct gggtgaatga catccaccgt 180
cgttctttga ccaagcgtag cactgctggt gttgaaaaga cttataacat tcatacttgg 240
agtgcttatg cgggtgaatt tgatgcagag acgattgagc agatcaagtc tagccccgat 300
gtcgcgtctg tggagccaga ctacatcatg tacctgtcgg acattgttga agacaagcgt 360
gctctgacca cacaatctgg agctccttgg ggccttggca ctgtttccca ccgcacatct 420
gggtctacga gctacattta cgatagctca gctggctctg gaacctttgc ctatgtggtt 480
gactccggca tcaacacctc tcatcagcaa ttcggcgggc gcgccagtct tggctacaat 540
gctgcaggag gacagcacgt cgacactctt ggccatggta ctcatgtttc tggaacaatt 600
ggtggatcta catacggcgt tgctaaacag gccagcctaa tctccgtcaa agtctttgct 660
ggagagagcg ctaccacctc tgttatcctt gacggctata actgggctgt aaacgacatt 720
gtctcgagga atcgtgctag caaatctgcc attaacatgt cgcttggagg acctgcctca 780
tccacctgga cgaccgccat taacgcagcc tttaaccagg gtgtgcttac cattgtcgcc 840
gctggtaatg gcgacagttt cggaaacccc cagccagttt ccggcacttc tcctgctaat 900

```
gttcctaatg ctatcactgt tgcggcgctg gacatcaact ggcgcactgc ttccttcacc     960

aactacggtg ctggcgttga tgtctttgcc cctggtgtta acattctgtc gtcatggatt    1020

ggatccaaca ctgctaccaa cacaatcagc ggcacctcta tggcgacacc tcacgttgtt    1080

ggtctggctc tctatcttca atcccttgaa ggcctcacca ctcctaccgc tgtcactaat    1140

cggatcaagg ctctggctac cgctggccgt ataactggca gccttaacgg cagccccaac    1200

actctcatct tcaacggaaa cagtgcttaa                                     1230
```

```
<210> SEQ ID NO 38
<211> LENGTH: 1185
<212> TYPE: DNA
<213> ORGANISM: Trichoderma hamatum

<400> SEQUENCE: 38

atgacttctc tataccttac ttctgccctt gggctgctat gcctcctccc cgctgcacag      60

gcaggctgga atccgaactc aaagaacaac attgtcgtat actggggaca ggatgcaggc     120

agcattggcc agaatagact gtcttactac tgcgaaaatg cccctgatgt tgatgttatc     180

aatatctctt tcttagttgg cataacagat cttaacctga accttgccaa tgttggcaac     240

aactgtacct cttttgctca ggatcccaac ctactcaact gcccccaagt tgcggcagat     300

atcgtcgagt gccaacagac atatggaaaa acaatcatga tgagcttgtt tggctcgact     360

tatactgaga gtggtttcag ttcgtcgtca actgcagtgt ccgccgctca agaaatttgg     420

gccatgttcg gtcctgtcca gagcggcaac agcacccccc gaccttttgg taacgctgtg     480

attgatggat ttgactttga tcttgaagac cctatcgaaa acaacatgga gccttttgcg     540

gcagagctgc gatctctcac aagtgctgct acctccaaga agttttacct ttcggctgct     600

cctcagtgtg tgtaccccga cgcgtctgat cagacgttcc tccagggaga ggtggctttt     660

gactggttga atatccaatt ttacaacaat ggctgtggta cctcttacta cccctcgggc     720

tacaactacg caacttggga caactgggtc aagaccgtca gtgctaaccc aaacactaag     780

ctgcttgtcg gcactcctgc cagtgtccat gctgtaaact ttgccaacta ctttcccacc     840

aatgatcaac tcgccggagc tatctcgtct tccaagtcgt acggtagctt tgctggtgtg     900

atgctatggg atatggctca gctctttgga aatcctggat acctggactt gatcgtagcg     960

gacctgggtg gcgcttccac ccctcctccg ccagcttcca ctactctgtc cactgtgact    1020

aggtcctcta ctgctagcag cggacctact tctcctcctc cctccggcgg tggcagtgtc    1080

cctcaatggg gccagtgcgg tggacaggga tacacaggac caactcaatg ccagtctccc    1140

tacacttgcg ttgttgagag ccagtggtgg gcatcttgcc agtaa                    1185
```

```
<210> SEQ ID NO 39
<211> LENGTH: 297
<212> TYPE: DNA
<213> ORGANISM: Trichoderma hamatum

<400> SEQUENCE: 39

atgagaacat ctaccgctat tatatctctt gcccttgtgg tgatgggaat tgccgcccct      60

gctgccgagg ccggctctgt tgtcagcgaa gccggctttg ttgtcagcga agcccaattc     120

aacgccatat ttcccggtcg aaaccctttt tactcctata gggcattgac cggcgccctc     180

ggatcttatc ccagcttcac caacactgct gataacgcca ctaggctccg cgaggccgcc     240

gctttcttcg ccaatgtgga tcatgaaacc gatgggctca agttcgtcgt ggaataa        297
```

<210> SEQ ID NO 40
<211> LENGTH: 1074
<212> TYPE: DNA
<213> ORGANISM: Trichoderma hamatum

<400> SEQUENCE: 40

```
atgagcgccg catcccgcaa gtcacgcata gctacgagtg tggcgagagt tatgtacacc     60
aatgcagtct atttccctag cagcagaata tatcaaggtg attcgccggg aatgctcaat    120
tacagctgca tcaaccacgt gtattatgct tatgccagcg tgacggcgga cggcaatgtg    180
tttctcggcg atgagtgggc cgatgcaaga gcgccagtgg atggtgttca gggtggctta    240
ggatccttga tgcatctcaa gcagaggcac cctcacctgc aggttgtctt atctattggt    300
ggcagcactg catcagaggt atttcccatt gttgcatcaa gcactctcct cagagacaac    360
tttgcccggt ctgcccttgg cctcgtggaa gcatccgggc ttgatggtat tgacattgcc    420
tgggagttcc catcccaagc taaacatggc cacgatttcc tagccttgct ggcagcagtg    480
cggattcata tgcctgaaga ccgcttcatt ctaacagctg tcctccctgc ggcgaaggag    540
gttctacaac tcatcgacct cagcacagcg gccgagtacc ttgactacat caaccttgtg    600
gcatatgatt tcttcggcac gtggacgtcc aaaactggtc atcacgcaca gttatatact    660
atgaacaagg acgaaccctc ggcatcgaca ggtgtggcgt atgtcatgtc ccaaggattc    720
cctgcgaaga gtatcctgct cgggatccca acctacggac gaagcttcct caaggccaat    780
gggccgggcc aggattttaa cggcgttggc ggccaagatg gcacattcga atacggcgaa    840
ttaccacgaa agggatgcaa agagattgtg gataggcgct atattgcggc ccaatgtgtc    900
ggtggtgatg gggggtttgt cacgtacgac aaccccgaga cggtcaaggt taaggcggaa    960
ttttgcaagc aaaagggatt aggggggctt ttttactgga acggaccggc tgactctcga   1020
gatcaagcac gaagtctgat tgcggctgga ttccgcgctc tacacacctc gtga         1074
```

<210> SEQ ID NO 41
<211> LENGTH: 306
<212> TYPE: DNA
<213> ORGANISM: Trichoderma hamatum

<400> SEQUENCE: 41

```
atgcaattga ccacagtcgt cgcgctcttc gcctctctgg ccggcgccgc gcctgcccct     60
gaacccgctg ctgagcttgt tgctcgtgat ggtccttgct cctctggtgt caccaataac    120
gtccctcaat gctgcggtac tggtatcctc agtgttgtct acgtggactg caagactccc    180
actcaagctc cctctgccac taaccagttg agcgccatct gcgctcgagt aggtctccag    240
gccaagtgtt gcaccgtcgg cattgctggc gttggcgttc tttgccagga tgctattccc    300
cagtaa                                                               306
```

<210> SEQ ID NO 42
<211> LENGTH: 417
<212> TYPE: DNA
<213> ORGANISM: Trichoderma hamatum

<400> SEQUENCE: 42

```
atgcaattgt ccaacctctt caagcttgct ctcttcaccg ccgctgtctc tgctgatacc     60
gtctcgtacg atactggcta cgatgacgca tctcgctctc tgaccgtcgt ctcctgctcc    120
gacggcccca acggcctcat caccagatac cactggcaga cccagggcca gatccctcgc    180
ttcccataca ttggtggtgt ccaggccgtc gccggctgga actcccctag ctgcggcacc    240
```

```
tgctggaagc tcacttacag cggcaagacc atctacgtct tggctgttga ccacgccggt    300

gctggcttca acattggcct cgacgccatg aatgctctca ccaacggcca ggctgttgcc    360

ctcggacgtg tctctgccac tgcctctcag gtggctgtga gcaactgcgg tctctag       417


<210> SEQ ID NO 43
<211> LENGTH: 1263
<212> TYPE: DNA
<213> ORGANISM: Trichoderma hamatum

<400> SEQUENCE: 43

atgcattcaa caactttctt tgccagtctg ggactcgcag gcctggttgc cggcgcccct     60

tcggccccgc acaacgttaa agctcgccaa gcttccggtg cccaaaacgt cgtctattgg    120

ggaggcacta acaatgaaag cgacgacctt tctacctatt gtacgcccac cgcaggcatt    180

gacatccttg ttctgtcttt cttggacatt tacggcacaa ctggcaacat tccagcaggt    240

aatattggca attcttgcta tatcggaaca aatggcacac ctcaactatg tgataatctt    300

gctgcttcaa tagccagctg ccaggccgct ggtattaaaa ttatcttgtc tctcggagga    360

gcggccggct cctattctct acaatcgcag tcacaggctg tggctattgg ccagtatctc    420

tgggaggctt acggcaactc tggcagcact tctgtccagc ggccctttgg caatgtcttt    480

gttaatggtt ttgactttga ccttgagctg aacgccggca accaatacta ccagtatctg    540

atatcaaccc tccgttccaa ctttgccagt gacccgaaac atacgtatta tatcactgga    600

gcgccccagt gtcctctccc gttgagtatt cctcaaatcc gtaaaccaaa tatgggagag    660

attataagtg cctcacagtt cgactatctc tggattcaat tctataacaa caacgcttat    720

gcaccagacc cctgttctct tggtctgcct ggcgatgcac ccttcaacta caacaactgg    780

acgtcattta ttgctactac cccttcaaaa aacgcaaaac tatttattgg agtccctgcg    840

aatactttag ctgctaatgg caattcaggt ggtgccgttt actatgcttc gccatcccag    900

cttgcttcca ttgtcgcgaa tacaaaatct agcccagatt ttggaggaat tatgatgtgg    960

gatgctgggt actctgatgc taatgtcaac aacggatgca actacgctca ggaggccaaa   1020

aacatcctcc ttaccggcgc tccctgtgga ggctcacccc caccggttag cagcagcaag   1080

cctacatcca ctgcaaccaa atccgctact agcacttcat cagcctcggg aacaggcccg   1140

acaggaggcg gcacagtacc tcagtggggc cagtgcggcg gagagggata cacgggcccg   1200

acgcagtgcg tttctcccta caaatgcgtc gaatcaagtc aatggtggtc gtcttgccaa   1260

taa                                                                 1263


<210> SEQ ID NO 44
<211> LENGTH: 999
<212> TYPE: DNA
<213> ORGANISM: Trichoderma hamatum

<400> SEQUENCE: 44

atgccctctt tgatcacggt tgcgagcgtg ctcgctcttg ttccatccgc cttcgcgggc     60

tggaatgtca actcgaagca aaacattgct gtgtactggg gacaaaactc cgccaaccaa    120

cagagcacac agcagcgtct ttcagcctac tgcaatgcga agattgaatc tgacagttgc    180

gatgtagatg ccaacatcaa tgtcattgac attgctttcc tgaatggaat tactcctcct    240

atgaccaact ttgccaatgc tggtgaccga tgcactccct tctccgacaa cccttggctc    300

ttgagctgcc ctgaaattga ggcggatatc aagacttgcc aggctaatgg caagaccatt    360
```

```
ctcatttctc ttggtggtga ttcttacact caaggtggct ggagctctac cagtgctgct    420

caggccgcag ccaaacaggt ctgggccatg tttggtcctg tccaatccgg cagctccacc    480

gagcgtccct ttggcagcgc cgttgttgac ggttttgact tcgactttga agcgacgact    540

aacaatctcg cggcctttgg cgctcagctc aagagcctct cgagcgctgc cggtggcaag    600

aagtactact tctctgctgc tccccagtgc ttcttccccg acgctgctgt cggtgcactg    660

atcaacgccg tccccatgga ctggatccag attcaattct ataacaaccc ttgcggcgtc    720

agcggctaca cccccggcac cagcaaccag aacaactaca actaccagac ctgggatacc    780

tgggccaaga caagccccaa ccccaacgtc aagcttcttg tcggcattcc cgctggccca    840

ggtgctggtc gcggctacgt gtctggctct cagctcactt cagtcttcca gtactcgaag    900

ggcttcagca gcacttttgc cggtgctatg atgtgggata tgtcccagct cttccagaac    960

actggcttcg aggcccaggt tgtcaatgct ttgaaataa                           999
```

```
<210> SEQ ID NO 45
<211> LENGTH: 1623
<212> TYPE: DNA
<213> ORGANISM: Trichoderma hamatum

<400> SEQUENCE: 45

atgccgctta aggtcttcga gtcagcttcg cctgcgccgt cgcatccctc cttatcgcac     60

ctctgcctgc tcgtcttcga agctgttcta gaagtagtct gtgtgagctt gccgggatac    120

atcgttgcgc gccttggcca tttcgatgcc gataagcaaa agttcctggc taatctcaat    180

gtgatgctct tcacgccctg tcttatcttc accaagctag catctcagct caatgccgaa    240

aaactatccg atctcgccat catccccgcc atctttatcg tgcaaactct tgtatcatgg    300

atagtttcga tcctggtcgc caaggggttc cgattcaata agcgagcttc caacttcgtt    360

actgctatgg gcgtctttgg caattcaaat tcactgccca tctctctcgt tctttctctc    420

tcgcaaacaa tcaagggcct ccactgggac aggataccag gcgacaacga tgacgaagtc    480

ggcgctcgcg gtatcttata tctactgatt ttccagcaac ttggccagct tgtcagatgg    540

agctggggat atcacgttct gctagccccc aaggataaat acgccgagta tcaagacgaa    600

attgccgaag aaggccagta cagatacaga gacgaagagc cgaacgaaca ggagccggag    660

attctcatta ctggtttgga cggtgatacc gaagatgatg gcgagagcaa tgcttctgaa    720

gattatatac ctgctggacg aacacctctt gcgagcaatt cccgggcttc actggctggc    780

tcttccgtcg acaatgacga catgctgaat ttcaaaaagg gcaactacac tcgtggaagc    840

tcgctcgcca acacagactt ggaagatgat attctttcat tccctcgtat tcgtcttcga    900

gatgaggctg aagtcgagca cggagttact gctcgtatca agaaatcact atattctctg    960

aaagacaaag cttctgcggc catgactcgc caatatcagc gacttcctca acctgttcaa   1020

acctgccttt ccttcattca taagtcaatc acaaagactc tcggatttgt atgggatttc   1080

atgaatccac ctttgtgggc tatgctcatc gcggtcatcg tggcgtccat cccgagtctc   1140

caacagttgt tcttcgaaga tggttcattc gtgaaaaata gcgtcaccaa cgctgtttcg   1200

tctagtggag gcgttgcagt gcctttgatc ttggttgttc tcggcgccaa cttggcgcgc   1260

aacactgccg ctcacgattc tcccatagac ccggaggagg aaaagattgg caccaagctc   1320

ttgatcgctt cgttgctgag caggatggtt ctgccaactt tgattatggc acccattctg   1380

gctattacgg caaaatactt gcccatcagc attctagatg atcccatctt tattgtcgta   1440

tgctttcttc ttactggcgc acccagtgcg ctccagcttg cgcaaatttg ccaaatcaac   1500
```

aatgtttatg agcagactat gggaagaatc ctctttcaga gctatgttat ctggattctt 1560
ccctctactc ttttccttgt catgatggca ctcgaggtga ttgagtgggc aacagtgaat 1620
taa 1623

<210> SEQ ID NO 46
<211> LENGTH: 717
<212> TYPE: DNA
<213> ORGANISM: Trichoderma hamatum

<400> SEQUENCE: 46
atgctaccgt cgagcctttg ccggattgcc gctgttatca gcgtggcttc tgcggaaatg 60
gtttcggtaa catttgatac cgcttacgac gatccttctc gttcactgag tgaagtcgct 120
tgttggagga agggcacggg attcatgcct aacttggatt ggaaacttca aaaagatgca 180
ttggaattta ttggaatcaa agcaattcgt ggcttcagtt ctgcccaatg tttttcctgc 240
tggaaaattg agtatggaga taagcagata tcactgttcg caattgacag cgccgactcg 300
ggcattgttc tctctctgag caccatgcaa tatcttacag gtggccaggc tcgcgagctg 360
gcccgaattg atgcaaaggc aacccaagtc gacgcatcaa actgtgggat ttctgcggct 420
gaactgcaca aatacgattt ctataccaat ggtagtggaa atagcgatgg ctctaggagc 480
aacactggag ctattgttgg aggagttctc ggtggtgtgg ctgggcttgc tttaactggg 540
cttgctgttt ttttcttccc ccgctataag aatttagctg ctggacataa gccagtgagc 600
cagaatactc ctcctgctgc ttatcaatcc tctctgatgc agcaggaccc caaggctcac 660
tatgatccta aatatttcgc agagatggat acacagccat acacgccccc tgattag 717

<210> SEQ ID NO 47
<211> LENGTH: 1209
<212> TYPE: DNA
<213> ORGANISM: Trichoderma hamatum

<400> SEQUENCE: 47
atgctccgta ctcctacaat cccctggctt ctaaatatca tcctagaaga aaaccctact 60
atgattcctt caatgaaaaa gtgcggccgc aagttatggg ctggcctggc attgctagcc 120
ttgcctgtaa ttgcaagcgc atcatgcgcg cttcctagca cctacaaatg gacttcgact 180
ggcccgctgg caaaccccaa gtcgggctgg gtttcgctta aagatttcag ccatgttcca 240
tacaatggcc agcatctggt ctattcttcg actgtgaact cggcaggttc ctatggctcg 300
atgaattttg gtctcgtctc aaactggacc aacctcagca cagccagcca aaacacaatg 360
aaccttggca cggtagcgcc aactctcttc tatttctctc ccaagaagat ctgggttctt 420
gcatacgaat gggctgctac tccatttgcc tatgtcacgt cgaccgatcc taccaatgcc 480
aatggttggt cagcttcgca accgctcttc agcggaagca tatctccctc tagccctatc 540
gacccagcac tcatcagcga tggcacgaat atgtaccttt tctttgcagg agataatggc 600
aaaatctacc ggtccagtat gcccattggc cagttcccat ccagcttcgg cacatcgtac 660
acaacgatca tgagcgccgc aaccaacgat ctgtttgaag cgatacaggt gtacactgtc 720
tcaggccaga atcaatatct tatgattgtt gagtgtatcg gatctgttgg acggtatttc 780
cgctcattta cggccacatc cctgagcggt acatggacgc cgcaagctgc aaccgagagc 840
aatccctttg caggccatgc taacagcgga gctacttgga ctaacgatat cagctctgga 900
gatcttattc gcagcacaaa cgatgagacg atgaccattg atccctgcaa cctccagctg 960

```
ctgtaccaag gaatggccgt tggttccacc ggagactata actccctgcc atggcgaccc   1020

gccgtcttga ctctaaccaa ccccggctcg agcacaggca acggcaacgg cactggaagc   1080

ggcggctcag gcggcagcgg atctggacaa gcatcgcagt atgctcagtg cggcggtttg   1140

ggctatactg gacccacgag cccgtacaaa tgcacgtttg tcaacgaata ctactcccag   1200

tgtctatag                                                           1209
```

```
<210> SEQ ID NO 48
<211> LENGTH: 978
<212> TYPE: DNA
<213> ORGANISM: Trichoderma hamatum

<400> SEQUENCE: 48

atgctctaca ctgctgctct ggccggcctt atggccactg ctgcccttgc tgccccctac     60

cgccgacagg ctactggcca aaacgttgta tactggggcc aaaacggcgg cggcgttact    120

gaaagtaaca atttgtctga ttattgcgat gctgaagcag gcatcgatct acttgttctt    180

agtttcctct acgagtatgg caatggaaat actattcctt caggcactat cggccagagc    240

tgctccattg atacctccgg aaacccttca aactgtgatg cccttgcctc ggccattgct    300

acctgcaagt ccaatggagt caaggttgtc ttgtctctcg gcggcgccgt tggagcctac    360

tctctctcct ctcagcagga ggccgagaca attggccaaa acctctggga cgcatacggt    420

gccggcaatg gaaccgtccc cagaccgttc agaagcaccg ttgtcgatgg ctgggacttt    480

gatatcgaag ccagtagtgg caaccagtat tatcaatact tgattgccaa gcttcgctca    540

aatttcaacg gcggcaacta cgtgattacc ggtgctcctc agtgccctat tccggagcct    600

aacatgcagc aaatcattac cacttctcag tttgactatc tttgggtcca gttctacaac    660

aatccctcgt gctcagttgg aacgtcgaca ccaaacttcc aagattgggt ttccaacatt    720

gccaacactc cttctgccaa tgccaagatc ttccttggtg tgcctgcaag cccgctcggc    780

gctactggaa ctgaatctgg cgcccaatat tacctcgagc cttctgctct caacactctc    840

gtcggccagt tctcatccaa ccctgcgttt ggcggtatca tgatgtgggc tgccggtttc    900

tccgatgcca acgtgaacaa tggatgcact tatgctcaag aggctaagaa gatccttact    960

tctggtcaaa tctgctaa                                                  978
```

```
<210> SEQ ID NO 49
<211> LENGTH: 1278
<212> TYPE: DNA
<213> ORGANISM: Trichoderma hamatum

<400> SEQUENCE: 49

atgctttccc acgctatcct tgctggcctc ggccttgctg gtctcgctgc cgctgcgcct     60

accaggacga ttgcgactcg tcaagcttcc ggttatcaga acgctgtcta ctggggtgcc    120

actggcaaac agaaccctaa cctcgctgaa tactgcacgt ccacctcggg cattgatatc    180

ctgatcctgt ccttcttgga cgtctacggt gccactggca acttccccct tggcaacttt    240

ggcaacgact gcttcgtcgg caccacgggt gttccccagt catgctctga cctggcctcc    300

cagatcaaga cctgccagaa cgctggtgtc aagattattg tttctctcgg tggtgccgcc    360

ggttcatact ctgtcacgtc ccagcagcag gcccagacca tcggtcaata cctctgggat    420

gcctacggta actctggcag cacctctgtc cagcgtccct ttggcgatgt ctttgttaac    480

ggttgggact ttgacatcga ggccaacggc ggcttcagcc agtactacca gtacatgatt    540

ggcaccctgc gctccaactt cgccaaggac tccgccaaca cgtactacat caccggtgct    600
```

```
ccccagtgcc ccctgcccga ggagaacatg ggcgatatga tccagcactc cgtcttcgac    660
tacctcttca tccagttcta caacaacaac cccacctgct ctcttggtct gtctggccag    720
gctcccctca actacgacga ctggaccaac tttgtctcca ccacccagtc caagaacgcg    780
aagctcttcc tcggtgcccc tgccggacct ctcgcctcca acggaaaccc aaacggtgcc    840
gtctactacg ctaccccctc ggatctggcc cccatcgtca acaaggccaa gacgaagtca    900
aactttggcg gtgtcatgct ctgggacgct ggttactctg atgagaactc cagcggcggt    960
tgcaactacg cccagcaggt caagagcatc ctcaccaccg gcgccccttg caacggcacc   1020
cccgtcagcg gtggtggctc tcctcccgct acttcttcca ctgcttcttc tcctcccgct   1080
acttcttcca ctgcttcttc tcctcctgct acttcttccc ttcctgccga tggaagcacc   1140
ggaagcaccg gtaacagcgg cgttggcagc gttgcccagt ggggacagtg cggcggtatt   1200
ggttacactg gtcctaccca gtgccagtcc ccattcaagt gcgttaacga gggcccgtat   1260
tggtcttctt gccaataa                                                 1278
```

<210> SEQ ID NO 50
<211> LENGTH: 1149
<212> TYPE: DNA
<213> ORGANISM: Trichoderma hamatum

<400> SEQUENCE: 50

```
atggccggtt cacttacagc agacgctcac gaagctgttc ggtgcatcat gtatctcaca     60
gggcaacatg tggtagtccc ttcagaccat gatctcgtgg gttccataac acatgtgata    120
ctggcattca tgcgctctga tgtcttcaat gtggataaaa cgcctgccga gttcccgttt    180
tttacaaccg ttgctgaaac acggcagaag ttcaatgcga atactaaaat catggtcgca    240
attgggggtt ggggggattc tgcaggattt gaagaagctg cgcgtgacga ttcgtcgaga    300
aagcggtggg ctaaccaagt aaaggccatg gttgacctga caggagctga tggcattgac    360
attgactggg aatatccggg gggaaatcgt gacgactata aacttattcc gaattctcag    420
cgggaatggg agatagaggc attcgtgctt cttcttcgag aacttcgttt ggttttggga    480
gaagaaaaac tactcacaat tgcggtgcca gcgctagaac gcgatttgat ggctttcaca    540
aactcaacta ttccgtccat cgtgaatcag gttgacttca ttagtgtaat gacttacgat    600
atgatgaatc gacgtgatac cattgtcaag caccatagtg gtgtggccga ctctcaggaa    660
gcaatggagc gatatataga tcgtggggcc cctccgcaca aattgaactt cggacttggt    720
tactatgcca aatggttcat gaccgagcaa tgcgatttac agcacccatt ggggtgccgc    780
actcaactgc tagaagaccc cgccaatgga gccgaccttg gcaagactgc agcttttagc    840
tggcatgacg aggttcccgt ggaattggct aattctttcg agaaagctca tactcatggc    900
cgctactatg aagatggaag ctacgggtat tgggatgatg aagagaagag atggtggtcc    960
tacgacacgc ctctcgccat caaaactaaa gtccctcggt ttctcggcga actgcaattg   1020
ggcggtgtgt ttgcctgggg gctgggggag gatgctccgc agtttattca cttgaaggcc   1080
actactgatg ggattcgggc tttgcgcgga ggccagagct cacgggattc ggtgaaagat   1140
gaactgtaa                                                           1149
```

<210> SEQ ID NO 51
<211> LENGTH: 1332
<212> TYPE: DNA
<213> ORGANISM: Trichoderma hamatum

<400> SEQUENCE: 51

```
atggcgcctt tcaatactat gcttgggtat ctcctgttag tggtagcccc tttggcggct     60
gccctgccgt tccgtggcca tggccccaac acccataacc acatcaactt gaacttcaac    120
ctcaccgaaa ccatcaacga gatcaatgaa aacttggctg gcctagttgg atacatcacc    180
aaccctcacg ccaagcacat cgtcgccaac cgctacattg tcgtctacaa caacaccttc    240
ggctccgagg ccatcgccgc caagcaggcc gagttcgctg ccaccatcca gaagcgcaac    300
cttggaaagc gaagcctcgg cggcaacatg ctgtccactg aaatccactc cttccagatg    360
cacacctggc gcgccatggc tctcgacgct gacgatgaga tgatcaagtc cattttcgcc    420
gcgaaggagg tcgcctatat cgaggctgat accgtcgtcc agaccaaggc tctcgttgcc    480
cagaccaacg ctacccccgg cctcatccgt ctctctaacc aaaacattgg tggcaagaac    540
tacatctttg acaactctgc cggcgctggt atcactgcct acgttgtcga cactggtatt    600
agaatcaccc acactgagtt tgagggccgt gcttctttcg gtgccaactt tgtcaactcc    660
aacaacactg atgagaacgg ccacggcagc cacgtttctg gtaccattgg tggtgctacc    720
ttcggcgttg ccaagaacat caagctcgtt gccgtcaagg tccttgatgc ctctggtgcc    780
ggtagcaact ctggcgttct gaacggcatg cagttcgtcg tcaacgacgt ccaggccaag    840
ggcctctccg gcaaggctgt catgaacatg tctctcggtg gctccctgtc cgctgctgtc    900
aacaacgcta ttgctgccat tgccaacgct ggtgtcgtcc ctgttgttgc tgctggtaac    960
gagaaccaag atactgccaa cacctctccc ggctctgccc ctcaggccat caccgtcggt   1020
gctatcgatg ccaccaccga tatccgtgct agcttctcca actttggcgc tgatgtcgat   1080
atctacgccc ccggtgtcaa tgttctcagc gttggcatca agtctgatac cgatactgcc   1140
gttctcagcg gcaccagcat ggccactcct cacgttgccg gtctcactgg ctacctgatg   1200
gctctcaagg gtgttaccaa cgtcaacgat gtcaccaacc tcatcaagaa cctcgccact   1260
gcttccggcg cctcggtcca gcagaacgtt gccggaacca ccaacctcat cgccaacaac   1320
ggtgaactgt aa                                                        1332
```

<210> SEQ ID NO 52
<211> LENGTH: 510
<212> TYPE: DNA
<213> ORGANISM: Trichoderma hamatum

<400> SEQUENCE: 52

```
atgggctata gccgcaaaga taaatcgagg tacatcaaca caattcaaga agcacttgac     60
atctctacag ctttcgttgc cagcagccga aaaagaatag ctttaacttg gaagattatc    120
attcaaattc aatccaatct atctagaatg caattcttcg ctctcctccc tctgttatac    180
accaccgctg cagcccttgg catcaattgt cgtgggaaca gcaactgcgt cggtactcca    240
gaatgcagac tcgccgatct gatcttgcaa gtcagccagc aagatcccag cacatcatac    300
agccctggtc agcacattgc ttgttgcggc atacctggcg gcaatatctg tgcattcact    360
cagggcatta gcaattcgat tacagctgga gaagccctgg gtatgctgca ggggctatcc    420
gcccacggtt gtggccaatg cggcagtatt cccttcaagg ataacaatgt cgctgaggga    480
caattgacag tcaactggac cgatcactaa                                     510
```

<210> SEQ ID NO 53
<211> LENGTH: 1170
<212> TYPE: DNA
<213> ORGANISM: Trichoderma hamatum

<400> SEQUENCE: 53
atgggctcct ttaaagccat tatcgcagca tctctagctg ccctaggaca gttcgctgca 60
gctgctccag cggaaggcca atccaagcga gctggcatct cttccatcgt caagggaaca 120
ccggtaggct ttgcgtcttc agtcacgggt ggtgggaccg ttgccccggt atatccaacc 180
acgatcgcgc agctgaagag ctacctcacc tcaactagcc cgcagaacat tgtcatctct 240
ggtactttca actttgctgg tactgagggc acaacaactc ttccagcttg taacgcatac 300
ccatgtacac cctccaacgg tggacaggcg ttgctaaaca cactgggtgg atgcgggtcg 360
ctatctacgt acaacgtaaa tctcgacacc gctgcatata acgctatcaa tgtccagtca 420
gacaagacac ttgttgggat taacggtgca actctcaatg gcaaaggctt acgccttttct 480
ggcgtttcta atgtcattat ccaaaacatt gcaatcacta atctaaaccc gcagtatgtc 540
tggggtggtg atgccattag tctcagcaat actaacaatg tctggattga ccatgtgaag 600
acatccaacc tcggccgtca gcactatagc ttcggtactg gctccaataa cgcagtcacc 660
atctctaaca gcttcatcag tggtcagacc tcttactcag ctagctgtga tggccactcg 720
tactggggtc tcgaactggt tggaagcggt gaccaaatca cattttacaa gaactatgtc 780
tactacacat ctggacgtac ccctgctttg tccggcaata ccctcttcca tgcagttaac 840
aacgtctggt cctcaaactc cggacacgca attgaaggta cttcgaacgg catgggcttg 900
tatgagggta actactttgt gaacgttccg accattgtcg cttcaggctt cgtaggtcgt 960
ctcttcagct cacagtcatc tgctgtgtcg cagtgcgcgc aatatttagg acgcaactgt 1020
gtctcgaatt ctttatcaaa ctcgggtact ttcaccaata gcgacacgag cttcctttac 1080
ctgtttcaag gcaaggccaa tattgtttcc gccgcttctg cctcgtctat tcagtcgagt 1140
gtcgtttcgt cggcaggaaa tacgctttaa 1170

<210> SEQ ID NO 54
<211> LENGTH: 1185
<212> TYPE: DNA
<213> ORGANISM: Trichoderma hamatum

<400> SEQUENCE: 54
atggttcaat ctgcggctta tctaggagcc ttgctggcca ccctgccctt ggcacgtgcc 60
ggtttcaacg ctagctcgac gcaaaacatt gccgtgtact ggggtcaaaa ctcggcaaat 120
caagcaacct ctcagcagcg attgtctact tactgtgcca atgctgatat agatatcatc 180
ccaattgggt tcatgaacgg catcagcccg gtcattacca actttgccaa tgcaggcgac 240
aattgcacgg cttttgcaga taatcagaat gcacttaatt gtccccaaat cgagcaagac 300
atcattacat gccagcaaac atatggcaag acaatcctga tttcgctggg gggcggatct 360
tatacccagg gcggcttctc gtccactggt gtcgccacat cagcggctca gacggtttgg 420
aacatgtttg gccctgtcaa tccaaacagc aacgtagacc gtccatttgg ttccgcagtg 480
gttgatggcg ttgactttga ctttgaatct ggcgtcaata acttggccac ttttgccact 540
gagctgcgga gcttgatgga cgcttctgcg tcttctgcga acaggaagtt ctacctgtct 600
gctgcgccgc aatgcgtcta tcccgatttc gctgacaacc cggccctgaa tggttcggtt 660
ttcttcgatt tcattatgat tcaatattac aataatggat gcggagtcag cagctatgtc 720
cctggagcaa ctacccagtg gaactacaac tttgatgtct gggacaactg ggcgcatacc 780
gtcagcaaga accctaacgt gaggattctg cttggtatcg ccgccaacac tggtgctgcc 840
agtggatacg tgtccggaac acagctttct gcggtcatct catttaccaa gcaatactca 900
agctttgcgg gtatcatgat gtgggatatg tcccaattgt atcagaattc cggcttcttg 960
ggccaggttg tcagtgatct cgccgcctct ggttcaaccc ccccggctac tacttctagt 1020
ggagcttcca agactaccac ttctagtggc ggttctacaa gcccaactgg cggcagtgtg 1080
ccgcaatggg gtcaatgtgg aggcgaagga tacactggcc ctacgcaatg ccagtcgcct 1140
tacaagtgcg tttttagcag tcagtggtgg tcatcttgcc agtaa 1185

<210> SEQ ID NO 55
<211> LENGTH: 1983
<212> TYPE: DNA
<213> ORGANISM: Trichoderma hamatum

<400> SEQUENCE: 55
atgttactga aacagattct cgttgccacg ttgctttcct tgagctctgt caaggctttc 60
cctaacccga atcacgccca agatctcgag gccagggaag ctgaagataa tctcgttgct 120
cgcggcggtc acgactgcgg ctcttacgct acctggaact acggaaagaa ctgctgtgtc 180
tgcaaagata acggcaagaa ctacgattct aagtccaaga catgcagttg tccacacggg 240
caagtctgga atggcaagca atgcgttgtg gactgtggca aagatgcgac ttatgattgg 300
aagcaaaaga aatgcgtctg caagaaacaa ggcgaggtct ataactctaa tacgaagact 360
tgcagctgcc cgcctggaac tgtttggaac ggctacggat gtgttgtcga ctgtggcaag 420
gaagcgcact ttgataaatg gcagaagaag tgcgtctgca ataacaacgg cgaagtctat 480
gattccaaga gcaaaacctg cagttgccct ggtggccaat actggaacgg caagaaatgc 540
gtatgccctt atggcaaggt ctggaacggc aagcagtgca tagaggactg tggtaaagac 600
gcacacttcg actataacca aaagaagtgc gtatgcaaca agaatggaca ggtctacaac 660
tccaacagca agacctgcaa atgtccaggt ggccagtatt gggacggcaa gcattgtgtc 720
tgcccatatg gtcaagtctt taatggcaag cagtgtgttc ctgattgcgg taaagaagcc 780
cactttgatt ataagcaaaa gaagtgcgta tgcaacaact acggcgaaat ctacaattcc 840
aagagcaaga cttgcgcctg tcctgacggc cagtattgga atggaaagca atgcgtttgc 900
ccttacggca agatctggaa tggcaaacag tgtgttcctg attgcggtaa agacgcccac 960
tttgactaca accaaaagaa gtgtgtttgc aacaagaatg gagagatcta tgactctaag 1020
agcaagactt gcgcctgtcc tgacggccag tattggaatg gaaaacagtg tgcctgcccg 1080
tacggcaaga tttggaatgg caaacagtgt gttcctgatt gcggcaaaga agcccacttc 1140
gattacaacc agaagcagtg cgtttgcaac aataagggag agatctatga ttctaagagc 1200
aagacttgcg cctgtcctga cggccaatac tggaatggaa agcagtgtgc ctgcccgtac 1260
ggcaagatct ggaacggcaa gcagtgtgta gaagattgcg gcaaagaagc acacttcgat 1320
tacaaccaga agcaatgtgt ttgcaataac aagggagaaa tctatgattc taagagcaag 1380
acttgcaagt gccctgatgg ccaatactgg gacggaaagc agtgcgcttg tccatacgga 1440
aagatctgga atggtaagca gtgtgtagag gactgtggca aggacgcaca cttcgattat 1500
aaccagaagc agtgtgtttg caataacaag ggagagattt acgattctaa gagcaagact 1560
tgcaagtgcc ctgacggcca atactgggac ggaaaacaat gtgcttgtcc ctacggccaa 1620
atttgggacg gaaagcaatg cacaccaaac tgcggcaaag acgctaccta tgacagtaag 1680
cagaagcaat gcgtgtgcaa caagaagggc caagtctttg attccaagca cttgacatgc 1740
agctgcccgg ctggaacgag ttggaacggc tatgcttgtg tcccagattg tggcaaggat 1800

```
gcgcactacg ataccaatca gaagtgctgc gtgtgcaata acaagggcca gatatttaat   1860

tctggaagca agacatgcag ctgcccaggc aaccaatact gggacggcaa taaatgcaca   1920

tgcccctatg gatcgacatg ggacagcagt aagaagacgt gcaagcagac acccatacat   1980

taa                                                                  1983
```

<210> SEQ ID NO 56
<211> LENGTH: 1275
<212> TYPE: DNA
<213> ORGANISM: Trichoderma hamatum

<400> SEQUENCE: 56

```
atgttgggct tcctcggaaa atccgtggcc ttgcttgctg cgctgcaggc caccctcacc     60

tctgcatctc ctctgtctac aaacgacgtc acagttgaga agagagccag cggatatgcg    120

aacgctgtct acttcactaa ctggggtatc tacggccgca actttcaacc ccaggacctg    180

gttgcgtcgg acatcactca tgtcatctac tcgttcatga acttccaagc agacggcact    240

gtcgtctctg gagatgctta cgccgattac cagaagcact attccgatga ttcttggaat    300

gatgtcggca acaacgcgta cggttgtgtc aagcaactgt tcaagttgaa gaaggccaac    360

cgcaacttga aggttatgct ttctataggt ggctggacct ggtccaccaa cttcccttct    420

gccgcaagca ccgatgccaa ccgcaagaac tttgccaaga cagccattac tttcatgaag    480

gactggggtt ttgatggtat tgacgtcgac tgggagtatc ctgccgataa cacccaggcc    540

accaacatgg ttcttctgct taaggagatc cgatctcagc tagatgctta tgcggcccaa    600

tacgctccag gataccactt ccttctctcc atcgctgccc ccgctggccc agagcactac    660

tctgccctgc acctggccga ccttggtcaa gttctcgact atatcaacct tatggcttat    720

gactatgctg gttcttggag cagcttctcc ggacatgatg ccaacttgtt tgccaacccc    780

tccaacccca actcttcacc atacaacacc gatcaggcta tcaaggctta tatcaacgga    840

ggtgttcctg cacgcaagat cgttcttggc atgcccatct atggacgatc tttcgagagc    900

accggtggaa ttggccagtc ttacagcgga attggatctg gaagctggga gaacggtatc    960

tgggactaca aggttcttcc caaggccggt gctacagtcc agtacgactc tgtcgcacag   1020

gcatactaca gctatgaccc tagctccaag gagctcatct ccttcgatac ccctagcatg   1080

atcaacacca aggtctctta cctcaagaac ctcggcctgg gaggcagtat gttctgggag   1140

gcttctgctg acaagactgg ctccgactcc ttgatcggaa caagccacag agcgcttgga   1200

agcctggact caactcagaa cttgctgagc taccccaact cccagtacga taacatccga   1260

agcggtctta actaa                                                     1275
```

<210> SEQ ID NO 57
<211> LENGTH: 1239
<212> TYPE: DNA
<213> ORGANISM: Trichoderma hamatum

<400> SEQUENCE: 57

```
atgtttttca gcaaagcact ggctgctacc ggccttttgg ccactgctgc tctcgctgca     60

cccaccgtgg agaagcgtgc cgctggaggc aagctcgtca tctactgggg tgctgaagac    120

gacagcacta ctctcgccaa cgtctgtgcc gattcctctt acgacattgt caacttggct    180

ttccttgaca agttctctgc tggtggtggc tacccctcgc tctctctgag caccctgggc    240

ggcccatctg ccgctcagaa ggctgctggt gccaccaacc tccaggatgg ttcttctttg    300
```

```
gttcccgcca tcaaggcctg ccaggccgcc ggcaagctgg tcatcctctc tatgggtggt    360

gctaccgact tctctgcagt ctccctttcg ggcgatgctc agggacagtc tgttgccgac    420

atggtttgga acctgttctt gggtggtact gccaacccca ctctccgtcc tttcggatca    480

gtcaagctcg acggtgttga tctcgacaac gagactggca accccactgg ttacctggcc    540

atgactcaac gcttccgatc caactttgcc aaggacacca gcaagaggta ctacctcact    600

gctgctcccc agtgcccctt ccccgatgcc tctgagcctc tcaacgtctg ccagctcctt    660

gattacgtct gggtccagtt ctacaacaac ggcaactgca acgttggcca gtccggcttc    720

aacactgctg tcaagaactg gagcaagaac attggtaacg ctactctgtt cattggtgcg    780

ctggccagcg gtgccgatgg tgaccagggc tacatctctc ccagcgctct gatctctgct    840

tacaacggtg tctctgctct taacctgccc aacgttggcg gtatcatgct ttgggaggct    900

cagctcgctg tcaagaacag caacttccag aagaccatca aggctgccat cggctccggc    960

tccactcctc ctcctcctcc tcccgcctct tccaccactc ctgccggaag cacccccacc   1020

tgctcttggg ccggccactg cgctggcgct acttgcagca ctgacaatga ctgctccgac   1080

tccctcacct gcaacagcgg caagtgcggt accgctggca gcactgctcc tcctcctacc   1140

acttgctctt gggcgggcca ctgcctcggc gcttcttgcg gtaacgacaa cgactgctct   1200

gacccttact tctgctccaa cggcgtctgc tctcagtaa                           1239
```

<210> SEQ ID NO 58
<211> LENGTH: 930
<212> TYPE: DNA
<213> ORGANISM: Trichoderma hamatum

<400> SEQUENCE: 58

```
atgtttttcc gcaacgccgt cgccgtaacc agccttttgg ctgcactttc tagtgcccaa     60

ccctccggcc ccgaattggc cgtgtactgg ggtgctgaag atgatagcac gactctcagc    120

gacgtgtgtt cagacaactc ttatggcatt gtgaatcttg ccttcctcga cacatttttt    180

gctgcaggag gctttcctca actcagcgtc agcgggttag atggcccatc ccaagctcag    240

caaagcgctg gtgccactgg cctcaaggat ggtagcagtc ttgtagacgc tattaagcag    300

tgccagtcgg ccgggaagct ggtccttctc agccttggtg gcgctggcgc cgatgtcact    360

cttcaatcag actctgatgg agagaaaatt gctgatacac tctggaatct gttcggtggt    420

ggcactgata accaagagct gcgtcccttt ggagatgtca agctcgatgg cttcgacttg    480

gacaatgaat ctggcaaccc cacaggttac ctagctatgg taaagcgttt caagtccaac    540

ttccagtcgg acacgagcaa aacttatttc cttactgcgg ctcctcaatg cccattcccc    600

gatgcttcgc agcctcaaga tgtttgcagt gaattggact ttgtctgggt ccagttttac    660

aacaacggcg attgcaacat tgcgcaatct gatttcttaa actccgtcca gacttggagc    720

agcggcattg gcaacgctaa gctctacatc ggtgctttgg ctagtggtgc tgacggcgat    780

cagggctttg ctgatgctga tacgctattg ggtgctattc aggatgtcaa gaatatgaac    840

cttcccaatt atggaggtgc catgctttgg gaagcccaac tggctgttaa aaacggcaac    900

tttcagcaga agattgcccc cggtctataa                                     930
```

<210> SEQ ID NO 59
<211> LENGTH: 396
<212> TYPE: DNA
<213> ORGANISM: Trichoderma hamatum

<400> SEQUENCE: 59

```
atgaaatcaa gtctcttgtc tcttattgcc attgcaatta atggtgcctt ggctggcatt     60
aactgtaatg gcagcggaga ctgtgccggg actcctggta ctctaggcga tcttattgct    120
gatgcatacc aaattgaccc aaatcgttgg tataacaatg gagaacatat cgcctgctcg    180
gataatcgag gcggcggtgg cctttgtgct ttcttccaga atactctcgg tggccctgga    240
agctcagttc tgactttgct tcaaaacctg caagctcacg gctgcaataa gtgcggcagt    300
attccggtaa atttccctca gggagataac agtgaaaatc atggggagct tactgtcaac    360
tttgttgttt cggctggctg cactgggctt tgctag                              396
```

<210> SEQ ID NO 60
<211> LENGTH: 408
<212> TYPE: DNA
<213> ORGANISM: Trichoderma hamatum

<400> SEQUENCE: 60

```
atgaagttca gctttacgtc cgctatcgcc attgcaagca ttggaatcac tggcgccaga     60
gccggcatta actgcaatgg cagtggcaac tgccctggag tagctggcga cctcagcacc    120
cttatttcat ttggatggtc aatcgacccc aaccgttggt ataacaacgg ggaacacatt    180
gtttgcgtgc aaagtcaact tgggactgga ctttgtgcct tcctccagaa caccggcggt    240
gcccctggta gttcgattca gccgttgctc caggcattgc aaggccacgg atgcaataaa    300
tgtggcagtg ttccgctgaa cttccttcag ggagataaca gcgaagatca cggggagctt    360
actgttaatg ctgttggctc aactgccggc tgcagtggga tttgctag                 408
```

<210> SEQ ID NO 61
<211> LENGTH: 1035
<212> TYPE: DNA
<213> ORGANISM: Trichoderma hamatum

<400> SEQUENCE: 61

```
atgacacgcc tcctcgacgc cagctttctg ctgctacctg ccatcgcatc gacgctattt     60
ggcactgcct ctgcacaaaa tgcgacatgt gcactcaagg gaaagccggc aggcaaagtc    120
ctaatgggat attgggaaaa ctgggatgga tcagccaacg gtgtgcaccc tggatttggc    180
tggacaccga tcgagaaccc catcattaaa cagaatggtt acaatgtgat caacgccgcc    240
ttccccgtta ttctatcaga tggcacagtg ttatgggaaa acgacatggc tcctggcact    300
caggtcgcaa ccccagctga aatgtgcgcg gctaaagcag ctggagccac aattcttttg    360
tcaattggag gtgctactgc tggcatagat ctcagctcaa gtacagtcgc tgataagttc    420
atcgcgacca ttgtaccaat cttgaagcaa tacaattttg acggtattga tattgacatt    480
gagaccggct tggtcaacag cggcaatatc aaaacacttt ccacatcaca ggccaacttg    540
attcgcatca ttgatggtgt tcttgctcag atgccttcca acttcggctt gaccatggca    600
cctgagacag catacgttac aggtggtagc atcacgtacg gctctatttg ggatcctac     660
ctacctatca ttcagaaata tgttcagaac ggccggctgt ggtggctaaa catgcaatat    720
tacaacggcg acatgtacgg ctgctctggc gactcatatg ccgctggcac tgttcaagga    780
ttcatcgctc agactgattg cttaaatgca ggtcttaccg tccaaggcac cacaatcaag    840
gttccatata gcatgcaagt acccggtcta cctgcgcaat caggagctgg cggtggctac    900
atgaacccga gcttggttgg acaagcctgg gatcactaca acggtgctct gaaaggcttg    960
atgacgtggt caatcaactg ggatggagca ggcggctgga cgtttggcga caatttgctt   1020
```

actcgtattg gttag 1035

<210> SEQ ID NO 62
<211> LENGTH: 846
<212> TYPE: DNA
<213> ORGANISM: Trichoderma hamatum

<400> SEQUENCE: 62
atgcacctcc actctctctt tacggcgctt gcgctggcga gccctgcgct cgctgcttca 60
atccctcgca gcagcagcag ctcctcatca tcaactatca ccgtctgggc gactccccac 120
gacagctact catcctccgt cggcgtcttg ggctgcaagg tcgacaccaa tcgcatcgcc 180
tactggccag actccgtcga ctgcaccaac atctgcgtgt ctctttcgta ccaggaccga 240
caggtctacc tccttcgcgt cgaccaatca cagggcgcgc acgacatcag ctacgatgcc 300
tggaattacc tcgttaccgg ctatccagcc acggaaaagc ccgttgcggg agggcccatg 360
gaaatgacga cggaaaacgt cgatgcgtcc aaatgcgccg acctcatcta cacagcgggc 420
ggcaagcttc ccctcagtgc ggcaaatagc atgaatttct tggccagctg cttggagcaa 480
gagaattcat gggttgcaag caactacgtg ttatacaaca tcttggatgc aatttgcacc 540
gttggccaaa accaggtctg ctctttgaac tggcccactg ccaaccagcc cacctgtccg 600
ggcaccctag gattgcccga cgcactcaaa ggcgaacctg tctacaatat cgagtatcct 660
tccggcgtca aggtacttgc aggggcgcca ccaactgtac caactggagt acctgttcca 720
gtaccggcgc cttctaccaa cgacgatgag aagagcgctg cacggagttt aaggcattca 780
gactctctcg tctggatacc agtcctttca ttaacttcca ttatatattc ttggatgctg 840
tggtaa 846

<210> SEQ ID NO 63
<211> LENGTH: 459
<212> TYPE: DNA
<213> ORGANISM: Trichoderma hamatum

<400> SEQUENCE: 63
atgcgtttca acagtttcat cgccgtcgcg gctgcgaccg ctcaaagcgc cgccggcctg 60
ggaatcaact gcctgggcga cactctctgc ggaatctcgt acatgagcgg cggacgcctg 120
acccagttcc agaccatctt cgacaacatc tttgagaagc ggatatacga caacggcgac 180
gacatcggct gcatcgaggt ccactcaatc aacttcaagg gctccttcaa aggcacatac 240
tgcgcctacg tccaaaacct ggatggcagc gtcaacggcg ccaccctcaa gaccctttac 300
accgagctgg tcaactatgg ctgtggaatc tgcggctcca tccccatcca ctacagcaag 360
ggcgacaacg actccaacca cggagagctc tctttcaaca tggtggacag cctgccggac 420
aactgcgagc tcggcaagcc ttgcgcagcg acctcctaa 459

<210> SEQ ID NO 64
<211> LENGTH: 447
<212> TYPE: DNA
<213> ORGANISM: Trichoderma hamatum

<400> SEQUENCE: 64
atgtacttcg ccaacaccct actctccatc gccggtgctg catcaatagc caatgccttg 60
ggcagcaatt gtcaagacag cggtgtttgc gcggatatca acgctaacct gagttttgcc 120
attgaacaac taaaaggaat ggaccagctc cagagattct cggacggaca acacatcacc 180
tgcgttgata cggacagtga gggcaactct tccctctgtc tctcatacca ggacactggc 240
cgatcatgga ctgtattcca gactgcctgg tttgcccagt ccttggtaga gcagggatgc 300
caggcctgtg gaagcctgtc tatgggctct catcatggcg agctggtcgc cagcgtcatc 360
acaaagagta ccagcggcct ggatacctct ggagctcgtc gtgggatgga catggttcaa 420
ctggctgtaa gagctgggga ccgatga 447

<210> SEQ ID NO 65
<211> LENGTH: 417
<212> TYPE: DNA
<213> ORGANISM: Trichoderma hamatum

<400> SEQUENCE: 65
atgttgttta aaattgccat cgttgtgatc gcctccacag cacgtgtttc cgcctttggt 60
atcaactgcg aaggcagtgg ctactgctct ccattgttca atcctggagc caacaaccac 120
ccgctgctag agatggtgga cgttatcgac tttggaattg atgacaatcg atggtatgca 180
gcaggagagc atattgcctg tgatcagagt tctggtgtct gcgcttttgt acagaagatt 240
ggcggtgctt caggtggcga tattgctcga gctgtccgct atctcgcaga ccatggctgc 300
actacctgtg gaagcgtacc cttggacttc cctaacacca acgatgtcaa caacggagag 360
gtgactttca actttgttgg gttggaagat atgggtagct gcagcgatct ttgctaa 417

<210> SEQ ID NO 66
<211> LENGTH: 415
<212> TYPE: DNA
<213> ORGANISM: Trichoderma hamatum

<400> SEQUENCE: 66
atgaaaatgc ttattactgc cgctcttttc accctggccc tcgccgcccc tgtcgccgag 60
actaagcctc atagcattgc tgctcgcgat ccctttactt gccccggcgg cctgaccaac 120
agcaccccca tgtgctgcag cgttaatgtc cttggcctgc tagcccttga ttgccagcaa 180
cgtatgggtt actttgcttc atatttatcc tttcaatata tggggaactt gaatagctga 240
cattttcatc gctcattagc tggcgcggac ggctgtagtg gcagctccaa gcccaattgt 300
tgcacccttg gagcggtatg ttttttaatg attggtcacg ccaacagttt tgagcattta 360
ctgatagaat ttctcaatac aggccggaca gggtgttatt tgcaacgcac tgtaa 415

<210> SEQ ID NO 67
<211> LENGTH: 2033
<212> TYPE: DNA
<213> ORGANISM: Trichoderma hamatum

<400> SEQUENCE: 67
atgaagtcgg ccattcttct tgggctcact ggcctcgctg ccaatgtgaa tgcccatcct 60
gctaagcagc cagagaccgg caacggcctg actaagcgtg gcgttgatat tagcaagtat 120
agcttgccta atctttcaaa gtacacgtct tcgccaaaca tcgaacaaga ggcctctctg 180
cagtctttgg ctttcaagcg caactatgtg gatacagcca cacgagctgt caagaaagct 240
gcccccaagg ccgaattccg cgtcgtggat gaccactata tcgatgttga cggcattggt 300
cacgtccact ttaagcagac agtgcacgga attgacattg acaacggtga cttcaaggtt 360
aacgtgagtg gaaggcaaaa tcacctcacc tagaaaacca gaaacttaca aataatatga 420
acttagattg gcaaagacgg tagagtcttc tctcatggaa acagcttctt ttctggcaag 480
ctgccccagc agaacccctt gaggaagcgt gatttctctg accccaccac tgcgctcaag 540

```
ggtgcaattg atatcctggg cctcccggtt caggctgatg gcgccaccgc cgaagctcag    600
gaaggcactg agaagtacac gttgaagggt acatccggag ctgtcagcga tcctaaggct    660
cacctcgttt acctcgtcaa gggagacgga actctggctc tgacttggcg ggtcgagacc    720
gatatcatgg acaactggct tctcacctac gttgacgcaa caaccaacca agagattcat    780
ggtgttgtag actacgtctc cgaccttgcc accttccagg tttacccctg gggcctcaat    840
gaccccaccg agggagatcg taaagtcctg accgacccgt ggagaaccga tgcctcccca    900
ttcacttggc tcagcgacgg aaccaccaac tatactgtaa ctcgcggaaa caatgctatt    960
gcgcaggata atccttctgg gggggacagt tatctcaata atcaccgtcc atccagctcg   1020
actcgggact ttcaatatcc ctttacgctg actcagacca accctacaga ttatagggat   1080
gctgccatca cacagctctt ttacacagtc aacaagtacc acgatttgct atatgtcctt   1140
ggcttcaacg aggtagcagg aaacttccaa gcaaataaca acggaaaggg cggcaaggcc   1200
aatgatttcg ttattgttaa cgctcaagac ggcagtggaa cgaacaatgc caactttgct   1260
accccggccg atggaagcaa tggccgtatg agaatgtaca tctggactac tgctaacccc   1320
aagcgagatg gcgatctcga ggcgggcatt gttatccacg aatacactca cggatgtaag   1380
tctctctcat ttcaacttcg tatctactct ttctaacgct tgaaacagtg tctacccgtc   1440
ttaccggcgg ccctgccaac tctggatgcc ttactggcac tgaagccggc ggcatgggtg   1500
aaggctgggg tgatttcttc gccaccgcta tccgcttaaa ggctggtgac acccgcagca   1560
aggactatcc tatgggagtc tgggccgata acaacgtcaa gggtatccgc cagtatcctt   1620
attcaacaag ccttactacc aatcctctta cttataaaac cgtcaatacg caaaatgaag   1680
tccactcagc cggtactaca tggccaccca ttttgtacga agtcctgtgg aacctcattg   1740
acaagtacgg caagaatgac gacgatttcc ctacctttga tagccagggc gtccccaccg   1800
acggcaagta tcttaccttg aaactcgtcc tcaatggatt ggctctgcag ccctgcacgc   1860
caacttttgt ttctgcccgt gatgccatct tggatgctga tcgtgctttg accggagggg   1920
agaatctttg tgaattatgg acaggattcg ccaagagagg tcttggatcc ggcgccaaat   1980
attcttccac cgctcgcgtt gaaagcttca ctatcccatc tggggtttgc taa          2033
```

<210> SEQ ID NO 68
<211> LENGTH: 438
<212> TYPE: DNA
<213> ORGANISM: Trichoderma hamatum

<400> SEQUENCE: 68

```
atgaagttct tcgccgccac cgctctcctt gccgccacta ccattgctgg acctcttgag     60
gttcgcactg gagacggtaa catttgtcct agcggcggcc tctacggcaa ccctcagtgc    120
tgctcctctc tcctccttgg tctcattggt cttgactgca acgtccgtaa gttaaaaaca    180
aagctcattc aaagcctatt gatgcaatac attctcatac tggtgtccta tagccaacca    240
aacgccccgt gacggcgctg actttagaaa catctgcgct aagactggtg acgaggccct    300
ttgctgtgtt gctcccgttg taagtaatca cccagcttca agttgccctt gcccttgccc    360
ttgtgctgtt gctaatttct acactatctt taggccggcc aagctcttct ctgccaggtc    420
gccgttggtg ccagctaa                                                  438
```

<210> SEQ ID NO 69
<211> LENGTH: 432
<212> TYPE: DNA
<213> ORGANISM: Trichoderma hamatum

<400> SEQUENCE: 69

```
atgaagttct ttgctgttgc cactctcttt gtcactggcg tcatctccgc cccgtcaccc     60
aatgccctaa attcccgcag tcttctttgc agccctggcc tttactccac cgcgcagtgc    120
tgtggtgttg atgtattggg agttgctgat ttggactgtg cggctcgtaa gtagtctctc    180
aaagcccaat catatttatt gatttgaaga tgctgatact gggaatttag ctactggcac    240
tattaccaac gcccaaggat ttcaggctgc ctgtgctaag aaaggccaag aggctcgctg    300
ttgtgttcta cctgttgtaa gttatcctaa gatacgtgta atgcggctgc ttttatagac    360
tggcaatact aacaattttt gtccctttag gccggccaag atgtcctgtg ccaggacccc    420
cctggtttgt aa                                                        432
```

<210> SEQ ID NO 70
<211> LENGTH: 1351
<212> TYPE: DNA
<213> ORGANISM: Trichoderma hamatum

<400> SEQUENCE: 70

```
atgaccagca ttcgtcgtct tgctctctat ctcggagctt tgctcccggc tgtcctcgcc     60
gctccagcag cccttcacaa gaagcctgag gctgcaccta acaagtttat tgtcactctt    120
aaagagggcg cttcaattga taccgactct catctcgcct gggtgaatga catccaccgt    180
cgttctttga ccaagcgtag cactgctggt gttgaaaaga cttataacat tcatacttgg    240
agtgcttatg cgggtgaatt tgatgcagag acgattgagc agatcaagtc tagccccgat    300
gtacgtgctc tccgtatcct aacgaaaaga agaaaagcta atcacgctgt caggtcgcgt    360
ctgtggagcc agactacatc atgtacctgt cggacattgt tgaagacaag cgtgctctga    420
ccacacaatc tggagctcct tggggccttg gcactgtttc ccaccgcaca tctgggtcta    480
cgagctacat ttacgatagc tcagctggct ctggaacctt tgcctatgtg gttgactccg    540
gcatcaacac ctctcatcag caattcggcg ggcgcgccag tcttggctac aatgctgcag    600
gaggacagca cgtcgacact cttggccatg gtactcatgt ttctggaaca attggtggat    660
ctacatacgg cgttgctaaa caggtgagtg attccaatgt tgttgttatc acatacaagt    720
gcattcaaga ctgactcggt actattcata ggccagccta atctccgtca aagtctttgc    780
tggagagagc gctaccacct ctgttatcct tgacggctat aactgggctg taaacgacat    840
tgtctcgagg aatcgtgcta gcaaatctgc cattaacatg tcgcttggag gacctgcctc    900
atccacctgg acgaccgcca ttaacgcagc ctttaaccag ggtgtgctta ccattgtcgc    960
cgctggtaat ggcgacagtt tcggaaaccc ccagccagtt tccggcactt ctcctgctaa   1020
tgttcctaat gctatcactg ttgcggcgct ggacatcaac tggcgcactg cttccttcac   1080
caactacggt gctggcgttg atgtctttgc ccctggtgtt aacattctgt cgtcatggat   1140
tggatccaac actgctacca acacaatcag cggcacctct atggcgacac ctcacgttgt   1200
tggtctggct ctctatcttc aatcccttga aggcctcacc actcctaccg ctgtcactaa   1260
tcggatcaag gctctggcta ccgctggccg tataactggc agccttaacg gcagccccaa   1320
cactctcatc ttcaacggaa acagtgctta a                                  1351
```

<210> SEQ ID NO 71
<211> LENGTH: 355
<212> TYPE: DNA
<213> ORGANISM: Trichoderma hamatum

<400> SEQUENCE: 71
atgagaacat ctaccgctat tatatctctt gcccttgtgg tgatgggaat tgccgcccct 60
gctggtcatg tatcgagcaa ccagccgcgg agcgtggaag gttgagctca tcaaaggagc 120
agccgaggcc ggctctgttg tcagcgaagc cggctttgtt gtcagcgaag cccaattcaa 180
cgccatattt cccggtcgaa acccttttta ctcctatagg gcattgaccg gcgccctcgg 240
atcttatccc agcttcacca acactgctga taacgccact aggctccgcg aggccgccgc 300
tttcttcgcc aatgtggatc atgaaaccga tgggctcaag ttcgtcgtgg aataa 355

<210> SEQ ID NO 72
<211> LENGTH: 1422
<212> TYPE: DNA
<213> ORGANISM: Trichoderma hamatum

<400> SEQUENCE: 72
atgagcgccg catcccgcaa gtcacgcata gctacgagtg tggcgagagt tatgtacacc 60
aatgcagtct atttccctag cagcagaata tatcaaggtg attcgccggg aatgctcaat 120
tacagctgca tcaaccacgt gtattatgct tatgccagcg tgacggcgga cggcaatgtg 180
tttgtgagtt ttgatcaagt cccggagacc acacatatgg caaagtggct tcttttcccg 240
tgccatggtt cggaaaagtt gagaatattt cacctgcatg atgttgctcg gctgctgact 300
tgtgacgtgt ggcccagctc ggcgatgagt gggccgatgc aagagcgcca gtggatggtg 360
ttcagggtgg cttaggatcc ttgatgcatc tcaagcagag gcaccctcac ctgcaggttg 420
tcttatctat tggtggcagc actgcatcag aggtatttcc cattgttgca tcaagcactc 480
tcctcagaga caactttgcc cggtctgccc ttggcctcgt ggaagcatcc gggcttgatg 540
gtattgacag taagtacgaa cgaacaagag gaagacgaac aaagaaggag gtagaggaag 600
catggatgtc aagttcacac acgcgcgctc gcacatacac ccgccacaaa caagagtctt 660
cagctaatta ctcgtctccc taaatagttg cctgggagtt cccatcccaa gctaaacatg 720
gccacgattt cctagccttg ctggcagcag tgcggattca tatgcctgaa gaccgcttca 780
ttctaacagc tgtcctccct gcggcgaagg aggttctaca actcatcgac ctcagcacag 840
cggccgagta ccttgactac atcaaccttg tggcatatga tttcttcggc acgtggacgt 900
ccaaaactgg tcatcacgca cagttatata ctatgaacaa ggacgaaccc tcggcatcga 960
caggtgtggc gtatgtcatg tcccaaggat tccctgcgaa gagtatcctg ctcgggatcc 1020
caacctacgg acgaagcttc ctcaaggcca atgggccggg ccaggatttt aacggcgttg 1080
gcggccaaga tggcacattc gaatacggcg aattaccacg aaagggatgc aaagagattg 1140
tggataggcg ctatattgcg gcccaatgtg tcggtggtga tggggggttt gtcacgtacg 1200
acaaccccga gacggtcaag gttaaggcgg aattttgcaa gcaaaaggga ttaggggttt 1260
gtggagctca aatttatcca atctctgtga gacacaaatt ggttgctaac tatcaaattt 1320
ttaatattgc aggggctttt ttactggaac ggaccggctg actctcgaga tcaagcacga 1380
agtctgattg cggctggatt ccgcgctcta cacacctcgt ga 1422

<210> SEQ ID NO 73
<211> LENGTH: 424
<212> TYPE: DNA
<213> ORGANISM: Trichoderma hamatum

<400> SEQUENCE: 73
atgcaattga ccacagtcgt cgcgctcttc gcctctctgg ccggcgccgc gcctgcccct 60
gaacccgctg ctgagcttgt tgctcgtgat ggtccttgct cctctggtgt caccaataac 120
gtccctcaat gctgcggtac tggtatcctc agtgttgtct acgtggactg caagactcgt 180
aagtctttca acgctctcgc ttgatgagaa atccccattg catgctaagc cttgacttag 240
ccactcaagc tccctctgcc actaaccagt tgagcgccat ctgcgctcga gtaggtctcc 300
aggccaagtg ttgcaccgtc ggcattgtaa gttcttcgtc ctagaatcgg atttgcaaaa 360
gggattctaa ttattgtatc aggctggcgt tggcgttctt tgccaggatg ctattcccca 420
gtaa 424

<210> SEQ ID NO 74
<211> LENGTH: 480
<212> TYPE: DNA
<213> ORGANISM: Trichoderma hamatum

<400> SEQUENCE: 74
atgcaattgt ccaacctctt caagcttgct ctcttcaccg ccgctgtctc tgctgatacc 60
ggtatgatga atcactacct gtattcgatg ctctcgtttt gctaacacag attcactcac 120
acagtctcgt acgatactgg ctacgatgac gcatctcgct ctctgaccgt cgtctcctgc 180
tccgacggcc ccaacggcct catcaccaga taccactggc agacccaggg ccagatccct 240
cgcttcccat acattggtgg tgtccaggcc gtcgccggct ggaactcccc tagctgcggc 300
acctgctgga agctcactta cagcggcaag accatctacg tcttggctgt tgaccacgcc 360
ggtgctggct tcaacattgg cctcgacgcc atgaatgctc tcaccaacgg ccaggctgtt 420
gccctcggac gtgtctctgc cactgcctct caggtggctg tgagcaactg cggtctctag 480

<210> SEQ ID NO 75
<211> LENGTH: 1445
<212> TYPE: DNA
<213> ORGANISM: Trichoderma hamatum

<400> SEQUENCE: 75
atgcattcaa caactttctt tgccagtctg ggactcgcag gcctggttgc cggcgcccct 60
tcggccccgc acaacgttaa agctcgccaa gcttccggtg cccaaaacgt cgtctattgg 120
ggaggcacta acaatgaaag cgacgacctt tctacctatt gtacgcccac cgcaggcatt 180
gacatccttg ttctgtcttt cttggacatt tacggcacaa ctggcaacat tccagcaggt 240
aatattggca attcttgcta tatcggaaca aatggcacac ctcaactatg tgataatctt 300
gctgcttcaa tagccagctg ccaggccgct ggtattaaaa ttatcttgtc tctcggagga 360
gcggccggct cctattctct acaatcgcag tcacaggctg tggctattgg ccagtatctc 420
tgggaggctt acggcaactc tggcagcact tctgtccagc ggccctttgg caatgtcttt 480
gttaatggtt ttgactttga ccttgagctg aacgccggca accaatacta ccagtatctg 540
atatcaaccc tccgttccaa ctttgccagt gacccgaaac atacgtatta tatcactgga 600
gcgccccagt gtcctctccc gttgagtatt cctcaaatcc gtagttagat gggtgactca 660
tggcttgcta acaacactaa tggaacaaat agagaaccaa atatgggaga gattataagt 720
gcctcacagt tcgactatct ctggattcaa ttctataaca acaacgctta tgcaccagac 780
ccctgttctc ttggtctgcc tggcgatgca cccttcaact acaacaactg gacgtcattt 840
attgctacta ccccttcaaa aaacgcagta tgtgtatttc ggcccctggt attatcttgc 900
ataccaaatt tctaacaatt tctactagaa actatttatt ggagtccctg cgaatacttt 960

```
agctgctaat ggcaattcag gtggtgccgt ttactatgct tcgccatccc agcttgcttc   1020

cattgtcgcg aatacaaaat ctagcccaga ttttggagga attatgatgt gggatgctgg   1080

gtactctgat gctaatgtca acaacggatg caactacgct caggaggcca aaaacatcct   1140

ccttaccggc gctccctgtg gaggctcacc cccaccggtt agcagcagca agcctacatc   1200

cactgcaacc aaatccgcta ctagcacttc atcagcctcg ggaacaggcc cgacaggagg   1260

cggcacagta cctcagtggg gccaggtgag tcactagagg ccttggggct tacatatgac   1320

ctggggaaaa gagccctagc taattgatgt tttagtgcgg cggagaggga tacacgggcc   1380

cgacgcagtg cgtttctccc tacaaatgcg tcgaatcaag tcaatggtgg tcgtcttgcc   1440

aataa                                                               1445
```

<210> SEQ ID NO 76
<211> LENGTH: 1185
<212> TYPE: DNA
<213> ORGANISM: Trichoderma hamatum

<400> SEQUENCE: 76

```
atgccctctt tgatcacggt tgcgagcgtg ctcgctcttg ttccatccgc cttcgcgggc     60

tggaatgtca actcgaagca aaacattgct gtgtactggg gtaatgactc ttgtaaatat    120

ttctaattta tagaaagaaa gcatctaaca tgctatctgt ataggacaaa actccgccaa    180

ccaacagagc acacagcagc gtctttcagc ctactgcaat ggtacgtttg tgctttattt    240

cctgaccgaa acctacgatt gggttgagaa acagcgaaga ttgaatctga cagttgcgat    300

gtagatgcca acatcaatgt cattgacatt gctttcctga atggaattac tcctcctatg    360

accaactttg ccaatgctgg tgaccgatgc actcccttct ccgacaaccc ttggctcttg    420

agctgccctg aaattgagtg agtcttctgt tgaagaaatg cttttctgtt gtaaatagat    480

atggactaac catggttgaa ttaaagggcg gatatcaaga cttgccaggc taatggcaag    540

accattctca tttctcttgg tggtgattct tacactcaag gtggctggag ctctaccagt    600

gctgctcagg ccgcagccaa acaggtctgg gccatgtttg gtcctgtcca atccggcagc    660

tccaccgagc gtccctttgg cagcgccgtt gttgacggtt ttgacttcga ctttgaagcg    720

acgactaaca atctcgcggc ctttggcgct cagctcaaga gcctctcgag cgctgccggt    780

ggcaagaagt actacttctc tgctgctccc cagtgcttct tccccgacgc tgctgtcggt    840

gcactgatca acgccgtccc catggactgg atccagattc aattctataa caacccttgc    900

ggcgtcagcg gctacacccc cggcaccagc aaccagaaca actacaacta ccagacctgg    960

gatacctggg ccaagacaag ccccaacccc aacgtcaagc ttcttgtcgg cattcccgct   1020

ggcccaggtg ctggtcgcgg ctacgtgtct ggctctcagc tcacttcagt cttccagtac   1080

tcgaagggct tcagcagcac ttttgccggt gctatgatgt gggatatgtc ccagctcttc   1140

cagaacactg gcttcgaggc ccaggttgtc aatgctttga aataa                   1185
```

<210> SEQ ID NO 77
<211> LENGTH: 1753
<212> TYPE: DNA
<213> ORGANISM: Trichoderma hamatum

<400> SEQUENCE: 77

```
atgccgctta aggtcttcga gtcagcttcg cctgcgccgt cgcatccctc cttatcgcac     60

ctctgcctgc tcgtcttcga agctgttcta gaagtagtct gtgtgagctt gccgggatac    120

atcgttgcgc gccttggcca tttcgatgcc gataagcaaa agttcctggc taatctcaat    180
```

```
gtgatgctct tcacgccctg tcttagtacg ttgctccctc ttgccatgtc tctgttattc    240
tcctttgaac gccgtctgac ccatttctct cctcagtctt caccaagcta gcatctcagc    300
tcaatgccga aaaactatcc gatctcgcca tcatccccgc catctttatc gtgcaaactc    360
ttgtatcatg gatagtttcg atcctggtcg ccaaggggtt ccgattcaat aagcgagctt    420
ccaacttcgt tactgctatg ggcgtctttg gcaattcaaa ttcactgccc atctctctcg    480
ttctttctct ctcgcaaaca atcaagggcc tccactggga caggatacca ggcgacaacg    540
atgacgaagt cggcgctcgc ggtatcttat atctactgat tttccagcaa cttggccagc    600
ttgtcagatg gagctgggga tatcacgttc tgctagcccc caaggataaa tacgccgagt    660
atcaagacga aattgccgaa gaaggccagt acagatacag agacgaagag ccgaacgaac    720
aggagccgga gattctcatt actggtttgg acggtgatac cgaagatgat ggcgagagca    780
atgcttctga agattatata cctgctggac gaacacctct tgcgagcaat tcccgggctt    840
cactggctgg ctcttccgtc gacaatgacg acatgctgaa tttcaaaaag ggcaactaca    900
ctcgtggaag ctcgctcgcc aacacagact tggaagatga tattctttca ttccctcgta    960
ttcgtcttcg agatgaggct gaagtcgagc acggagttac tgctcgtatc aagaaatcac   1020
tatattctct gaaagacaaa gcttctgcgg ccatgactcg ccaatatcag cgacttcctc   1080
aacctgttca aacctgcctt tccttcattc ataagtcaat cacaaagact ctcggatttg   1140
tatgggattt catgaatcca cctttgtggg ctatgctcat cgcggtcatc gtggcgtcca   1200
tcccgagtct ccaacagttg ttcttcgaag atggttcatt cgtgaaaaat agcgtcacca   1260
acgctgtttc gtctagtgga ggcgttgcag tgcctttgat cttggttgtt ctcggcgcca   1320
acttggcgcg caacactgcc gctcacgatt ctcccataga cccggaggag gaaaagattg   1380
gcaccaagct cttgatcgct tcgttgctga gcaggatggt tctgccaact ttgattatgg   1440
cacccattct ggctattacg gcaaaatact tgcccatcag cattctagat gatcccatct   1500
ttattgtcgt atgctttctt cttactggcg cacccagtgc gctccagctt gcgcaaattt   1560
gccaaatcaa caatgtttat gagcagacta tgggaagaat cctctttcag agctatgtta   1620
tctggtaagc atttcaacac ccttaatttt gtctatcgtg catttcacta atacacatat   1680
taggattctt ccctctactc ttttccttgt catgatggca ctcgaggtga ttgagtgggc   1740
aacagtgaat taa                                                      1753
```

<210> SEQ ID NO 78
<211> LENGTH: 1443
<212> TYPE: DNA
<213> ORGANISM: Trichoderma hamatum

<400> SEQUENCE: 78

```
atgctaccgt cgagcctttg ccggattgcc gctgttatca gcgtggcttc tgcggaaatg     60
gtttcgggtg agtacaatat aaaccctcca acatgtgatc tgtctcacac ttatacatca    120
tagtaacatt tgataccgct tacgacgatc cttctcgttc actgagtgaa gtcgcttgtt    180
ggaggaaggg cacgggattc atgcctaact tggattggaa acttcaaaaa gatgcattgg    240
aatttattgg aatcaaagca attcgtggct tcagttctgc ccaatgtttt tcctgctgga    300
aaattgagta tggagataag cagatatcac tgttcgcaat tgacagcgcc gactcgggca    360
ttgttctctc tctgagcacc atgcaatatc ttacaggtgg ccaggctcgc gagctggccc    420
gaattgatgc aaaggcaacc caagtcgacg catcaaactg tgggatttct gcggctgaac    480
```

```
tgcacaaata cgatttctag ttagtcgtat ccacttttag gctaccaagc aagcgttcaa    540
gtagtttcaa agataagtca agctttgtat cttcgcccct attacctgga gttgagacta    600
tttgttacgt ttttttggt gagactacgg ctacatatag ccccaaacgt tcacttctac    660
tgcggcatta gtttttatac aatgcattat ttacgccaat atcttgtatc aaggtctgag    720
tagtgtcaac ctccactctt gagagagcat ctatagctta agagtatact cattacgacc    780
gaaatatatt gatattttat tcaaacacat aactagcaat gataaaagtc gccttagagg    840
acgtaagagt aataaaatgt aaaaatttca gatctggaca catatactgc acacacatac    900
atttataact ccgcaattaa ccatttttgg ttaagtacag ctgagataac ttactttcat    960
acatcgattt taccgtagtt gagaatatct tggtatttaa ttatctttac attcggttcg   1020
tcattcaaca aaagatgcgc aattgaagtt gtcacattat ctgtttaatt atgagtctta   1080
tggacagata gagatgcaat tttgtggtga agagaggtat ttttatcatc aacagcacta   1140
acagatcact gccttactga aattagcagt accaatggta gtggaaatag cgatggctct   1200
aggagcaaca ctggagctat tgttggagga gttctcggtg gtgtggctgg gcttgcttta   1260
actgggcttg ctgttttttt cttcccccgc tataagaatt tagctgctgg acataagcca   1320
gtgagccaga atactcctcc tgctgcttat caatcctctc tgatgcagca ggaccccaag   1380
gctcactatg atcctaaata tttcgcagag atggatacac agccatacac gccccctgat   1440
tag                                                                 1443
```

<210> SEQ ID NO 79
<211> LENGTH: 1272
<212> TYPE: DNA
<213> ORGANISM: Trichoderma hamatum

<400> SEQUENCE: 79

```
atgctccgta ctcctacaat cccctggctt ctaaatatca tcctagaaga aaaccctact     60
atgattcctt caatgaaaaa gtgcggccgc aagttatggg ctggcctggc attgctagcc    120
ttgcctgtaa ttgcaagcgc atcatgcgcg cttcctagca cctacaaatg gacttcgact    180
ggcccgctgg caaaccccaa gtcgggctgg gtttcgctta aagatttcag ccatgttcca    240
tacaatggcc agcatctggt ctattcttcg actgtgaact cggcaggttc ctatggctcg    300
atgaattttg gtctcgtctc aaactggacc aacctcagca cagccagcca aaacacaatg    360
aaccttggca cggtagcgcc aactctcttc tatttctctc ccaagaagat ctgggttctt    420
gcatacgaat gggctgctac tccatttgcc tatgtcacgt cgaccgatcc taccaatgcc    480
aatggttggt cagcttcgca accgctcttc agcggaagca tatctccctc tagccctatc    540
gacccagcac tcatcagcga tggcacgaat atgtaccttt tctttgcagg agataatggc    600
aaaatctacc ggtccagtat gcccattggc cagttcccat ccagcttcgg cacatcgtac    660
acaacgatca tgagcgccgc aaccaacgat ctgtttgaag cgatacaggt gtacactgtc    720
tcaggccaga atcaatatct tatgattgtt gagtgtatcg gatctgttgg acggtatttc    780
cgctcattta cggccacatc cctgagcggt acatggacgc cgcaagctgc aaccgagagc    840
aatccctttg caggccatgc taacagcgga gctacttgga ctaacgatat cagctctgga    900
gatcttattc gcagcacaaa cgatgagacg atgaccattg atccctgcaa cctccagctg    960
ctgtaccaag gaatggccgt tggttccacc ggagactata actccctgcc atggcgaccc   1020
gccgtcttga ctctaaccaa ccccggctcg agcacaggca acggcaacgg cactggaagc   1080
ggcggctcag gcggcagcgg atctggacaa gcatcgcagt atgctcagtg cggcggtttg   1140
```

```
ggctatactg gacccacggt ttgccaggca cgtaatgctg ttccaagttt cttgataatg   1200

aaattgctaa cacgagatca gagcccgtac aaatgcacgt ttgtcaacga atactactcc   1260

cagtgtctat ag                                                       1272
```

<210> SEQ ID NO 80
<211> LENGTH: 1047
<212> TYPE: DNA
<213> ORGANISM: Trichoderma hamatum

<400> SEQUENCE: 80

```
atgctctaca ctgctgctct ggccggcctt atggccactg ctgcccttgc tgccccctac     60

cgccgacagg ctactggcca aaacgttgta tactggggcc aaaacggcgg cggcgttact    120

gaaagtaaca atttgtctga ttattgcgat gctgaagcag gcatcgatct acttgttctt    180

agtttcctct acgagtatgg ttagtttcac cccgttgtgc ctttgcaaat tgcaatcttg    240

tgtactactc ttactaacca ttttgtaggc aatggaaata ctattccttc aggcactatc    300

ggccagagct gctccattga tacctccgga aacccttcaa actgtgatgc ccttgcctcg    360

gccattgcta cctgcaagtc caatggagtc aaggttgtct tgtctctcgg cggcgccgtt    420

ggagcctact ctctctcctc tcagcaggag gccgagacaa ttggccaaaa cctctgggac    480

gcatacggtg ccggcaatgg aaccgtcccc agaccgttca gaagcaccgt tgtcgatggc    540

tgggactttg atatcgaagc cagtagtggc aaccagtatt atcaatactt gattgccaag    600

cttcgctcaa atttcaacgg cggcaactac gtgattaccg gtgctcctca gtgccctatt    660

ccggagccta acatgcagca aatcattacc acttctcagt ttgactatct ttgggtccag    720

ttctacaaca atccctcgtg ctcagttgga acgtcgacac caaacttcca agattgggtt    780

tccaacattg ccaacactcc ttctgccaat gccaagatct tccttggtgt gcctgcaagc    840

ccgctcggcg ctactggaac tgaatctggc gcccaatatt acctcgagcc ttctgctctc    900

aacactctcg tcggccagtt ctcatccaac cctgcgtttg gcggtatcat gatgtgggct    960

gccggtttct ccgatgccaa cgtgaacaat ggatgcactt atgctcaaga ggctaagaag   1020

atccttactt ctggtcaaat ctgctaa                                       1047
```

<210> SEQ ID NO 81
<211> LENGTH: 1342
<212> TYPE: DNA
<213> ORGANISM: Trichoderma hamatum

<400> SEQUENCE: 81

```
atgctttccc acgctatcct tgctggcctc ggccttgctg gtctcgctgc cgctgcgcct     60

accaggacga ttgcgactcg tcaagcttcc ggttatcaga acgctgtcta ctggggtgcc    120

actggcaaac agaaccctaa cctcgctgaa tactgcacgt ccacctcggg cattgatatc    180

ctgatcctgt ccttcttgga cgtctacggt gccactggca acttcccctc tggcaacttt    240

ggcaacgact gcttcgtcgg caccacgggt gttccccagt catgctctga cctggcctcc    300

cagatcaaga cctgccagaa cgctggtgtc aagattattg tttctctcgg tggtgccgcc    360

ggttcatact ctgtcacgtc ccagcagcag gcccagacca tcggtcaata cctctgggat    420

gcctacggta actctggcag cacctctgtc cagcgtccct ttggcgatgt ctttgttaac    480

ggttgggact ttgacatcga ggccaacggc ggcttcagcc agtactacca gtacatgatt    540

ggcaccctgc gctccaactt cgccaaggac tccgccaaca cgtactacat caccggtgct    600
```

```
ccccagtgcc ccctgcccga ggagaacatg ggcgatatga tccagcactc cgtcttcgac    660

tacctcttca tccagttcta caacaacaac cccacctgct ctcttggtct gtctggccag    720

gctcccctca actacgacga ctggaccaac tttgtctcca ccacccagtc caagaacgcg    780

aagctcttcc tcggtgcccc tgccggacct ctcgcctcca acggaaaccc aaacggtgcc    840

gtctactacg ctacccccctc ggatctggcc cccatcgtca acaaggccaa gacgaagtca    900

aactttggcg gtgtcatgct ctgggacgct ggttactctg atgagaactc cagcggcggt    960

tgcaactacg cccagcaggt caagagcatc ctcaccaccg gcgccccttg caacggcacc   1020

cccgtcagcg gtggtggctc tcctcccgct acttcttcca ctgcttcttc tcctcccgct   1080

acttcttcca ctgcttcttc tcctcctgct acttcttccc ttcctgccga tggaagcacc   1140

ggaagcaccg gtaacagcgg cgttggcagc gttgcccagt ggggacaggt aagataattt   1200

tcttcctatt agttatagaa agacattttt gctaacagtt gtttgataat agtgcggcgg   1260

tattggttac actggtccta cccagtgcca gtccccattc aagtgcgtta acgagggccc   1320

gtattggtct tcttgccaat aa                                            1342
```

<210> SEQ ID NO 82
<211> LENGTH: 1270
<212> TYPE: DNA
<213> ORGANISM: Trichoderma hamatum

<400> SEQUENCE: 82

```
atggccggtt cacttacagc agacgctcac gaagctgttc ggtgcatcat gtatctcaca     60

gggtgagctt ctttttggcc cggcttctac ttggcttaca gaatatctaa cgctttcgta    120

ggcaacatgt ggtagtccct tcagaccatg atctcgtggg ttccataaca catgtgatac    180

tggcattcat gcgctctgat gtcttcaatg tggataaaac gcctgccgag ttcccgtttt    240

ttacaaccgt tgctgaaaca cggcagaagt tcaatgcgaa tactaaaatc atggtcgcaa    300

ttgggggttg gggggattct gcaggatttg aagaagctgc gcgtgacgat tcgtcgagaa    360

agcggtgggc taaccaagta aaggccatgg ttgacctgac aggagctgat ggcattgaca    420

ttgactggga atatccgggg taagttgatg gtgaatcgca gtacccaccg cagagcagtt    480

ttcatctaac attatttcca ggggaaatcg tgacgactat aaacttattc cgaattctca    540

gcgggaatgg gagatagagg cattcgtgct tcttcttcga gaacttcgtt tggttttggg    600

agaagaaaaa ctactcacaa ttgcggtgcc agcgctagaa cgcgatttga tggctttcac    660

aaactcaact attccgtcca tcgtgaatca ggttgacttc attagtgtaa tgacttacga    720

tatgatgaat cgacgtgata ccattgtcaa gcaccatagt ggtgtggccg actctcagga    780

agcaatggag cgatatatag atcgtggggc ccctccgcac aaattgaact tcggacttgg    840

ttactatgcc aaatggttca tgaccgagca atgcgattta cagcacccat tggggtgccg    900

cactcaactg ctagaagacc ccgccaatgg agccgacctt ggcaagactg cagcttttag    960

ctggcatgac gaggttcccg tggaattggc taattctttc gagaaagctc atactcatgg   1020

ccgctactat gaagatggaa gctacgggta ttgggatgat gaagagaaga gatggtggtc   1080

ctacgacacg cctctcgcca tcaaaactaa agtccctcgg tttctcggcg aactgcaatt   1140

gggcggtgtg tttgcctggg ggctggggga ggatgctccg cagtttattc acttgaaggc   1200

cactactgat gggattcggg ctttgcgcgg aggccagagc tcacgggatt cggtgaaaga   1260

tgaactgtaa                                                          1270
```

<210> SEQ ID NO 83
<211> LENGTH: 1545
<212> TYPE: DNA
<213> ORGANISM: Trichoderma hamatum

<400> SEQUENCE: 83
atggcgcctt tcaatactat gcttgggtat ctcctgttag tggtagcccc tttggcggct 60
gccctgccgt tccgtggcca tggccccaac acccataacc acatcaactt gaacttcaac 120
ctcaccgaaa ccatcaacga gatcaatgaa aacttggctg gcctagttgg atacatcacc 180
aaccctcacg ccaagcacat cgtcgccaac cgctacattg tcgtctacaa caacaccttc 240
ggctccgagg ccatcgccgc caagcaggcc gagttcgctg ccaccatcca gaagcgcaac 300
cttggaaagc gaagcctcgg cggcaacatg ctgtccactg aaatccactc cttccagatg 360
cacacctggc gcgccatggc tctcgacgct gacgatgaga tgatcaagtc cattttcgcc 420
gcgaaggagg tcgcctatat cgaggctgat accgtcgtcc agaccaaggc tctcgttgcc 480
cagaccaacg ctacccccgg cctcatccgt ctctctaacc aaaacattgg tggcaagaac 540
tacatctttg acaactctgc cggcgctggt atcactgcct acgttgtcga cactggtatt 600
agaatcaccc acactgagtt tgagggccgt gcttctttcg gtgccaactt tgtcaactcc 660
aacgtatgta acatgccctc ctcatacgcc caaactggtg aatgaagttt gcccatcatg 720
aacaaaaagc taacaatagc gcttagaaca ctgatgagaa cggccacggc agccacgttt 780
ctggtaccat tggtggtgct accttcggcg ttgccaagaa catcaagctc gttgccgtca 840
aggtccttga tgcctctggt gccggtagca actctggcgt tctgaacggc atgcagttcg 900
tcgtcaacga cgtccaggcc aagggcctct ccggcaaggc tgtcatgaac atgtctctcg 960
gtggctccct gtccgctgct gtcaacaacg ctattgctgc cattgccaac gctggtgtcg 1020
tccctgttgt tgctgctggt aacgagaacg tacgtttata tccttcccac tcgtctcctc 1080
tgaaaaaaac gttgttttta actcgcatta tagcaagata ctgccaacac ctctcccggc 1140
tctgcccctc aggccatcac cgtcggtgct atcgatgcca ccaccgatat ccgtgctagc 1200
ttctccaact ttggcgctga tgtcgatatc tacgcccccg gtgtcaatgt tctcagcgtt 1260
ggcatcaagt ctgataccga tactgccgtt ctcagcggca ccagcatggg taagaaccca 1320
aacccttaca taaaaaaacc tttgtatcct aaactaatcc gcgttcttca tatagccact 1380
cctcacgttg ccggtctcac tggctacctg atggctctca agggtgttac caacgtcaac 1440
gatgtcacca acctcatcaa gaacctcgcc actgcttccg gcgcctcggt ccagcagaac 1500
gttgccggaa ccaccaacct catcgccaac aacggtgaac tgtaa 1545

<210> SEQ ID NO 84
<211> LENGTH: 555
<212> TYPE: DNA
<213> ORGANISM: Trichoderma hamatum

<400> SEQUENCE: 84
atgggctata gccgcaaaga taaatcgagg tacatcaaca caattcaaga agcacttgac 60
atctctacag ctttcgttgc cagcagccga aaaagaatag ctttaacttg gaagattatc 120
attcaaattc aatccaagta agaattacaa tctgaagtat tactaggatt acatttaaac 180
agtctatcta gaatgcaatt cttcgctctc ctccctctgt tatacaccac cgctgcagcc 240
cttggcatca attgtcgtgg gaacagcaac tgcgtcggta ctccagaatg cagactcgcc 300
gatctgatct tgcaagtcag ccagcaagat cccagcacat catacagccc tggtcagcac 360
attgcttgtt gcggcatacc tggcggcaat atctgtgcat tcactcaggg cattagcaat 420
tcgattacag ctggagaagc cctgggtatg ctgcaggggc tatccgccca cggttgtggc 480
caatgcggca gtattccctt caaggataac aatgtcgctg agggacaatt gacagtcaac 540
tggaccgatc actaa 555

<210> SEQ ID NO 85
<211> LENGTH: 1411
<212> TYPE: DNA
<213> ORGANISM: Trichoderma hamatum

<400> SEQUENCE: 85
atggttcaat ctgcggctta tctaggagcc ttgctggcca ccctgccctt ggcacgtgcc 60
ggtttcaacg ctagctcgac gcaaaacatt gccgtgtact ggggtgagct gaacatattc 120
ttgctgaata tgagcttcca attaatacat tgcgttcagg tcaaaactcg gcaaatcaag 180
caacctctca gcagcgattg tctacttact gtgccagtaa gttcaagatc gtcctagaac 240
aattcatgac agctaacgat tatttctaga tgctgatata gatgtgggca ttaccaaaaa 300
ccttggatgt cactctgtag cctggctgac ctctcacaga tcatcccaat tgggttcatg 360
aacggcatca gcccggtcat taccaacttt gccaatgcag gcgacaattg cacggctttt 420
gcagataatc agaatgcact taattgtccc caaatcgagt aagttgcccc cagactctca 480
gtgaatttcg ccagtatacg atgcttagat atcctttagg caagacatca ttacatgcca 540
gcaaacatat ggcaagacaa tcctgatttc gctgggggc ggatcttata cccagggcgg 600
cttctcgtcc actggtgtcg ccacatcagc ggctcagacg gtttggaaca tgtttggccc 660
tgtcaatcca aacagcaacg tagaccgtcc atttggttcc gcagtggttg atggcgttga 720
ctttgacttt gaatctggcg tcaataactt ggccactttt gccactgagc tgcggagctt 780
gatggacgct tctgcgtctt ctgcgaacag gaagttctac ctgtctgctg cgccgcaatg 840
cgtctatccc gatttcgctg acaacccggc cctgaatggt tcggttttct tcgatttcat 900
tatgattcaa tattacaata atggatgcgg agtcagcagc tatgtccctg gagcaactac 960
ccagtggaac tacaactttg atgtctggga caactgggcg cataccgtca gcaagaaccc 1020
taacgtgagg attctgcttg gtatcgccgc caacactggt gctgccagtg gatacgtgtc 1080
cggaacacag ctttctgcgg tcatctcatt taccaagcaa tactcaagct ttgcgggtat 1140
catgatgtgg gatatgtccc aattgtatca gaattccggc ttcttgggcc aggttgtcag 1200
tgatctcgcc gcctctggtt caacccccc ggctactact tctagtggag cttccaagac 1260
taccacttct agtggcggtt ctacaagccc aactggcggc agtgtgccgc aatggggtca 1320
atgtggaggc gaaggataca ctggccctac gcaatgccag tcgccttaca agtgcgtttt 1380
tagcagtcag tggtggtcat cttgccagta a 1411

<210> SEQ ID NO 86
<211> LENGTH: 1983
<212> TYPE: DNA
<213> ORGANISM: Trichoderma hamatum

<400> SEQUENCE: 86
atgttactga aacagattct cgttgccacg ttgctttcct tgagctctgt caaggctttc 60
cctaacccga atcacgccca agatctcgag gccagggaag ctgaagataa tctcgttgct 120
cgcggcggtc acgactgcgg ctcttacgct acctggaact acggaaagaa ctgctgtgtc 180
tgcaaagata acggcaagaa ctacgattct aagtccaaga catgcagttg tccacacggg 240

```
caagtctgga atggcaagca atgcgttgtg gactgtggca aagatgcgac ttatgattgg    300

aagcaaaaga aatgcgtctg caagaaacaa ggcgaggtct ataactctaa tacgaagact    360

tgcagctgcc cgcctggaac tgtttggaac ggctacggat gtgttgtcga ctgtggcaag    420

gaagcgcact ttgataaatg gcagaagaag tgcgtctgca ataacaacgg cgaagtctat    480

gattccaaga gcaaaacctg cagttgccct ggtggccaat actggaacgg caagaaatgc    540

gtatgccctt atggcaaggt ctggaacggc aagcagtgca tagaggactg tggtaaagac    600

gcacacttcg actataacca aaagaagtgc gtatgcaaca agaatggaca ggtctacaac    660

tccaacagca agacctgcaa atgtccaggt ggccagtatt gggacggcaa gcattgtgtc    720

tgcccatatg gtcaagtctt taatggcaag cagtgtgttc ctgattgcgg taaagaagcc    780

cactttgatt ataagcaaaa gaagtgcgta tgcaacaact acggcgaaat ctacaattcc    840

aagagcaaga cttgcgcctg tcctgacggc cagtattgga atggaaagca atgcgtttgc    900

ccttacggca agatctggaa tggcaaacag tgtgttcctg attgcggtaa agacgcccac    960

tttgactaca accaaaagaa gtgtgtttgc aacaagaatg gagagatcta tgactctaag   1020

agcaagactt gcgcctgtcc tgacggccag tattggaatg gaaaacagtg tgcctgcccg   1080

tacggcaaga tttggaatgg caaacagtgt gttcctgatt gcggcaaaga agcccacttc   1140

gattacaacc agaagcagtg cgtttgcaac aataagggag agatctatga ttctaagagc   1200

aagacttgcg cctgtcctga cggccaatac tggaatggaa agcagtgtgc ctgcccgtac   1260

ggcaagatct ggaacggcaa gcagtgtgta gaagattgcg gcaaagaagc acacttcgat   1320

tacaaccaga agcaatgtgt ttgcaataac aagggagaaa tctatgattc taagagcaag   1380

acttgcaagt gccctgatgg ccaatactgg gacggaaagc agtgcgcttg tccatacgga   1440

aagatctgga atggtaagca gtgtgtagag gactgtggca aggacgcaca cttcgattat   1500

aaccagaagc agtgtgtttg caataacaag ggagagattt acgattctaa gagcaagact   1560

tgcaagtgcc ctgacggcca atactgggac ggaaaacaat gtgcttgtcc ctacggccaa   1620

atttgggacg gaaagcaatg cacaccaaac tgcggcaaag acgctaccta tgacagtaag   1680

cagaagcaat gcgtgtgcaa caagaagggc caagtctttg attccaagca cttgacatgc   1740

agctgcccgg ctggaacgag ttggaacggc tatgcttgtg tcccagattg tggcaaggat   1800

gcgcactacg ataccaatca gaagtgctgc gtgtgcaata acaagggcca gatatttaat   1860

tctggaagca agacatgcag ctgcccaggc aaccaatact gggacggcaa taaatgcaca   1920

tgcccctatg gatcgacatg ggacagcagt aagaagacgt gcaagcagac acccatacat   1980

taa                                                                 1983
```

<210> SEQ ID NO 87
<211> LENGTH: 1468
<212> TYPE: DNA
<213> ORGANISM: Trichoderma hamatum

<400> SEQUENCE: 87

```
atgttgggct tcctcggaaa atccgtggcc ttgcttgctg cgctgcaggc caccctcacc     60

tctgcatctc ctctgtctac aaacgacgtc acagttgaga agagagccag cggatatgcg    120

aacgctgtct acttcactaa ctggtgagtg aagctaattt gtgattatga attttagtgc    180

taactattgg tgattaaagg ggtatctacg gccgcaactt tcaaccccag gacctggttg    240

cgtcggacat cactcatgtc atctactcgt tcatgaactt ccaagcagac ggcactgtgt    300
```

```
aagttttgta accaagagat ggtgtatcct aaatatctat tttcagttgc tgatcgtttc    360

ctctatagcg tctctggaga tgcttacgcc gattaccaga agcactattc cgatgattgt    420

acgataaccc cccctttaag tgctcttaat tctaagcttt gcaaatatac taacatctat    480

ctcagcttgg aatgatgtcg gcaacaacgc gtacggttgt gtcaagcaac tgttcaagtt    540

gaagaaggcc aaccgcaact tgaaggttat gctttctata ggtggctgga cctggtccac    600

caacttccct tctgccgcaa gcaccgatgc caaccgcaag aactttgcca agacagccat    660

tactttcatg aaggactggg gttttgatgg tattgacgtc gactgggagt atcctgccga    720

taacacccag gccaccaaca tggttcttct gcttaaggag atccgatctc agctagatgc    780

ttatgcggcc caatacgctc caggatacca cttccttctc tccatcgctg cccccgctgg    840

cccagagcac tactctgccc tgcacctggc cgaccttggt caagttctcg actatatcaa    900

ccttatggct tatgactatg ctggttcttg gagcagcttc tccggacatg atgccaactt    960

gtttgccaac ccctccaacc ccaactcttc accatacaac accgatcagg ctatcaaggc   1020

ttatatcaac ggaggtgttc ctgcacgcaa gatcgttctt ggcatgccca tctatggacg   1080

atctttcgag agcaccggtg gaattggcca gtcttacagc ggaattggat ctggaagctg   1140

ggagaacggt atctgggact acaaggttct tcccaaggcc ggtgctacag tccagtacga   1200

ctctgtcgca caggcatact acagctatga ccctagctcc aaggagctca tctccttcga   1260

taccccctagc atgatcaaca ccaaggtctc ttacctcaag aacctcggcc tgggaggcag   1320

tatgttctgg gaggcttctg ctgacaagac tggctccgac tccttgatcg gaacaagcca   1380

cagagcgctt ggaagcctgg actcaactca gaacttgctg agctacccca actcccagta   1440

cgataacatc cgaagcggtc ttaactaa                                      1468
```

<210> SEQ ID NO 88
<211> LENGTH: 1308
<212> TYPE: DNA
<213> ORGANISM: Trichoderma hamatum

<400> SEQUENCE: 88

```
atgtttttca gcaaagcact ggctgctacc ggccttttgg ccactgctgc tctcgctgca     60

cccaccgtgg agaagcgtgc cgctggaggc aagctcgtca tctactgggg tgctgaagac    120

gacagcacta ctctcgccaa cgtctgtgcc gattcctctt acgacattgt caacttggct    180

ttccttgaca agttctctgc tggtggtggc taccccctcgc tctctctgag caccctgggc    240

ggcccatctg ccgctcagaa ggctgctggt gccaccaacc tccaggatgg ttcttctttg    300

gttcccgcca tcaaggcctg ccaggccgcc ggcaagctgg tcatcctctc tatgggtggt    360

gctaccgact tctctgcagt ctccctttcg ggcgatgctc agggacagtc tgttgccgac    420

atggtttgga acctgttctt gggtggtact gccaaccccca ctctccgtcc tttcggatca    480

gtcaagctcg acggtgttga tctcggtgag taaaagtcat tcctaacatg atctatgaat    540

tctaccttta ctgacatctc atcctgcaat atagacaacg agactggcaa ccccactggt    600

tacctggcca tgactcaacg cttccgatcc aactttgcca aggacaccag caagaggtac    660

tacctcactg ctgctcccca gtgccccttc cccgatgcct ctgagcctct caacgtctgc    720

cagctccttg attacgtctg ggtccagttc tacaacaacg gcaactgcaa cgttggccag    780

tccggcttca acactgctgt caagaactgg agcaagaaca ttggtaacgc tactctgttc    840

attggtgcgc tggccagcgg tgccgatggt gaccagggct acatctctcc cagcgctctg    900

atctctgctt acaacggtgt ctctgctctt aacctgccca acgttggcgg tatcatgctt    960
```

```
tgggaggctc agctcgctgt caagaacagc aacttccaga agaccatcaa ggctgccatc   1020

ggctccggct ccactcctcc tcctcctcct cccgcctctt ccaccactcc tgccggaagc   1080

acccccacct gctcttgggc cggccactgc gctggcgcta cttgcagcac tgacaatgac   1140

tgctccgact ccctcacctg caacagcggc aagtgcggta ccgctggcag cactgctcct   1200

cctcctacca cttgctcttg ggcgggccac tgcctcggcg cttcttgcgg taacgacaac   1260

gactgctctg acccttactt ctgctccaac ggcgtctgct ctcagtaa                1308
```

<210> SEQ ID NO 89
<211> LENGTH: 980
<212> TYPE: DNA
<213> ORGANISM: Trichoderma hamatum

<400> SEQUENCE: 89

```
atgtttttcc gcaacgccgt cgccgtaacc agccttttgg ctgcactttc tagtgcccaa     60

ccctccggcc ccgaattggc cgtgtactgg ggtgctgaag atgatagcac gactctcagc    120

gacgtgtgtt cagacaactc ttatggcatt gtgaatcttg ccttcctcga cacatttttt    180

gctgcaggag gctttcctca actcagcgtc agcgggttag atggcccatc ccaagctcag    240

caaagcgctg gtgccactgg cctcaaggat ggtagcagtc ttgtagacgc tattaagcag    300

tgccagtcgg ccgggaagct ggtccttctc agccttggtg gcgctggcgc cgatgtcact    360

cttcaatcag actctgatgg agagaaaatt gctgatacac tctggaatct gttcggtggt    420

ggcactgata accaagagct gcgtcccttt ggagatgtca agctcgatgg cttcgacttg    480

ggtgagtaac attaatgaat taacacgatc aatgtggcta actctatgca gacaatgaat    540

ctggcaaccc cacaggttac ctagctatgg taaagcgttt caagtccaac ttccagtcgg    600

acacgagcaa aacttatttc cttactgcgg ctcctcaatg cccattcccc gatgcttcgc    660

agcctcaaga tgtttgcagt gaattggact ttgtctgggt ccagttttac aacaacggcg    720

attgcaacat tgcgcaatct gatttcttaa actccgtcca gacttggagc agcggcattg    780

gcaacgctaa gctctacatc ggtgctttgg ctagtggtgc tgacggcgat cagggctttg    840

ctgatgctga tacgctattg ggtgctattc aggatgtcaa gaatatgaac cttcccaatt    900

atggaggtgc catgctttgg gaagcccaac tggctgttaa aaacggcaac tttcagcaga    960

agattgcccc cggtctataa                                                980
```

<210> SEQ ID NO 90
<211> LENGTH: 1309
<212> TYPE: DNA
<213> ORGANISM: Trichoderma hamatum

<400> SEQUENCE: 90

```
catcgagaag ttcgagaagg taagctcatt tcgctgcttt tttcattcct tttgggcaca     60

attgtgccag acaattctgt tctcagtctt gtcaccattt ttgcccacca agcatcgcac    120

cccgctttgt ctacctaccc ctcctttggc acagcaaaat ttttctggct gcctgggttg    180

gtttttagtg gggtgccaaa tttttggcag tgaccccgcc atcgccactg ttcctcatct    240

catgcattac ccaacataat cttcagtcaa ttgcttggtt cattgtgcta atcatacttt    300

aatcaatagg aagccgccga actcggcaag ggttccttca agtatgcgtg ggttcttgac    360

aagctcaagg ccgagcgtga gcgtggtatc accatcgaca ttgccctgtg gaagttcgag    420

actcccaagt actatgtcac cgtcattggt atgttttcag tccgactggt cactatccca    480
```

```
tcatcatcat gctaacgtgc gactctacag acgctcccgg tcaccgtgat ttcatcaaga    540

acatgatcac tggtacctcc caggccgatt gcgctatcct cattatcgct gccggtactg    600

gtgagttcga ggctggtatc tccaaggatg gccagactcg tgagcacgct ctgctcgcct    660

acaccctggg tgtcaagcag ctcattgttg ccatcaacaa gatggacact gccaactggg    720

ccgaggctcg ttaccttgag atcatcaagg agacctccaa cttcatcaag aaggtcggct    780

tcaaccccaa gaccgttgcc tttgtcccca tctctggctt caacggtgac aacatgctcc    840

aggcctccac caactgcccc tggtacaagg gttgggagaa ggagaccaag gctggcaagt    900

ccaccggtaa gaccctcctc gaggccattg acgccatcga gcccccccaag cgtcccacag    960

acaagcccct ccgtctgccc cttcaggatg tctacaagat cggtggtatc ggaacagtcc   1020

ctgtcggccg tatcgagact ggtgtcctca agcccggtat ggtcgttacc ttcgctcctt   1080

ccaacgtcac cactgaagtc aagtccgtcg agatgcacca cgagcagctc gttgagggtg   1140

tccccggtga caacgttgga ttcaacgtca agaacgtctc cgtcaaggat atccgccgtg   1200

gtaacgttgc cggtgactcc aagaacgacc cccccatgggg tgccgcttct ttcaacgccc   1260

aggtcatcgt catgaaccac cctggccagg tcggtgccgg atacgctcc              1309
```

<210> SEQ ID NO 91
<211> LENGTH: 707
<212> TYPE: DNA
<213> ORGANISM: Trichoderma hamatum

<400> SEQUENCE: 91

```
ccgaggagca ccccgtcctg ctcaccgagg cccccatcaa ccccaagtcc aaccgtgaga     60

agatgaccca gatcgtcttc gagaccttca acgctcccgc tttctacgtc tctatccagg    120

ccgttctgtc cctgtacgcc tctggtcgta ccaccggtat cgttctcgac tccggtgatg    180

gtgttaccca cgttgtcccc atctacgagg gtttcgctct tcctcacgcc attgctcgtg    240

ttgacatggc tggtcgtgat cttaccgact acctgatgaa gatcctggct gagcgtggtt    300

acactttctc caccaccgcc gagcgagaaa ttgttcgtga catcaaggag aagctctgct    360

acgtcgctct cgacttcgag caggagatcc agaccgctgc tcagagctcc agcctggaga    420

agtcatacga gcttcccgac ggtcaggtca tcaccatcgg caacgagcga ttccgtgctc    480

ctgaggctct gttccagcct tctgtccttg gtcttgagag cggtggtatc cacgtcacca    540

ctttcaactc catcatgaag tgcgatgttg acgtccgaaa ggacctgtac ggcaacattg    600

tcatggtaag tgaatttccg cattcaacaa ttgattttta tagcggcgct aatgtatttc    660

tcaatctagt ctggtggtac caccatgtac cccggtctct ccgaccg                  707
```

<210> SEQ ID NO 92
<211> LENGTH: 469
<212> TYPE: DNA
<213> ORGANISM: Trichoderma hamatum

<400> SEQUENCE: 92

```
tctctctttg tgagtctcta gacagtcttt tgcgacaaat ctgctggcga tttgggtact     60

aatctgctgg ctacaggaca aggacggcga tggtacgtag tacctagtga cgcgatactc    120

ctcttttccc ctcctcctca ccgtcccccct attttgtgcg agctatcact agagcgcctg    180

aacctgcgat accgatcgaa atatccccgg ctggcaattt ttatgacgaa taaacggaca    240

agaaactaac agacttgact tggcaggcca gatcaccacc aaggagctgg gcactgtcat    300

gcgctctttg ggccagaacc cctccgagtc agagctgcag gacatgatca acgaggttga    360
```

```
tgccgacaac aacggatcca tcgatttccc tggtatgtca atagcagaaa cacatagaca    420

gctgccggat acaggctaat ctagagcggt gaagagttcc ttaccatga                469


<210> SEQ ID NO 93
<211> LENGTH: 1069
<212> TYPE: DNA
<213> ORGANISM: Trichoderma hamatum

<400> SEQUENCE: 93

tggccaagct gttccgtggt atcatgcgca ggatgaatac cgagttggcc aactacctga     60

gacgatgtgt tgagggcaac cgccacttca accttgctgt tggcatcaag cccggcacac    120

tctccaacgg attgaagtat tcacttgcta ccggaaactg gggtgaccag aagaaggcaa    180

tgagctcgac tgcaggtgta tcacaggtgc ttaaccgtta cacttttgcc tcgacacttt    240

ctcatttgcg tcgtaccaac acacccattg gaagagatgg taagctggcg aagcctcgac    300

agcttcacaa cacacattgg ggtttggtgt gcccagccga gacccctgaa ggacaagctt    360

gtggtctggt caaaaacttg tctctgatgt gctacgtcag tgtcggatct ccttctgagc    420

ctttgatcga gtttatgatc aataggggta tggaggttgt tgaggagtac gaaccactga    480

ggtatcccca tgctacaaag atctttgtga atggtgtctg ggttggaatc caccaagacc    540

ccaagcatct ggtaaaccaa gttttggaca ctcgtcgtaa atcctatctg cagtacgaag    600

tctctctgat cagagatatt cgtgaccaag aattcaaaat cttctctgac gccggtcgtg    660

ttatgcgtcc tgtctttact gtacagcaag aagatgaccc ggaaacgggt atcaacaagg    720

gccacttggt attgaccaag gacctcgtca acagacttgc caaagagcag gctgagcctc    780

cagaagaccc aagcatgaag cttggatggg aggggttaat tagggctggt gcggtggaat    840

atctcgacgc cgaggaagaa gaaacggcta tgatttgcat gacaccggag gaccttgaac    900

tttatcgtct tcagaaagct ggtatttcca cggatgaaga catgggagac gatccaaaca    960

agcgtctcaa gaccaagaca aatccgacaa ctcacatgta cacgcattgc gagattcacc   1020

caagtatgat cttaggtatc tgtgctagta tcattccttt ccccgatca               1069


<210> SEQ ID NO 94
<211> LENGTH: 382
<212> TYPE: PRT
<213> ORGANISM: Trichoderma hamatum

<400> SEQUENCE: 94

Met Ala Gly Ser Leu Thr Ala Asp Ala His Glu Ala Val Arg Cys Ile
1               5                   10                  15

Met Tyr Leu Thr Gly Gln His Val Val Val Pro Ser Asp His Asp Leu
            20                  25                  30

Val Gly Ser Ile Thr His Val Ile Leu Ala Phe Met Arg Ser Asp Val
        35                  40                  45

Phe Asn Val Asp Lys Thr Pro Ala Glu Phe Pro Phe Phe Thr Thr Val
    50                  55                  60

Ala Glu Thr Arg Gln Lys Phe Asn Ala Asn Thr Lys Ile Met Val Ala
65                  70                  75                  80

Ile Gly Gly Trp Gly Asp Ser Ala Gly Phe Glu Glu Ala Ala Arg Asp
                85                  90                  95

Asp Ser Ser Arg Lys Arg Trp Ala Asn Gln Val Lys Ala Met Val Asp
            100                 105                 110

Leu Thr Gly Ala Asp Gly Ile Asp Ile Asp Trp Glu Tyr Pro Gly Gly
```

```
        115                 120                 125

Asn Arg Asp Asp Tyr Lys Leu Ile Pro Asn Ser Gln Arg Glu Trp Glu
    130                 135                 140

Ile Glu Ala Phe Val Leu Leu Leu Arg Glu Leu Arg Leu Val Leu Gly
145                 150                 155                 160

Glu Glu Lys Leu Leu Thr Ile Ala Val Pro Ala Leu Glu Arg Asp Leu
                165                 170                 175

Met Ala Phe Thr Asn Ser Thr Ile Pro Ser Ile Val Asn Gln Val Asp
            180                 185                 190

Phe Ile Ser Val Met Thr Tyr Asp Met Met Asn Arg Arg Asp Thr Ile
        195                 200                 205

Val Lys His His Ser Gly Val Ala Asp Ser Gln Glu Ala Met Glu Arg
    210                 215                 220

Tyr Ile Asp Arg Gly Ala Pro Pro His Lys Leu Asn Phe Gly Leu Gly
225                 230                 235                 240

Tyr Tyr Ala Lys Trp Phe Met Thr Glu Gln Cys Asp Leu Gln His Pro
                245                 250                 255

Leu Gly Cys Arg Thr Gln Leu Leu Glu Asp Pro Ala Asn Gly Ala Asp
            260                 265                 270

Leu Gly Lys Thr Ala Ala Phe Ser Trp His Asp Glu Val Pro Val Glu
        275                 280                 285

Leu Ala Asn Ser Phe Glu Lys Ala His Thr His Gly Arg Tyr Tyr Glu
    290                 295                 300

Asp Gly Ser Tyr Gly Tyr Trp Asp Asp Glu Glu Lys Arg Trp Trp Ser
305                 310                 315                 320

Tyr Asp Thr Pro Leu Ala Ile Lys Thr Lys Val Pro Arg Phe Leu Gly
                325                 330                 335

Glu Leu Gln Leu Gly Gly Val Phe Ala Trp Gly Leu Gly Glu Asp Ala
            340                 345                 350

Pro Gln Phe Ile His Leu Lys Ala Thr Thr Asp Gly Ile Arg Ala Leu
        355                 360                 365

Arg Gly Gly Gln Ser Ser Arg Asp Ser Val Lys Asp Glu Leu
    370                 375                 380


<210> SEQ ID NO 95
<211> LENGTH: 443
<212> TYPE: PRT
<213> ORGANISM: Trichoderma hamatum

<400> SEQUENCE: 95

Met Ala Pro Phe Asn Thr Met Leu Gly Tyr Leu Leu Leu Val Val Ala
1               5                   10                  15

Pro Leu Ala Ala Ala Leu Pro Phe Arg Gly His Gly Pro Asn Thr His
            20                  25                  30

Asn His Ile Asn Leu Asn Phe Asn Leu Thr Glu Thr Ile Asn Glu Ile
        35                  40                  45

Asn Glu Asn Leu Ala Gly Leu Val Gly Tyr Ile Thr Asn Pro His Ala
    50                  55                  60

Lys His Ile Val Ala Asn Arg Tyr Ile Val Val Tyr Asn Asn Thr Phe
65                  70                  75                  80

Gly Ser Glu Ala Ile Ala Ala Lys Gln Ala Glu Phe Ala Ala Thr Ile
                85                  90                  95

Gln Lys Arg Asn Leu Gly Lys Arg Ser Leu Gly Gly Asn Met Leu Ser
            100                 105                 110
```

```
Thr Glu Ile His Ser Phe Gln Met His Thr Trp Arg Ala Met Ala Leu
        115                 120                 125

Asp Ala Asp Asp Glu Met Ile Lys Ser Ile Phe Ala Ala Lys Glu Val
    130                 135                 140

Ala Tyr Ile Glu Ala Asp Thr Val Val Gln Thr Lys Ala Leu Val Ala
145                 150                 155                 160

Gln Thr Asn Ala Thr Pro Gly Leu Ile Arg Leu Ser Asn Gln Asn Ile
                165                 170                 175

Gly Gly Lys Asn Tyr Ile Phe Asp Asn Ser Ala Gly Ala Gly Ile Thr
            180                 185                 190

Ala Tyr Val Val Asp Thr Gly Ile Arg Ile Thr His Thr Glu Phe Glu
        195                 200                 205

Gly Arg Ala Ser Phe Gly Ala Asn Phe Val Asn Ser Asn Asn Thr Asp
    210                 215                 220

Glu Asn Gly His Gly Ser His Val Ser Gly Thr Ile Gly Gly Ala Thr
225                 230                 235                 240

Phe Gly Val Ala Lys Asn Ile Lys Leu Val Ala Val Lys Val Leu Asp
                245                 250                 255

Ala Ser Gly Ala Gly Ser Asn Ser Gly Val Leu Asn Gly Met Gln Phe
            260                 265                 270

Val Val Asn Asp Val Gln Ala Lys Gly Leu Ser Gly Lys Ala Val Met
        275                 280                 285

Asn Met Ser Leu Gly Gly Ser Leu Ser Ala Ala Val Asn Asn Ala Ile
    290                 295                 300

Ala Ala Ile Ala Asn Ala Gly Val Val Pro Val Val Ala Ala Gly Asn
305                 310                 315                 320

Glu Asn Gln Asp Thr Ala Asn Thr Ser Pro Gly Ser Ala Pro Gln Ala
                325                 330                 335

Ile Thr Val Gly Ala Ile Asp Ala Thr Thr Asp Ile Arg Ala Ser Phe
            340                 345                 350

Ser Asn Phe Gly Ala Asp Val Asp Ile Tyr Ala Pro Gly Val Asn Val
        355                 360                 365

Leu Ser Val Gly Ile Lys Ser Asp Thr Asp Thr Ala Val Leu Ser Gly
    370                 375                 380

Thr Ser Met Ala Thr Pro His Val Ala Gly Leu Thr Gly Tyr Leu Met
385                 390                 395                 400

Ala Leu Lys Gly Val Thr Asn Val Asn Asp Val Thr Asn Leu Ile Lys
                405                 410                 415

Asn Leu Ala Thr Ala Ser Gly Ala Ser Val Gln Gln Asn Val Ala Gly
            420                 425                 430

Thr Thr Asn Leu Ile Ala Asn Asn Gly Glu Leu
        435                 440
```

<210> SEQ ID NO 96
<211> LENGTH: 309
<212> TYPE: PRT
<213> ORGANISM: Trichoderma hamatum

<400> SEQUENCE: 96

```
Met Phe Phe Arg Asn Ala Val Ala Val Thr Ser Leu Leu Ala Ala Leu
1               5                   10                  15

Ser Ser Ala Gln Pro Ser Gly Pro Glu Leu Ala Val Tyr Trp Gly Ala
            20                  25                  30

Glu Asp Asp Ser Thr Thr Leu Ser Asp Val Cys Ser Asp Asn Ser Tyr
        35                  40                  45
```

```
Gly Ile Val Asn Leu Ala Phe Leu Asp Thr Phe Phe Ala Ala Gly Gly
    50                  55                  60

Phe Pro Gln Leu Ser Val Ser Gly Leu Asp Gly Pro Ser Gln Ala Gln
65                  70                  75                  80

Gln Ser Ala Gly Ala Thr Gly Leu Lys Asp Gly Ser Ser Leu Val Asp
                85                  90                  95

Ala Ile Lys Gln Cys Gln Ser Ala Gly Lys Leu Val Leu Leu Ser Leu
            100                 105                 110

Gly Gly Ala Gly Ala Asp Val Thr Leu Gln Ser Asp Ser Asp Gly Glu
        115                 120                 125

Lys Ile Ala Asp Thr Leu Trp Asn Leu Phe Gly Gly Gly Thr Asp Asn
    130                 135                 140

Gln Glu Leu Arg Pro Phe Gly Asp Val Lys Leu Asp Gly Phe Asp Leu
145                 150                 155                 160

Asp Asn Glu Ser Gly Asn Pro Thr Gly Tyr Leu Ala Met Val Lys Arg
                165                 170                 175

Phe Lys Ser Asn Phe Gln Ser Asp Thr Ser Lys Thr Tyr Phe Leu Thr
            180                 185                 190

Ala Ala Pro Gln Cys Pro Phe Pro Asp Ala Ser Gln Pro Gln Asp Val
        195                 200                 205

Cys Ser Glu Leu Asp Phe Val Trp Val Gln Phe Tyr Asn Asn Gly Asp
    210                 215                 220

Cys Asn Ile Ala Gln Ser Asp Phe Leu Asn Ser Val Gln Thr Trp Ser
225                 230                 235                 240

Ser Gly Ile Gly Asn Ala Lys Leu Tyr Ile Gly Ala Leu Ala Ser Gly
                245                 250                 255

Ala Asp Gly Asp Gln Gly Phe Ala Asp Ala Asp Thr Leu Leu Gly Ala
            260                 265                 270

Ile Gln Asp Val Lys Asn Met Asn Leu Pro Asn Tyr Gly Gly Ala Met
        275                 280                 285

Leu Trp Glu Ala Gln Leu Ala Val Lys Asn Gly Asn Phe Gln Gln Lys
    290                 295                 300

Ile Ala Pro Gly Leu
305


<210> SEQ ID NO 97
<211> LENGTH: 412
<212> TYPE: PRT
<213> ORGANISM: Trichoderma hamatum

<400> SEQUENCE: 97

Met Phe Phe Ser Lys Ala Leu Ala Ala Thr Gly Leu Leu Ala Thr Ala
1               5                   10                  15

Ala Leu Ala Ala Pro Thr Val Glu Lys Arg Ala Ala Gly Gly Lys Leu
            20                  25                  30

Val Ile Tyr Trp Gly Ala Glu Asp Asp Ser Thr Thr Leu Ala Asn Val
        35                  40                  45

Cys Ala Asp Ser Ser Tyr Asp Ile Val Asn Leu Ala Phe Leu Asp Lys
    50                  55                  60

Phe Ser Ala Gly Gly Gly Tyr Pro Ser Leu Ser Leu Ser Thr Leu Gly
65                  70                  75                  80

Gly Pro Ser Ala Ala Gln Lys Ala Ala Gly Ala Thr Asn Leu Gln Asp
                85                  90                  95

Gly Ser Ser Leu Val Pro Ala Ile Lys Ala Cys Gln Ala Ala Gly Lys
```

```
            100                 105                 110

Leu Val Ile Leu Ser Met Gly Gly Ala Thr Asp Phe Ser Ala Val Ser
        115                 120                 125

Leu Ser Gly Asp Ala Gln Gly Gln Ser Val Ala Asp Met Val Trp Asn
    130                 135                 140

Leu Phe Leu Gly Gly Thr Ala Asn Pro Thr Leu Arg Pro Phe Gly Ser
145                 150                 155                 160

Val Lys Leu Asp Gly Val Asp Leu Asp Asn Glu Thr Gly Asn Pro Thr
                165                 170                 175

Gly Tyr Leu Ala Met Thr Gln Arg Phe Arg Ser Asn Phe Ala Lys Asp
            180                 185                 190

Thr Ser Lys Arg Tyr Tyr Leu Thr Ala Ala Pro Gln Cys Pro Phe Pro
        195                 200                 205

Asp Ala Ser Glu Pro Leu Asn Val Cys Gln Leu Leu Asp Tyr Val Trp
    210                 215                 220

Val Gln Phe Tyr Asn Asn Gly Asn Cys Asn Val Gly Gln Ser Gly Phe
225                 230                 235                 240

Asn Thr Ala Val Lys Asn Trp Ser Lys Asn Ile Gly Asn Ala Thr Leu
                245                 250                 255

Phe Ile Gly Ala Leu Ala Ser Gly Ala Asp Gly Asp Gln Gly Tyr Ile
            260                 265                 270

Ser Pro Ser Ala Leu Ile Ser Ala Tyr Asn Gly Val Ser Ala Leu Asn
        275                 280                 285

Leu Pro Asn Val Gly Gly Ile Met Leu Trp Glu Ala Gln Leu Ala Val
    290                 295                 300

Lys Asn Ser Asn Phe Gln Lys Thr Ile Lys Ala Ala Ile Gly Ser Gly
305                 310                 315                 320

Ser Thr Pro Pro Pro Pro Pro Pro Ala Ser Ser Thr Thr Pro Ala Gly
                325                 330                 335

Ser Thr Pro Thr Cys Ser Trp Ala Gly His Cys Ala Gly Ala Thr Cys
            340                 345                 350

Ser Thr Asp Asn Asp Cys Ser Asp Ser Leu Thr Cys Asn Ser Gly Lys
        355                 360                 365

Cys Gly Thr Ala Gly Ser Thr Ala Pro Pro Pro Thr Thr Cys Ser Trp
    370                 375                 380

Ala Gly His Cys Leu Gly Ala Ser Cys Gly Asn Asp Asn Asp Cys Ser
385                 390                 395                 400

Asp Pro Tyr Phe Cys Ser Asn Gly Val Cys Ser Gln
                405                 410


<210> SEQ ID NO 98
<211> LENGTH: 389
<212> TYPE: PRT
<213> ORGANISM: Trichoderma hamatum

<400> SEQUENCE: 98

Met Gly Ser Phe Lys Ala Ile Ile Ala Ala Ser Leu Ala Ala Leu Gly
1               5                   10                  15

Gln Phe Ala Ala Ala Ala Pro Ala Glu Gly Gln Ser Lys Arg Ala Gly
            20                  25                  30

Ile Ser Ser Ile Val Lys Gly Thr Pro Val Gly Phe Ala Ser Ser Val
        35                  40                  45

Thr Gly Gly Gly Thr Val Ala Pro Val Tyr Pro Thr Thr Ile Ala Gln
    50                  55                  60
```

```
Leu Lys Ser Tyr Leu Thr Ser Thr Ser Pro Gln Asn Ile Val Ile Ser
65                  70                  75                  80

Gly Thr Phe Asn Phe Ala Gly Thr Glu Gly Thr Thr Thr Leu Pro Ala
                85                  90                  95

Cys Asn Ala Tyr Pro Cys Thr Pro Ser Asn Gly Gly Gln Ala Leu Leu
            100                 105                 110

Asn Thr Leu Gly Gly Cys Gly Ser Leu Ser Thr Tyr Asn Val Asn Leu
        115                 120                 125

Asp Thr Ala Ala Tyr Asn Ala Ile Asn Val Gln Ser Asp Lys Thr Leu
    130                 135                 140

Val Gly Ile Asn Gly Ala Thr Leu Asn Gly Lys Gly Leu Arg Leu Ser
145                 150                 155                 160

Gly Val Ser Asn Val Ile Ile Gln Asn Ile Ala Ile Thr Asn Leu Asn
                165                 170                 175

Pro Gln Tyr Val Trp Gly Gly Asp Ala Ile Ser Leu Ser Asn Thr Asn
            180                 185                 190

Asn Val Trp Ile Asp His Val Lys Thr Ser Asn Leu Gly Arg Gln His
        195                 200                 205

Tyr Ser Phe Gly Thr Gly Ser Asn Asn Ala Val Thr Ile Ser Asn Ser
    210                 215                 220

Phe Ile Ser Gly Gln Thr Ser Tyr Ser Ala Ser Cys Asp Gly His Ser
225                 230                 235                 240

Tyr Trp Gly Leu Glu Leu Val Gly Ser Gly Asp Gln Ile Thr Phe Tyr
                245                 250                 255

Lys Asn Tyr Val Tyr Tyr Thr Ser Gly Arg Thr Pro Ala Leu Ser Gly
            260                 265                 270

Asn Thr Leu Phe His Ala Val Asn Asn Val Trp Ser Ser Asn Ser Gly
        275                 280                 285

His Ala Ile Glu Gly Thr Ser Asn Gly Met Gly Leu Tyr Glu Gly Asn
    290                 295                 300

Tyr Phe Val Asn Val Pro Thr Ile Val Ala Ser Gly Phe Val Gly Arg
305                 310                 315                 320

Leu Phe Ser Ser Gln Ser Ser Ala Val Ser Gln Cys Ala Gln Tyr Leu
                325                 330                 335

Gly Arg Asn Cys Val Ser Asn Ser Leu Ser Asn Ser Gly Thr Phe Thr
            340                 345                 350

Asn Ser Asp Thr Ser Phe Leu Tyr Leu Phe Gln Gly Lys Ala Asn Ile
        355                 360                 365

Val Ser Ala Ala Ser Ala Ser Ser Ile Gln Ser Ser Val Val Ser Ser
    370                 375                 380

Ala Gly Asn Thr Leu
385


<210> SEQ ID NO 99
<211> LENGTH: 169
<212> TYPE: PRT
<213> ORGANISM: Trichoderma hamatum

<400> SEQUENCE: 99

Met Gly Tyr Ser Arg Lys Asp Lys Ser Arg Tyr Ile Asn Thr Ile Gln
1               5                   10                  15

Glu Ala Leu Asp Ile Ser Thr Ala Phe Val Ala Ser Ser Arg Lys Arg
            20                  25                  30

Ile Ala Leu Thr Trp Lys Ile Ile Ile Gln Ile Gln Ser Asn Leu Ser
        35                  40                  45
```

```
Arg Met Gln Phe Phe Ala Leu Leu Pro Leu Leu Tyr Thr Thr Ala Ala
    50                  55                  60

Ala Leu Gly Ile Asn Cys Arg Gly Asn Ser Asn Cys Val Gly Thr Pro
65                  70                  75                  80

Glu Cys Arg Leu Ala Asp Leu Ile Leu Gln Val Ser Gln Gln Asp Pro
                85                  90                  95

Ser Thr Ser Tyr Ser Pro Gly Gln His Ile Ala Cys Cys Gly Ile Pro
            100                 105                 110

Gly Gly Asn Ile Cys Ala Phe Thr Gln Gly Ile Ser Asn Ser Ile Thr
        115                 120                 125

Ala Gly Glu Ala Leu Gly Met Leu Gln Gly Leu Ser Ala His Gly Cys
    130                 135                 140

Gly Gln Cys Gly Ser Ile Pro Phe Lys Asp Asn Asn Val Ala Glu Gly
145                 150                 155                 160

Gln Leu Thr Val Asn Trp Thr Asp His
                165


<210> SEQ ID NO 100
<211> LENGTH: 281
<212> TYPE: PRT
<213> ORGANISM: Trichoderma hamatum

<400> SEQUENCE: 100

Met His Leu His Ser Leu Phe Thr Ala Leu Ala Leu Ala Ser Pro Ala
1               5                   10                  15

Leu Ala Ala Ser Ile Pro Arg Ser Ser Ser Ser Ser Ser Ser Ser Thr
            20                  25                  30

Ile Thr Val Trp Ala Thr Pro His Asp Ser Tyr Ser Ser Ser Val Gly
        35                  40                  45

Val Leu Gly Cys Lys Val Asp Thr Asn Arg Ile Ala Tyr Trp Pro Asp
    50                  55                  60

Ser Val Asp Cys Thr Asn Ile Cys Val Ser Leu Ser Tyr Gln Asp Arg
65                  70                  75                  80

Gln Val Tyr Leu Leu Arg Val Asp Gln Ser Gln Gly Ala His Asp Ile
                85                  90                  95

Ser Tyr Asp Ala Trp Asn Tyr Leu Val Thr Gly Tyr Pro Ala Thr Glu
            100                 105                 110

Lys Pro Val Ala Gly Gly Pro Met Glu Met Thr Thr Glu Asn Val Asp
        115                 120                 125

Ala Ser Lys Cys Ala Asp Leu Ile Tyr Thr Ala Gly Gly Lys Leu Pro
    130                 135                 140

Leu Ser Ala Ala Asn Ser Met Asn Phe Leu Ala Ser Cys Leu Glu Gln
145                 150                 155                 160

Glu Asn Ser Trp Val Ala Ser Asn Tyr Val Leu Tyr Asn Ile Leu Asp
                165                 170                 175

Ala Ile Cys Thr Val Gly Gln Asn Gln Val Cys Ser Leu Asn Trp Pro
            180                 185                 190

Thr Ala Asn Gln Pro Thr Cys Pro Gly Thr Leu Gly Leu Pro Asp Ala
        195                 200                 205

Leu Lys Gly Glu Pro Val Tyr Asn Ile Glu Tyr Pro Ser Gly Val Lys
    210                 215                 220

Val Leu Ala Gly Ala Pro Pro Thr Val Pro Thr Gly Val Pro Val Pro
225                 230                 235                 240

Val Pro Ala Pro Ser Thr Asn Asp Asp Glu Lys Ser Ala Ala Arg Ser
```

```
                245                 250                 255

Leu Arg His Ser Asp Ser Leu Val Trp Ile Pro Val Leu Ser Leu Thr
            260                 265                 270

Ser Ile Ile Tyr Ser Trp Met Leu Trp
        275                 280


<210> SEQ ID NO 101
<211> LENGTH: 420
<212> TYPE: PRT
<213> ORGANISM: Trichoderma hamatum

<400> SEQUENCE: 101

Met His Ser Thr Thr Phe Phe Ala Ser Leu Gly Leu Ala Gly Leu Val
1               5                   10                  15

Ala Gly Ala Pro Ser Ala Pro His Asn Val Lys Ala Arg Gln Ala Ser
            20                  25                  30

Gly Ala Gln Asn Val Val Tyr Trp Gly Gly Thr Asn Asn Glu Ser Asp
        35                  40                  45

Asp Leu Ser Thr Tyr Cys Thr Pro Thr Ala Gly Ile Asp Ile Leu Val
    50                  55                  60

Leu Ser Phe Leu Asp Ile Tyr Gly Thr Thr Gly Asn Ile Pro Ala Gly
65                  70                  75                  80

Asn Ile Gly Asn Ser Cys Tyr Ile Gly Thr Asn Gly Thr Pro Gln Leu
                85                  90                  95

Cys Asp Asn Leu Ala Ala Ser Ile Ala Ser Cys Gln Ala Ala Gly Ile
            100                 105                 110

Lys Ile Ile Leu Ser Leu Gly Gly Ala Ala Gly Ser Tyr Ser Leu Gln
        115                 120                 125

Ser Gln Ser Gln Ala Val Ala Ile Gly Gln Tyr Leu Trp Glu Ala Tyr
    130                 135                 140

Gly Asn Ser Gly Ser Thr Ser Val Gln Arg Pro Phe Gly Asn Val Phe
145                 150                 155                 160

Val Asn Gly Phe Asp Phe Asp Leu Glu Leu Asn Ala Gly Asn Gln Tyr
                165                 170                 175

Tyr Gln Tyr Leu Ile Ser Thr Leu Arg Ser Asn Phe Ala Ser Asp Pro
            180                 185                 190

Lys His Thr Tyr Tyr Ile Thr Gly Ala Pro Gln Cys Pro Leu Pro Leu
        195                 200                 205

Ser Ile Pro Gln Ile Arg Lys Pro Asn Met Gly Glu Ile Ile Ser Ala
    210                 215                 220

Ser Gln Phe Asp Tyr Leu Trp Ile Gln Phe Tyr Asn Asn Asn Ala Tyr
225                 230                 235                 240

Ala Pro Asp Pro Cys Ser Leu Gly Leu Pro Gly Asp Ala Pro Phe Asn
                245                 250                 255

Tyr Asn Asn Trp Thr Ser Phe Ile Ala Thr Thr Pro Ser Lys Asn Ala
            260                 265                 270

Lys Leu Phe Ile Gly Val Pro Ala Asn Thr Leu Ala Ala Asn Gly Asn
        275                 280                 285

Ser Gly Gly Ala Val Tyr Tyr Ala Ser Pro Ser Gln Leu Ala Ser Ile
    290                 295                 300

Val Ala Asn Thr Lys Ser Ser Pro Asp Phe Gly Gly Ile Met Met Trp
305                 310                 315                 320

Asp Ala Gly Tyr Ser Asp Ala Asn Val Asn Asn Gly Cys Asn Tyr Ala
                325                 330                 335
```

```
Gln Glu Ala Lys Asn Ile Leu Leu Thr Gly Ala Pro Cys Gly Gly Ser
            340                 345                 350

Pro Pro Pro Val Ser Ser Ser Lys Pro Thr Ser Thr Ala Thr Lys Ser
        355                 360                 365

Ala Thr Ser Thr Ser Ser Ala Ser Gly Thr Gly Pro Thr Gly Gly Gly
    370                 375                 380

Thr Val Pro Gln Trp Gly Gln Cys Gly Gly Glu Gly Tyr Thr Gly Pro
385                 390                 395                 400

Thr Gln Cys Val Ser Pro Tyr Lys Cys Val Glu Ser Ser Gln Trp Trp
                405                 410                 415

Ser Ser Cys Gln
            420


<210> SEQ ID NO 102
<211> LENGTH: 98
<212> TYPE: PRT
<213> ORGANISM: Trichoderma hamatum

<400> SEQUENCE: 102

Met Lys Phe Phe Ala Ala Thr Ala Leu Leu Ala Ala Thr Thr Ile Ala
1               5                   10                  15

Gly Pro Leu Glu Val Arg Thr Gly Asp Gly Asn Ile Cys Pro Ser Gly
            20                  25                  30

Gly Leu Tyr Gly Asn Pro Gln Cys Cys Ser Ser Leu Leu Leu Gly Leu
        35                  40                  45

Ile Gly Leu Asp Cys Asn Val Pro Asn Gln Thr Pro Arg Asp Gly Ala
    50                  55                  60

Asp Phe Arg Asn Ile Cys Ala Lys Thr Gly Asp Glu Ala Leu Cys Cys
65                  70                  75                  80

Val Ala Pro Val Ala Gly Gln Ala Leu Leu Cys Gln Val Ala Val Gly
                85                  90                  95

Ala Ser


<210> SEQ ID NO 103
<211> LENGTH: 97
<212> TYPE: PRT
<213> ORGANISM: Trichoderma hamatum

<400> SEQUENCE: 103

Met Lys Phe Phe Ala Val Ala Thr Leu Phe Val Thr Gly Val Ile Ser
1               5                   10                  15

Ala Pro Ser Pro Asn Ala Leu Asn Ser Arg Ser Leu Leu Cys Ser Pro
            20                  25                  30

Gly Leu Tyr Ser Thr Ala Gln Cys Cys Gly Val Asp Val Leu Gly Val
        35                  40                  45

Ala Asp Leu Asp Cys Ala Ala Pro Thr Gly Thr Ile Thr Asn Ala Gln
    50                  55                  60

Gly Phe Gln Ala Ala Cys Ala Lys Lys Gly Gln Glu Ala Arg Cys Cys
65                  70                  75                  80

Val Leu Pro Val Ala Gly Gln Asp Val Leu Cys Gln Asp Pro Pro Gly
                85                  90                  95

Leu


<210> SEQ ID NO 104
<211> LENGTH: 135
<212> TYPE: PRT
<213> ORGANISM: Trichoderma hamatum
```

<400> SEQUENCE: 104

```
Met Lys Phe Ser Phe Thr Ser Ala Ile Ala Ile Ala Ser Ile Gly Ile
1               5                   10                  15

Thr Gly Ala Arg Ala Gly Ile Asn Cys Asn Gly Ser Gly Asn Cys Pro
            20                  25                  30

Gly Val Ala Gly Asp Leu Ser Thr Leu Ile Ser Phe Gly Trp Ser Ile
        35                  40                  45

Asp Pro Asn Arg Trp Tyr Asn Asn Gly Glu His Ile Val Cys Val Gln
    50                  55                  60

Ser Gln Leu Gly Thr Gly Leu Cys Ala Phe Leu Gln Asn Thr Gly Gly
65                  70                  75                  80

Ala Pro Gly Ser Ser Ile Gln Pro Leu Leu Gln Ala Leu Gln Gly His
                85                  90                  95

Gly Cys Asn Lys Cys Gly Ser Val Pro Leu Asn Phe Leu Gln Gly Asp
            100                 105                 110

Asn Ser Glu Asp His Gly Glu Leu Thr Val Asn Ala Val Gly Ser Thr
        115                 120                 125

Ala Gly Cys Ser Gly Ile Cys
    130                 135
```

<210> SEQ ID NO 105
<211> LENGTH: 89
<212> TYPE: PRT
<213> ORGANISM: Trichoderma hamatum

<400> SEQUENCE: 105

```
Met Lys Met Leu Ile Thr Ala Ala Leu Phe Thr Leu Ala Leu Ala Ala
1               5                   10                  15

Pro Val Ala Glu Thr Lys Pro His Ser Ile Ala Ala Arg Asp Pro Phe
            20                  25                  30

Thr Cys Pro Gly Gly Leu Thr Asn Ser Thr Pro Met Cys Cys Ser Val
        35                  40                  45

Asn Val Leu Gly Leu Leu Ala Leu Asp Cys Gln Gln Pro Gly Ala Asp
    50                  55                  60

Gly Cys Ser Gly Ser Ser Lys Pro Asn Cys Cys Thr Leu Gly Ala Ala
65                  70                  75                  80

Gly Gln Gly Val Ile Cys Asn Ala Leu
                85
```

<210> SEQ ID NO 106
<211> LENGTH: 638
<212> TYPE: PRT
<213> ORGANISM: Trichoderma hamatum

<400> SEQUENCE: 106

```
Met Lys Ser Ala Ile Leu Leu Gly Leu Thr Gly Leu Ala Ala Asn Val
1               5                   10                  15

Asn Ala His Pro Ala Lys Gln Pro Glu Thr Gly Asn Gly Leu Thr Lys
            20                  25                  30

Arg Gly Val Asp Ile Ser Lys Tyr Ser Leu Pro Asn Leu Ser Lys Tyr
        35                  40                  45

Thr Ser Ser Pro Asn Ile Glu Gln Glu Ala Ser Leu Gln Ser Leu Ala
    50                  55                  60

Phe Lys Arg Asn Tyr Val Asp Thr Ala Thr Arg Ala Val Lys Lys Ala
65                  70                  75                  80
```

```
Ala Pro Lys Ala Glu Phe Arg Val Val Asp Asp His Tyr Ile Asp Val
                85                  90                  95

Asp Gly Ile Gly His Val His Phe Lys Gln Thr Val His Gly Ile Asp
            100                 105                 110

Ile Asp Asn Gly Asp Phe Lys Val Asn Ile Gly Lys Asp Gly Arg Val
        115                 120                 125

Phe Ser His Gly Asn Ser Phe Phe Ser Gly Lys Leu Pro Gln Gln Asn
    130                 135                 140

Pro Leu Arg Lys Arg Asp Phe Ser Asp Pro Thr Thr Ala Leu Lys Gly
145                 150                 155                 160

Ala Ile Asp Ile Leu Gly Leu Pro Val Gln Ala Asp Gly Ala Thr Ala
                165                 170                 175

Glu Ala Gln Glu Gly Thr Glu Lys Tyr Thr Leu Lys Gly Thr Ser Gly
            180                 185                 190

Ala Val Ser Asp Pro Lys Ala His Leu Val Tyr Leu Val Lys Gly Asp
        195                 200                 205

Gly Thr Leu Ala Leu Thr Trp Arg Val Glu Thr Asp Ile Met Asp Asn
    210                 215                 220

Trp Leu Leu Thr Tyr Val Asp Ala Thr Thr Asn Gln Glu Ile His Gly
225                 230                 235                 240

Val Val Asp Tyr Val Ser Asp Leu Ala Thr Phe Gln Val Tyr Pro Trp
                245                 250                 255

Gly Leu Asn Asp Pro Thr Glu Gly Asp Arg Lys Val Leu Thr Asp Pro
            260                 265                 270

Trp Arg Thr Asp Ala Ser Pro Phe Thr Trp Leu Ser Asp Gly Thr Thr
        275                 280                 285

Asn Tyr Thr Val Thr Arg Gly Asn Asn Ala Ile Ala Gln Asp Asn Pro
    290                 295                 300

Ser Gly Gly Asp Ser Tyr Leu Asn Asn His Arg Pro Ser Ser Ser Thr
305                 310                 315                 320

Arg Asp Phe Gln Tyr Pro Phe Thr Leu Thr Gln Thr Asn Pro Thr Asp
                325                 330                 335

Tyr Arg Asp Ala Ala Ile Thr Gln Leu Phe Tyr Thr Val Asn Lys Tyr
            340                 345                 350

His Asp Leu Leu Tyr Val Leu Gly Phe Asn Glu Val Ala Gly Asn Phe
        355                 360                 365

Gln Ala Asn Asn Asn Gly Lys Gly Gly Lys Ala Asn Asp Phe Val Ile
    370                 375                 380

Val Asn Ala Gln Asp Gly Ser Gly Thr Asn Asn Ala Asn Phe Ala Thr
385                 390                 395                 400

Pro Ala Asp Gly Ser Asn Gly Arg Met Arg Met Tyr Ile Trp Thr Thr
                405                 410                 415

Ala Asn Pro Lys Arg Asp Gly Asp Leu Glu Ala Gly Ile Val Ile His
            420                 425                 430

Glu Tyr Thr His Gly Leu Ser Thr Arg Leu Thr Gly Gly Pro Ala Asn
        435                 440                 445

Ser Gly Cys Leu Thr Gly Thr Glu Ala Gly Gly Met Gly Glu Gly Trp
    450                 455                 460

Gly Asp Phe Phe Ala Thr Ala Ile Arg Leu Lys Ala Gly Asp Thr Arg
465                 470                 475                 480

Ser Lys Asp Tyr Pro Met Gly Val Trp Ala Asp Asn Asn Val Lys Gly
                485                 490                 495

Ile Arg Gln Tyr Pro Tyr Ser Thr Ser Leu Thr Thr Asn Pro Leu Thr
```

```
            500                 505                 510

Tyr Lys Thr Val Asn Thr Gln Asn Glu Val His Ser Ala Gly Thr Thr
        515                 520                 525

Trp Ala Thr Ile Leu Tyr Glu Val Leu Trp Asn Leu Ile Asp Lys Tyr
    530                 535                 540

Gly Lys Asn Asp Asp Asp Phe Pro Thr Phe Asp Ser Gln Gly Val Pro
545                 550                 555                 560

Thr Asp Gly Lys Tyr Leu Thr Leu Lys Leu Val Leu Asn Gly Leu Ala
                565                 570                 575

Leu Gln Pro Cys Thr Pro Thr Phe Val Ser Ala Arg Asp Ala Ile Leu
            580                 585                 590

Asp Ala Asp Arg Ala Leu Thr Gly Gly Glu Asn Leu Cys Glu Leu Trp
        595                 600                 605

Thr Gly Phe Ala Lys Arg Gly Leu Gly Ser Gly Ala Lys Tyr Ser Ser
    610                 615                 620

Thr Ala Arg Val Glu Ser Phe Thr Ile Pro Ser Gly Val Cys
625                 630                 635


<210> SEQ ID NO 107
<211> LENGTH: 131
<212> TYPE: PRT
<213> ORGANISM: Trichoderma hamatum

<400> SEQUENCE: 107

Met Lys Ser Ser Leu Leu Ser Leu Ile Ala Ile Ala Ile Asn Gly Ala
1               5                   10                  15

Leu Ala Gly Ile Asn Cys Asn Gly Ser Gly Asp Cys Ala Gly Thr Pro
            20                  25                  30

Gly Thr Leu Gly Asp Leu Ile Ala Asp Ala Tyr Gln Ile Asp Pro Asn
        35                  40                  45

Arg Trp Tyr Asn Asn Gly Glu His Ile Ala Cys Ser Asp Asn Arg Gly
    50                  55                  60

Gly Gly Gly Leu Cys Ala Phe Phe Gln Asn Thr Leu Gly Gly Pro Gly
65                  70                  75                  80

Ser Ser Val Leu Thr Leu Leu Gln Asn Leu Gln Ala His Gly Cys Asn
                85                  90                  95

Lys Cys Gly Ser Ile Pro Val Asn Phe Pro Gln Gly Asp Asn Ser Glu
            100                 105                 110

Asn His Gly Glu Leu Thr Val Asn Phe Val Val Ser Ala Gly Cys Thr
        115                 120                 125

Gly Leu Cys
    130


<210> SEQ ID NO 108
<211> LENGTH: 138
<212> TYPE: PRT
<213> ORGANISM: Trichoderma hamatum

<400> SEQUENCE: 108

Met Leu Phe Lys Ile Ala Ile Val Val Ile Ala Ser Thr Ala Arg Val
1               5                   10                  15

Ser Ala Phe Gly Ile Asn Cys Glu Gly Ser Gly Tyr Cys Ser Pro Leu
            20                  25                  30

Phe Asn Pro Gly Ala Asn Asn His Pro Leu Leu Glu Met Val Asp Val
        35                  40                  45

Ile Asp Phe Gly Ile Asp Asp Asn Arg Trp Tyr Ala Ala Gly Glu His
```

```
    50                  55                  60

Ile Ala Cys Asp Gln Ser Ser Gly Val Cys Ala Phe Val Gln Lys Ile
65                  70                  75                  80

Gly Gly Ala Ser Gly Gly Asp Ile Ala Arg Ala Val Arg Tyr Leu Ala
                85                  90                  95

Asp His Gly Cys Thr Thr Cys Gly Ser Val Pro Leu Asp Phe Pro Asn
            100                 105                 110

Thr Asn Asp Val Asn Asn Gly Glu Val Thr Phe Asn Phe Val Gly Leu
        115                 120                 125

Glu Asp Met Gly Ser Cys Ser Asp Leu Cys
    130                 135


<210> SEQ ID NO 109
<211> LENGTH: 424
<212> TYPE: PRT
<213> ORGANISM: Trichoderma hamatum

<400> SEQUENCE: 109

Met Leu Gly Phe Leu Gly Lys Ser Val Ala Leu Leu Ala Ala Leu Gln
1               5                   10                  15

Ala Thr Leu Thr Ser Ala Ser Pro Leu Ser Thr Asn Asp Val Thr Val
            20                  25                  30

Glu Lys Arg Ala Ser Gly Tyr Ala Asn Ala Val Tyr Phe Thr Asn Trp
        35                  40                  45

Gly Ile Tyr Gly Arg Asn Phe Gln Pro Gln Asp Leu Val Ala Ser Asp
    50                  55                  60

Ile Thr His Val Ile Tyr Ser Phe Met Asn Phe Gln Ala Asp Gly Thr
65                  70                  75                  80

Val Val Ser Gly Asp Ala Tyr Ala Asp Tyr Gln Lys His Tyr Ser Asp
                85                  90                  95

Asp Ser Trp Asn Asp Val Gly Asn Asn Ala Tyr Gly Cys Val Lys Gln
            100                 105                 110

Leu Phe Lys Leu Lys Lys Ala Asn Arg Asn Leu Lys Val Met Leu Ser
        115                 120                 125

Ile Gly Gly Trp Thr Trp Ser Thr Asn Phe Pro Ser Ala Ala Ser Thr
    130                 135                 140

Asp Ala Asn Arg Lys Asn Phe Ala Lys Thr Ala Ile Thr Phe Met Lys
145                 150                 155                 160

Asp Trp Gly Phe Asp Gly Ile Asp Val Asp Trp Glu Tyr Pro Ala Asp
                165                 170                 175

Asn Thr Gln Ala Thr Asn Met Val Leu Leu Leu Lys Glu Ile Arg Ser
            180                 185                 190

Gln Leu Asp Ala Tyr Ala Ala Gln Tyr Ala Pro Gly Tyr His Phe Leu
        195                 200                 205

Leu Ser Ile Ala Ala Pro Ala Gly Pro Glu His Tyr Ser Ala Leu His
    210                 215                 220

Leu Ala Asp Leu Gly Gln Val Leu Asp Tyr Ile Asn Leu Met Ala Tyr
225                 230                 235                 240

Asp Tyr Ala Gly Ser Trp Ser Ser Phe Ser Gly His Asp Ala Asn Leu
                245                 250                 255

Phe Ala Asn Pro Ser Asn Pro Asn Ser Ser Pro Tyr Asn Thr Asp Gln
            260                 265                 270

Ala Ile Lys Ala Tyr Ile Asn Gly Gly Val Pro Ala Arg Lys Ile Val
        275                 280                 285
```

```
Leu Gly Met Pro Ile Tyr Gly Arg Ser Phe Glu Ser Thr Gly Gly Ile
    290                 295                 300

Gly Gln Ser Tyr Ser Gly Ile Gly Ser Gly Ser Trp Glu Asn Gly Ile
305                 310                 315                 320

Trp Asp Tyr Lys Val Leu Pro Lys Ala Gly Ala Thr Val Gln Tyr Asp
                325                 330                 335

Ser Val Ala Gln Ala Tyr Tyr Ser Tyr Asp Pro Ser Ser Lys Glu Leu
            340                 345                 350

Ile Ser Phe Asp Thr Pro Ser Met Ile Asn Thr Lys Val Ser Tyr Leu
        355                 360                 365

Lys Asn Leu Gly Leu Gly Gly Ser Met Phe Trp Glu Ala Ser Ala Asp
    370                 375                 380

Lys Thr Gly Ser Asp Ser Leu Ile Gly Thr Ser His Arg Ala Leu Gly
385                 390                 395                 400

Ser Leu Asp Ser Thr Gln Asn Leu Leu Ser Tyr Pro Asn Ser Gln Tyr
                405                 410                 415

Asp Asn Ile Arg Ser Gly Leu Asn
            420


<210> SEQ ID NO 110
<211> LENGTH: 660
<212> TYPE: PRT
<213> ORGANISM: Trichoderma hamatum

<400> SEQUENCE: 110

Met Leu Leu Lys Gln Ile Leu Val Ala Thr Leu Leu Ser Leu Ser Ser
1               5                   10                  15

Val Lys Ala Phe Pro Asn Pro Asn His Ala Gln Asp Leu Glu Ala Arg
            20                  25                  30

Glu Ala Glu Asp Asn Leu Val Ala Arg Gly Gly His Asp Cys Gly Ser
        35                  40                  45

Tyr Ala Thr Trp Asn Tyr Gly Lys Asn Cys Cys Val Cys Lys Asp Asn
    50                  55                  60

Gly Lys Asn Tyr Asp Ser Lys Ser Lys Thr Cys Ser Cys Pro His Gly
65                  70                  75                  80

Gln Val Trp Asn Gly Lys Gln Cys Val Val Asp Cys Gly Lys Asp Ala
                85                  90                  95

Thr Tyr Asp Trp Lys Gln Lys Lys Cys Val Cys Lys Lys Gln Gly Glu
            100                 105                 110

Val Tyr Asn Ser Asn Thr Lys Thr Cys Ser Cys Pro Pro Gly Thr Val
        115                 120                 125

Trp Asn Gly Tyr Gly Cys Val Val Asp Cys Gly Lys Glu Ala His Phe
    130                 135                 140

Asp Lys Trp Gln Lys Lys Cys Val Cys Asn Asn Asn Gly Glu Val Tyr
145                 150                 155                 160

Asp Ser Lys Ser Lys Thr Cys Ser Cys Pro Gly Gly Gln Tyr Trp Asn
                165                 170                 175

Gly Lys Lys Cys Val Cys Pro Tyr Gly Lys Val Trp Asn Gly Lys Gln
            180                 185                 190

Cys Ile Glu Asp Cys Gly Lys Asp Ala His Phe Asp Tyr Asn Gln Lys
        195                 200                 205

Lys Cys Val Cys Asn Lys Asn Gly Gln Val Tyr Asn Ser Asn Ser Lys
    210                 215                 220

Thr Cys Lys Cys Pro Gly Gly Gln Tyr Trp Asp Gly Lys His Cys Val
225                 230                 235                 240
```

```
Cys Pro Tyr Gly Gln Val Phe Asn Gly Lys Gln Cys Val Pro Asp Cys
                245                 250                 255

Gly Lys Glu Ala His Phe Asp Tyr Lys Gln Lys Lys Cys Val Cys Asn
            260                 265                 270

Asn Tyr Gly Glu Ile Tyr Asn Ser Lys Ser Lys Thr Cys Ala Cys Pro
        275                 280                 285

Asp Gly Gln Tyr Trp Asn Gly Lys Gln Cys Val Cys Pro Tyr Gly Lys
    290                 295                 300

Ile Trp Asn Gly Lys Gln Cys Val Pro Asp Cys Gly Lys Asp Ala His
305                 310                 315                 320

Phe Asp Tyr Asn Gln Lys Lys Cys Val Cys Asn Lys Asn Gly Glu Ile
                325                 330                 335

Tyr Asp Ser Lys Ser Lys Thr Cys Ala Cys Pro Asp Gly Gln Tyr Trp
            340                 345                 350

Asn Gly Lys Gln Cys Ala Cys Pro Tyr Gly Lys Ile Trp Asn Gly Lys
        355                 360                 365

Gln Cys Val Pro Asp Cys Gly Lys Glu Ala His Phe Asp Tyr Asn Gln
    370                 375                 380

Lys Gln Cys Val Cys Asn Asn Lys Gly Glu Ile Tyr Asp Ser Lys Ser
385                 390                 395                 400

Lys Thr Cys Ala Cys Pro Asp Gly Gln Tyr Trp Asn Gly Lys Gln Cys
                405                 410                 415

Ala Cys Pro Tyr Gly Lys Ile Trp Asn Gly Lys Gln Cys Val Glu Asp
            420                 425                 430

Cys Gly Lys Glu Ala His Phe Asp Tyr Asn Gln Lys Gln Cys Val Cys
        435                 440                 445

Asn Asn Lys Gly Glu Ile Tyr Asp Ser Lys Ser Lys Thr Cys Lys Cys
    450                 455                 460

Pro Asp Gly Gln Tyr Trp Asp Gly Lys Gln Cys Ala Cys Pro Tyr Gly
465                 470                 475                 480

Lys Ile Trp Asn Gly Lys Gln Cys Val Glu Asp Cys Gly Lys Asp Ala
                485                 490                 495

His Phe Asp Tyr Asn Gln Lys Gln Cys Val Cys Asn Asn Lys Gly Glu
            500                 505                 510

Ile Tyr Asp Ser Lys Ser Lys Thr Cys Lys Cys Pro Asp Gly Gln Tyr
        515                 520                 525

Trp Asp Gly Lys Gln Cys Ala Cys Pro Tyr Gly Gln Ile Trp Asp Gly
    530                 535                 540

Lys Gln Cys Thr Pro Asn Cys Gly Lys Asp Ala Thr Tyr Asp Ser Lys
545                 550                 555                 560

Gln Lys Gln Cys Val Cys Asn Lys Lys Gly Gln Val Phe Asp Ser Lys
                565                 570                 575

His Leu Thr Cys Ser Cys Pro Ala Gly Thr Ser Trp Asn Gly Tyr Ala
            580                 585                 590

Cys Val Pro Asp Cys Gly Lys Asp Ala His Tyr Asp Thr Asn Gln Lys
        595                 600                 605

Cys Cys Val Cys Asn Asn Lys Gly Gln Ile Phe Asn Ser Gly Ser Lys
    610                 615                 620

Thr Cys Ser Cys Pro Gly Asn Gln Tyr Trp Asp Gly Asn Lys Cys Thr
625                 630                 635                 640

Cys Pro Tyr Gly Ser Thr Trp Asp Ser Ser Lys Lys Thr Cys Lys Gln
                645                 650                 655
```

```
Thr Pro Ile His
            660


<210> SEQ ID NO 111
<211> LENGTH: 238
<212> TYPE: PRT
<213> ORGANISM: Trichoderma hamatum

<400> SEQUENCE: 111

Met Leu Pro Ser Ser Leu Cys Arg Ile Ala Ala Val Ile Ser Val Ala
1               5                   10                  15

Ser Ala Glu Met Val Ser Val Thr Phe Asp Thr Ala Tyr Asp Asp Pro
            20                  25                  30

Ser Arg Ser Leu Ser Glu Val Ala Cys Trp Arg Lys Gly Thr Gly Phe
        35                  40                  45

Met Pro Asn Leu Asp Trp Lys Leu Gln Lys Asp Ala Leu Glu Phe Ile
    50                  55                  60

Gly Ile Lys Ala Ile Arg Gly Phe Ser Ser Ala Gln Cys Phe Ser Cys
65                  70                  75                  80

Trp Lys Ile Glu Tyr Gly Asp Lys Gln Ile Ser Leu Phe Ala Ile Asp
                85                  90                  95

Ser Ala Asp Ser Gly Ile Val Leu Ser Leu Ser Thr Met Gln Tyr Leu
            100                 105                 110

Thr Gly Gly Gln Ala Arg Glu Leu Ala Arg Ile Asp Ala Lys Ala Thr
        115                 120                 125

Gln Val Asp Ala Ser Asn Cys Gly Ile Ser Ala Ala Glu Leu His Lys
    130                 135                 140

Tyr Asp Phe Tyr Thr Asn Gly Ser Gly Asn Ser Asp Gly Ser Arg Ser
145                 150                 155                 160

Asn Thr Gly Ala Ile Val Gly Gly Val Leu Gly Gly Val Ala Gly Leu
                165                 170                 175

Ala Leu Thr Gly Leu Ala Val Phe Phe Phe Pro Arg Tyr Lys Asn Leu
            180                 185                 190

Ala Ala Gly His Lys Pro Val Ser Gln Asn Thr Pro Pro Ala Ala Tyr
        195                 200                 205

Gln Ser Ser Leu Met Gln Gln Asp Pro Lys Ala His Tyr Asp Pro Lys
    210                 215                 220

Tyr Phe Ala Glu Met Asp Thr Gln Pro Tyr Thr Pro Pro Asp
225                 230                 235


<210> SEQ ID NO 112
<211> LENGTH: 402
<212> TYPE: PRT
<213> ORGANISM: Trichoderma hamatum

<400> SEQUENCE: 112

Met Leu Arg Thr Pro Thr Ile Pro Trp Leu Leu Asn Ile Ile Leu Glu
1               5                   10                  15

Glu Asn Pro Thr Met Ile Pro Ser Met Lys Lys Cys Gly Arg Lys Leu
            20                  25                  30

Trp Ala Gly Leu Ala Leu Leu Ala Leu Pro Val Ile Ala Ser Ala Ser
        35                  40                  45

Cys Ala Leu Pro Ser Thr Tyr Lys Trp Thr Ser Thr Gly Pro Leu Ala
    50                  55                  60

Asn Pro Lys Ser Gly Trp Val Ser Leu Lys Asp Phe Ser His Val Pro
65                  70                  75                  80
```

```
Tyr Asn Gly Gln His Leu Val Tyr Ser Ser Thr Val Asn Ser Ala Gly
                85                  90                  95

Ser Tyr Gly Ser Met Asn Phe Gly Leu Val Ser Asn Trp Thr Asn Leu
            100                 105                 110

Ser Thr Ala Ser Gln Asn Thr Met Asn Leu Gly Thr Val Ala Pro Thr
        115                 120                 125

Leu Phe Tyr Phe Ser Pro Lys Lys Ile Trp Val Leu Ala Tyr Glu Trp
    130                 135                 140

Ala Ala Thr Pro Phe Ala Tyr Val Thr Ser Thr Asp Pro Thr Asn Ala
145                 150                 155                 160

Asn Gly Trp Ser Ala Ser Gln Pro Leu Phe Ser Gly Ser Ile Ser Pro
                165                 170                 175

Ser Ser Pro Ile Asp Pro Ala Leu Ile Ser Asp Gly Thr Asn Met Tyr
            180                 185                 190

Leu Phe Phe Ala Gly Asp Asn Gly Lys Ile Tyr Arg Ser Ser Met Pro
        195                 200                 205

Ile Gly Gln Phe Pro Ser Ser Phe Gly Thr Ser Tyr Thr Thr Ile Met
    210                 215                 220

Ser Ala Ala Thr Asn Asp Leu Phe Glu Ala Ile Gln Val Tyr Thr Val
225                 230                 235                 240

Ser Gly Gln Asn Gln Tyr Leu Met Ile Val Glu Cys Ile Gly Ser Val
                245                 250                 255

Gly Arg Tyr Phe Arg Ser Phe Thr Ala Thr Ser Leu Ser Gly Thr Trp
            260                 265                 270

Thr Pro Gln Ala Ala Thr Glu Ser Asn Pro Phe Ala Gly His Ala Asn
        275                 280                 285

Ser Gly Ala Thr Trp Thr Asn Asp Ile Ser Ser Gly Asp Leu Ile Arg
    290                 295                 300

Ser Thr Asn Asp Glu Thr Met Thr Ile Asp Pro Cys Asn Leu Gln Leu
305                 310                 315                 320

Leu Tyr Gln Gly Met Ala Val Gly Ser Thr Gly Asp Tyr Asn Ser Leu
                325                 330                 335

Pro Trp Arg Pro Ala Val Leu Thr Leu Thr Asn Pro Gly Ser Ser Thr
            340                 345                 350

Gly Asn Gly Asn Gly Thr Gly Ser Gly Gly Ser Gly Gly Ser Gly Ser
        355                 360                 365

Gly Gln Ala Ser Gln Tyr Ala Gln Cys Gly Gly Leu Gly Tyr Thr Gly
    370                 375                 380

Pro Thr Ser Pro Tyr Lys Cys Thr Phe Val Asn Glu Tyr Tyr Ser Gln
385                 390                 395                 400

Cys Leu


<210> SEQ ID NO 113
<211> LENGTH: 425
<212> TYPE: PRT
<213> ORGANISM: Trichoderma hamatum

<400> SEQUENCE: 113

Met Leu Ser His Ala Ile Leu Ala Gly Leu Gly Leu Ala Gly Leu Ala
1               5                   10                  15

Ala Ala Ala Pro Thr Arg Thr Ile Ala Thr Arg Gln Ala Ser Gly Tyr
            20                  25                  30

Gln Asn Ala Val Tyr Trp Gly Ala Thr Gly Lys Gln Asn Pro Asn Leu
        35                  40                  45
```

Ala Glu Tyr Cys Thr Ser Thr Ser Gly Ile Asp Ile Leu Ile Leu Ser
50 55 60

Phe Leu Asp Val Tyr Gly Ala Thr Gly Asn Phe Pro Ser Gly Asn Phe
65 70 75 80

Gly Asn Asp Cys Phe Val Gly Thr Thr Gly Val Pro Gln Ser Cys Ser
85 90 95

Asp Leu Ala Ser Gln Ile Lys Thr Cys Gln Asn Ala Gly Val Lys Ile
100 105 110

Ile Val Ser Leu Gly Gly Ala Ala Gly Ser Tyr Ser Val Thr Ser Gln
115 120 125

Gln Gln Ala Gln Thr Ile Gly Gln Tyr Leu Trp Asp Ala Tyr Gly Asn
130 135 140

Ser Gly Ser Thr Ser Val Gln Arg Pro Phe Gly Asp Val Phe Val Asn
145 150 155 160

Gly Trp Asp Phe Asp Ile Glu Ala Asn Gly Gly Phe Ser Gln Tyr Tyr
165 170 175

Gln Tyr Met Ile Gly Thr Leu Arg Ser Asn Phe Ala Lys Asp Ser Ala
180 185 190

Asn Thr Tyr Tyr Ile Thr Gly Ala Pro Gln Cys Pro Leu Pro Glu Glu
195 200 205

Asn Met Gly Asp Met Ile Gln His Ser Val Phe Asp Tyr Leu Phe Ile
210 215 220

Gln Phe Tyr Asn Asn Asn Pro Thr Cys Ser Leu Gly Leu Ser Gly Gln
225 230 235 240

Ala Pro Leu Asn Tyr Asp Asp Trp Thr Asn Phe Val Ser Thr Thr Gln
245 250 255

Ser Lys Asn Ala Lys Leu Phe Leu Gly Ala Pro Ala Gly Pro Leu Ala
260 265 270

Ser Asn Gly Asn Pro Asn Gly Ala Val Tyr Tyr Ala Thr Pro Ser Asp
275 280 285

Leu Ala Pro Ile Val Asn Lys Ala Lys Thr Lys Ser Asn Phe Gly Gly
290 295 300

Val Met Leu Trp Asp Ala Gly Tyr Ser Asp Glu Asn Ser Ser Gly Gly
305 310 315 320

Cys Asn Tyr Ala Gln Gln Val Lys Ser Ile Leu Thr Thr Gly Ala Pro
325 330 335

Cys Asn Gly Thr Pro Val Ser Gly Gly Gly Ser Pro Pro Ala Thr Ser
340 345 350

Ser Thr Ala Ser Ser Pro Pro Ala Thr Ser Ser Thr Ala Ser Ser Pro
355 360 365

Pro Ala Thr Ser Ser Leu Pro Ala Asp Gly Ser Thr Gly Ser Thr Gly
370 375 380

Asn Ser Gly Val Gly Ser Val Ala Gln Trp Gly Gln Cys Gly Gly Ile
385 390 395 400

Gly Tyr Thr Gly Pro Thr Gln Cys Gln Ser Pro Phe Lys Cys Val Asn
405 410 415

Glu Gly Pro Tyr Trp Ser Ser Cys Gln
420 425

<210> SEQ ID NO 114
<211> LENGTH: 325
<212> TYPE: PRT
<213> ORGANISM: Trichoderma hamatum

<400> SEQUENCE: 114

```
Met Leu Tyr Thr Ala Ala Leu Ala Gly Leu Met Ala Thr Ala Ala Leu
1               5                   10                  15

Ala Ala Pro Tyr Arg Arg Gln Ala Thr Gly Gln Asn Val Val Tyr Trp
            20                  25                  30

Gly Gln Asn Gly Gly Gly Val Thr Glu Ser Asn Asn Leu Ser Asp Tyr
        35                  40                  45

Cys Asp Ala Glu Ala Gly Ile Asp Leu Leu Val Leu Ser Phe Leu Tyr
    50                  55                  60

Glu Tyr Gly Asn Gly Asn Thr Ile Pro Ser Gly Thr Ile Gly Gln Ser
65                  70                  75                  80

Cys Ser Ile Asp Thr Ser Gly Asn Pro Ser Asn Cys Asp Ala Leu Ala
                85                  90                  95

Ser Ala Ile Ala Thr Cys Lys Ser Asn Gly Val Lys Val Val Leu Ser
            100                 105                 110

Leu Gly Gly Ala Val Gly Ala Tyr Ser Leu Ser Ser Gln Gln Glu Ala
        115                 120                 125

Glu Thr Ile Gly Gln Asn Leu Trp Asp Ala Tyr Gly Ala Gly Asn Gly
    130                 135                 140

Thr Val Pro Arg Pro Phe Arg Ser Thr Val Val Asp Gly Trp Asp Phe
145                 150                 155                 160

Asp Ile Glu Ala Ser Ser Gly Asn Gln Tyr Tyr Gln Tyr Leu Ile Ala
                165                 170                 175

Lys Leu Arg Ser Asn Phe Asn Gly Gly Asn Tyr Val Ile Thr Gly Ala
            180                 185                 190

Pro Gln Cys Pro Ile Pro Glu Pro Asn Met Gln Gln Ile Ile Thr Thr
        195                 200                 205

Ser Gln Phe Asp Tyr Leu Trp Val Gln Phe Tyr Asn Asn Pro Ser Cys
    210                 215                 220

Ser Val Gly Thr Ser Thr Pro Asn Phe Gln Asp Trp Val Ser Asn Ile
225                 230                 235                 240

Ala Asn Thr Pro Ser Ala Asn Ala Lys Ile Phe Leu Gly Val Pro Ala
                245                 250                 255

Ser Pro Leu Gly Ala Thr Gly Thr Glu Ser Gly Ala Gln Tyr Tyr Leu
            260                 265                 270

Glu Pro Ser Ala Leu Asn Thr Leu Val Gly Gln Phe Ser Ser Asn Pro
        275                 280                 285

Ala Phe Gly Gly Ile Met Met Trp Ala Ala Gly Phe Ser Asp Ala Asn
    290                 295                 300

Val Asn Asn Gly Cys Thr Tyr Ala Gln Glu Ala Lys Lys Ile Leu Thr
305                 310                 315                 320

Ser Gly Gln Ile Cys
                325
```

<210> SEQ ID NO 115
<211> LENGTH: 540
<212> TYPE: PRT
<213> ORGANISM: Trichoderma hamatum

<400> SEQUENCE: 115

```
Met Pro Leu Lys Val Phe Glu Ser Ala Ser Pro Ala Pro Ser His Pro
1               5                   10                  15

Ser Leu Ser His Leu Cys Leu Leu Val Phe Glu Ala Val Leu Glu Val
            20                  25                  30

Val Cys Val Ser Leu Pro Gly Tyr Ile Val Ala Arg Leu Gly His Phe
```

```
        35                  40                  45

Asp Ala Asp Lys Gln Lys Phe Leu Ala Asn Leu Asn Val Met Leu Phe
    50                  55                  60

Thr Pro Cys Leu Ile Phe Thr Lys Leu Ala Ser Gln Leu Asn Ala Glu
65                  70                  75                  80

Lys Leu Ser Asp Leu Ala Ile Ile Pro Ala Ile Phe Ile Val Gln Thr
                85                  90                  95

Leu Val Ser Trp Ile Val Ser Ile Leu Val Ala Lys Gly Phe Arg Phe
            100                 105                 110

Asn Lys Arg Ala Ser Asn Phe Val Thr Ala Met Gly Val Phe Gly Asn
        115                 120                 125

Ser Asn Ser Leu Pro Ile Ser Leu Val Leu Ser Leu Ser Gln Thr Ile
    130                 135                 140

Lys Gly Leu His Trp Asp Arg Ile Pro Gly Asp Asn Asp Asp Glu Val
145                 150                 155                 160

Gly Ala Arg Gly Ile Leu Tyr Leu Leu Ile Phe Gln Gln Leu Gly Gln
                165                 170                 175

Leu Val Arg Trp Ser Trp Gly Tyr His Val Leu Leu Ala Pro Lys Asp
            180                 185                 190

Lys Tyr Ala Glu Tyr Gln Asp Glu Ile Ala Glu Glu Gly Gln Tyr Arg
        195                 200                 205

Tyr Arg Asp Glu Glu Pro Asn Glu Gln Glu Pro Glu Ile Leu Ile Thr
    210                 215                 220

Gly Leu Asp Gly Asp Thr Glu Asp Asp Gly Glu Ser Asn Ala Ser Glu
225                 230                 235                 240

Asp Tyr Ile Pro Ala Gly Arg Thr Pro Leu Ala Ser Asn Ser Arg Ala
                245                 250                 255

Ser Leu Ala Gly Ser Ser Val Asp Asn Asp Asp Met Leu Asn Phe Lys
            260                 265                 270

Lys Gly Asn Tyr Thr Arg Gly Ser Ser Leu Ala Asn Thr Asp Leu Glu
        275                 280                 285

Asp Asp Ile Leu Ser Phe Pro Arg Ile Arg Leu Arg Asp Glu Ala Glu
    290                 295                 300

Val Glu His Gly Val Thr Ala Arg Ile Lys Lys Ser Leu Tyr Ser Leu
305                 310                 315                 320

Lys Asp Lys Ala Ser Ala Ala Met Thr Arg Gln Tyr Gln Arg Leu Pro
                325                 330                 335

Gln Pro Val Gln Thr Cys Leu Ser Phe Ile His Lys Ser Ile Thr Lys
            340                 345                 350

Thr Leu Gly Phe Val Trp Asp Phe Met Asn Pro Pro Leu Trp Ala Met
        355                 360                 365

Leu Ile Ala Val Ile Val Ala Ser Ile Pro Ser Leu Gln Gln Leu Phe
    370                 375                 380

Phe Glu Asp Gly Ser Phe Val Lys Asn Ser Val Thr Asn Ala Val Ser
385                 390                 395                 400

Ser Ser Gly Gly Val Ala Val Pro Leu Ile Leu Val Val Leu Gly Ala
                405                 410                 415

Asn Leu Ala Arg Asn Thr Ala Ala His Asp Ser Pro Ile Asp Pro Glu
            420                 425                 430

Glu Glu Lys Ile Gly Thr Lys Leu Leu Ile Ala Ser Leu Leu Ser Arg
        435                 440                 445

Met Val Leu Pro Thr Leu Ile Met Ala Pro Ile Leu Ala Ile Thr Ala
    450                 455                 460
```

```
Lys Tyr Leu Pro Ile Ser Ile Leu Asp Asp Pro Ile Phe Ile Val Val
465                 470                 475                 480

Cys Phe Leu Leu Thr Gly Ala Pro Ser Ala Leu Gln Leu Ala Gln Ile
                485                 490                 495

Cys Gln Ile Asn Asn Val Tyr Glu Gln Thr Met Gly Arg Ile Leu Phe
            500                 505                 510

Gln Ser Tyr Val Ile Trp Ile Leu Pro Ser Thr Leu Phe Leu Val Met
        515                 520                 525

Met Ala Leu Glu Val Ile Glu Trp Ala Thr Val Asn
    530                 535                 540


<210> SEQ ID NO 116
<211> LENGTH: 331
<212> TYPE: PRT
<213> ORGANISM: Trichoderma hamatum

<400> SEQUENCE: 116

Met Pro Ser Leu Ile Thr Val Ala Ser Val Leu Ala Leu Val Pro Ser
1               5                   10                  15

Ala Phe Ala Gly Trp Asn Val Asn Ser Lys Gln Asn Ile Ala Val Tyr
            20                  25                  30

Trp Gly Gln Asn Ser Ala Asn Gln Gln Ser Thr Gln Gln Arg Leu Ser
        35                  40                  45

Ala Tyr Cys Asn Ala Lys Ile Glu Ser Asp Ser Cys Asp Val Asp Ala
    50                  55                  60

Asn Ile Asn Val Ile Asp Ile Ala Phe Leu Asn Gly Ile Thr Pro Pro
65                  70                  75                  80

Met Thr Asn Phe Ala Asn Ala Gly Asp Arg Cys Thr Pro Phe Ser Asp
                85                  90                  95

Asn Pro Trp Leu Leu Ser Cys Pro Glu Ile Glu Ala Asp Ile Lys Thr
            100                 105                 110

Cys Gln Ala Asn Gly Lys Thr Ile Leu Ile Ser Leu Gly Gly Asp Ser
        115                 120                 125

Tyr Thr Gln Gly Gly Trp Ser Ser Thr Ser Ala Ala Gln Ala Ala Ala
    130                 135                 140

Lys Gln Val Trp Ala Met Phe Gly Pro Val Gln Ser Gly Ser Ser Thr
145                 150                 155                 160

Glu Arg Pro Phe Gly Ser Ala Val Val Asp Gly Phe Asp Phe Asp Phe
                165                 170                 175

Glu Ala Thr Thr Asn Asn Leu Ala Ala Phe Gly Ala Gln Leu Lys Ser
            180                 185                 190

Leu Ser Ala Ala Gly Gly Lys Lys Tyr Tyr Phe Ser Ala Ala Pro Gln
        195                 200                 205

Cys Phe Phe Pro Asp Ala Ala Val Gly Ala Leu Ile Asn Ala Val Pro
    210                 215                 220

Met Asp Trp Ile Gln Ile Gln Phe Tyr Asn Asn Pro Cys Gly Val Ser
225                 230                 235                 240

Gly Tyr Thr Pro Gly Thr Ser Asn Gln Asn Asn Tyr Asn Tyr Gln Thr
                245                 250                 255

Trp Asp Thr Trp Ala Lys Thr Ser Pro Asn Pro Asn Val Lys Leu Leu
            260                 265                 270

Val Gly Ile Pro Ala Gly Pro Gly Ala Gly Arg Gly Tyr Val Ser Gly
        275                 280                 285

Ser Gln Leu Thr Ser Val Phe Gln Tyr Ser Lys Gly Phe Ser Ser Thr
```

```
    290                 295                 300

Phe Ala Gly Ala Met Met Trp Asp Met Ser Gln Leu Phe Gln Asn Thr
305                 310                 315                 320

Gly Phe Glu Ala Gln Val Val Asn Ala Leu Lys
                325                 330


<210> SEQ ID NO 117
<211> LENGTH: 138
<212> TYPE: PRT
<213> ORGANISM: Trichoderma hamatum

<400> SEQUENCE: 117

Met Gln Leu Ser Asn Leu Phe Lys Leu Ala Leu Phe Thr Ala Ala Val
1               5                   10                  15

Ser Ala Asp Thr Val Ser Tyr Asp Thr Gly Tyr Asp Asp Ala Ser Arg
            20                  25                  30

Ser Leu Thr Val Val Ser Cys Ser Asp Gly Pro Asn Gly Leu Ile Thr
        35                  40                  45

Arg Tyr His Trp Gln Thr Gln Gly Gln Ile Pro Arg Phe Pro Tyr Ile
    50                  55                  60

Gly Gly Val Gln Ala Val Ala Gly Trp Asn Ser Pro Ser Cys Gly Thr
65                  70                  75                  80

Cys Trp Lys Leu Thr Tyr Ser Gly Lys Thr Ile Tyr Val Leu Ala Val
                85                  90                  95

Asp His Ala Gly Ala Gly Phe Asn Ile Gly Leu Asp Ala Met Asn Ala
            100                 105                 110

Leu Thr Asn Gly Gln Ala Val Ala Leu Gly Arg Val Ser Ala Thr Ala
        115                 120                 125

Ser Gln Val Ala Val Ser Asn Cys Gly Leu
    130                 135


<210> SEQ ID NO 118
<211> LENGTH: 101
<212> TYPE: PRT
<213> ORGANISM: Trichoderma hamatum

<400> SEQUENCE: 118

Met Gln Leu Thr Thr Val Val Ala Leu Phe Ala Ser Leu Ala Gly Ala
1               5                   10                  15

Ala Pro Ala Pro Glu Pro Ala Ala Glu Leu Val Ala Arg Asp Gly Pro
            20                  25                  30

Cys Ser Ser Gly Val Thr Asn Asn Val Pro Gln Cys Cys Gly Thr Gly
        35                  40                  45

Ile Leu Ser Val Val Tyr Val Asp Cys Lys Thr Pro Thr Gln Ala Pro
    50                  55                  60

Ser Ala Thr Asn Gln Leu Ser Ala Ile Cys Ala Arg Val Gly Leu Gln
65                  70                  75                  80

Ala Lys Cys Cys Thr Val Gly Ile Ala Gly Val Gly Val Leu Cys Gln
                85                  90                  95

Asp Ala Ile Pro Gln
            100


<210> SEQ ID NO 119
<211> LENGTH: 152
<212> TYPE: PRT
<213> ORGANISM: Trichoderma hamatum

<400> SEQUENCE: 119
```

```
Met Arg Phe Asn Ser Phe Ile Ala Val Ala Ala Ala Thr Ala Gln Ser
1               5                   10                  15

Ala Ala Gly Leu Gly Ile Asn Cys Leu Gly Asp Thr Leu Cys Gly Ile
            20                  25                  30

Ser Tyr Met Ser Gly Gly Arg Leu Thr Gln Phe Gln Thr Ile Phe Asp
        35                  40                  45

Asn Ile Phe Glu Lys Arg Ile Tyr Asp Asn Gly Asp Asp Ile Gly Cys
    50                  55                  60

Ile Glu Val His Ser Ile Asn Phe Lys Gly Ser Phe Lys Gly Thr Tyr
65                  70                  75                  80

Cys Ala Tyr Val Gln Asn Leu Asp Gly Ser Val Asn Gly Ala Thr Leu
                85                  90                  95

Lys Thr Leu Tyr Thr Glu Leu Val Asn Tyr Gly Cys Gly Ile Cys Gly
            100                 105                 110

Ser Ile Pro Ile His Tyr Ser Lys Gly Asp Asn Asp Ser Asn His Gly
        115                 120                 125

Glu Leu Ser Phe Asn Met Val Asp Ser Leu Pro Asp Asn Cys Glu Leu
    130                 135                 140

Gly Lys Pro Cys Ala Ala Thr Ser
145                 150
```

<210> SEQ ID NO 120
<211> LENGTH: 98
<212> TYPE: PRT
<213> ORGANISM: Trichoderma hamatum

<400> SEQUENCE: 120

```
Met Arg Thr Ser Thr Ala Ile Ile Ser Leu Ala Leu Val Val Met Gly
1               5                   10                  15

Ile Ala Ala Pro Ala Ala Glu Ala Gly Ser Val Val Ser Glu Ala Gly
            20                  25                  30

Phe Val Val Ser Glu Ala Gln Phe Asn Ala Ile Phe Pro Gly Arg Asn
        35                  40                  45

Pro Phe Tyr Ser Tyr Arg Ala Leu Thr Gly Ala Leu Gly Ser Tyr Pro
    50                  55                  60

Ser Phe Thr Asn Thr Ala Asp Asn Ala Thr Arg Leu Arg Glu Ala Ala
65                  70                  75                  80

Ala Phe Phe Ala Asn Val Asp His Glu Thr Asp Gly Leu Lys Phe Val
                85                  90                  95

Val Glu
```

<210> SEQ ID NO 121
<211> LENGTH: 357
<212> TYPE: PRT
<213> ORGANISM: Trichoderma hamatum

<400> SEQUENCE: 121

```
Met Ser Ala Ala Ser Arg Lys Ser Arg Ile Ala Thr Ser Val Ala Arg
1               5                   10                  15

Val Met Tyr Thr Asn Ala Val Tyr Phe Pro Ser Ser Arg Ile Tyr Gln
            20                  25                  30

Gly Asp Ser Pro Gly Met Leu Asn Tyr Ser Cys Ile Asn His Val Tyr
        35                  40                  45

Tyr Ala Tyr Ala Ser Val Thr Ala Asp Gly Asn Val Phe Leu Gly Asp
    50                  55                  60
```

```
Glu Trp Ala Asp Ala Arg Ala Pro Val Asp Gly Val Gln Gly Gly Leu
65                  70                  75                  80

Gly Ser Leu Met His Leu Lys Gln Arg His Pro His Leu Gln Val Val
                85                  90                  95

Leu Ser Ile Gly Gly Ser Thr Ala Ser Glu Val Phe Pro Ile Val Ala
            100                 105                 110

Ser Ser Thr Leu Leu Arg Asp Asn Phe Ala Arg Ser Ala Leu Gly Leu
        115                 120                 125

Val Glu Ala Ser Gly Leu Asp Gly Ile Asp Ile Ala Trp Glu Phe Pro
    130                 135                 140

Ser Gln Ala Lys His Gly His Asp Phe Leu Ala Leu Leu Ala Ala Val
145                 150                 155                 160

Arg Ile His Met Pro Glu Asp Arg Phe Ile Leu Thr Ala Val Leu Pro
                165                 170                 175

Ala Ala Lys Glu Val Leu Gln Leu Ile Asp Leu Ser Thr Ala Ala Glu
            180                 185                 190

Tyr Leu Asp Tyr Ile Asn Leu Val Ala Tyr Asp Phe Phe Gly Thr Trp
        195                 200                 205

Thr Ser Lys Thr Gly His His Ala Gln Leu Tyr Thr Met Asn Lys Asp
    210                 215                 220

Glu Pro Ser Ala Ser Thr Gly Val Ala Tyr Val Met Ser Gln Gly Phe
225                 230                 235                 240

Pro Ala Lys Ser Ile Leu Leu Gly Ile Pro Thr Tyr Gly Arg Ser Phe
                245                 250                 255

Leu Lys Ala Asn Gly Pro Gly Gln Asp Phe Asn Gly Val Gly Gly Gln
            260                 265                 270

Asp Gly Thr Phe Glu Tyr Gly Glu Leu Pro Arg Lys Gly Cys Lys Glu
        275                 280                 285

Ile Val Asp Arg Arg Tyr Ile Ala Ala Gln Cys Val Gly Gly Asp Gly
    290                 295                 300

Gly Phe Val Thr Tyr Asp Asn Pro Glu Thr Val Lys Val Lys Ala Glu
305                 310                 315                 320

Phe Cys Lys Gln Lys Gly Leu Gly Gly Leu Phe Tyr Trp Asn Gly Pro
                325                 330                 335

Ala Asp Ser Arg Asp Gln Ala Arg Ser Leu Ile Ala Ala Gly Phe Arg
            340                 345                 350

Ala Leu His Thr Ser
        355
```

<210> SEQ ID NO 122
<211> LENGTH: 344
<212> TYPE: PRT
<213> ORGANISM: Trichoderma hamatum

<400> SEQUENCE: 122

```
Met Thr Arg Leu Leu Asp Ala Ser Phe Leu Leu Leu Pro Ala Ile Ala
1               5                   10                  15

Ser Thr Leu Phe Gly Thr Ala Ser Ala Gln Asn Ala Thr Cys Ala Leu
            20                  25                  30

Lys Gly Lys Pro Ala Gly Lys Val Leu Met Gly Tyr Trp Glu Asn Trp
        35                  40                  45

Asp Gly Ser Ala Asn Gly Val His Pro Gly Phe Gly Trp Thr Pro Ile
    50                  55                  60

Glu Asn Pro Ile Ile Lys Gln Asn Gly Tyr Asn Val Ile Asn Ala Ala
65                  70                  75                  80
```

```
Phe Pro Val Ile Leu Ser Asp Gly Thr Val Leu Trp Glu Asn Asp Met
                85                  90                  95

Ala Pro Gly Thr Gln Val Ala Thr Pro Ala Glu Met Cys Ala Ala Lys
            100                 105                 110

Ala Ala Gly Ala Thr Ile Leu Leu Ser Ile Gly Gly Ala Thr Ala Gly
        115                 120                 125

Ile Asp Leu Ser Ser Ser Thr Val Ala Asp Lys Phe Ile Ala Thr Ile
    130                 135                 140

Val Pro Ile Leu Lys Gln Tyr Asn Phe Asp Gly Ile Asp Ile Asp Ile
145                 150                 155                 160

Glu Thr Gly Leu Val Asn Ser Gly Asn Ile Lys Thr Leu Ser Thr Ser
                165                 170                 175

Gln Ala Asn Leu Ile Arg Ile Ile Asp Gly Val Leu Ala Gln Met Pro
            180                 185                 190

Ser Asn Phe Gly Leu Thr Met Ala Pro Glu Thr Ala Tyr Val Thr Gly
        195                 200                 205

Gly Ser Ile Thr Tyr Gly Ser Ile Trp Gly Ser Tyr Leu Pro Ile Ile
    210                 215                 220

Gln Lys Tyr Val Gln Asn Gly Arg Leu Trp Trp Leu Asn Met Gln Tyr
225                 230                 235                 240

Tyr Asn Gly Asp Met Tyr Gly Cys Ser Gly Asp Ser Tyr Ala Ala Gly
                245                 250                 255

Thr Val Gln Gly Phe Ile Ala Gln Thr Asp Cys Leu Asn Ala Gly Leu
            260                 265                 270

Thr Val Gln Gly Thr Thr Ile Lys Val Pro Tyr Ser Met Gln Val Pro
        275                 280                 285

Gly Leu Pro Ala Gln Ser Gly Ala Gly Gly Gly Tyr Met Asn Pro Ser
    290                 295                 300

Leu Val Gly Gln Ala Trp Asp His Tyr Asn Gly Ala Leu Lys Gly Leu
305                 310                 315                 320

Met Thr Trp Ser Ile Asn Trp Asp Gly Ala Gly Gly Trp Thr Phe Gly
                325                 330                 335

Asp Asn Leu Leu Thr Arg Ile Gly
            340


<210> SEQ ID NO 123
<211> LENGTH: 409
<212> TYPE: PRT
<213> ORGANISM: Trichoderma hamatum

<400> SEQUENCE: 123

Met Thr Ser Ile Arg Arg Leu Ala Leu Tyr Leu Gly Ala Leu Leu Pro
1               5                   10                  15

Ala Val Leu Ala Ala Pro Ala Ala Leu His Lys Lys Pro Glu Ala Ala
            20                  25                  30

Pro Asn Lys Phe Ile Val Thr Leu Lys Glu Gly Ala Ser Ile Asp Thr
        35                  40                  45

Asp Ser His Leu Ala Trp Val Asn Asp Ile His Arg Arg Ser Leu Thr
    50                  55                  60

Lys Arg Ser Thr Ala Gly Val Glu Lys Thr Tyr Asn Ile His Thr Trp
65                  70                  75                  80

Ser Ala Tyr Ala Gly Glu Phe Asp Ala Glu Thr Ile Glu Gln Ile Lys
                85                  90                  95

Ser Ser Pro Asp Val Ala Ser Val Glu Pro Asp Tyr Ile Met Tyr Leu
```

```
            100                 105                 110

Ser Asp Ile Val Glu Asp Lys Arg Ala Leu Thr Thr Gln Ser Gly Ala
        115                 120                 125

Pro Trp Gly Leu Gly Thr Val Ser His Arg Thr Ser Gly Ser Thr Ser
    130                 135                 140

Tyr Ile Tyr Asp Ser Ser Ala Gly Ser Gly Thr Phe Ala Tyr Val Val
145                 150                 155                 160

Asp Ser Gly Ile Asn Thr Ser His Gln Gln Phe Gly Gly Arg Ala Ser
                165                 170                 175

Leu Gly Tyr Asn Ala Ala Gly Gly Gln His Val Asp Thr Leu Gly His
            180                 185                 190

Gly Thr His Val Ser Gly Thr Ile Gly Gly Ser Thr Tyr Gly Val Ala
        195                 200                 205

Lys Gln Ala Ser Leu Ile Ser Val Lys Val Phe Ala Gly Glu Ser Ala
    210                 215                 220

Thr Thr Ser Val Ile Leu Asp Gly Tyr Asn Trp Ala Val Asn Asp Ile
225                 230                 235                 240

Val Ser Arg Asn Arg Ala Ser Lys Ser Ala Ile Asn Met Ser Leu Gly
                245                 250                 255

Gly Pro Ala Ser Ser Thr Trp Thr Thr Ala Ile Asn Ala Ala Phe Asn
            260                 265                 270

Gln Gly Val Leu Thr Ile Val Ala Ala Gly Asn Gly Asp Ser Phe Gly
        275                 280                 285

Asn Pro Gln Pro Val Ser Gly Thr Ser Pro Ala Asn Val Pro Asn Ala
    290                 295                 300

Ile Thr Val Ala Ala Leu Asp Ile Asn Trp Arg Thr Ala Ser Phe Thr
305                 310                 315                 320

Asn Tyr Gly Ala Gly Val Asp Val Phe Ala Pro Gly Val Asn Ile Leu
                325                 330                 335

Ser Ser Trp Ile Gly Ser Asn Thr Ala Thr Asn Thr Ile Ser Gly Thr
            340                 345                 350

Ser Met Ala Thr Pro His Val Val Gly Leu Ala Leu Tyr Leu Gln Ser
        355                 360                 365

Leu Glu Gly Leu Thr Thr Pro Thr Ala Val Thr Asn Arg Ile Lys Ala
    370                 375                 380

Leu Ala Thr Ala Gly Arg Ile Thr Gly Ser Leu Asn Gly Ser Pro Asn
385                 390                 395                 400

Thr Leu Ile Phe Asn Gly Asn Ser Ala
                405


<210> SEQ ID NO 124
<211> LENGTH: 394
<212> TYPE: PRT
<213> ORGANISM: Trichoderma hamatum

<400> SEQUENCE: 124

Met Thr Ser Leu Tyr Leu Thr Ser Ala Leu Gly Leu Leu Cys Leu Leu
1               5                   10                  15

Pro Ala Ala Gln Ala Gly Trp Asn Pro Asn Ser Lys Asn Asn Ile Val
            20                  25                  30

Val Tyr Trp Gly Gln Asp Ala Gly Ser Ile Gly Gln Asn Arg Leu Ser
        35                  40                  45

Tyr Tyr Cys Glu Asn Ala Pro Asp Val Asp Val Ile Asn Ile Ser Phe
    50                  55                  60
```

```
Leu Val Gly Ile Thr Asp Leu Asn Leu Asn Leu Ala Asn Val Gly Asn
65                  70                  75                  80

Asn Cys Thr Ser Phe Ala Gln Asp Pro Asn Leu Leu Asn Cys Pro Gln
                85                  90                  95

Val Ala Ala Asp Ile Val Glu Cys Gln Gln Thr Tyr Gly Lys Thr Ile
            100                 105                 110

Met Met Ser Leu Phe Gly Ser Thr Tyr Thr Glu Ser Gly Phe Ser Ser
        115                 120                 125

Ser Ser Thr Ala Val Ser Ala Ala Gln Glu Ile Trp Ala Met Phe Gly
    130                 135                 140

Pro Val Gln Ser Gly Asn Ser Thr Pro Arg Pro Phe Gly Asn Ala Val
145                 150                 155                 160

Ile Asp Gly Phe Asp Phe Asp Leu Glu Asp Pro Ile Glu Asn Asn Met
                165                 170                 175

Glu Pro Phe Ala Ala Glu Leu Arg Ser Leu Thr Ser Ala Ala Thr Ser
            180                 185                 190

Lys Lys Phe Tyr Leu Ser Ala Ala Pro Gln Cys Val Tyr Pro Asp Ala
        195                 200                 205

Ser Asp Gln Thr Phe Leu Gln Gly Glu Val Ala Phe Asp Trp Leu Asn
    210                 215                 220

Ile Gln Phe Tyr Asn Asn Gly Cys Gly Thr Ser Tyr Tyr Pro Ser Gly
225                 230                 235                 240

Tyr Asn Tyr Ala Thr Trp Asp Asn Trp Val Lys Thr Val Ser Ala Asn
                245                 250                 255

Pro Asn Thr Lys Leu Leu Val Gly Thr Pro Ala Ser Val His Ala Val
            260                 265                 270

Asn Phe Ala Asn Tyr Phe Pro Thr Asn Asp Gln Leu Ala Gly Ala Ile
        275                 280                 285

Ser Ser Ser Lys Ser Tyr Gly Ser Phe Ala Gly Val Met Leu Trp Asp
    290                 295                 300

Met Ala Gln Leu Phe Gly Asn Pro Gly Tyr Leu Asp Leu Ile Val Ala
305                 310                 315                 320

Asp Leu Gly Gly Ala Ser Thr Pro Pro Pro Pro Ala Ser Thr Thr Leu
                325                 330                 335

Ser Thr Val Thr Arg Ser Ser Thr Ala Ser Ser Gly Pro Thr Ser Pro
            340                 345                 350

Pro Pro Ser Gly Gly Gly Ser Val Pro Gln Trp Gly Gln Cys Gly Gly
        355                 360                 365

Gln Gly Tyr Thr Gly Pro Thr Gln Cys Gln Ser Pro Tyr Thr Cys Val
    370                 375                 380

Val Glu Ser Gln Trp Trp Ala Ser Cys Gln
385                 390


<210> SEQ ID NO 125
<211> LENGTH: 394
<212> TYPE: PRT
<213> ORGANISM: Trichoderma hamatum

<400> SEQUENCE: 125

Met Val Gln Ser Ala Ala Tyr Leu Gly Ala Leu Leu Ala Thr Leu Pro
1               5                   10                  15

Leu Ala Arg Ala Gly Phe Asn Ala Ser Ser Thr Gln Asn Ile Ala Val
            20                  25                  30

Tyr Trp Gly Gln Asn Ser Ala Asn Gln Ala Thr Ser Gln Gln Arg Leu
        35                  40                  45
```

```
Ser Thr Tyr Cys Ala Asn Ala Asp Ile Asp Ile Ile Pro Ile Gly Phe
    50                  55                  60

Met Asn Gly Ile Ser Pro Val Ile Thr Asn Phe Ala Asn Ala Gly Asp
65                  70                  75                  80

Asn Cys Thr Ala Phe Ala Asp Asn Gln Asn Ala Leu Asn Cys Pro Gln
                85                  90                  95

Ile Glu Gln Asp Ile Ile Thr Cys Gln Gln Thr Tyr Gly Lys Thr Ile
            100                 105                 110

Leu Ile Ser Leu Gly Gly Gly Ser Tyr Thr Gln Gly Gly Phe Ser Ser
        115                 120                 125

Thr Gly Val Ala Thr Ser Ala Ala Gln Thr Val Trp Asn Met Phe Gly
    130                 135                 140

Pro Val Asn Pro Asn Ser Asn Val Asp Arg Pro Phe Gly Ser Ala Val
145                 150                 155                 160

Val Asp Gly Val Asp Phe Asp Phe Glu Ser Gly Val Asn Asn Leu Ala
                165                 170                 175

Thr Phe Ala Thr Glu Leu Arg Ser Leu Met Asp Ala Ser Ala Ser Ser
            180                 185                 190

Ala Asn Arg Lys Phe Tyr Leu Ser Ala Ala Pro Gln Cys Val Tyr Pro
        195                 200                 205

Asp Phe Ala Asp Asn Pro Ala Leu Asn Gly Ser Val Phe Phe Asp Phe
    210                 215                 220

Ile Met Ile Gln Tyr Tyr Asn Asn Gly Cys Gly Val Ser Ser Tyr Val
225                 230                 235                 240

Pro Gly Ala Thr Thr Gln Trp Asn Tyr Asn Phe Asp Val Trp Asp Asn
                245                 250                 255

Trp Ala His Thr Val Ser Lys Asn Pro Asn Val Arg Ile Leu Leu Gly
            260                 265                 270

Ile Ala Ala Asn Thr Gly Ala Ala Ser Gly Tyr Val Ser Gly Thr Gln
        275                 280                 285

Leu Ser Ala Val Ile Ser Phe Thr Lys Gln Tyr Ser Ser Phe Ala Gly
    290                 295                 300

Ile Met Met Trp Asp Met Ser Gln Leu Tyr Gln Asn Ser Gly Phe Leu
305                 310                 315                 320

Gly Gln Val Val Ser Asp Leu Ala Ala Ser Gly Ser Thr Pro Pro Ala
                325                 330                 335

Thr Thr Ser Ser Gly Ala Ser Lys Thr Thr Thr Ser Ser Gly Gly Ser
            340                 345                 350

Thr Ser Pro Thr Gly Gly Ser Val Pro Gln Trp Gly Gln Cys Gly Gly
        355                 360                 365

Glu Gly Tyr Thr Gly Pro Thr Gln Cys Gln Ser Pro Tyr Lys Cys Val
    370                 375                 380

Phe Ser Ser Gln Trp Trp Ser Ser Cys Gln
385                 390


<210> SEQ ID NO 126
<211> LENGTH: 148
<212> TYPE: PRT
<213> ORGANISM: Trichoderma hamatum

<400> SEQUENCE: 126

Met Tyr Phe Ala Asn Thr Leu Leu Ser Ile Ala Gly Ala Ala Ser Ile
1               5                   10                  15

Ala Asn Ala Leu Gly Ser Asn Cys Gln Asp Ser Gly Val Cys Ala Asp
```

```
            20                  25                  30

Ile Asn Ala Asn Leu Ser Phe Ala Ile Glu Gln Leu Lys Gly Met Asp
        35                  40                  45

Gln Leu Gln Arg Phe Ser Asp Gly Gln His Ile Thr Cys Val Asp Thr
    50                  55                  60

Asp Ser Glu Gly Asn Ser Ser Leu Cys Leu Ser Tyr Gln Asp Thr Gly
65                  70                  75                  80

Arg Ser Trp Thr Val Phe Gln Thr Ala Trp Phe Ala Gln Ser Leu Val
                85                  90                  95

Glu Gln Gly Cys Gln Ala Cys Gly Ser Leu Ser Met Gly Ser His His
            100                 105                 110

Gly Glu Leu Val Ala Ser Val Ile Thr Lys Ser Thr Ser Gly Leu Asp
        115                 120                 125

Thr Ser Gly Ala Arg Arg Gly Met Asp Met Val Gln Leu Ala Val Arg
    130                 135                 140

Ala Gly Asp Arg
145


<210> SEQ ID NO 127
<211> LENGTH: 1380
<212> TYPE: DNA
<213> ORGANISM: Chitinophaga oryzae

<400> SEQUENCE: 127

ttaccgactt caggtccccc cggctttcat ggcttgacgg gcggtgtgta caaggtccgg     60

gaacgtattc accgtatcat tgctgatata cgattactag cgattccagc ttcatgaggg    120

cgagttgcag ccctcaattc gaactgagat aggatttttg agattagcat cctgttacca    180

ggtagcagcc ctttgttcct accattgtag cacgtgtgta gccctgggca taaaggccat    240

gatgacttga catcatcccc tccttcctcg cgtcttacga cggcagtttc tttagagttc    300

ccagcttaac ctgttggcaa ctaaagatag ggttgcgct cgttgcggga cttaacccaa     360

cacctcacgg cacgagctga cgacagccat gcagcacctt acaaaatgtg tattgctaca    420

aaatctgctt tcacagacgg gcatcttgca ttctagccca ggtaaggttc ctcgcgtatc    480

atcgaattaa accacatgct ccaccgcttg tgcggacccc cgtcaattcc tttgagtttc    540

aaccttgcgg tcgtacttcc caggtggatt acttaatgct ttcgctcaga cacttactgt    600

atatcgcaaa tgtcgagtaa tcatcgttta gggcgtggac taccagggta tctaatcctg    660

tttgatcccc acgctttcgt gcctcagcgt caatatttgt gtagccagct gccttcgcaa    720

ttggtgttct atgtcatatc tatgcatttc accgctacat gacatattcc gctaacctcc    780

acaatattca agacttatag tatccatggc agtttccagg ttaagcctgg agatttcacc    840

acggacttac aaatccgcct acgcaccctt taaacccagt gaatccggat aacgcttgca    900

ccctccgtat taccgcggct gctggcacgg agttagccgg tgcttattcc tctggtaccg    960

tcaacactct tagaaaaagg tgatttcgtc ccagataaaa gaagtttaca atccagagga   1020

ccttcatcct tcacgcggca tggctggttc agacttgcgt ccattgacca atattcctta   1080

ctgctgcctc ccgtaggagt cgggcccgtg tctcagtgcc cgtgtgactg gtcgcgctct   1140

cacgccagtt actgatcgtc ggcttggtga gccgttacct caccaactac ctaatcaggc   1200

gcacgcccat cttcaagcga aattctttaa tcattaagtg atgccaccct gtgattttac   1260

gatgtattaa tccgaatttc ttcgggctat ccatctcttg aaggaaggtt gcgtacgtgt   1320

tccgcacccg tttgccggtc gccacccagt attgctacct gtgctgcccc tcgacttgca   1380
```

<210> SEQ ID NO 128
<211> LENGTH: 137
<212> TYPE: PRT
<213> ORGANISM: Chitinophaga oryzae

<400> SEQUENCE: 128

```
Met Lys Ile Ala Ile Ile Asn Gly Pro Asn Leu Asn Leu Leu Gly Lys
1               5                   10                  15

Arg Glu Pro Gly Ile Tyr Gly Asn Glu Pro Phe Glu Asp Tyr Phe Glu
            20                  25                  30

Lys Leu Lys Val Leu Phe Ala Asp Val Glu Leu Glu Tyr Tyr Gln Asn
        35                  40                  45

Asn Ser Glu Gly Asn Ile Ile Asp Ile Leu His Glu Ile Gly Phe Thr
    50                  55                  60

Tyr Asp Gly Ile Leu Leu Asn Ala Gly Ala Tyr Thr His Tyr Ser Ile
65                  70                  75                  80

Ala Ile Arg Asp Ala Ile Ala Ala Ile Lys Thr Pro Val Leu Glu Ile
                85                  90                  95

His Ile Ser Asn Val His Ala Arg Glu Glu Phe Arg His Lys Ser Val
            100                 105                 110

Ile Ala Pro Val Cys Lys Gly Met Ile Ala Gly Leu Gly Met Lys Gly
        115                 120                 125

Tyr Ala Leu Gly Ile Asn Tyr Phe Leu
    130                 135
```

<210> SEQ ID NO 129
<211> LENGTH: 164
<212> TYPE: PRT
<213> ORGANISM: Chitinophaga oryzae

<400> SEQUENCE: 129

```
Met Lys Gln Val Glu Val Gly Ile Ile Met Gly Ser Ser Ser Asp Ala
1               5                   10                  15

Pro Ile Met Arg Gln Ala Ile Asp Val Leu Lys Lys Phe Asp Ile Gly
            20                  25                  30

Tyr Glu Phe Asn Val Val Ser Ala His Arg Ser Pro Gln Arg Met Phe
        35                  40                  45

Asp Tyr Ala Gly Thr Ala Glu Glu Arg Gly Leu Lys Val Ile Ile Ala
    50                  55                  60

Gly Ala Gly Gly Ala Ala His Leu Pro Gly Met Val Ala Ala Ile Thr
65                  70                  75                  80

Thr Leu Pro Val Val Gly Val Pro Ile Lys Ser Ser Asn Ser Leu Asp
                85                  90                  95

Gly Trp Asp Ser Leu Leu Ser Ile Val Gln Met Pro Gly Asp Ile Pro
            100                 105                 110

Val Ala Thr Val Ser Val Asn Gly Ala Arg Asn Ala Gly Leu Leu Ala
        115                 120                 125

Val Gln Ile Leu Ala Thr Cys Asn Pro Glu Leu Arg Gln Lys Leu Ala
    130                 135                 140

Asp Met Lys Arg Glu Asn Asn Glu Lys Val Asn Gln Met Asn Glu Thr
145                 150                 155                 160

Leu Asp Arg Ser
```

<210> SEQ ID NO 130
<211> LENGTH: 331

```
<212> TYPE: PRT
<213> ORGANISM: Chitinophaga oryzae

<400> SEQUENCE: 130

Met Asn Ser Phe Gly Arg Leu Phe Arg Val Asn Val Phe Gly Glu Ser
1               5                   10                  15

His Gly Ala Ser Val Gly Val Asn Ile Asp Gly Val Pro Ala Gly Ile
            20                  25                  30

Pro Leu Lys Gln Glu Asp Phe Leu Pro Asp Leu Asp Arg Arg Lys Ala
        35                  40                  45

Gly Ala Lys Gly Thr Thr Pro Arg Lys Glu Asp Asp Leu Pro Tyr Ile
    50                  55                  60

Lys Ser Gly Val Phe Asn Asp His Thr Thr Gly Ala Pro Ile Thr Ile
65                  70                  75                  80

Leu Phe Glu Asn Asn Asn Thr Arg Ser Thr Asp Tyr Glu Lys Leu Arg
                85                  90                  95

Glu Phe Pro Arg Pro Gly His Ala Asp Phe Val Ala Thr His Lys Tyr
            100                 105                 110

Gly Gly Phe Glu Asp Tyr Arg Gly Gly Gly His Phe Ser Gly Arg Leu
        115                 120                 125

Thr Leu Asn Leu Val Ala Ala Gly Val Ile Ala Lys Lys Ile Leu Gly
    130                 135                 140

Glu Ser Ile Lys Val Thr Ala Thr Leu Lys Glu Val Ala Gly Leu Pro
145                 150                 155                 160

Asp Ala Glu Gln Gly Leu Glu Ala Ala Ile Ala Ala Lys Asp Ser Val
                165                 170                 175

Gly Gly Ile Val Glu Cys Val Val Glu Gly Leu Pro Ile Gly Leu Gly
            180                 185                 190

Glu Pro Phe Phe Asp Ser Val Glu Ser Thr Ile Ala His Ala Val Phe
        195                 200                 205

Ala Ile Pro Ala Ile Lys Gly Ile Glu Phe Gly Ala Gly Phe Ala Ala
    210                 215                 220

Ala Lys Met Lys Gly Ile Glu His Asn Asp Ala Ile Leu Asp Ala Ser
225                 230                 235                 240

Gly Lys Thr Ala Thr Asn Asn Ala Gly Gly Val Val Gly Gly Ile Thr
                245                 250                 255

Asn Gly Asn Pro Leu Val Phe Arg Val Ala Val Lys Pro Thr Ser Ser
            260                 265                 270

Thr Pro Lys Glu Gln His Thr Leu Asn Ile Lys Ser Gly Gln Val Glu
        275                 280                 285

Ala Phe Ser Val Lys Gly Arg His Asp Leu Cys Ile Ala Leu Arg Val
    290                 295                 300

Pro Val Val Leu Glu Ala Val Ala Ala Met Ala Leu Ala Asp Leu Met
305                 310                 315                 320

Met Val Glu Gln Arg Ser Pro Arg Ile Trp Lys
                325                 330


<210> SEQ ID NO 131
<211> LENGTH: 298
<212> TYPE: PRT
<213> ORGANISM: Chitinophaga oryzae

<400> SEQUENCE: 131

Met Ser Gly Gln Leu Lys Glu Val Arg Asn Arg Ile Lys Ser Thr Gln
1               5                   10                  15
```

```
Ser Asn Leu Gln Ile Thr Lys Ala Met Lys Met Val Ser Ala Ala Lys
            20                  25                  30

Leu Arg Arg Ala Gln Asp Ala Ile Leu Leu Met Arg Pro Tyr Ala Val
        35                  40                  45

Lys Leu Gln Glu Met Leu Gln Asn Ile Val Ser Asn Ser Glu Gly Ser
    50                  55                  60

Ile Asp Leu Ala Leu Ala Ala Glu Arg Pro Val Glu Lys Val Leu Leu
65                  70                  75                  80

Val Val Ile Thr Ser Asp Arg Gly Leu Cys Gly Ala Tyr Asn Ser Asn
                85                  90                  95

Leu Ile Lys Leu Thr Lys Gln Val Ile Arg Glu Lys Tyr Gln Glu Gln
            100                 105                 110

Phe Glu Lys Gly His Val Thr Ile Leu Pro Ile Gly Lys Lys Gly Trp
        115                 120                 125

Glu His Phe Gly Lys Asn Gly Tyr Lys Met Asn Asp Thr Tyr Trp His
    130                 135                 140

Leu Phe Ala His Leu Asp Phe Asp His Val Lys Glu Ala Ala Ala Val
145                 150                 155                 160

Ala Thr Asp Gly Phe Thr Ser Gly Gln Tyr Asp Ala Val Glu Ile Ile
                165                 170                 175

Tyr Ser Gln Phe Lys Asn Ala Ala Thr Gln Phe Tyr Ile Ser Glu Gln
            180                 185                 190

Phe Leu Pro Ile Ala Lys Pro Gln Glu Val Glu Thr Gly Lys Gly Lys
        195                 200                 205

Lys Ala Ala Lys Ala Asp Phe Ile Phe Glu Pro Glu Lys Gln Thr Leu
    210                 215                 220

Ile Ala Glu Leu Met Pro Lys Ile Leu Asn Thr Gln Leu Tyr Lys Ala
225                 230                 235                 240

Met Leu Asp Ala Asn Ala Ser Glu His Gly Ala Arg Met Thr Ala Met
                245                 250                 255

Asp Lys Ala Thr Glu Asn Ala Asn Glu Leu Leu Arg Asn Tyr Lys Ile
            260                 265                 270

Thr Tyr Asn Arg Ala Arg Gln Ala Ala Ile Thr Thr Glu Leu Thr Glu
        275                 280                 285

Ile Val Ser Gly Ala Ala Ala Leu Glu Gly
    290                 295
```

<210> SEQ ID NO 132
<211> LENGTH: 1378
<212> TYPE: DNA
<213> ORGANISM: Bacillus velenzensis

<400> SEQUENCE: 132

```
gggagcttgc tccctgatgt tagcggcgga cgggtgagta acacgtgggt aacctgcctg     60

taagactggg ataactccgg gaaaccgggg ctaataccgg atggttgttt gaaccgcatg    120

gttcagacat aaaaggtggc ttcggctacc acttacagat ggacccgcgg cgcattagct    180

agttggtgag gtaacggctc accaaggcaa cgatgcgtag ccgacctgag agggtgatcg    240

gccacactgg gactgagaca cggcccagac tcctacggga ggcagcagta gggaatcttc    300

cgcaatggac gaaagtctga cggagcaacg ccgcgtgagt gatgaaggtt ttcggatcgt    360

aaagctctgt tgttagggaa gaacaagtgc cgttcaaata gggcggcacc ttgacggtac    420

ctaaccagaa agccacggct aactacgtgc cagcagccgc ggtaatacgt aggtggcaag    480

cgttgtccgg aattattggg cgtaaagggc tcgcaggcgg tttcttaagt ctgatgtgaa    540
```

```
agccccggc tcaaccgggg agggtcattg gaaactgggg aacttgagtg cagaagagga    600

gagtggaatt ccacgtgtag cggtgaaatg cgtagagatg tggaggaaca ccagtggcga    660

aggcgactct ctggtctgta actgacgctg aggagcgaaa gcgtggggag cgaacaggat    720

tagataccct ggtagtccac gccgtaaacg atgagtgcta agtgttaggg ggtttccgcc    780

ccttagtgct gcagctaacg cattaagcac tccgcctggg gagtacggtc gcaagactga    840

aactcaaagg aattgacggg ggcccgcaca agcggtggag catgtggttt aattcgaagc    900

aacgcgaaga accttaccag gtcttgacat cctctgacaa tcctagagat aggacgtccc    960

cttcgggggc agagtgacag gtggtgcatg gttgtcgtca gctcgtgtcg tgagatgttg   1020

ggttaagtcc cgcaacgagc gcaacccttg atcttagttg ccagcattca gttgggcact   1080

ctaaggtgac tgccggtgac aaaccggagg aaggtgggga tgacgtcaaa tcatcatgcc   1140

ccttatgacc tgggctacac acgtgctaca atgggcagaa caaagggcag cgaaaccgcg   1200

aggttaagcc aatcccacaa atctgttctc agttcggatc gcagtctgca actcgactgc   1260

gtgaagctgg aatcgctagt aatcgcggat cagcatgccg cggtgaatac gttcccgggc   1320

cttgtacaca ccgcccgtca caccacgaga gtttgtaaca cccgaagtcg gtgaggta     1378
```

<210> SEQ ID NO 133
<211> LENGTH: 292
<212> TYPE: PRT
<213> ORGANISM: Bacillus velenzensis

<400> SEQUENCE: 133

```
Met Ala Ile Thr Ala Gln Gln Val Lys Glu Leu Arg Gln Lys Thr Gly
1               5                   10                  15

Ala Gly Met Met Asp Cys Lys Lys Ala Leu Thr Glu Thr Asp Gly Asp
            20                  25                  30

Met Asp Lys Ala Ile Asp Leu Leu Arg Glu Lys Gly Ile Ala Lys Ala
        35                  40                  45

Ala Lys Lys Ala Asp Arg Ile Ala Ala Glu Gly Ser Thr Leu Ile Lys
    50                  55                  60

Thr Asp Gly Asn Lys Gly Val Ile Leu Glu Val Asn Ser Glu Thr Asp
65                  70                  75                  80

Phe Val Ala Lys Asn Glu Gly Phe Lys Glu Leu Leu Asn Thr Leu Ala
                85                  90                  95

Asp His Leu Leu Ala Asn Ala Pro Ala Asp Leu Glu Glu Ala Met Gly
            100                 105                 110

Gln Lys Met Glu Asn Gly Ser Thr Val Glu Glu Tyr Ile Thr Ser Asn
        115                 120                 125

Val Ala Lys Ile Gly Glu Lys Ile Thr Leu Arg Arg Phe Ala Val Ile
    130                 135                 140

Thr Lys Glu Asp Ser Glu Ala Phe Gly Ala Tyr Leu His Met Gly Gly
145                 150                 155                 160

Arg Ile Gly Val Leu Ser Val Leu Ser Gly Thr Asp Glu Asp Leu Ala
                165                 170                 175

Lys Asp Ile Ala Met His Val Ala Ala Val Asn Pro Arg Tyr Ile Ser
            180                 185                 190

Arg Asp Gln Val Ser Glu Glu Glu Ala Asn His Glu Arg Gln Ile Leu
        195                 200                 205

Thr Gln Gln Ala Leu Gln Glu Gly Lys Pro Glu Asn Ile Val Ala Lys
    210                 215                 220
```

```
Met Val Glu Gly Arg Leu Asn Lys Phe Phe Glu Glu Ile Cys Leu Leu
225                 230                 235                 240

Asp Gln Ala Phe Val Lys Asn Pro Asp Glu Lys Val Lys Gln Val Val
                245                 250                 255

Ala Ala Lys Asn Ala Ser Val Lys Thr Tyr Val Arg Tyr Glu Val Gly
            260                 265                 270

Glu Gly Ile Glu Lys Arg Gln Glu Asn Phe Ala Glu Glu Val Met Asn
        275                 280                 285

Gln Val Lys Lys
    290


<210> SEQ ID NO 134
<211> LENGTH: 132
<212> TYPE: PRT
<213> ORGANISM: Bacillus velenzensis

<400> SEQUENCE: 134

Met Lys Thr Val Lys Val Asn Ile Val Thr Pro Asp Gly Pro Val Tyr
1               5                   10                  15

Asp Ala Asp Ile Glu Met Val Ser Val Arg Ala Glu Ser Gly Asp Leu
            20                  25                  30

Gly Ile Leu Pro Gly His Ile Pro Thr Val Ala Pro Leu Lys Ile Gly
        35                  40                  45

Ala Val Arg Leu Lys Lys Asp Gly Gln Thr Glu Leu Ala Ala Val Ser
    50                  55                  60

Gly Gly Phe Leu Glu Val Arg Pro Asp Gln Val Thr Ile Leu Ala Gln
65                  70                  75                  80

Ala Ala Glu Thr Ala Glu Ser Ile Asp Lys Glu Arg Ala Leu Ala Ala
                85                  90                  95

Lys Lys Arg Ala Glu Asp Arg Leu Asn Lys Arg Ser Asp Asp Thr Asp
            100                 105                 110

Ile Arg Arg Ala Glu Leu Ala Leu Gln Arg Ala Val Asn Arg Leu Asp
        115                 120                 125

Val Ala Gly Asn
    130


<210> SEQ ID NO 135
<211> LENGTH: 475
<212> TYPE: PRT
<213> ORGANISM: Bacillus velenzensis

<400> SEQUENCE: 135

Met Asn Phe Glu Thr Val Ile Gly Leu Glu Val His Val Glu Leu Lys
1               5                   10                  15

Thr Lys Ser Lys Ile Phe Ser Ser Ser Pro Thr Pro Phe Gly Ala Glu
            20                  25                  30

Ala Asn Thr Gln Thr Ser Val Ile Asp Leu Gly Tyr Pro Gly Val Leu
        35                  40                  45

Pro Val Leu Asn Lys Glu Ala Val Glu Phe Ala Met Lys Ala Ala Met
    50                  55                  60

Ala Leu Asn Cys Glu Ile Ala Thr Asp Thr Lys Phe Asp Arg Lys Asn
65                  70                  75                  80

Tyr Phe Tyr Pro Asp Asn Pro Lys Ala Tyr Gln Ile Ser Gln Phe Asp
                85                  90                  95

Lys Pro Ile Gly Glu Asn Gly Trp Ile Glu Ile Glu Val Gly Gly Lys
            100                 105                 110
```

```
Thr Lys Lys Ile Gly Ile Thr Arg Leu His Leu Glu Glu Asp Ala Gly
        115                 120                 125

Lys Leu Thr His Thr Gly Asp Gly Ser Leu Val Asp Phe Asn Arg Gln
    130                 135                 140

Gly Thr Pro Leu Val Glu Ile Val Ser Glu Pro Asp Ile Arg Thr Pro
145                 150                 155                 160

Glu Glu Ala Tyr Ala Tyr Leu Glu Lys Leu Lys Ser Ile Ile Gln Tyr
                165                 170                 175

Thr Gly Val Ser Asp Cys Lys Met Glu Glu Gly Ser Leu Arg Cys Asp
            180                 185                 190

Ala Asn Ile Ser Leu Arg Pro Ile Gly Gln Glu Lys Phe Gly Thr Lys
        195                 200                 205

Thr Glu Leu Lys Asn Leu Asn Ser Phe Ala Phe Val Gln Lys Gly Leu
    210                 215                 220

Glu Tyr Glu Glu Lys Arg Gln Glu Gln Val Leu Leu Ser Gly Gly Val
225                 230                 235                 240

Ile Gln Gln Glu Thr Arg Arg Tyr Asp Glu Ala Thr Lys Lys Thr Ile
                245                 250                 255

Leu Met Arg Val Lys Glu Gly Ser Asp Asp Tyr Arg Tyr Phe Pro Glu
            260                 265                 270

Pro Asp Leu Val Glu Leu Tyr Ile Asp Asp Glu Trp Lys Glu Arg Val
        275                 280                 285

Arg Ala Thr Ile Pro Glu Leu Pro Asp Glu Arg Arg Lys Arg Tyr Ile
    290                 295                 300

Glu Glu Leu Gly Leu Pro Ala Tyr Asp Ala Met Val Leu Thr Leu Thr
305                 310                 315                 320

Lys Glu Met Ala Asp Phe Phe Glu Glu Thr Val Asn Lys Gly Ala Glu
                325                 330                 335

Ala Lys Gln Ala Ser Asn Trp Leu Met Gly Glu Val Ser Ala Tyr Leu
            340                 345                 350

Asn Ala Glu Gln Lys Glu Leu Glu Asp Val Ala Leu Thr Pro Glu Gly
        355                 360                 365

Leu Ala Gly Met Ile Lys Leu Ile Glu Lys Gly Thr Ile Ser Ser Lys
    370                 375                 380

Ile Ala Lys Lys Val Phe Lys Glu Leu Ile Glu Lys Gly Gly Asp Ala
385                 390                 395                 400

Glu Lys Ile Val Lys Glu Lys Gly Leu Val Gln Ile Ser Asp Glu Ser
                405                 410                 415

Val Leu Leu Lys Leu Val Thr Asp Ala Leu Asp Ser Asn Pro Gln Ser
            420                 425                 430

Ile Glu Asp Phe Lys Asn Gly Lys Asp Arg Ala Ile Gly Phe Leu Val
        435                 440                 445

Gly Gln Ile Met Lys Ala Ser Lys Gly Gln Ala Asn Pro Pro Met Val
    450                 455                 460

Asn Lys Ile Leu Leu Glu Glu Ile Lys Lys Arg
465                 470                 475
```

<210> SEQ ID NO 136
<211> LENGTH: 427
<212> TYPE: PRT
<213> ORGANISM: Bacillus velenzensis

<400> SEQUENCE: 136

```
Met Ser Tyr Leu Ile Lys Asn Gly Trp Met Leu Asn Glu Gln Gly Glu
1               5                   10                  15
```

```
Lys Val Ala Gln Asp Ile Arg Val Thr Gly Glu Phe Ile Thr Glu Thr
            20                  25                  30

Gly Leu Leu Thr Ala Lys Asp Gly Glu Thr Val Ile Asp Ala Glu Gly
        35                  40                  45

Leu Phe Val Ser Pro Gly Leu Val Asp Leu His Val His Phe Arg Glu
    50                  55                  60

Pro Gly Gly Glu Lys Lys Glu Thr Ile Glu Thr Gly Ser Lys Ala Ala
65                  70                  75                  80

Ala Arg Gly Gly Phe Thr Thr Val Ala Ala Met Pro Asn Thr Arg Pro
                85                  90                  95

Val Pro Asp Thr Lys Glu Gln Met Glu Trp Leu Gln Asn Arg Ile Lys
            100                 105                 110

Glu Thr Ser Ser Val Arg Val Leu Pro Tyr Ala Ser Ile Thr Ile Arg
        115                 120                 125

Gln Ile Gly Glu Glu Met Thr Asp Phe Glu Ala Leu His Glu Ala Gly
    130                 135                 140

Ala Phe Ala Phe Thr Asp Asp Gly Val Gly Val Gln Thr Ala Gly Met
145                 150                 155                 160

Met Tyr Glu Ala Met Lys Arg Ala Ala Ser Met Asn Lys Ala Ile Val
                165                 170                 175

Ala His Cys Glu Asp Asn Ser Leu Ile Tyr Gly Gly Ser Val His Glu
            180                 185                 190

Gly Ser Phe Ser Lys Ala Asn Gly Leu Asn Gly Ile Pro Ser Ile Cys
        195                 200                 205

Glu Ala Val His Ile Ala Arg Asp Val Leu Leu Ala Glu Ala Ala Asp
    210                 215                 220

Cys His Tyr His Val Cys His Ile Ser Thr Lys Glu Ser Val Arg Ala
225                 230                 235                 240

Val Arg Asp Ala Lys Lys Ala Gly Ile Arg Val Thr Ala Glu Val Ser
                245                 250                 255

Pro His His Leu Leu Leu Cys Asp Glu Asp Ile Pro Gly Leu Asp Thr
            260                 265                 270

Asn Phe Lys Met Asn Pro Pro Leu Arg Ser Lys Glu Asp Arg Glu Ala
        275                 280                 285

Leu Ile Glu Gly Leu Leu Asp Gly Thr Ile Asp Phe Ile Ala Thr Asp
    290                 295                 300

His Ala Pro His Thr Glu Glu Glu Lys Asn Thr Asp Met Lys Leu Ala
305                 310                 315                 320

Pro Phe Gly Ile Val Gly Leu Glu Thr Ala Phe Pro Leu Leu Tyr Thr
                325                 330                 335

His Phe Val Lys Asn Gly Thr Trp Thr Leu Lys Gln Leu Val Asp Phe
            340                 345                 350

Met Thr Val Lys Pro Cys Glu Ala Phe Gly Leu Pro Tyr Gly Thr Leu
        355                 360                 365

Ala Pro Gly Ala Pro Ala Asp Ile Thr Leu Ile Asp Leu Glu Lys Glu
    370                 375                 380

Ala Ala Ile Asp Lys Asp Thr Phe Leu Ser Lys Gly Lys Asn Thr Pro
385                 390                 395                 400

Phe Asn Lys Met Lys Cys Phe Gly Trp Pro Val Ala Thr Met Ala Ala
                405                 410                 415

Gly Lys Leu Ala Tyr Glu Glu Gly Arg Leu Val
            420                 425
```

ENDOPHYTE COMPOSITIONS AND METHODS FOR IMPROVED PLANT HEALTH

CROSS REFERENCE TO RELATED APPLICATIONS

This application is a U.S. National Phase Application under 35 U.S.C. § 371 of International Application No. PCT/US2022/026051 filed Apr. 22, 2022, which claims the benefit of and priority to U.S. Provisional Patent Application No. 63/201,305 filed Apr. 22, 2021, the entire disclosure of which is hereby incorporated by reference in its entirety for all purposes.

SEQUENCE LISTING

The instant application contains a Sequence Listing with 136 sequences, which has been filed electronically in ASCII format is hereby incorporated by reference in its entirety. Said ASCII copy, created on Apr. 22, 2022, is named 10236PCTWO1_final_ST25.txt and is 215,474 bytes in size.

BACKGROUND

According to the United Nations Food and Agriculture Organization, the world's population will exceed 9.6 billion people by the year 2050, which will require significant improvements in agriculture to meet growing food demands. There is a need for improved methods and agricultural plants that will enable a near doubling of food production with fewer resources and more environmentally sustainable inputs, and for plants with improved responses to various stresses.

SUMMARY OF INVENTION

Disclosed herein are methods of improving plant health, comprising heterologously disposing one or more endophytes to a plant element in an effective amount to improve a trait of agronomic importance in a plant derived from the treated plant element relative to a reference plant derived from a reference plant element, wherein the one or more endophytes comprise at least one polynucleotide sequence that is at least 97% identical to one or more polynucleotide sequences selected from the group consisting of SEQ ID NOs. 27, 32-93, 127, 132, and combinations thereof. Optionally, the one or more endophytes are capable of producing a protein whose amino acid sequence is selected from the group consisting of SEQ ID NOs. 28-31, 94-126, 128-131, 133-136, and combinations thereof.

In some embodiments, the method additionally comprises the step of placing the plant element in or on a growth medium. In some embodiments, the one or more endophytes are heterologously disposed to a plant element prior to placing the treated plant element in or on a growth medium. In some embodiments, the one or more endophytes are heterologously disposed to a plant element after placing the plant elements in or on a growth medium. In some embodiments, the one or more endophytes are heterologously disposed to a plant element concurrently with placing the plant elements in or on a growth medium.

In some embodiments, the one or more endophytes are heterologously disposed to a plant element at least two times. In some embodiments, the one or more endophytes are heterologously disposed to a plant element via a seed treatment or soil pre-treatment and one or more foliar applications. In some embodiments, the one or more endophytes are heterologously disposed to a plant element via a seed treatment or soil pre-treatment and one or more floral applications. In some embodiments, the one or more endophytes are heterologously disposed to a plant element via one or more seed treatments or soil pre-treatments, one or more foliar applications, and one or more floral applications. In some embodiments, the one or more endophytes are heterologously disposed to a plant element via seed treatment, root wash, seedling soak, foliar application, floral application, soil inoculum, in-furrow application, sidedress application, soil pre-treatment, wound inoculation, drip tape irrigation, vector-mediation inoculation, injection, osmopriming, hydroponics, aquaponics, aeroponics, or combinations thereof.

In some embodiments, the one or more endophytes are heterologously disposed to a plant element of a different plant variety from the variety of the plant element from which the one or more endophytes were obtained. In some embodiments, the one or more endophytes are heterologously disposed to a plant element of the same plant variety as the variety of the plant element from which the one or more endophytes were obtained. In some embodiments, the one or more endophytes are heterologously disposed to a plant element of a different plant species from the species of the plant element from which the one or more endophytes were obtained. In some embodiments, the one or more endophytes are heterologously disposed to a plant element of the same plant species as the species of the plant element from which the one or more endophytes were obtained.

In some embodiments, the plant elements are allowed to germinate. In some embodiments, the plant elements are grown to yield.

In another aspect, disclosed herein are synthetic compositions, comprising one or more endophytes heterologously disposed to a treatment formulation, wherein the one or more endophytes comprise at least one polynucleotide sequence that is at least 97% identical to one or more polynucleotide sequences selected from the group consisting of SEQ ID NOs. 27, 32-93, 127, 132, and combinations thereof. Optionally, the one or more endophytes are capable of producing a protein whose amino acid sequence is selected from the group consisting of SEQ ID NOs. 28-31, 94-126, 128-131, 133-136, and combinations thereof. In some embodiments, the composition additionally comprises a plant element. In some embodiments, the one or more endophytes are capable of improving a trait of agronomic importance in a plant derived from the plant element (for example, when grown from a treated seed) relative to a plant derived from a reference plant element.

In some embodiments, the synthetic composition additionally comprises one or more of a surfactant, a buffer, a tackifier, a microbial stabilizer, a fungicide, an anticomplex agent, an herbicide, a nematicide, an insecticide, a plant growth regulator, a rodenticide, a desiccant, a nutrient, an excipient, a wetting agent, a salt, and a polymer. In some embodiments, the polymer is a biodegradable polymer selected from the group consisting of alginate, agarose, agar, gelatin, polyacrylamide, chitosan, polyvinyl alcohol, and combinations thereof. In some embodiments, the biodegradable polymer is alginate and the alginate is sodium alginate or calcium alginate.

In some embodiments, the synthetic composition comprises one or more endophytes of the present invention and one or more chemical or biological agents capable of killing a pest of a plant, impeding the feeding and or growth and or reproduction of a pest of a plant, repelling a pest of a plant, and or reducing the severity or extent of infection of a plant host by a pest of a plant, including without limitation chemical or biological agents that are acetylcholinesterase (AChE) inhibitors, GABA-gated chloride channel blockers, sodium channel modulators, nicotinic acetylcholine receptor (nAChR) competitive modulators, nicotinic acetylcholine receptor (nAChR) allosteric modulators—Site I, Glutamate-gated chloride channel (GluCl) allosteric modulators, Chordotonal organ TRPV channel modulators, Nicotinic acetylcholine receptor (nAChR) channel blockers, Octopamine receptor agonists, Voltage-dependent sodium channel blockers, multi-site inhibitors, Ryanodine receptor modulators, chordotonal organ modulators (wherein the chordotonal organ modulator does not bind to the Nan-lav TRPV channel complex), GABA-gated chloride channel allosteric modulators, GABA-gated chloride channel allosteric modulators—Site II, nicotinic acetylcholine receptor (nAChR) Allosteric Modulators—Site II, Juvenile hormone mimics, Mite growth inhibitors affecting CHS1, Inhibitors of chitin biosynthesis affecting CHS1, Inhibitors of chitin biosynthesis—type 1, Moulting disruptors—Dipteran, Ecdysone receptor agonists, Inhibitors of acetyl COA carboxylase, Inhibitors of mitochondrial ATP synthase, Uncouplers of oxidative phosphorylation via disruption of the proton gradient, Mitochondrial complex III electron transport inhibitors, Mitochondrial complex I electron transport inhibitors, Mitochondrial complex IV electron transport inhibitors, Mitochondrial complex II electron transport inhibitors, Microbial disruptors of insect midgut membranes, Host-specific occluded pathogenic viruses, other active compounds (such as Azadirachtin, Benzoximate, Bromopropylate, Chinomethionat, Dicofol, Lime sulfur, Mancozeb, Pyridalyl, Sulfur, Chlorantraniliprole, Clothianidin, Tioxazafen, Fluopyram, Triticonazole), other active bacterial agents (such as certain *Burkholderia* strains including without limitation *Burkholderia rinojenses, Wolbachia pipientis*), other active fungal agents (such as *Beauveria bassiana* strains, Metarhizium anisopliae strain F52, *Paecilomyces* fumosoroseus Apopka strain 97), biological essence including synthetics or extracts or refined or unrefined oils (such as *Dysphania ambrosioides* near ambrosioides extract, fatty acid monoesters with glycerol or propanediol, neem oil), non-specific mechanical disruptors (such as Diatomaceous earth), or combinations thereof. Examples of AChE inhibitors include without limitation Carbamates (such as Alanycarb, Aldicarb, Bendiocarb, Benfuracarb, Butocarboxim, Butoxycarboxim, Carbaryl, Carbofuran, Carbosulfan, Ethiofencarb, Fenobucarb, Formetanate, Furathiocarb, Isoprocarb, Methiocarb, Methomyl, Metolcarb, Oxamyl, Pirimicarb, Propoxur, Thiodicarb, Thiofanox, Triazamate, Trimethacarb, XMC, Xylylcarb) and Organophosphates (such as Acephate, Azamethiphos, Azinphos-ethyl, Azinphosmethyl, Cadusafos, Chlorethoxyfos, Chlorfenvinphos, Chlormephos, Chlorpyrifos, Chlorpyrifos-methyl, Coumaphos, Cyanophos, Demeton-S-methyl, Diazinon, Dichlorvos/DDVP, Dicrotophos, Dimethoate, Dimethylvinphos, Disulfoton, EPN, Ethion, Ethoprophos, Famphur, Fenamiphos, Fenitrothion, Fenthion, Fosthiazate, Heptenophos, Imicyafos, Isofenphos, Isopropyl O-(methoxyaminothiophosphoryl) salicylate, Isoxathion, Malathion, Mecarbam, Methamidophos, Methidathion, Mevinphos, Monocrotophos, Naled, Omethoate, Oxydemeton-methyl, Parathion, Parathion-methyl, Phenthoate, Phorate, Phosalone, Phosmet, Phosphamidon, Phoxim, Pirimiphos-methyl, Profenofos, Propetamphos, Prothiofos, Pyraclofos, Pyridaphenthion, Quinalphos, Sulfotep, Tebupirimfos, Temephos, Terbufos, Tetrachlorvinphos, Thiometon, Triazophos, Trichlorfon, Vamidothion). Examples of GABA-gated chloride channel blockers include without limitation Cyclodiene Organochlorines (such as Chlordane, Endosulfan) and Phenylpyrazoles (Fiproles) (such as Ethiprole, Fipronil). Examples of sodium channel modulators include without limitation pyrethroids and pyrethrins (such as Acrinathrin, Allethrin, d-cis-trans Allethrin, d-trans Allethrin, Bifenthrin, Bioallethrin, Bioallethrin Scyclopentenyl isomer, Bioresmethrin, Cycloprothrin, Cyfluthrin, beta-Cyfluthrin, Cyhalothrin, lambda-Cyhalothrin, gamma-Cyhalothrin, Cypermethrin, alpha-Cypermethrin, beta-Cypermethrin, thetacypermethrin, zeta-Cypermethrin, Cyphenothrin, (1R)-trans-isomers], Deltamethrin, Empenthrin (EZ)-(1R)-isomers], Esfenvalerate, Etofenprox, Fenpropathrin, Fenvalerate, Flucythrinate, Flumethrin, tau-Fluvalinate, Halfenprox, Imiprothrin, Kadethrin, Permethrin, Phenothrin [(1R)-trans-isomer], Prallethrin, Pyrethrins (pyrethrum), Resmethrin, Silafluofen, Tefluthrin, Tetramethrin, Tetramethrin [(1R)-isomers], Tralomethrin, Transfluthrin) and Methoxychlor. Examples of nAChR competitive modulators include without limitation Neonicotinoids (such as Acetamiprid, Clothianidin, Dinotefuran, Imidacloprid, Nitenpyram, Thiacloprid, Thiamethoxam), nicotine, sulfoximines (such as Sulfoxaflor), Butenolides (such as Flupyradifurone), and Mesoionics (such as Triflumezopyrim). Examples of nAChR allosteric modulators—Site I include without limitation Spinosyns (such as Spinetoram, Spinosad). Examples of GluCl allosteric modulators include without limitation Avermectins and Milbemycins (such as Abamectin, Emamectin benzoate, Lepimectin, Milbemectin). Examples of multi-site inhibitors include without limitation Alkyl halides (such as Methyl bromide and other alkyl halides), Chloropicrin, Fluorides (such as Cryolite (Sodium aluminum fluoride), Sulfuryl fluoride), Borates (such as Borax, Boric acid, Disodium octaborate, Sodium borate, Sodium metaborate), Tartar emetic, Methyl isothiocyanate generators (such as Dazomet, Metam). Examples of chordotonal organ TRPV channel modulators include without limitation Pyridine azomethine derivatives (such as Pymetrozine, Pyrifluquinazon), and Pyropenes (such as Afidopyropen). Examples of juvenile hormone mimics include without limitation juvenile hormone analogues (such as Hydroprene, Kinoprene, Methoprene), fenoxycarb, and pyriproxyfen. Examples of mite growth inhibitors affecting CHS1 include without limitation Clofentezine, Diflovidazin, Hexythiazox, and Etoxazole. Examples of microbial disruptors of insect midgut membranes include without limitation *Bacillus thuringiensis* (such as *Bacillus thuringiensis* subsp. *israelensis, Bacillus thuringiensis* subsp. *aizawai, Bacillus thuringiensis* subsp. kurstaki, *Bacillus thuringiensis* subsp. tenebrionis, *Bacillus thuringiensis* strain EX297512) and the insecticidal proteins they produce (such as Cry1Ab, Cry1Ac, Cry1Fa, Cry1A.105, Cry2Ab, Vip3A, mCry3A, Cry3Ab, Cry3Bb, Cry34Ab1/Cry35Ab1) and *Bacillus sphaericus*. Examples of inhibitors of mitochondrial ATP synthase include without limitation Diafenthiuron, Organotin miticides (such as Azocyclotin, Cyhexatin, Fenbutatin oxide), Propargite, and Tetradifon. Examples of uncouplers of oxidative phosphorylation via disruption of the proton gradient include without limitation Pyrroles (such as Chlorfenapyr), Dinitrophenols, and Sulfluramid. Examples of nAChR channel blockers include without limitation Nereistoxin analogues (such as Bensultap, Cartap hydrochloride, Thiocyclam, Thiosultap-sodium). Examples of inhibitors of chitin biosynthesis affecting CHS1 include without limitation Benzoylureas (such as Bistrifluron, Chlorfluazuron, Diflubenzuron, Flucycloxuron, Flufenoxuron, Hexaflumuron, Lufenuron, Novaluron, Noviflumuron, Teflubenzuron, Triflumuron). Examples of inhibitors of chitin biosynthesis—type 1 include without limitation Buprofezin. Examples of moulting disruptors (Dipteran) include without limitation Cyromazine. Examples of ecdysone receptor agonists include without limitation Diacylhydrazines (such as Chromafenozide, Halofenozide, Methoxyfenozide, Tebufenozide). Examples of octopamine receptor agonists include without limitation Amitraz. Examples of mitochondrial complex III electron transport inhibitors include without limitation Hydramethylnon, Acequinocyl, Fluacrypyrim, and Bifenazate. Examples of mitochondrial complex I electron transport inhibitors include without limitation METI acaricides and insecticides such as Fenazaquin, Fenpyroximate, Pyridaben, Pyrimidifen, Tebufenpyrad, Tolfenpyrad) and Rotenone. Examples of voltage-dependent sodium channel blockers include without limitation Oxadiazines (such as Indoxacarb) and Semicarbazones (such as Metaflumizone). Examples of inhibitors of acetyl COA carboxylase include without limitation Tetronic and Tetramic acid derivatives (such as Spirodiclofen, Spiromesifen, Spiropidion, Spirotetramat). Examples of mitochondrial complex IV electron transport inhibitors include without limitation Phosphides (Aluminium phosphide, Calcium phosphide, Phosphine, Zinc phosphide), Cyanides (such as Calcium cyanide, Potassium cyanide, Sodium cyanide). Examples of mitochondrial complex II electron transport inhibitors include without limitation Beta-ketonitrile derivatives (such as Cyenopyrafen, Cyflumetofen) and Carboxanilides (such as Pyflubumide). Examples of ryanodine receptor modulators include without limitation such as Diamides (such as Chlorantraniliprole, Cyantraniliprole, Cyclaniliprole Flubendiamide, Tetraniliprole). Examples of chordotonal organ modulators include without limitation Flonicamid. Examples of GABA-gated chloride channel allosteric modulators include without limitation Meta-diamides (Broflanilide) and Isoxazolines (such as Fluxametamide). Examples of nicotinic acetylcholine receptor (nAChR) Allosteric Modulators—Site II include without limitation GS-omega/kappa HXTX-Hv1a peptide.

In some embodiments, the synthetic composition comprises one or more endophytes of the present invention and one or chemical or biological agent capable of killing a pathogen of a plant, impeding the feeding and or growth and or reproduction of a pathogen of a plant, repelling a pathogen of a plant, and or reducing the severity or extent of infection of a plant host by a pathogen of a plant, including without limitation chemical or biological agents that are PhenylAmides fungicides (acylalanines, oxazolidinones, butyrolactones), hydroxy-(2-amino-) pyrimidines, heteroaromatics (such as isoxazoles, isothiazolones), carboxylic acids, Methyl-Benzimidazole-Carbamates (MBC) fungicides (such as thiophanates, benzimidazoles), N-phenyl carbamates, benzamides (such as toluamides, pyridinylmethyl-benzamides), thiazole carboxamide (such as ethylamino-thiazole-carboxamide), phenylureas, cyanoacrylates (such as aminocyanoacrylates), aryl-phenyl-ketones (such as benzophenone, benzoylpyridine), pyrimidinamines, pyrazole-METI (such as pyrazole-5-carboxamides), quinazoline, succinate-dehydrogenase inhibitors (SDHI) (such as phenylbenzamides, phenyl-oxo-ethyl thiophene amide, pyridinylethyl-benzamides, phenyl-cyclobutyl-pyridineamide, furan-carboxamides, oxathiin-carboxamides, thiazole-carboxamides, pyrazole-4-carboxamides, N-cyclopropyl-N-benzyl-pyrazole-carboxamides, N-methoxy-(phenyl-ethyl)-pyrazole-carboxamides, pyridine-carboxamides, pyrazine-carboxamides, pydiflumetofen, fluxapyroxad), quinone outside inhibitors (such as methoxy-acrylates, methoxy-acetamide, methoxy-carbamates, oximino-acetates, oximino-acetamides, oxazolidine-diones, dihydro-dioxazines, imidazolinones, benzyl-carbamates, tetrazolinones), quinone inside inhibitors (such as cyano-imidazole, sulfamoyl-triazole, picolinamides), uncouplers of oxidative phosphorylation (such as dinitrophenyl-crotonates, 2,6-dinitro-anilines), organo tin compounds (tri-phenyl tin compounds), thiophene-carboxamides, Quinone outside Inhibitor—stigmatellin binding type (such as triazolo-pyrimidylamine), anilino-pyrimidines, enopyranuronic acid antibiotic, hexopyranosyl antibiotic, glucopyranosyl antibiotic, tetracycline antibiotic, aza-naphthalenes (such as aryloxyquinoline, quinazolinone), phenylpyrroles, dicarboximides, phosphoro-thiolates, dithiolanes, aromatic hydrocarbons, chlorophenyls, nitroanilines, heteroaromatics (such as 1,2,4-thiadiazoles), carbamates, demethylation inhibitors (such as piperazines, pyridines, pyrimidines, imidazoles, triazoles, triazolinthiones), amines (such as morpholines, piperidines, spiroketal-amines), ketoreductase inhibitors (such as hydroxyanilides, amino-pyrazolinone), thiocarbamates, allylamines, polyoxins (such as peptidyl pyrimidine nucleoside), Carboxylic Acid Amides (such as cinnamic acid amides, valinamide carbamates, mandelic acid amides), melanin biosynthesis inhibitors—reductase (such as isobenzo-furanone, pyrrolo-quinolinone, triazolobenzo-thiazole), melanin biosynthesis inhibitors—dehydratase (such as cyclopropane-carboxamide, carboxamide, propionamide), melanin biosynthesis inhibitors—polyketide synthase (such as trifluoroethyl-carbamate), benzo-thiadiazole, benzisothiazole, thiadiazole-carboxamide, polysaccharides (such as laminarin), plant ethanol extracts (such as anthraquinones, resveratrol, extract from *Reynoutria sachalinensis*), phosphonates (such as ethyl phosphonates, fosetyl-Al, phosphorous acid and salts), isothiazole (such as isothiazolylmethyl ether), cyanoacetamide-oxime, phthalamic acids, benzotriazines, benzene-sulphonamides, pyridazinones, phenyl-acetamide, guanidines, thiazolidine (such as cyanomethylene-thiazolidines), pyrimidinone-hydrazones, 4-quinolyl-acetates, tetrazolyloximes, glucopyranosyl antibiotics, copper salts, sulphur, dithio-carbamates and relatives (such as amobam, ferbam, mancozeb, maneb, metiram, propineb, thiram, zinc thiazole, zineb, ziram), phthalimides, chloronitriles (phthalonitriles), sulfamides (such as dichlofluanid, tolylfluanid), bis-guanidines (such as guazatine, iminoctadine), triazines (such as anilazine), quinones (anthraquinones) (such as dithianon), quinoxalines (such as chinomethionat, quinomethionate), maleimide (such as fluoroimide), thiocarbamate (such as methasulfocarb), polypeptide (lectin) plant extracts (such as extract from the cotyledons of lupine plantlets), phenol and sesquiterpene and triterpenoid and coumarin plant extracts (such as extract from *Swinglea glutinosa*), terpene hydrocarbon and terpene alcohol and terpene phenol extracts plant extracts (such as extract from *Melaleuca alternifolia*, plant oils such as eugenol, geraniol, thymol mixtures thereof), Polyene (such as amphoteric macrolide antifungal antibiotic from *Streptomyces natalensis* or *Streptomyces chattanoogensis*), oxysterol binding protein homologue inhibition (piperidinyl-thiazole-isoxazolines), other active compounds (such as Fludioxonil, Mefenoxam, Sedaxane, Azoxystrobin, Thiabendazole, Ethaboxam, metalaxyl (such as without limitation metalaxyl-M), Trifloxystrobin, Myclobutanil, Acibenzolar-S-methyl, Metconazole, tolclofos-methyl, Fluopyram, Ipconazole, Oxathiapiprolin, Difenoconazole, Prothyoconazol, Tebuconazole, Pyraclostrobin, Fluxapyroxad, Triticonazole, Fluaxapyroxad), and combinations thereof.

In some embodiments, the synthetic composition comprises one or more endophytes of the present invention and one or more biological agents (for example bacterial or fungal agents) including, but not limited to, those agents capable of killing a pest or pathogen of a plant, impeding the feeding and or growth and or reproduction of a pest or pathogen of a plant, repelling a pest or pathogen of a plant, and or reducing the severity or extent of infection of a plant host by a pathogen or pest of a plant. The one or more bacterial or fungal agents may be living or dead (including without limitation by heat inactivation) bacteria or fungi, extracts and or metabolites of bacteria or fungi (including without limitation extracts and or metabolites in spent growth media), or combinations thereof. Non-limiting examples of biological agents include *Trichoderma* species including without limitation *Trichoderma* atroviride strain I-1237, *Trichoderma* atroviride strain LU132, *Trichoderma* atroviride strain SC1, *Trichoderma* atroviride strain SKT-1, *Trichoderma* atroviride strain 77B, *Trichoderma* asperellum strain T34, *Trichoderma* asperellum strain kd, *Trichoderma harzianum* strain T-22, *Trichoderma virens* strain G-41; *Clonostachys* species including without limitation *Gliocladium catenulatum* strain J1446, *Clonostachys rosea* strain CR-7; *Coniothyrium* species including without limitation *Coniothyrium minitans* strain CON M 91-08; *Talaromyces* species including without limitation *Talaromyces flavus* strain SAY-Y-94-01; *Saccharomyces* species including without limitation *Saccharomyces cerevisae* strain LAS02; *Bacillus* species including without limitation *Bacillus amyloliquefaciens* strain QST713, *Bacillus amyloliquefaciens* strain FZB24, *Bacillus amyloliquefaciens* strain MBI600, *Bacillus amyloliquefaciens* strain D747, *Bacillus amyloliquefaciens* strain F727, *Bacillus amyloliquefaciens* strain AT-332, *Bacillus amyloliquefaciens* strain MBI 600 *Bacillus mycoides* isolate J, *Bacillus subtilis* strain AFS032321, *Bacillus subtilis* strain Y1336, *Bacillus subtilis* strain MBI 600, *Bacillus subtilis* strain HAI-0404, *Bacillus firmus* I-1582); *Pseudomonas* species including without limitation *Pseudomonas chlororaphis* strain AFS009; *Streptomyces* species including without limitation *Streptomyces griseovirides* strain K61, *Streptomyces lydicus* strain WYEC108; *Penicillium* species such as *Penicillium* bilaiae, *Penicillium* bilaiae; and Pasteuria species including without limitation Pasteuria nishizawae Pn1).

In some embodiments, one or more endophytes of the present invention and one or chemical or biological agents described herein are present in a synthetic composition at a weight ratio of between 1000:1 and 1:1000, 100:1 and 1:100, or 10:1 and 1:10.

In some embodiments, the synthetic composition may be stored at between 0 degrees Celsius and 4 degrees Celsius for 1 week with less than 1 log loss of CFU of the one or more endophytes. In some embodiments, the synthetic composition may be stored at between 4.1 degrees Celsius and 20 degrees Celsius for 1 week with less than 1 log loss of CFU of the one or more endophytes. In some embodiments, the synthetic composition may be stored at between 20.1 degrees Celsius and 35 degrees Celsius for 1 week with less than 1 log loss of CFU of the one or more endophytes.

In yet another aspect, described herein are methods of measuring plant health comprising determining the presence or abundance of one or more endophytes in a plant element, growth medium or growth environment, wherein the one or more endophytes comprise at least one polynucleotide sequence that is at least 97% identical to one or more polynucleotide sequences selected from the group consisting of SEQ ID NOs. 27, 32-93, 127, 132, and combinations thereof. In some embodiments, the presence or abundance of one or more endophytes is determined relative to a reference plant element, growth medium or growth environment. In some embodiments, the one or more endophytes are not present in the reference plant element, growth medium or growth environment. In some embodiments, the one or more endophytes are less abundant in the reference plant element, growth medium or growth environment. In some embodiments, the presence or abundance of one or more endophytes is determined in a plant element and modulation of one or more traits of agronomic importance is inferred from the presence or amount of the one or more endophytes in the plant element. In some embodiments, the presence or abundance of one or more endophytes is determined in a growth medium and the capacity of the growth medium to modulate one or more trait of agronomic importance in a plant element planted therein is inferred from the presence or amount of the one or more endophytes in the growth medium. In some embodiments, the presence or abundance of one or more endophytes is determined in a growth environment and the capacity of the growth environment to modulate one or more trait of agronomic importance in a plant element grown therein is inferred from the presence or amount of the one or more endophytes in the growth environment. In some embodiments, the presence or abundance of one or more endophytes is determined by polymerase chain reaction, fluorescence in situ hybridization, or isothermal amplification.

In some embodiments, a plurality of nucleic acid probes are used to determine the presence or abundance of one or more endophytes in a plant element, growth medium or growth environment, wherein the plurality comprises complementary or reverse complementary sequences to a region of at least 10 contiguous nucleotides within one or more polynucleotide sequences selected from the group consisting of SEQ ID NOs. 27, 32-93, 127, 132, and combinations thereof. In some embodiments, the complementary or reverse complementary region comprises at least 20 contiguous nucleotides. In some embodiments, the complementary or reverse complementary region comprises at least 30 contiguous nucleotides. In some embodiments, the complementary or reverse complementary region comprises at least 40 contiguous nucleotides. In some embodiments, the plurality of nucleic acid probes are single-stranded DNA. In some embodiments, the plurality of nucleic acid probes are attached to one or more solid supports. In some embodiments, the plurality of nucleic acid probes are attached to a plurality of beads. In some embodiments, the plurality of nucleic acid probes are attached to a contiguous solid support.

In some embodiments, the plant element is a monocot. In some embodiments, the monocot is a cereal. In some embodiments, the cereal is selected from the group consisting of wheat, rice, barley, buckwheat, rye, millet, oats, corn, sorghum, triticale and spelt. In some embodiments, the cereal is wheat.

In some embodiments, the plant element is a dicot. In some embodiments, the dicot is selected from the group consisting of cotton, tomato, lettuce, peppers, cucumber, endive, melon, potato, cannabis, and squash. In some embodiments, the dicot is a legume. In some embodiments, the legume is soy, peas or beans.

In some embodiments, the plant element is a whole plant, seedling, meristematic tissue, ground tissue, vascular tissue, dermal tissue, seed, leaf, root, shoot, stem, flower, fruit, stolon, bulb, tuber, corm, keikis, shoot, or bud. In some embodiments, the plant element is a seed.

In some embodiments, the trait of agronomic importance is selected from the group consisting of drought tolerance, heat tolerance, cold tolerance, salinity tolerance, metal tolerance, herbicide tolerance, improved water use efficiency, improved nitrogen utilization, improved nitrogen fixation, improved nutrient use efficiency, improved nutrient utilization, biotic stress tolerance, improved disease resistance, yield improvement, health enhancement, vigor improvement, decreased necrosis, decreased chlorosis, decreased area of necrotic tissue, decreased area of chlorotic tissue, growth improvement, photosynthetic capability improvement, nutrition enhancement, altered protein content, altered oil content, increased biomass, increased shoot height, increased root length, increased shoot biomass, increased root biomass, increased leaf area, increased shoot area, increased root area, improved root architecture, increased seed germination percentage, increased seed germination rate, increased seedling survival, increased survival, photosynthetic efficiency, transpiration rate, seed/fruit number or mass, plant grain or fruit yield, leaf chlorophyll content, photosynthetic rate, wilt recovery, turgor pressure, modulation of a metabolite, production of a volatile organic compound (VOC), modulation of the proteome, increased seed weight, altered seed carbohydrate composition, altered seed oil composition, altered seed protein composition, altered seed nutrient composition, and combinations thereof. In some embodiments, the trait of agronomic importance is biotic stress tolerance. In some embodiments, the trait of agronomic importance is improved nutrient use efficiency. In some embodiments, the trait of agronomic importance is drought tolerance.

In some embodiments, the one or more endophytes is a member of the Class Chitinophagia, Bacilli, Gammaproteobacteria, or Sordariomycetes. In some embodiments, the one or more endophytes is a member of the Order Chitinophagales, Bacillales, Pseudomonadales, or Hypocreales. In some embodiments, the one or more endophytes is a member of the Family Chitinophagaceae, Bacillaceae, Pseudomonadaceae, or Hypocreaceae. In some embodiments, the one or more endophytes is a member of the Genus *Chitinophaga, Bacillus, Pseudomonas*, or *Trichoderma.*

In some embodiments, the one or more endophytes is a member of the Genus *Chitinophaga*, wherein the one or more endophytes comprise at least one polynucleotide sequence that is at least 97%, at least 98%, at least 99%, or 100% identical to 16S ribosomal RNA gene having SEQ ID NO. 127. In some embodiments, the genomes of the one or more endophytes comprise one or more open reading frames encoding proteins whose amino acid sequences are at least 97%, at least 97%, at least 98%, at least 99%, or 100% identical to one or more of SEQ ID NOs. 128-131. In some embodiments, the one or more endophytes is a member of the Genus *Chitinophaga*, wherein the one or more endophytes are capable of producing a protein whose amino acid sequence is at least 95%, at least 96%, at least 97%, at least 97%, at least 98%, at least 99%, or 100% identical to one or more of SEQ ID NOs. 128-131.

In some embodiments, the one or more endophytes is a member of the Genus *Bacillus*, wherein the one or more endophytes comprise at least one polynucleotide sequence that is at least 97%, at least 98%, at least 99%, or 100% identical to 16S ribosomal RNA gene having SEQ ID 132. In some embodiments, the genomes of the one or more endophytes comprise one or more open reading frames encoding proteins whose amino acid sequences are at least 97%, at least 97%, at least 98%, at least 99%, or 100% identical to one or more of SEQ ID NOs. 133-136. In some embodiments, the one or more endophytes is a member of the Genus *Bacillus*, wherein the one or more endophytes are capable of producing a protein whose amino acid sequence is at least 95%, at least 96%, at least 97%, at least 97%, at least 98%, at least 99%, or 100% identical to one or more of SEQ ID NOs. 133-136.

In some embodiments, the one or more endophytes is a member of the Genus *Pseudomonas*, wherein the one or more endophytes comprise at least one polynucleotide sequence that is at least 97%, at least 98%, at least 99%, or 100% identical to 16S ribosomal RNA gene having SEQ ID NO. 27. In some embodiments, the genomes of the one or more endophytes comprise one or more open reading frames encoding proteins whose amino acid sequences are at least 97%, at least 97%, at least 98%, at least 99%, or 100% identical to one or more of SEQ ID NOs. 28-31. In some embodiments, the one or more endophytes is a member of the Genus *Pseudomonas*, wherein the one or more endophytes are capable of producing a protein whose amino acid sequence is at least 95%, at least 96%, at least 97%, at least 97%, at least 98%, at least 99%, or 100% identical to one or more of SEQ ID NOs. 28-31.

In some embodiments, the one or more endophytes is a member of the Genus *Trichoderma*, wherein the one or more endophytes comprise at least one polynucleotide sequence that is at least 97%, at least 98%, at least 99%, or 100% identical to internal transcribed spacer sequence having SEQ ID NO. 32. In some embodiments, the genomes of the one or more endophytes comprise one or more open reading frames encoding proteins whose amino acid sequences are at least 97%, at least 97%, at least 98%, at least 99%, or 100% identical to one or more of SEQ ID NOs. 95-127. In some embodiments, the one or more endophytes is a member of the Genus *Trichoderma*, wherein the one or more endophytes genomes comprise at least one polynucleotide sequence that is at least 97%, at least 98%, at least 99%, or 100% identical to one or more polynucleotide sequences selected from the group consisting of SEQ ID NOs. 59-94. In some embodiments, the genome of the one or more endophytes of the Genus *Trichoderma* comprises polynucleotide regions having 100% sequence identity to SEQ ID NOs. 32-93.

In some embodiments, the genome of the one or more endophytes of the Genus *Trichoderma* comprises at least 1, 2, 3, 4, 5, 6, 7, 8, 9, 10, 11, 12 polynucleotide regions having at least 97%, at least 98%, at least 99%, or 100% sequence identity to one or more polynucleotide sequences selected from the group consisting of SEQ ID NOs. 61, 71, 72, 75, 76, 80, 81, 82, 85, 87, 88, and 89. In some embodiments, the genome of the one or more endophytes of the Genus *Trichoderma* comprises at least one polynucleotide regions having at least 97%, at least 98%, at least 99%, or 100% sequence identity to one or more polynucleotide sequences selected from the group consisting of SEQ ID NOs. 61, 80, 87, 88, 89 and at least one polynucleotide regions having at least 97%, at least 98%, at least 99%, or 100% sequence identity to one or more polynucleotide sequences selected from the group consisting of SEQ ID NOs. 71, 72, 75, 76, 81, 82, and 85. In some embodiments, the genome of the one or more endophytes of the Genus *Trichoderma* comprises at least 1 polynucleotide regions having at least 97%, at least 98%, at least 99%, or 100% sequence identity to SEQ ID NOs. 87 and at least 1 polynucleotide regions having at least 97%, at least 98%, at least 99%, or 100% sequence identity to SEQ ID NOs. 71. In some embodiments, the genome of the one or more endophytes of the Genus *Trichoderma* comprises polynucleotide regions having at least 97%, at least 98%, at least 99%, or 100% sequence identity to one or more polynucleotide sequences selected from the group consisting of SEQ ID NOs. 61, 80, 87, 88, 89 and at least 1 polynucleotide regions having at least 97%, at least 98%, at least 99%, or 100% sequence identity to one or more polynucleotide sequences selected from the group consisting of SEQ ID NOs. 71, 72, 75, 76, 81, 82, and 85.

In some embodiments, the genome of the one or more endophytes of the Genus *Trichoderma* comprises at least 1, 2, 3, 4, 5, 6 polynucleotide regions having at least 97%, at least 98%, at least 99%, or 100% sequence identity to one or more polynucleotide sequences selected from the group consisting of SEQ ID NOs. 59, 60, 63, 64, 65, and 84. In some embodiments, the genome of the one or more endophytes of the Genus *Trichoderma* comprises polynucleotide regions having 100% sequence identity to SEQ ID NOs. 59, 60, 63, 64, 65, and 84.

In some embodiments, the genome of the one or more endophytes of the Genus *Trichoderma* comprises at least 1, 2, 3, 4, 5, 6 polynucleotide regions having at least 97%, at least 98%, at least 99%, or 100% sequence identity to one or more polynucleotide sequences selected from the group consisting of SEQ ID NOs. 67, 70, 79, and 83. In some embodiments, the genome of the one or more endophytes of the Genus *Trichoderma* comprises polynucleotide regions having 100% sequence identity to SEQ ID NOs. 67, 70, 79, and 83.

In some embodiments, the genome of the one or more endophytes of the Genus *Trichoderma* comprises a polynucleotide regions having at least 97%, at least 98%, at least 99%, or 100% sequence identity to SEQ ID NO. 77.

In some embodiments, the genome of the one or more endophytes of the Genus *Trichoderma* comprises at least 1, 2, 3, 4, 5, 6, 7, 8 polynucleotide regions having at least 97%, at least 98%, at least 99%, or 100% sequence identity to one or more polynucleotide sequences selected from the group consisting of SEQ ID NOs. 62, 66, 68, 69, 73, 74, 78, and 86. In some embodiments, the genome of the one or more endophytes of the Genus *Trichoderma* comprises polynucleotide regions having 100% sequence identity to SEQ ID NOs. 62, 66, 68, 69, 73, 74, 78, and 86.

In some embodiments, the genome of the one or more endophytes of the Genus *Trichoderma* comprises at least one polynucleotide region having at least 97%, at least 98%, at least 99%, or 100% sequence identity to one or more polynucleotide sequences selected from the group consisting of SEQ ID NOs. 61, 71, 72, 75, 76, 80, 81, 82, 85, 87, 88, and 89, and at least one polynucleotide regions having at least 97%, at least 98%, at least 99%, or 100% sequence identity to one or more polynucleotide sequences selected from the group consisting of SEQ ID NOs. 59, 60, 63, 64, 65, and 84, and at least one polynucleotide regions having at least 97%, at least 98%, at least 99%, or 100% sequence identity to one or more polynucleotide sequences selected from the group consisting of SEQ ID NOs. 67, 70, 79, and 83, and at least a polynucleotide region having at least 97%, at least 98%, at least 99%, or 100% sequence identity to SEQ ID NO. 77, and at least one polynucleotide regions having at least 97%, at least 98%, at least 99%, or 100% sequence identity to one or more polynucleotide sequences selected from the group consisting of SEQ ID NOs. 62, 66, 68, 69, 73, 74, 78, and 86.

In some embodiments, the one or more endophytes is a member of the Genus *Trichoderma*, wherein the one or more endophytes are capable of producing a protein whose amino acid sequence is at least 95%, at least 96%, at least 97%, at least 97%, at least 98%, at least 99%, or 100% identical to one or more of SEQ ID NOs. 94-126.

In some embodiments, the one or more endophytes is a member of the Genus *Trichoderma*, wherein the one or more endophytes are capable of producing a protein whose amino acid sequence is at least 95%, at least 96%, at least 97%, at least 97%, at least 98%, at least 99%, or 100% identical to one or more of SEQ ID NOs. 99, 104, 107, 108, 119, and 126.

In some embodiments, the one or more endophytes is a member of the Genus *Trichoderma*, wherein the one or more endophytes are capable of producing a protein whose amino acid sequence is at least 95%, at least 96%, at least 97%, at least 97%, at least 98%, at least 99%, or 100% identical to one or more of SEQ ID NOs. 94, 95, 96, 97, 98, 101, 106, 109, 112, 113, 114, 116, 120, 121, 122, 123, 124, and 125.

In some embodiments, the one or more endophytes is a member of the Genus *Trichoderma*, wherein the one or more endophytes are capable of producing a protein whose amino acid sequence is at least 95%, at least 96%, at least 97%, at least 97%, at least 98%, at least 99%, or 100% identical to one or more of SEQ ID NOs. 100, 102, 103, 105, 110, 111, 117, and 118.

In some embodiments, the one or more endophytes is a member of the Genus *Trichoderma*, wherein the one or more endophytes are capable of producing a protein whose amino acid sequence is at least 95%, at least 96%, at least 97%, at least 97%, at least 98%, at least 99%, or 100% identical to SEQ ID NO. 115.

In some embodiments, the one or more endophytes is a member of the Genus *Trichoderma*, wherein the one or more endophytes are capable of producing at least one protein whose amino acid sequence is at least 95%, at least 96%, at least 97%, at least 97%, at least 98%, at least 99%, or 100% identical to one or more of SEQ ID NOs. 94-126, and at least one protein whose amino acid sequence is at least 95%, at least 96%, at least 97%, at least 97%, at least 98%, at least 99%, or 100% identical to one or more of SEQ ID NOs. 99, 104, 107, 108, 119, and 126, and at least one protein whose amino acid sequence is at least 95%, at least 96%, at least 97%, at least 97%, at least 98%, at least 99%, or 100% identical to one or more of SEQ ID NOs. 94, 95, 96, 97, 98, 101, 106, 109, 112, 113, 114, 116, 120, 121, 122, 123, 124, and 125, and at least one protein whose amino acid sequence is at least 95%, at least 96%, at least 97%, at least 97%, at least 98%, at least 99%, or 100% identical to one or more of SEQ ID NOs. 100, 102, 103, 105, 110, 111, 117, and 118.

In some embodiments, the one or more endophytes comprises at least 2 endophytes. In some embodiments, the one or more endophytes comprises at least 3 endophytes. In some embodiments, the one or more endophytes comprises at least 4 endophytes. In some embodiments, the one or more endophytes comprises at least 5 endophytes. In some embodiments, the one or more endophytes comprises at least 10 endophytes.

In some embodiments, the one or more endophytes are encapsulated in polymeric beads. In some embodiments, the polymeric beads are less than 500 μm in diameter at their widest point. In some embodiments, the polymeric beads are less than 200 μm in diameter at their widest point. In some embodiments, the polymeric beads are less than 100 μm in diameter at their widest point. In some embodiments, the polymeric beads are less than 50 μm in diameter at their widest point. In some embodiments, the polymeric beads' average diameter at their widest point is between 500 μm and 250 μm. In some embodiments, the polymeric beads' average diameter at their widest point is between 249 μm and 100 μm. In some embodiments, the polymeric beads' average diameter at their widest point is between 100 μm and 50 μm.

In some embodiments, the one or more endophytes are encapsulated in inorganic or mineral particles. In some embodiments, the inorganic or mineral particles are silica, clay, talc, sand, silt, and magnetite. In some embodiments, the one or more endophytes are encapsulated in organic matter particles. In some embodiments, the organic matter particles are urea, humus, active carbons, proteins, biochar, carbohydrate, and lipids.

DETAILED DESCRIPTION

Figure 1A:
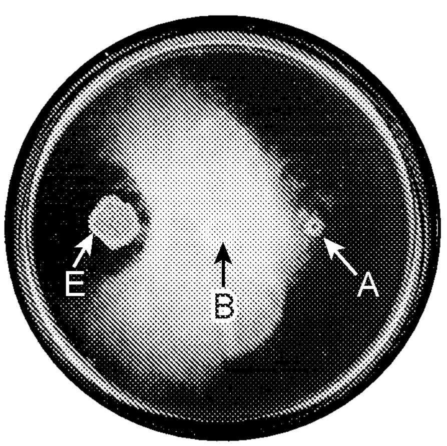
FIG. 1A shows an exemplary photo a tryptic soy agar (TSA) plate inoculated with *Fusarium graminearum* (B), MIC-84302 (E), and metconazole (A) a chemical fungicide. The lack of growth of *Fusarium graminearum* around MIC-84302 is notable in comparison to the control plate shown in FIG. 1C.

Terms used in the claims and specification are defined as set forth below unless otherwise specified.

It must be noted that, as used in the specification and the appended claims, the singular forms "a," "an" and "the" include plural referents unless the context clearly dictates otherwise.

This invention relates to methods and compositions for improving plant health. The present invention includes methods for improving plant health, as well as synthetic compositions comprising endophytes capable of improving plant health, and nucleic acid probes and nucleic acid detection kits that may be used to identify endophytes of the present invention.

"Plant health" is demonstrated by the improvement of a trait of agronomic importance in a plant or plant element as compared to a reference plant or plant element. A trait of agronomic importance includes, but is not limited to, drought tolerance, heat tolerance, cold tolerance, salinity tolerance, metal tolerance, herbicide tolerance, improved water use efficiency, improved nitrogen utilization, improved nitrogen fixation, improved nutrient use efficiency, improved nutrient utilization, biotic stress tolerance, increased disease resistance, yield improvement, health enhancement, vigor improvement, decreased necrosis, decreased chlorosis, decreased area of necrotic tissue, increased stand count, decreased area of chlorotic tissue, decreased pathogen load of tissues, growth improvement, photosynthetic capability improvement, nutrition enhancement, altered protein content, altered oil content, increased biomass, increased shoot height, increased root length, increased shoot biomass, increased root biomass, increased leaf area, increased shoot area, increased root area, improved root architecture, increased seed germination percentage, increased seed germination rate, increased seedling survival, increased survival, photosynthetic efficiency, transpiration rate, seed/fruit number or mass, plant grain or fruit yield, leaf chlorophyll content, photosynthetic rate, wilt recovery, turgor pressure, modulation of a metabolite, production of a volatile organic compound (VOC), modulation of the proteome, increased seed weight, altered seed carbohydrate composition, altered seed oil composition, altered seed protein composition, altered seed nutrient composition, and combinations thereof. The phrase "biotic stress" refers to a growth environment comprising one or more pests or pathogens. Pests can be nematodes and/or insects. In some embodiments, a pest is of an order Lepidoptera, Hemiptera, Tylenchida/Rhabditida, Dorylaimida, Trichinellida, or Triplonchida. In some embodiments, a pest is of a genera *Chrysodeixis, Trichoplusia, Nezara, Lygus, Aphis, Belonolaimus, Xiphenema, Trichodorus, Pratylenchus, Aphelenchoides, Meloidogyne*, or *Rotylenchulus*. Pathogens can be fungal, viral, protist, or bacterial pathogens, for example of vertebrates or plants. In some embodiments, a pathogen is of a genera *Pythium, Rhizoctonia, Phytophthora, Fusarium, Alternaria, Stagonospora, Aspergillus, Magnaporthe, Botrytis, Puccinia, Blumeria, Erysiphe, Leveillula, Mycosphaerella*, or *Colletotrichum*.

"Biomass" means the total mass or weight (fresh or dry), at a given time (for example, age or stage of development), of a plant tissue, plant tissues, an entire plant, or population of plants. The term may also refer to all the plants or species in the community ("community biomass").

An "increased yield" can refer to any increase in seed or fruit biomass; or seed, seed pod or ear, or fruit number per plant; or seed or fruit weight; or seed or fruit size per plant or unit of production area, e.g. acre or hectare. For example, increased yield of seed or fruit biomass may be measured in units of bushels per acre, pounds per acre, tons per acre, or kilos per hectare. An increased yield can also refer to an increase production of a component of, or product derived from, a plant or plant element or of a unit of measure thereof. For example, increased carbohydrate yield of a grain or increased oil yield of a seed. Typically, where yield indicates an increase in a particular component or product derived from a plant, the particular characteristic is designated when referring to increased yield, e.g., increased oil or grain yield or increased protein yield or seed size.

"Nutrition enhancement" refers to modulation of the presence, abundance or form of one or more substances in a plant element, wherein the modulation of the one or more substances provides a benefit to other organisms that consume or utilize said plant element.

Synthetic compositions and methods of use described herein may improve plant health by providing an improved benefit or tolerance to a plant that is of at least 0.1%, at least 0.5%, at least 1%, at least 2%, at least 3%, between 3% and 5%, at least 5%, between 5% and 10%, at least 10%, between 10% and 15%, for example at least 15%, between 15% and 20%, at least 20%, between 20% and 30%, at least 30%, between 30% and 40%, at least 40%, between 40% and 50%, at least 50%, between 50% and 60%, at least 60%, between 60% and 75%, at least 75%, between 75% and 100%, at least 100%, between 100% and 150%, at least 150%, between 150% and 200%, at least 200%, between 200% and 300%, at least 300% or more, when compared with a reference plant. A "reference plant", "reference plant element", "reference agricultural plant" or "reference seed" means a similarly situated plant or seed of the same species, strain, or cultivar to which a treatment, formulation, composition or endophyte preparation as described herein is not administered/contacted. A reference plant, therefore, is identical to the treated plant except for the presence of the active ingredient to be tested and can serve as a control for detecting the effects of the treatment conferred to the plant. A plurality of reference plants may be referred to as a "reference population".

In some embodiments, one or more endophytes and or one or more compounds produced by one or more endophytes are heterologously disposed on a plant element in an effective amount to improve plant health. In some embodiments, an improvement of plant health is measured by an increase in a trait of agronomic importance, for example root length or yield. In some embodiments, an improvement of subject health is measured by a decrease in a trait of importance, for example necrosis or chlorosis. In some embodiments, improved plant health is demonstrated by an improvement of a trait of agronomic importance or tolerance in a treated plant by at least 0.1%, at least 0.5%, at least 1%, at least 2%, at least 3%, between 3% and 5%, at least 5%, between 5% and 10%, at least 10%, between 10% and 15%, for example at least 15%, between 15% and 20%, at least 20%, between 20% and 30%, at least 30%, between 30% and 40%, at least 40%, between 40% and 50%, at least 50%, between 50% and 60%, at least 60%, between 60% and 75%, at least 75%, between 75% and 100%, at least 100%, between 100% and 150%, at least 150%, between 150% and 200%, at least 200%, between 200% and 300%, at least 300% or more, as compared to a reference plant element not further comprising said endophyte. An "effective amount" of one or more endophytes is the amount capable of improving trait of agronomic importance or tolerance by at least 0.1%, at least 0.5%, at least 1%, at least 2%, at least 3%, between 3% and 5%, at least 5%, between 5% and 10%, at least 10%, between 10% and 15%, for example at least 15%, between 15% and 20%, at least 20%, between 20% and 30%, at least 30%, between 30% and 40%, at least 40%, between 40% and 50%, at least 50%, between 50% and 60%, at least 60%, between 60% and 75%, at least 75%, between 75% and 100%, at least 100%, between 100% and 150%, at least 150%, between 150% and 200%, at least 200%, between 200% and 300%, at least 300% or more, as compared to a reference plant element not further comprising said endophyte. In some embodiments, an effective amount of treatment comprising an endophyte is at least 10 CFU per unit of plant element, at least 10^2 CFU per unit of plant element, between 10^2 and 10^3 CFU per unit of plant element, at least about 10^3 CFU per unit of plant element, between 10^3 and 10^4 CFU per unit of plant element, at least about 10^4 CFU per unit of plant element, between 10^4 and 10^5 CFU per unit of plant element, at least about 10^5 CFU, between 10^5 and 10^6 CFU per unit of plant element, at least about 10^6 CFU per unit of plant element, between 10^6 and 10^7 CFU per unit of plant element, at least about 10^7 CFU per unit of plant element, between 10^7 and 10^8 CFU per unit of plant element, or even greater than 10^8 CFU per unit of plant element. A unit of a plant element may be an individual plant element, e.g. an individual seed, or a unit of area surface area of a plant element, e.g. a square inch of leaf tissue, or unit of surface area of a plant element, e.g. a cubic centimeter of root.

The methods and compositions of the present invention are broadly applicable to cultivated plants, particularly plants that are cultivated by humans for food, feed, fiber, fuel, and/or industrial purposes. In some embodiments, plants (including seeds and other plant elements) are monocots or dicots. In some embodiments, plants used in the methods and compositions of the present invention include, but are not limited to: agricultural row, agricultural grass plants or other field crops: wheat, rice, barley, buckwheat, beans (for example: soybean, snap, dry), corn (for example: grain, seed, sweet corn, silage, popcorn, high oil), canola, peas (for example: dry, succulent), peanuts, safflower, sunflower, alfalfa hay, forage and cover crops (for example: alfalfa, clover, vetch, and trefoil), berries and small fruits (for example: blackberries, blueberries, currants, elderberries, gooseberries, huckleberries, loganberries, raspberries, strawberries, bananas and grapes), bulb crops (for example: garlic, leeks, onions, shallots, and ornamental bulbs), citrus fruits (for example: citrus hybrids, grapefruit, kumquat, lines, oranges, and pummelos), cucurbit vegetables (for example: cucumbers, melons, gourds, pumpkins, and squash), flowers (for example: ornamental, horticultural flowers including roses, daisies, tulips, freesias, carnations, heather, lilies, irises, orchids, snapdragons, and ornamental sunflowers), bedding plants, ornamentals, fruiting vegetables (for example: eggplant, sweet and hot peppers, tomatillos, and tomatoes), herbs, spices, mints, hydroponic crops (for example: cucumbers, tomatoes, lettuce, herbs, and spices), leafy vegetables and cole crops (for example: arugula, celery, chervil, endive, fennel, lettuce including head and leaf, parsley, radicchio, rhubarb, spinach, Swiss chard, broccoli, Brussels sprouts, cabbage, cauliflower, collards, kale, kohlrabi, and mustard greens), asparagus, legume vegetable and field crops (for example: snap and dry beans, lentils, succulent and dry peas, and peanuts), pome fruit (for example: pears and quince), root crops (for example: beets, sugarbeets, red beets, carrots, celeriac, chicory, horseradish, parsnip, radish, rutabaga, salsify, and turnips), deciduous trees (for example: maple and oak), evergreen trees (for example: pine, cedar, hemlock and spruce), small grains (for example: rye, wheat including spring and winter wheat, millet, oats, barley including spring and winter barley, and spelt), stone fruits (for example: apricots, cherries, nectarines, peaches, plums, and prunes), tree nuts (for example: almonds, beech nuts, Brazil nuts, butternuts, cashews, chestnuts, filberts, hickory nuts, macadamia nuts, pecans, pistachios, and walnuts), and tuber crops (for example: potatoes, sweet potatoes, yams, artichoke, cassava, and ginger). In a particular embodiment, the agricultural plant is selected from the group consisting of rice (*Oryza sativa* and related varieties), soy (*Glycine max* and related varieties), wheat (*Triticum aestivum* and related varieties), oats (*Avena sativa* and related varieties), barley (*Hordeum vulgare* and related varieties), corn (*Zea mays* and related varieties), peanuts (*Arachis hypogaea* and related varieties), canola (*Brassica napus, Brassica rapa* and related varieties), coffee (*Coffea* spp.), cocoa (*Theobroma cacao*), melons, and tomatoes (*Solanum lycopsersicum* and related varieties).

Plant health may be improved by treatment of a plant or plant element. A "plant element" is intended to generically reference either a whole plant or a plant component, including but not limited to plant tissues, parts, and cell types. A plant element is preferably one of the following: whole plant, seedling, meristematic tissue, ground tissue, vascular tissue, dermal tissue, seed, leaf, root, shoot, stem, flower, fruit, stolon, bulb, tuber, corm, keikis, shoot, or bud.

Plant health may be improved by treatment with a composition of the present invention, in particular compositions of the present invention comprising one or more endophytes. An "endophyte" is an organism capable of living on a plant element (e.g., rhizoplane or phyllosphere) or within a plant element, or on a surface in close physical proximity with a plant element, e.g., the phyllosphere and rhizosphere including soil surrounding roots. A "beneficial" endophytes does not cause disease or harm the host plant otherwise. Endophytes can occupy the intracellular or extracellular spaces of plant tissue, including the leaves, stems, flowers, fruits, seeds, or roots. An endophyte can be, for example, a bacterial or fungal organism, and can confer a beneficial property to the host plant such as an increase in yield, biomass, resistance, or fitness. An endophyte can be a fungus or a bacterium. As used herein, the term "microbe" is sometimes used to describe an endophyte. As used herein, the term "microbe" or "microorganism" refers to any species or taxon of microorganism, including, but not limited to, archaea, bacteria, microalgae, fungi (including mold and yeast species), mycoplasmas, microspores, nanobacteria, oomycetes, and protozoa. In some embodiments, a microbe or microorganism is an endophyte, for example a bacterial or fungal endophyte, which is capable of living within a plant.

The term "isolated" is intended to specifically reference an organism, cell, tissue, polynucleotide, or polypeptide that is removed from its original source and purified from additional components with which it was originally associated. For example, an endophyte may be considered isolated from a seed if it is removed from that seed source and purified so that it is isolated from one or more additional components with which it was originally associated. Similarly, an endophyte may be removed and purified from a plant or plant element so that it is isolated and no longer associated with its source plant or plant element.

As used herein, an isolated strain of a microbe is a strain that has been removed from its natural milieu. "Pure cultures" or "isolated cultures" are cultures in which the organisms present are only of one strain of a particular genus and species. This is in contrast to "mixed cultures," which are cultures in which more than one genus and/or species of microorganism are present. As such, the term "isolated" does not necessarily reflect the extent to which the microbe has been purified. A "substantially pure culture" of the strain of microbe refers to a culture which contains substantially no other microbes than the desired strain or strains of microbe. In other words, a substantially pure culture of a strain of microbe is substantially free of other contaminants, which can include microbial contaminants. Further, as used herein, a "biologically pure" strain is intended to mean the strain was separated from materials with which it is normally associated in nature. A strain associated with other strains, or with compounds or materials that it is not normally found with in nature, is still defined as "biologically pure." A monoculture of a particular strain is, of course, "biologically pure." As used herein, the term "enriched culture" of an isolated microbial strain refers to a microbial culture that contains more that 50%, 60%, 70%, 80%, 90%, or 95% of the isolated strain.

A "population" of endophytes, or an "endophyte population", refers to one or more endophytes that share a common genetic derivation, e.g., one or more propagules of a single endophyte, i.e., endophytes grown from a single picked colony. In some embodiments, a population refers to endophytes of identical taxonomy. In some cases, a population of endophytes refers to one or more endophytes of the same genus. In some cases, a population of endophytes refers to one or more endophytes of the same species or strain.

A "plurality of endophytes" means two or more types of endophyte entities, e.g., of bacteria or fungi, or combinations thereof. In some embodiments, the two or more types of endophyte entities are two or more individual endophytic organisms, regardless of genetic derivation or taxonomic relationship. In some embodiments, the two or more types of endophyte entities are two or more populations of endophytes. In other embodiments, the two or more types of endophyte entities are two or more species of endophytes. In yet other embodiments, the two or more types of endophyte entities are two or more genera of endophytes. In yet other embodiments, the two or more types of endophyte entities are two or more families of endophytes. In yet other embodiments, the two or more types of endophyte entities are two or more orders of endophytes. In yet other embodiments, the two or more types of endophyte entities are two or more classes of endophytes. In yet other embodiments, the two or more types of endophyte entities are two or more phyla of endophytes. In some embodiments, a plurality refers to three or more endophytes, either distinct individual organisms or distinct members of different genetic derivation or taxa. In some embodiments, a plurality refers to four or more either distinct individual endophytic organisms or distinct members of different genetic derivation or taxa. In some embodiments, a plurality refers to five or more, ten or more, or an even greater number of either distinct individual endophytic organisms or distinct members of different genetic derivation or taxa. In some embodiments, the term “consortium” or “consortia” may be used as a collective noun synonymous with “plurality”, when describing more than one population, species, genus, family, order, class, or phylum of endophytes.

In some embodiments, a treatment may comprise a modified microbe or plant or plant element. A microbe or plant or plant element is “modified” when it comprises an artificially introduced genetic or epigenetic modification. In some embodiments, the modification is introduced by a genome engineering or genome editing technology. In some embodiments, genome engineering or editing utilizes non-homologous end joining (NHEJ), homology directed repair (HDR), or combinations thereof. In some embodiments, genome engineering or genome editing is carried out with a Class I or Class II clustered regulatory interspaced short palindromic repeats (CRISPR) system. In some embodiments, the CRISPR system is CRISPR/Cas9. In some embodiments, the CRISPR system is CRISPR/Cpf1. In some embodiments, the modification is introduced by a targeted nuclease. In some embodiments, targeted nucleases include, but are not limited to, transcription activator-like effector nuclease (TALEN), zinc finger nuclease (ZNF), Cas9, Cas9 variants, Cas9 homologs, Cpf1, Cpf1 variants, Cpf1 homologs, and combinations thereof. In some embodiments, the modification is an epigenetic modification. In some embodiments, the modification is introduced by treatment with a DNA methyltransferase inhibitor such as 5-azacytidine, or a histone deacetylase inhibitor such as 2-amino-7-methoxy-3H-phenoxazin-3-one. In some embodiments, the modification is introduced via tissue culture. In some embodiments, a modified microbe or plant or plant element comprises a transgene.

As used herein, the term “bacterium” or “bacteria” refers in general to any prokaryotic organism and may reference an organism from either Kingdom Eubacteria (Bacteria), Kingdom Archaebacteria (Archaea), or both. In some cases, bacterial genera have been reassigned due to various reasons (such as, but not limited to, the evolving field of whole genome sequencing), and it is understood that such nomenclature reassignments are within the scope of any claimed genus.

As used herein, the term “fungus” or “fungi” refers in general to any organism from Kingdom Fungi. Historical taxonomic classification of fungi has been according to morphological presentation. Beginning in the mid-1800’s, it was recognized that some fungi have a pleomorphic life cycle, and that different nomenclature designations were being used for different forms of the same fungus. With the development of genomic sequencing, it became evident that taxonomic classification based on molecular phylogenetics did not align with morphological-based nomenclature (Shenoy B D, Jeewon R, Hyde K D. Impact of DNA sequence-data on the taxonomy of anamorphic fungi. Fungal Diversity 26(10) 1-54. 2007). Systematics experts have not aligned on common nomenclature for all fungi, nor are all existing databases and information resources inclusive of updated taxonomies. As such, many fungi provided herein may be described by their anamorph form, but it is understood that based on identical genomic sequencing, any pleomorphic state of that fungus may be considered to be the same organism. In some cases, fungal genera have been reassigned due to various reasons, and it is understood that such nomenclature reassignments are within the scope of any claimed genus.

The degree of relatedness between microbes may be inferred from the sequence similarity of one or more homologous polynucleotide sequences of the microbes. In some embodiments, the one or more homologous polynucleotide sequences are marker genes. As used herein, the term “marker gene” refers to a conserved genomic region comprising sequence variation among related organisms. Examples of marker genes that may be used for the present invention, include but are not limited to: 16S ribosomal RNA gene (“16S”), internal transcribed spacer (“ITS”); fusA gene; largest subunit of RNA polymerase II (“RPB1”); second largest subunit of RNA polymerase II (“RPB2”); beta-tubulin or tubulin (“BTUB2” or “TUB2”); phosphoglycerate kinase (“PGK”); actin (“ACT”); long subunit rRNA gene (“LSU”); small subunit rRNA gene (“SSU”), 60S ribosomal protein L 10 (“60S_L10_L1”), atpD, Calmodulin (“CMD”), GDP gene (“GPD1_2”), etc.

The terms “sequence similarity”, “identity”, “percent identity”, “percent sequence identity” or “identical” in the context of polynucleotide sequences refer to the nucleotides in the two sequences that are the same when aligned for maximum correspondence. There are different algorithms known in the art that can be used to measure nucleotide sequence identity. Nucleotide sequence identity can be measured by a local or global alignment, preferably implementing an optimal local or optimal global alignment algorithm. For example, a global alignment may be generated using an implementation of the Needleman-Wunsch algorithm (Needleman, S. B. & Wunsch, C. D. (1970) Journal of Molecular Biology. 48(3):443-53). For example, a local alignment may be generated using an implementation of the Smith-Waterman algorithm (Smith T. F & Waterman, M. S. (1981) Journal of Molecular Biology. 147(1): 195-197). Optimal global alignments using the Needleman-Wunsch algorithm and optimal local alignments using the Smith-Waterman algorithm are implemented in USEARCH, for example USEARCH version v8.1.1756_i86osx32.

A gap is a region of an alignment wherein a sequence does not align to a position in the other sequence of the alignment. A terminal gap is a region beginning at the end of a sequence in an alignment wherein the nucleotide in the terminal position of that sequence does not correspond to a nucleotide position in the other sequence of the alignment and extending for all contiguous positions in that sequence wherein the nucleotides of that sequence do not correspond to a nucleotide position in the other sequence of the alignment. An internal gap is a gap in an alignment which is flanked on the 3' and 5' end by positions wherein the aligned sequences are identical. In global alignments, terminal gaps are discarded before identity is calculated. For both local and global alignments, internal gaps are counted as differences.

In some embodiments, the nucleic acid sequence to be aligned is a complete gene. In some embodiments, the nucleic acid sequence to be aligned is a gene fragment. In some embodiments, the nucleic acid sequence to be aligned is an intergenic sequence. In a preferred embodiment, inference of homology from a sequence alignment is made where the region of alignment is at least 85% of the length of the query sequence.

The term "substantial homology" or "substantial similarity," when referring to a polynucleotide sequence or fragment thereof, indicates that, when optimally aligned with appropriate nucleotide insertions or deletions with another polynucleotide sequence (or its complementary strand), there is nucleotide sequence identity in at least about 76%, 80%, 85%, or at least about 90%, or at least about 95%, 96%, at least 97%, 98%, 99% or 100% of the positions of the alignment, wherein the region of alignment is at least about 50%, 60%, 70%, 75%, 85%, or at least about 90%, or at least about 95%, 96%, 97%, 98%, 99% or 100% of the length of the query sequence. In a preferred embodiment, the region of alignment contains at least 100 positions inclusive of any internal gaps. In some embodiments, the region of alignment comprises at least 100 nucleotides of the query sequence. In some embodiments, the region of alignment comprises at least 200 nucleotides of the query sequence. In some embodiments, the region of alignment comprises at least 300 nucleotides of the query sequence. In some embodiments, the region of alignment comprises at least 400 nucleotides of the query sequence. In some embodiments, the region of alignment comprises at least 500 nucleotides of the query sequence. In some embodiments, the terminal nucleotides are trimmed from one or both ends of the sequence prior to alignment. In some embodiments, at least the terminal 10, 15, 20, 25, 30, between 20-30, 35, 40, 45, 50, between 25-50 nucleotides are trimmed from the sequence prior to alignment.

Synthetic Compositions for Improving Plant Health

In some embodiments, a synthetic composition comprises one or more endophytes capable of improving plant health. A "synthetic composition" comprises one or more endophytes combined by human endeavor with a heterologously disposed plant element or a treatment formulation, said combination which is not found in nature. In some embodiments, a synthetic composition comprises one or more plant elements or formulation components combined by human endeavor with an isolated, purified endophyte composition. In some embodiments, synthetic composition refers to a plurality of endophytes in a treatment formulation comprising additional components with which said endophytes are not found in nature. An endophyte is "heterologously disposed" when mechanically or manually applied, artificially inoculated or disposed onto or into a plant element, seedling, plant or onto or into a plant growth medium or onto or into a treatment formulation so that the endophyte exists on or in the plant element, seedling, plant, plant growth medium, or formulation in a manner not found in nature prior to the application of the treatment, e.g., said combination which is not found in nature in that plant variety, at that time in development, in that tissue, in that abundance, or in that growth condition (for example, drought, flood, cold, nutrient deficiency, etc.).

A "treatment formulation" refers to one or more compositions that facilitate the stability, storage, and/or application of one or more endophytes. Treatment formulations may comprise any one or more agents such as: a surfactant, a buffer, a tackifier, a microbial stabilizer, an antimicrobial, a fungicide, an anticomplex agent, an herbicide, a nematicide, an insecticide, a plant growth regulator, a rodenticide, a desiccant, a nutrient, an excipient, a wetting agent, a salt, a polymer. As used herein as a noun, a "treatment" may comprise one or more endophytes.

In some embodiments, a treatment formulation may comprise one or more polymeric beads comprising one or more endophytes. In some embodiments, a treatment formulation may consist of one or more polymeric beads comprising one or more endophytes. A polymeric bead may contain a biodegradable polymer such as alginate, agarose, agar, gelatin, polyacrylamide, chitosan, and polyvinyl alcohol. In some embodiments, the polymeric beads are less than 500 μm in diameter at their widest point. In some embodiments, the polymeric beads' average diameter at their widest point is between 500 μm and 250 μm, between 249 μm and 100 μm, 100 μm or less, between 100 μm and 50 μm, or 50 μm or less.

In some embodiments, an "agriculturally compatible carrier" can be used to formulate an agricultural formulation or other composition that includes a purified endophyte preparation. As used herein an "agriculturally compatible carrier" refers to any material, other than water, that can be added to a plant element without causing or having an adverse effect on the plant element (e.g., reducing seed germination) or the plant that grows from the plant element, or the like.

In some embodiments, the formulation can include a tackifier or adherent. Such agents are useful for combining the bacterial population of the invention with carriers that can contain other compounds (e.g., control agents that are not biologic), to yield a coating composition. Such compositions help create coatings around the plant or seed to maintain contact between the microbe and other agents with the plant or plant part. In some embodiments, adherents are selected from the group consisting of: alginate, gums, starches, lecithins, formononetin, polyvinyl alcohol, alkali formononetinate, hesperetin, polyvinyl acetate, cephalins, Gum Arabic, Xanthan Gum, Mineral Oil, Polyethylene Glycol (PEG), Polyvinyl pyrrolidone (PVP), Arabino-galactan, Methyl Cellulose, PEG 400, Chitosan, Polyacrylamide, Polyacrylate, Polyacrylonitrile, Glycerol, Triethylene glycol, Vinyl Acetate, Gellan Gum, Polystyrene, Polyvinyl, Carboxymethyl cellulose, Gum Ghatti, and polyoxyethylene-polyoxybutylene block copolymers.

The formulation can also contain a surfactant. Non-limiting examples of surfactants include nitrogen-surfactant blends such as Prefer 28 (Cenex), Surf-N(US), Inhance (Brandt), P-28 (Wilfarm) and Patrol (Helena); esterified seed oils include Sun-It II (AmCy), MSO (UAP), Scoil (Agsco), Hasten (Wilfarm) and Mes-100 (Drexel); and organo-silicone surfactants include Silwet L77 (UAP), Silikin (Terra), Dyne-Amie (Helena), Kinetic (Helena), Sylgard 309 (Wilbur-Ellis) and Century (Precision). In one embodiment, the surfactant is present at a concentration of between 0.01% v/v to 10% v/v. In another embodiment, the surfactant is present at a concentration of between 0.1% v/v to 1% v/v.

In certain cases, the formulation includes a microbial stabilizer. Such an agent can include a desiccant. As used herein, a "desiccant" can include any compound or mixture of compounds that can be classified as a desiccant regardless of whether the compound or compounds are used in such concentrations that they in fact have a desiccating effect on the liquid inoculant. Such desiccants are ideally compatible with the bacterial population used, and should promote the ability of the microbial population to survive application on the seeds and to survive desiccation. Examples of suitable desiccants include one or more of trehalose, sucrose, glycerol, and Methylene glycol. Other suitable desiccants include, but are not limited to, non reducing sugars and sugar alcohols (e.g., mannitol or sorbitol). The amount of desiccant introduced into the formulation can range from about 5% to about 50% by weight/volume, for example, between about 10% to about 40%, between about 15% and about 35%, or between about 20% and about 30%.

In some embodiments the formulation includes, for example, solid carriers such as talc, fullers earth, bentonite, kaolin clay, pyrophyllite, bentonite, montmorillonite, diatomaceous earth, acid white soil, vermiculite, and pearlite, and inorganic salts such as ammonium sulfate, ammonium phosphate, ammonium nitrate, urea, ammonium chloride, and calcium carbonate. Also, organic fine powders such as wheat flour, wheat bran, and rice bran maybe used. The liquid carriers include vegetable oils such as soybean oil and cottonseed oil, glycerol, ethylene glycol, polyethylene glycol, propylene glycol, polypropylene glycol, etc.

In some embodiments, the abundance of an endophyte can be estimated by methods well known in the art including, but not limited to, qPCR, community sequencing, flow cytometry, and/or counting colony-forming units. As used herein, a "colony-forming unit" ("CFU") is used as a measure of viable microorganisms in a sample. A CFU is an individual viable cell capable of forming on a solid medium a visible colony whose individual cells are derived by cell division from one parental cell.

In some embodiments, the synthetic composition of the present invention comprises one or more of the following: antimicrobial, fungicide, nematicide, bactericide, insecticide, or herbicide.

In some embodiments, the time to 1 log loss in CFU of an endophyte in formulation is at greater than or equal to 168 days, greater than or equal to 150 days, greater than or equal to 125 days, greater than or equal to 100 days, greater than or equal to 75 days, greater than or equal to 50 days, greater than or equal to 20 days at 4 degrees Celsius. In some embodiments, the time to 1 log loss in CFU of an endophyte in formulation is at least 140 days, at least 90 days, at least 60 days, at least 50 days, at least 30 days, at least 20 days, at 22 degrees Celsius. In some embodiments, the time to 2 log loss in CFU of an endophyte on a seed is at least 3 days, at least 5 days, at least 10 days, at least 20 days, at least 21 days, at least 22 days, at least 23 days, at least 24 days, at least 25 days, at 22 degrees Celsius.

In some embodiments, a treatment is applied mechanically or manually or artificially inoculated to a plant element in a seed treatment, root wash, seedling soak, foliar application, floral application, soil inoculum, in-furrow application, sidedress application, soil pre-treatment, wound inoculation, drip tape irrigation, vector-mediation via a pollinator, injection, osmopriming, hydroponics, aquaponics, aeroponics, and combinations thereof. Application to the plant may be achieved, for example, as a powder for surface deposition onto plant leaves, as a spray to the whole plant or selected plant element, as part of a drip to the soil or the roots, or as a coating onto the plant element prior to or after planting. Such examples are meant to be illustrative and not limiting to the scope of the invention.

In some embodiments, the invention described herein provides a synthetic composition comprising one or more endophytes capable of improving plant health, wherein the one or more endophytes is a member of the Class Chitinophagia, Bacilli, Gammaproteobacteria, or Sordariomycetes. In some embodiments, the one or more endophytes is a member of the Order Chitinophagales, Bacillales, Pseudomonadales, or Hypocreales. In some embodiments, the one or more endophytes is a member of the Family Chitinophagaceae, Bacillaceae, Pseudomonadaceae, or Hypocreaceae. In some embodiments, the one or more endophytes is a member of the Genus *Chitinophaga, Bacillus, Pseudomonas*, or *Trichoderma*. In some embodiments, the one or more endophytes are selected from Table 3. In some embodiments, the one or more endophytes comprise one or more polynucleotide sequences at least 95%, at least 96%, at least 97%, at least 97%, at least 98%, at least 99%, or 100% identical to one or more of SEQ ID NOs. 27, 32-93, 127, or 132. In some embodiments, the one or more endophytes are capable of producing a protein whose amino acid sequence is at least 95%, at least 96%, at least 97%, at least 97%, at least 98%, at least 99%, or 100% identical to one or more of SEQ ID NOs. 28-31, 94-126, 128-131, 133-135, or 136.

In some embodiments of any of the synthetic compositions described herein, the synthetic compositions comprise at least 2, 3, 4, 5, 6, 7, 8, 9, 10, 15 or 20 or more endophytes. In some embodiments, the one or more endophytes comprise at least 2, 3, 4, 5, 6, 7, 8, 9, 10, 15 or 20 or more endophytes. In some embodiments, the one or more endophytes are distinct individual organisms or distinct members of different genetic derivation or taxa.

Methods for Improving Plant Health

In some embodiments, the invention provides methods of improving plant health comprising heterologously disposing one or more endophytes to a plant element in an effective amount to increase a trait of agronomic importance in the plant derived from the treated plant element relative to a plant derived from a reference plant element. In some embodiments, the one or more endophytes are a component of a treatment formulation. In some embodiments, the one or more endophytes are a component of a synthetic composition.

In some embodiments, the invention provides methods of improving plant health comprising creating any of the synthetic compositions described herein, wherein the synthetic composition comprises any of the plant elements of any of the plants described herein and any of the one or more endophytes described herein. In some embodiments, the synthetic composition comprises any of the treatment formulations described herein and any of the one or more endophytes described herein. In some embodiments, the synthetic composition additionally comprises a growth medium or growth environment. A growth environment is a natural or artificially constructed surrounding capable of supporting life of a plant. In some embodiments, the growth medium is soil. In some embodiments, the growth medium is a culture fluid suitable for propagation of an endophyte or plant tissue culture. In some embodiments, the method comprises a step of applying the synthetic composition to a growth medium. In some embodiments, the synthetic composition is applied before one or more plant elements are placed in or on the growth medium. In some embodiments, the synthetic composition is applied after one or more plant elements are placed in or on the growth medium. In some embodiments, the method comprises a step of germinating the plants. In some embodiments, the method comprises a step of growing the plants. For example, the plants may be grown in the plant vigor assays, greenhouse assessments, or field trials described herein. In some embodiments, the method comprises a step of growing the plants to maturity. In some embodiments, where the plants are commercially produced, maturity is the stage at which the plant is normally harvested.

In some embodiments of any of the methods described herein, plant health may be improved for plants in a stress condition. In some embodiments, the stress condition is a biotic or abiotic stress, or a combination of one or more biotic or abiotic stresses. In some embodiments of any of the methods described herein, the stress condition is an abiotic stress selected from the group consisting of: drought stress, salt stress, metal stress, heat stress, cold stress, low nutrient stress (alternately referred to herein as nutrient deficiency or growth in nutrient deficient conditions), and excess water stress, and combinations thereof. In some embodiments of any of the methods described herein, the stress condition is a biotic stress selected from the group consisting of: insect infestation, nematode infestation, complex infection, fungal infection, bacterial infection, oomycete infection, protozoal infection, viral infection, herbivore grazing, and combinations thereof. Stress tolerance is exemplified by improvement of one or more other traits of agronomic importance when compared with a reference plant, reference plant element, or reference population. For example, biotic stress tolerance may be shown by decreased pathogen load of tissues, decreased area of chlorotic tissue, decreased necrosis, improved growth, increased survival, increased biomass, increased shoot height, increased root length, etc. relative to a reference.

EXAMPLES

Example 1. Isolation and Identification of Endophytes

DNA Extraction

Endophytes of the present invention were isolated from the sources listed in Table 1.

TABLE 1

Sources of microbes of the present invention

| MIC ID | Isolated From | Isolation Condition |
|---|---|---|
| MIC-67967 | *Oryza sativa* (rice) | Low nutrient |
| MIC-84302 | *Lactuca serriola* (Prickly lettuce) | |
| MIC-18905 | *Glycine max* (soybean) | Cold stress |
| MIC-54347 | *Triticum aestivum* (wheat) | |

Each sample was processed independently. Each sample was washed in a dilute water and detergent solution; tissue was collected from plants. Samples were surface sterilized by successive rinses: 2 minutes in 10% bleach solution, 2 minutes in 70% ethanol solution, and a rinse with sterile water. The series of rinses was repeated 3 times. The plant tissue was cut into small pieces with sterile scissors and blended with 3, 7 mm steel beads in 5-7.5 ml phosphate buffered solution (PBS). DNA was extracted from the ground tissues using the Magbind Plant DNA kit (Omega, Norcross, Georgia, USA) according to the manufacturer's instructions.

Identification of Endophytes by Sequencing of Marker Genes

The endophytes were characterized by the sequences of genomic regions. Primers that amplify genomic regions of the endophytes of the present invention are listed in Table 2. Sanger sequencing was performed at Genewiz (South Plainfield, NJ). Raw chromatograms were converted to sequences, and corresponding quality scores were assigned using TraceTuner v3.0.6beta (U.S. Pat. No. 6,681,186). These sequences were quality filtered, aligned and a consensus sequence generated using Geneious v 8.1.8 (Biomatters Limited, Auckland NZ). The consensus sequences identifying the endophytes are listed in Table 3.

TABLE 2

Primer sequences useful in identifying microbes of the present invention

| Seq ID | Genomic Locus | Sequence |
|---|---|---|
| 1 | 27f, 16S, 16S IRNA gene | AGAGTTTGATYMTGGCTCAG |
| 2 | 1492r, 16S, 16S rRNA gene | GGTTACCTTGTTACGACTT |
| 3 | 515f, 16S, 16S rRNA gene | GTGYCAGCMGCCGCGGTAA |
| 4 | 806r, 16S, 16S rRNA gene | GGACTACNVGGGTWTCTAAT |
| 5 | ITSIF, ITS, Internal transcribed spacer | CTTGGTCATTTAGAGGAAGTAA |
| 6 | LR5, ITS, Internal transcribed spacer | TCCTGAGGGAAACTTCG |
| 7 | ITS2, ITS, Internal transcribed spacer | GCTGCGTTCTTCATCGATGC |
| 8 | ITS3, ITS, Internal transcribed spacer | GCATCGATGAAGAACGCAGC |
| 9 | ACT512f, ACT, Actin | ATGTGCAAGGCCGGTTTCG |
| 10 | ACT783r, ACT, Actin | TACGAGTCCTTCTGGCCCAT |
| 11 | CA14, ACT, Actin | AACTGGGATGACATGGAGAAGATCTGGC |
| 12 | CA5R, ACT, Actin | GTGAACAATGGATGGACCAGATTCGTCG |
| 13 | Cmd5, CMD, Calmodulin | CCGAGTACAAGGARGCCTTC |
| 14 | Cmd6, CMD, Calmodulin | CCGATRGAGGTCATRACGTGG |
| 15 | 5.8S, ITS, Internal transcribed spacer | CGCTGCGTTCTTCATCG |

TABLE 2-continued

| Seq ID | Genomic Locus | Sequence |
|---|---|---|
| | Primer sequences useful in identifying microbes of the present invention | |
| 16 | 5.8SR, ITS, Internal transcribed spacer | TCGATGAAGAACGCAGCG |
| 17 | ITS1, ITS, Internal transcribed spacer | TCCGTAGGTGAACCTGCGG |
| 18 | ITS4, ITS, Internal transcribed spacer | TCCTCCGCTTATTGATATGC |
| 19 | ITS5, ITS, Internal transcribed spacer | GGAAGTAAAAGTCGTAACAAGG |
| 20 | LS266, ITS, Internal transcribed spacer | GCATTCCCAAACAACTCGACTC |
| 21 | V9G, ITS, Internal transcribed spacer | TTACGTCCCTGCCCTTTGTA |
| 22 | 5F_Eur, RPB2, Second largest subunit of RNA polymerase II | GAYGAYCGKGAYCAYTTCGG |
| 23 | 7CR_Eur, RPB2, Second largest subunit of RNA polymerase II | CCCATRGCYTGYTTRCCCAT |
| 24 | bRPB2-7.1R, RPB2, Second largest subunit of RNA polymerase II | CCCATRGCYTGYTTMCCCATDGC |
| 25 | fRPB2-5F, RPB2, Second largest subunit of RNA polymerase II | GAYGAYMGWGATCAYTTYGG |
| 26 | fRPB2-7R, RPB2, Second largest subunit of RNA polymerase II | CCCATWGCYTGCTTMCCCAT |

TABLE 3

| SEQ ID | MIC ID | Sequence |
|---|---|---|
| | | Exemplary sequences of endophytes of the present invention |
| 27 | MIC-18905 | CTCAGATTGAACGCTGGCGGCAGGCCTAACACATGCAAGTCGAGCGGATGAAAGGAGCTTGC TCCTGGATTCAGCGGCGGACGGGTGAGTAATGCCTAGGAATCTGCCTGGTAGTGGGGGACAA CGTTTCGAAAGGAACGCTAATACCGCATACGTCCTACGGGAGAAAGCAGGGGACCTTCGGGC CTTGCGCTATCAGATGAGCCTAGGTCGGATTAGCTAGTTGGTGAGGTAATGGCTCACCAAGG CGACGATCCGTAACTGGTCTGAGAGGATGATCAGTCACACTGGAACTGAGACACGGTCCAGA CTCCTACGGGAGGCAGCAGTGGGGAATATTGGACAATGGGCGAAAGCCTGATCCAGCCATGC CGCGTGTGTGAAGAAGGTCTTCGGATTGTAAAGCACTTTAAGTTGGGAGGAAGGGTTGTAGA TTAATACTCTGCAATTTTGACGTTACCGACAGAATAAGCACCGGCTAACTCTGTGCCAGCAG CCGCGGTAATACAGAGGGTGCAAGCGTTAATCGGAATTACTGGGCGTAAAGCGCGCGTAGGT GGTTTGTTAAGTTGGATGTGAAATCCCCGGGCTCAACCTGGGAACTGCATCCAAAACTGGCA AGCTAGAGTATGGTAGAGGGTGGTGGAATTTCCTGTGTAGCGGTGAAATGCGTAGATATAGG AAGGAACACCAGTGGCGAAGGCGACCACCTGGACTGATACTGACACTGAGGTGCGAAAGCGT GGGGAGCAAACAGGATTAGATACCCTGGTAGTCCACGCCGTAAACGATGTCAACTAGCCGTT GGGAGCCTTGAGCTCTTAGTGGCGCAGCTAACGCATTAAGTTGACCGCCTGGGGAGTACGGC CGCAAGGTTAAAACTCAAATGAATTGACGGGGGCCCGCACAAGCGGTGGAGCATGTGGTTTA ATTCGAAGCAACGCGAAGAACCTTACCAGGCCTTGACATCCAATGAACTTTCCAGAGATGGA TTGGTGCCTTCGGGAGCATTGAGACAGGTGCTGCATGGCTGTCGTCAGCTCGTGTCGTGAGA TGTTGGGTTAAGTCCCGTAACGAGCGCAACCCTTGTCCTTAGTTACCAGCACGTCATGGTGG GCACTCTAAGGAGACTGCCGGTGACAAACCGGAGGAAGGTGGGGATGACGTCAAGTCATCAT GGCCCTTACGGCCTGGGCTACACACGTGCTACAATGGTCGGTACAGAGGGTTGCCAAGCCGC GAGGTGGAGCTAATCCCACAAAACCGATCGTAGTCCGGATCGCAGTCTGCAACTCGACTGCG TGAAGTCGGAATCGCTAGTAATCGCGAATCAGAATGTCGCGGTGAATACGTTCCCGGGCCTT GTACACACCGCCCGTCACACCATGGGAGTGGGTTGCACCAGAAGTAGCTAGTC |
| 28 | MIC-18905 | MRLIIVSGRSGSGKSTALNVLEDNGYYCIDNLPAGLLPELAERALIHTELAQPLVAVSIDAR NLPSHLSRFPELLEEVRARHIQCDVLYLDADEETLLKRFSETRRRHPLSTANRSLAEAIEDE TALLGPIADLADLKVNTTNLNLYQLRDTIKLRLLNQPEPGTAFLVESFGFKRGMPVDADLVF DVRCLPNPYWKPELRAQSGLDAPVAEYLAAQPEVEEMFQDIYGYLYKWLPRFAASNRAYVTI AIGCTGGHHRSVYLTERLGQALQKTLKNVQVRHRDL |
| 29 | MIC-18905 | MRVILLGAPGAGKGTQAKFITEKFGIPQISTGDMLRAAVKAGTPLGVQAKSIMDAGGLVSDD LIIALVQDRIAQPDCANGFLFDGFPRTIPQAEALVTAGVELDAVVEIAVEDEEIVQRIAGRR VHEASGRVYHIVYNPPKIAGKDDITGEELVQRKDDTEETVRHRLSVYHSQTKPLVEFYQSLS AKAGKPKYSHIPGVGSVEAITAKVLEALS |
| 30 | MIC-18905 | MSGNTYGKLFTVTTAGESHGPALVAIVDGCPPGLEISLEDLQRDLDRRKPGTSRHTTQRQEA DEVEILSGVFEGRTTGCSIGLLIRNTDQKSKDYSAIKDLFRPAHADYTYHHKYGERDYRGGG RSSARETAMRVAAGAIAKKYLASQGIVIRGYMSQLGPIEIPFKTWDSVEQNAFFSPDPDKVP ELEAYMDQLRRDQDSVGAKITVVAEGVMPGLGEPIFDRLDAELAHALMSINAVKGVEIGAGF |

TABLE 3-continued

Exemplary sequences of endophytes of the present invention

| SEQ ID | MIC ID | Sequence |
|---|---|---|
| | | ACVAQRGTEHRDELTPQGFLSNNAGGILGGISSGQPIVAHLALKPTSSITTPGRSIDIHGNP<br>VDVITKGRHDPCVGIRATPIAEAMMAIVLMDHLLRHRGQNADVRVSTPVLGL |
| 31 | MIC-18905 | MTEPALLPRPQLRRLLRKARRSLTPGEQRQAAKGLFRQLAQDPHFRRAKHISLYLPTDGEID<br>PRLLLREAQRRGKATYLPVLSAWPRTKMVFQRIRPGEKLKPNRFRILEPRANLARQRKIWTL<br>DLVLLPLVGFDDVGGRLGMGGGFYDRSLAYLARRKNWRKPTLLGLAHECQKVERLAQASWDV<br>PLQGTVTDKAWYFAG |
| 32 | MIC-54347 | CGGAGGGATCATTACCGAGTTTACAACTCCCAAACCCAATGTGAACGTTACCAAACTGTTGC<br>CTCGGCGGGGTCACGCCCCGGGTGCGTAAAAGCCCCGGAACCAGGCGCCCGCCGGAGGAACC<br>AACCAAACTCTTTCTGTAGTCCCCTCGCGGACGTATTTCTTACAGCTCTGAGCAAAAATTCA<br>AAATGAATCAAAACTTTCAACAACGGATCTCTTGGTTCTGGCATCGATGAAGAACGCAGCGA<br>AATGCGATAAGTAATGTGAATTGCAGAATTCAGTGAATCATCGAATCTTTGAACGCACATTG<br>CGCCCGCCAGTATTCTGGCGGGCATGCCTGTCCGAGCGTCATTTCAACCCTCGAACCCCTCC<br>GGGGGATCGGCGTTGGGGATCGGGACCCCTCACCGGGTGCCGGCCCTGAAATACAGTGGCGG<br>TCTCGCCGCAGCCTCTCCTGCGCAGTAGTTTGCACAACTCGCACCGGGAGCGCGGCGCGTCC<br>ACGTCCGTAAAACACCCAACTTCTGAAATGTTGACCTCGGATCAGGTAGGAATACCCGCTGA<br>ACTTAAGCATAT |
| 33 | MIC-54347 | ATGAAAATGCTTATTACTGCCGCTCTTTTCACCCTGGCCCTCGCCGCCCCTGTCGCCGAGAC<br>TAAGCCTCATAGCATTGCTGCTCGCGATCCCTTTACTTGCCCCGGCGGCCTGACCAACAGCA<br>CCCCCATGTGCTGCAGCGTTAATGTCCTTGGCCTGCTAGCCCTTGATTGCCAGCAACCTGGC<br>GCGGACGGCTGTAGTGGCAGCTCCAAGCCCAATTGTTGCACCCTTGGAGCGGCCGGACAGGG<br>TGTTATTTGCAACGCACTGTAA |
| 34 | MIC-54347 | ATGAAGTCGGCCATTCTTCTTGGGCTCACTGGCCTCGCTGCCAATGTGAATGCCCATCCTGC<br>TAAGCAGCCAGAGACCGGCAACGGCCTGACTAAGCGTGGCGTTGATATTAGCAAGTATAGCT<br>TGCCTAATCTTTCAAAGTACACGTCTTCGCCAAACATCGAACAAGAGGCCTCTCTGCAGTCT<br>TTGGCTTTCAAGCGCAACTATGTGGATACAGCCACACGAGCTGTCAAGAAAGCTGCCCCCAA<br>GGCCGAATTCCGCGTCGTGGATGACCACTATATCGATGTTGACGGCATTGGTCACGTCCACT<br>TTAAGCAGACAGTGCACGGAATTGACATTGACAACGGTGACTTCAAGGTTAACATTGGCAAA<br>GACGGTAGAGTCTTCTCTCATGGAAACAGCTTCTTTTCTGGCAAGCTGCCCCAGCAGAACCC<br>CTTGAGGAAGCGTGATTTCTCTGACCCCACCACTGCGCTCAAGGGTGCAATTGATATCCTGG<br>GCCTCCCGGTTCAGGCTGATGGCGCCACCGCCGAAGCTCAGGAAGGCACTGAGAAGTACACG<br>TTGAAGGGTACATCCGGAGCTGTCAGCGATCCTAAGGCTCACCTCGTTTACCTCGTCAAGGG<br>AGACGGAACTCTGGCTCTGACTTGGCGGGTCGAGACCGATATCATGGACAACTGGCTTCTCA<br>CCTACGTTGACGCAACAACCAACCAAGAGATTCATGGTGTTGTAGACTACGTCTCCGACCTT<br>GCCACCTTCCAGGTTTACCCCTGGGGCCTCAATGACCCCACCGAGGGAGATCGTAAAGTCCT<br>GACCGACCCGTGGAGAACCGATGCCTCCCCATTCACTTGGCTCAGCGACGGAACCACCAACT<br>ATACTGTAACTCGCGGAAACAATGCTATTGCGCAGGATAATCCTTCTGGGGGGGACAGTTAT<br>CTCAATAATCACCGTCCATCCAGCTCGACTCGGGACTTTCAATATCCCTTTACGCTGACTCA<br>GACCAACCCTACAGATTATAGGGATGCTGCCATCACACAGCTCTTTTACACAGTCAACAAGT<br>ACCACGATTTGCTATATGTCCTTGGCTTCAACGAGGTAGCAGGAAACTTCCAAGCAAATAAC<br>AACGGAAAGGGCGGCAAGGCCAATGATTTCGTTATTGTTAACGCTCAAGACGGCAGTGGAAC<br>GAACAATGCCAACTTTGCTACCCCGGCCGATGGAAGCAATGGCCGTATGAGAATGTACATCT<br>GGACTACTGCTAACCCCAAGCGAGATGGCGATCTCGAGGCGGGCATTGTTATCCACGAATAC<br>ACTCACGGATTGTCTACCCGTCTTACCGGCGGCCCTGCCAACTCTGGATGCCTTACTGGCAC<br>TGAAGCCGGCGGCATGGGTGAAGGCTGGGGTGATTTCTTCGCCACCGCTATCCGCTTAAAGG<br>CTGGTGACACCCGCAGCAAGGACTATCCTATGGGAGTCTGGGCCGATAACAACGTCAAGGGT<br>ATCCGCCAGTATCCTTATTCAACAAGCCTTACTACCAATCCTCTTACTTATAAAACCGTCAA<br>TACGCAAAATGAAGTCCACTCAGCCGGTACTACATGGGCCACCATTTTGTACGAAGTCCTGT<br>GGAACCTCATTGACAAGTACGGCAAGAATGACGACGATTTCCCTACCTTTGATAGCCAGGGC<br>GTCCCCACCGACGGCAAGTATCTTACCTTGAAACTCGTCCTCAATGGATTGGCTCTGCAGCC<br>CTGCACGCCAACTTTTGTTTCTGCCCGTGATGCCATCTTGGATGCTGATCGTGCTTTGACCG<br>GAGGGGAGAATCTTTGTGAATTATGGACAGGATTCGCCAAGAGAGGTCTTGGATCCGGCGCC<br>AAATATTCTTCCACCGCTCGCGTTGAAAGCTTCACTATCCCATCTGGGGTTTGCTAA |
| 35 | MIC-54347 | ATGAAGTTCTTCGCCGCCACCGCTCTCCTTGCCGCCACTACCATTGCTGGACCTCTTGAGGT<br>TCGCACTGGAGACGGTAACATTTGTCCTAGCGGCGGCCTCTACGGCAACCCTCAGTGCTGCT<br>CCTCTCTCCTCCTTGGTCTCATTGGTCTTGACTGCAACGTCCCCAACCAAACGCCCCGTGAC<br>GGCGCTGACTTTAGAAACATCTGCGCTAAGACTGGTGACGAGGCCCTTTGCTGTGTTGCTCC<br>CGTTGCCGGCCAAGCTCTTCTCTGCCAGGTCGCCGTTGGTGCCAGCTAA |
| 36 | MIC-54347 | ATGAAGTTCTTTGCTGTTGCCACTCTCTTTGTCACTGGCGTCATCTCCGCCCCGTCACCCAA<br>TGCCCTAAATTCCCGCAGTCTTCTTTGCAGCCCTGGCCTTTACTCCACCGCGCAGTGCTGTG<br>GTGTTGATGTATTGGGAGTTGCTGATTTGGACTGTGCGGCTCCTACTGGCACTATTACCAAC<br>GCCCAAGGATTTCAGGCTGCCTGTGCTAAGAAAGGCCAAGAGGCTCGCTGTTGTGTTCTACC<br>TGTTGCCGGCCAAGATGTCCTGTGCCAGGACCCCCCTGGTTTGTAA |
| 37 | MIC-54347 | ATGACCAGCATTCGTCGTCTTGCTCTCTATCTCGGAGCTTTGCTCCCGGCTGTCCTCGCCGC<br>TCCAGCAGCCCTTCACAAGAAGCCTGAGGCTGCACCTAACAAGTTTATTGTCACTCTTAAAG<br>AGGGCGCTTCAATTGATACCGACTCTCATCTCGCCTGGGTGAATGACATCCACCGTCGTTCT<br>TTGACCAAGCGTAGCACTGCTGGTGTTGAAAAGACTTATAACATTCATACTTGGAGTGCTTA<br>TGCGGGTGAATTTGATGCAGAGACGATTGAGCAGATCAAGTCTAGCCCCGATGTCGCGTCTG<br>TGGAGCCAGACTACATCATGTACCTGTCGGACATTGTTGAAGACAAGCGTGCTCTGACCACA |

TABLE 3-continued

| Exemplary sequences of endophytes of the present invention | | |
|---|---|---|
| SEQ ID | MIC ID | Sequence |
| | | CAATCTGGAGCTCCTTGGGGCCTTGGCACTGTTTCCCACCGCACATCTGGGTCTACGAGCTA<br>CATTTACGATAGCTCAGCTGGCTCTGGAACCTTTGCCTATGTGGTTGACTCCGGCATCAACA<br>CCTCTCATCAGCAATTCGGCGGGCGCGCCAGTCTTGGCTACAATGCTGCAGGAGGACAGCAC<br>GTCGACACTCTTGGCCATGGTACTCATGTTTCTGGAACAATTGGTGGATCTACATACGGCGT<br>TGCTAAACAGGCCAGCCTAATCTCCGTCAAAGTCTTTGCTGGAGAGAGCGCTACCACCTCTG<br>TTATCCTTGACGGCTATAACTGGGCTGTAAACGACATTGTCTCGAGGAATCGTGCTAGCAAA<br>TCTGCCATTAACATGTCGCTTGGAGGACCTGCCTCATCCACCTGGACGACCGCCATTAACGC<br>AGCCTTTAACCAGGGTGTGCTTACCATTGTCGCCGCTGGTAATGGCGACAGTTTCGGAAACC<br>CCCAGCCAGTTTCCGGCACTTCTCCTGCTAATGTTCCTAATGCTATCACTGTTGCGGCGCTG<br>GACATCAACTGGCGCACTGCTTCCTTCACCAACTACGGTGCTGGCGTTGATGTCTTTGCCCC<br>TGGTGTTAACATTCTGTCGTCATGGATTGGATCCAACACTGCTACCAACACAATCAGCGGCA<br>CCTCTATGGCGACACCTCACGTTGTTGGTCTGGCTCTCTATCTTCAATCCCTTGAAGGCCTC<br>ACCACTCCTACCGCTGTCACTAATCGGATCAAGGCTCTGGCTACCGCTGGCCGTATAACTGG<br>CAGCCTTAACGGCAGCCCCAACACTCTCATCTTCAACGGAAACAGTGCTTAA |
| 38 | MIC-54347 | ATGACTTCTCTATACCTTACTTCTGCCCTTGGGCTGCTATGCCTCCTCCCCGCTGCACAGGC<br>AGGCTGGAATCCGAACTCAAAGAACAACATTGTCGTATACTGGGGACAGGATGCAGGCAGCA<br>TTGGCCAGAATAGACTGTCTTACTACTGCGAAAATGCCCCTGATGTTGATGTTATCAATATC<br>TCTTTCTTAGTTGGCATAACAGATCTTAACCTGAACCTTGCCAATGTTGGCAACAACTGTAC<br>CTCTTTTGCTCAGGATCCCAACCTACTCAACTGCCCCCAAGTTGCGGCAGATATCGTCGAGT<br>GCCAACAGACATATGGAAAAACAATCATGATGAGCTTGTTTGGCTCGACTTATACTGAGAGT<br>GGTTTCAGTTCGTCGTCAACTGCAGTGTCCGCCGCTCAAGAAATTTGGGCCATGTTCGGTCC<br>TGTCCAGAGCGGCAACAGCACCCCCCGACCTTTTGGTAACGCTGTGATTGATGGATTTGACT<br>TTGATCTTGAAGACCCTATCGAAAACAACATGGAGCCTTTTGCGGCAGAGCTGCGATCTCTC<br>ACAAGTGCTGCTACCTCCAAGAAGTTTTACCTTTCGGCTGCTCCTCAGTGTGTGTACCCCGA<br>CGCGTCTGATCAGACGTTCCTCCAGGGAGAGGTGGCTTTTGACTGGTTGAATATCCAATTTT<br>ACAACAATGGCTGTGGTACCTCTTACTACCCCTCGGGCTACAACTACGCAACTTGGGACAAC<br>TGGGTCAAGACCGTCAGTGCTAACCCAAACACTAAGCTGCTTGTCGGCACTCCTGCCAGTGT<br>CCATGCTGTAAACTTTGCCAACTACTTTCCCACCAATGATCAACTCGCCGGAGCTATCTCGT<br>CTTCCAAGTCGTACGGTAGCTTTGCTGGTGTGATGCTATGGGATATGGCTCAGCTCTTTGGA<br>AATCCTGGATACCTGGACTTGATCGTAGCGGACCTGGGTGGCGCTTCCACCCCTCCTCCGCC<br>AGCTTCCACTACTCTGTCCACTGTGACTAGGTCCTCTACTGCTAGCAGCGGACCTACTTCTC<br>CTCCTCCCTCCGGCGGTGGCAGTGTCCCTCAATGGGGCCAGTGCGGTGGACAGGGATACACA<br>GGACCAACTCAATGCCAGTCTCCCTACACTTGCGTTGTTGAGAGCCAGTGGTGGGCATCTTG<br>CCAGTAA |
| 39 | MIC-54347 | ATGAGAACATCTACCGCTATTATATCTCTTGCCCTTGTGGTGATGGGAATTGCCGCCCCTGC<br>TGCCGAGGCCGGCTCTGTTGTCAGCGAAGCCGGCTTTGTTGTCAGCGAAGCCCAATTCAACG<br>CCATATTTCCCGGTCGAAACCCTTTTTACTCCTATAGGGCATTGACCGGCGCCCTCGGATCT<br>TATCCCAGCTTCACCAACACTGCTGATAACGCCACTAGGCTCCGCGAGGCCGCCGCTTTCTT<br>CGCCAATGTGGATCATGAAACCGATGGGCTCAAGTTCGTCGTGGAATAA |
| 40 | MIC-54347 | ATGAGCGCCGCATCCCGCAAGTCACGCATAGCTACGAGTGTGGCGAGAGTTATGTACACCAA<br>TGCAGTCTATTTCCCTAGCAGCAGAATATATCAAGGTGATTCGCCGGGAATGCTCAATTACA<br>GCTGCATCAACCACGTGTATTATGCTTATGCCAGCGTGACGGCGGACGGCAATGTGTTTCTC<br>GGCGATGAGTGGGCCGATGCAAGAGCGCCAGTGGATGGTGTTCAGGGTGGCTTAGGATCCTT<br>GATGCATCTCAAGCAGAGGCACCCTCACCTGCAGGTTGTCTTATCTATTGGTGGCAGCACTG<br>CATCAGAGGTATTTCCCATTGTTGCATCAAGCACTCTCCTCAGAGACAACTTTGCCCGGTCT<br>GCCCTTGGCCTCGTGGAAGCATCCGGGCTTGATGGTATTGACATTGCCTGGGAGTTCCCATC<br>CCAAGCTAAACATGGCCACGATTTCCTAGCCTTGCTGGCAGCAGTGCGGATTCATATGCCTG<br>AAGACCGCTTCATTCTAACAGCTGTCCTCCCTGCGGCGAAGGAGGTTCTACAACTCATCGAC<br>CTCAGCACAGCGGCCGAGTACCTTGACTACATCAACCTTGTGGCATATGATTTCTTCGGCAC<br>GTGGACGTCCAAAACTGGTCATCACGCACAGTTATATACTATGAACAAGGACGAACCCTCGG<br>CATCGACAGGTGTGGCGTATGTCATGTCCCAAGGATTCCCTGCGAAGAGTATCCTGCTCGGG<br>ATCCCAACCTACGGACGAAGCTTCCTCAAGGCCAATGGGCCGGGCCAGGATTTTAACGGCGT<br>TGGCGGCCAAGATGGCACATTCGAATACGGCGAATTACCACGAAAGGGATGCAAAGAGATTG<br>TGGATAGGCGCTATATTGCGGCCCAATGTGTCGGTGGTGATGGGGGGTTTGTCACGTACGAC<br>AACCCCGAGACGGTCAAGGTTAAGGCGGAATTTTGCAAGCAAAAGGGATTAGGGGGGCTTTT<br>TTACTGGAACGGACCGGCTGACTCTCGAGATCAAGCACGAAGTCTGATTGCGGCTGGATTCC<br>GCGCTCTACACACCTCGTGA |
| 41 | MIC-54347 | ATGCAATTGACCACAGTCGTCGCGCTCTTCGCCTCTCTGGCCGGCGCCGCGCCTGCCCCTGA<br>ACCCGCTGCTGAGCTTGTTGCTCGTGATGGTCCTTGCTCCTCTGGTGTCACCAATAACGTCC<br>CTCAATGCTGCGGTACTGGTATCCTCAGTGTTGTCTACGTGGACTGCAAGACTCCCACTCAA<br>GCTCCCTCTGCCACTAACCAGTTGAGCGCCATCTGCGCTCGAGTAGGTCTCCAGGCCAAGTG<br>TTGCACCGTCGGCATTGCTGGCGTTGGCGTTCTTTGCCAGGATGCTATTCCCCAGTAA |
| 42 | MIC-54347 | ATGCAATTGTCCAACCTCTTCAAGCTTGCTCTCTTCACCGCCGCTGTCTCTGCTGATACCGT<br>CTCGTACGATACTGGCTACGATGACGCATCTCGCTCTCTGACCGTCGTCTCCTGCTCCGACG<br>GCCCCAACGGCCTCATCACCAGATACCACTGGCAGACCCAGGGCCAGATCCCTCGCTTCCCA<br>TACATTGGTGGTGTCCAGGCCGTCGCCGGCTGGAACTCCCCTAGCTGCGGCACCTGCTGGAA<br>GCTCACTTACAGCGGCAAGACCATCTACGTCTTGGCTGTTGACCACGCCGGTGCTGGCTTCA<br>ACATTGGCCTCGACGCCATGAATGCTCTCACCAACGGCCAGGCTGTTGCCCTCGGACGTGTC<br>TCTGCCACTGCCTCTCAGGTGGCTGTGAGCAACTGCGGTCTCTAG |

TABLE 3-continued

| Exemplary sequences of endophytes of the present invention | | |
|---|---|---|
| SEQ ID | MIC ID | Sequence |
| 43 | MIC-54347 | ATGCATTCAACAACTTTCTTTGCCAGTCTGGGACTCGCAGGCCTGGTTGCCGGCGCCCCTTC<br>GGCCCCGCACAACGTTAAAGCTCGCCAAGCTTCCGGTGCCCAAAACGTCGTCTATTGGGGAG<br>GCACTAACAATGAAAGCGACGACCTTTCTACCTATTGTACGCCCACCGCAGGCATTGACATC<br>CTTGTTCTGTCTTTCTTGGACATTTACGGCACAACTGGCAACATTCCAGCAGGTAATATTGG<br>CAATTCTTGCTATATCGGAACAAATGGCACACCTCAACTATGTGATAATCTTGCTGCTTCAA<br>TAGCCAGCTGCCAGGCCGCTGGTATTAAAATTATCTTGTCTCTCGGAGGAGCGGCCGGCTCC<br>TATTCTCTACAATCGCAGTCACAGGCTGTGGCTATTGGCCAGTATCTCTGGGAGGCTTACGG<br>CAACTCTGGCAGCACTTCTGTCCAGCGGCCCTTTGGCAATGTCTTTGTTAATGGTTTTGACT<br>TTGACCTTGAGCTGAACGCCGGCAACCAATACTACCAGTATCTGATATCAACCCTCCGTTCC<br>AACTTTGCCAGTGACCCGAAACATACGTATTATATCACTGGAGCGCCCCAGTGTCCTCTCCC<br>GTTGAGTATTCCTCAAATCCGTAAACCAAATATGGGAGAGATTATAAGTGCCTCACAGTTCG<br>ACTATCTCTGGATTCAATTCTATAACAACAACGCTTATGCACCAGACCCCTGTTCTCTTGGT<br>CTGCCTGGCGATGCACCCTTCAACTACAACAACTGGACGTCATTTATTGCTACTACCCCTTC<br>AAAAAACGCAAAACTATTTATTGGAGTCCCTGCGAATACTTTAGCTGCTAATGGCAATTCAG<br>GTGGTGCCGTTTACTATGCTTCGCCATCCCAGCTTGCTTCCATTGTCGCGAATACAAAATCT<br>AGCCCAGATTTTGGAGGAATTATGATGTGGGATGCTGGGTACTCTGATGCTAATGTCAACAA<br>CGGATGCAACTACGCTCAGGAGGCCAAAAACATCCTCCTTACCGGCGCTCCCTGTGGAGGCT<br>CACCCCCACCGGTTAGCAGCAGCAAGCCTACATCCACTGCAACCAAATCCGCTACTAGCACT<br>TCATCAGCCTCGGGAACAGGCCCGACAGGAGGCGGCACAGTACCTCAGTGGGGCCAGTGCGG<br>CGGAGAGGGATACACGGGCCCGACGCAGTGCGTTTCTCCCTACAAATGCGTCGAATCAAGTC<br>AATGGTGGTCGTCTTGCCAATAA |
| 44 | MIC-54347 | ATGCCCTCTTTGATCACGGTTGCGAGCGTGCTCGCTCTTGTTCCATCCGCCTTCGCGGGCTG<br>GAATGTCAACTCGAAGCAAAACATTGCTGTGTACTGGGGACAAAACTCCGCCAACCAACAGA<br>GCACACAGCAGCGTCTTTCAGCCTACTGCAATGCGAAGATTGAATCTGACAGTTGCGATGTA<br>GATGCCAACATCAATGTCATTGACATTGCTTTCCTGAATGGAATTACTCCTCCTATGACCAA<br>CTTTGCCAATGCTGGTGACCGATGCACTCCCTTCTCCGACAACCCTTGGCTCTTGAGCTGCC<br>CTGAAATTGAGGCGGATATCAAGACTTGCCAGGCTAATGGCAAGACCATTCTCATTTCTCTT<br>GGTGGTGATTCTTACACTCAAGGTGGCTGGAGCTCTACCAGTGCTGCTCAGGCCGCAGCCAA<br>ACAGGTCTGGGCCATGTTTGGTCCTGTCCAATCCGGCAGCTCCACCGAGCGTCCCTTTGGCA<br>GCGCCGTTGTTGACGGTTTTGACTTCGACTTTGAAGCGACGACTAACAATCTCGCGGCCTTT<br>GGCGCTCAGCTCAAGAGCCTCTCGAGCGCTGCCGGTGGCAAGAAGTACTACTTCTCTGCTGC<br>TCCCCAGTGCTTCTTCCCCGACGCTGCTGTCGGTGCACTGATCAACGCCGTCCCCATGGACT<br>GGATCCAGATTCAATTCTATAACAACCCTTGCGGCGTCAGCGGCTACACCCCCGGCACCAGC<br>AACCAGAACAACTACAACTACCAGACCTGGGATACCTGGGCCAAGACAAGCCCCAACCCCAA<br>CGTCAAGCTTCTTGTCGGCATTCCCGCTGGCCCAGGTGCTGGTCGCGGCTACGTGTCTGGCT<br>CTCAGCTCACTTCAGTCTTCCAGTACTCGAAGGGCTTCAGCAGCACTTTTGCCGGTGCTATG<br>ATGTGGGATATGTCCCAGCTCTTCCAGAACACTGGCTTCGAGGCCCAGGTTGTCAATGCTTT<br>GAAATAA |
| 45 | MIC-54347 | ATGCCGCTTAAGGTCTTCGAGTCAGCTTCGCCTGCGCCGTCGCATCCCTCCTTATCGCACCT<br>CTGCCTGCTCGTCTTCGAAGCTGTTCTAGAAGTAGTCTGTGTGAGCTTGCCGGGATACATCG<br>TTGCGCGCCTTGGCCATTTCGATGCCGATAAGCAAAAGTTCCTGGCTAATCTCAATGTGATG<br>CTCTTCACGCCCTGTCTTATCTTCACCAAGCTAGCATCTCAGCTCAATGCCGAAAAACTATC<br>CGATCTCGCCATCATCCCCGCCATCTTTATCGTGCAAACTCTTGTATCATGGATAGTTTCGA<br>TCCTGGTCGCCAAGGGGTTCCGATTCAATAAGCGAGCTTCCAACTTCGTTACTGCTATGGGC<br>GTCTTTGGCAATTCAAATTCACTGCCCATCTCTCTCGTTCTTTCTCTCTCGCAAACAATCAA<br>GGGCCTCCACTGGGACAGGATACCAGGCGACAACGATGACGAAGTCGGCGCTCGCGGTATCT<br>TATATCTACTGATTTTCCAGCAACTTGGCCAGCTTGTCAGATGGAGCTGGGGATATCACGTT<br>CTGCTAGCCCCCAAGGATAAATACGCCGAGTATCAAGACGAAATTGCCGAAGAAGGCCAGTA<br>CAGATACAGAGACGAAGAGCCGAACGAACAGGAGCCGGAGATTCTCATTACTGGTTTGGACG<br>GTGATACCGAAGATGATGGCGAGAGCAATGCTTCTGAAGATTATATACCTGCTGGACGAACA<br>CCTCTTGCGAGCAATTCCCGGGCTTCACTGGCTGGCTCTTCCGTCGACAATGACGACATGCT<br>GAATTTCAAAAAGGGCAACTACACTCGTGGAAGCTCGCTCGCCAACACAGACTTGGAAGATG<br>ATATTCTTTCATTCCCTCGTATTCGTCTTCGAGATGAGGCTGAAGTCGAGCACGGAGTTACT<br>GCTCGTATCAAGAAATCACTATATTCTCTGAAAGACAAAGCTTCTGCGGCCATGACTCGCCA<br>ATATCAGCGACTTCCTCAACCTGTTCAAACCTGCCTTTCCTTCATTCATAAGTCAATCACAA<br>AGACTCTCGGATTTGTATGGGATTTCATGAATCCACCTTTGTGGGCTATGCTCATCGCGGTC<br>ATCGTGGCGTCCATCCCGAGTCTCCAACAGTTGTTCTTCGAAGATGGTTCATTCGTGAAAAA<br>TAGCGTCACCAACGCTGTTTCGTCTAGTGGAGGCGTTGCAGTGCCTTTGATCTTGGTTGTTC<br>TCGGCGCCAACTTGGCGCGCAACACTGCCGCTCACGATTCTCCCATAGACCCGGAGGAGGAA<br>AAGATTGGCACCAAGCTCTTGATCGCTTCGTTGCTGAGCAGGATGGTTCTGCCAACTTTGAT<br>TATGGCACCCATTCTGGCTATTACGGCAAAATACTTGCCCATCAGCATTCTAGATGATCCCA<br>TCTTTATTGTCGTATGCTTTCTTCTTACTGGCGCACCCAGTGCGCTCCAGCTTGCGCAAATT<br>TGCCAAATCAACAATGTTTATGAGCAGACTATGGGAAGAATCCTCTTTCAGAGCTATGTTAT<br>CTGGATTCTTCCCTCTACTCTTTTCCTTGTCATGATGGCACTCGAGGTGATTGAGTGGGCAA<br>CAGTGAATTAA |
| 46 | MIC-54347 | ATGCTACCGTCGAGCCTTTGCCGGATTGCCGCTGTTATCAGCGTGGCTTCTGCGGAAATGGT<br>TTCGGTAACATTTGATACCGCTTACGACGATCCTTCTCGTTCACTGAGTGAAGTCGCTTGTT<br>GGAGGAAGGGCACGGGATTCATGCCTAACTTGGATTGGAAACTTCAAAAAGATGCATTGGAA<br>TTTATTGGAATCAAAGCAATTCGTGGCTTCAGTTCTGCCCAATGTTTTTCCTGCTGGAAAAT<br>TGAGTATGGAGATAAGCAGATATCACTGTTCGCAATTGACAGCGCCGACTCGGGCATTGTTC<br>TCTCTCTGAGCACCATGCAATATCTTACAGGTGGCCAGGCTCGCGAGCTGGCCCGAATTGAT<br>GCAAAGGCAACCCAAGTCGACGCATCAAACTGTGGGATTTCTGCGGCTGAACTGCACAAATA |

TABLE 3-continued

| Exemplary sequences of endophytes of the present invention | | |
|---|---|---|
| SEQ ID | MIC ID | Sequence |
| | | CGATTTCTATACCAATGGTAGTGGAAATAGCGATGGCTCTAGGAGCAACACTGGAGCTATTGTTGGAGGAGTTCTCGGTGGTGTGGCTGGGCTTGCTTTAACTGGGCTTGCTGTTTTTTTCTTCCCCCGCTATAAGAATTTAGCTGCTGGACATAAGCCAGTGAGCCAGAATACTCCTCCTGCTGCTTATCAATCCTCTCTGATGCAGCAGGACCCCAAGGCTCACTATGATCCTAAATATTTCGCAGAGATGGATACACAGCCATACACGCCCCCTGATTAG |
| 47 | MIC-54347 | ATGCTCCGTACTCCTACAATCCCCTGGCTTCTAAATATCATCCTAGAAGAAAACCCTACTATGATTCCTTCAATGAAAAAGTGCGGCCGCAAGTTATGGGCTGGCCTGGCATTGCTAGCCTTGCCTGTAATTGCAAGCGCATCATGCGCGCTTCCTAGCACCTACAAATGGACTTCGACTGGCCCGCTGGCAAACCCCAAGTCGGGCTGGGTTTCGCTTAAAGATTTCAGCCATGTTCCATACAATGGCCAGCATCTGGTCTATTCTTCGACTGTGAACTCGGCAGGTTCCTATGGCTCGATGAATTTTGGTCTCGTCTCAAACTGGACCAACCTCAGCACAGCCAGCCAAAACACAATGAACCTTGGCACGGTAGCGCCAACTCTCTTCTATTTCTCTCCCAAGAAGATCTGGGTTCTTGCATACGAATGGGCTGCTACTCCATTTGCCTATGTCACGTCGACCGATCCTACCAATGCCAATGGTTGGTCAGCTTCGCAACCGCTCTTCAGCGGAAGCATATCTCCCTCTAGCCCTATCGACCCAGCACTCATCAGCGATGGCACGAATATGTACCTTTTCTTTGCAGGAGATAATGGCAAAATCTACCGGTCCAGTATGCCCATTGGCCAGTTCCCATCCAGCTTCGGCACATCGTACACAACGATCATGAGCGCCGCAACCAACGATCTGTTTGAAGCGATACAGGTGTACACTGTCTCAGGCCAGAATCAATATCTTATGATTGTTGAGTGTATCGGATCTGTTGGACGGTATTTCCGCTCATTTACGGCCACATCCCTGAGCGGTACATGGACGCCGCAAGCTGCAACCGAGAGCAATCCCTTTGCAGGCCATGCTAACAGCGGAGCTACTTGGACTAACGATATCAGCTCTGGAGATCTTATTCGCAGCACAAACGATGAGACGATGACCATTGATCCCTGCAACCTCCAGCTGCTGTACCAAGGAATGGCCGTTGGTTCCACCGGAGACTATAACTCCCTGCCATGGCGACCCGCCGTCTTGACTCTAACCAACCCCGGCTCGAGCACAGGCAACGGCAACGGCACTGGAAGCGGCGGCTCAGGCGGCAGCGGATCTGGACAAGCATCGCAGTATGCTCAGTGCGGCGGTTTGGGCTATACTGGACCCACGAGCCCGTACAAATGCACGTTTGTCAACGAATACTACTCCCAGTGTCTATAG |
| 48 | MIC-54347 | ATGCTCTACACTGCTGCTCTGGCCGGCCTTATGGCCACTGCTGCCCTTGCTGCCCCCTACCGCCGACAGGCTACTGGCCAAAACGTTGTATACTGGGGCCAAAACGGCGGCGGCGTTACTGAAAGTAACAATTTGTCTGATTATTGCGATGCTGAAGCAGGCATCGATCTACTTGTTCTTAGTTTCCTCTACGAGTATGGCAATGGAAATACTATTCCTTCAGGCACTATCGGCCAGAGCTGCTCCATTGATACCTCCGGAAACCCTTCAAACTGTGATGCCCTTGCCTCGGCCATTGCTACCTGCAAGTCCAATGGAGTCAAGGTTGTCTTGTCTCTCGGCGGCGCCGTTGGAGCCTACTCTCTCTCCTCTCAGCAGGAGGCCGAGACAATTGGCCAAAACCTCTGGGACGCATACGGTGCCGGCAATGGAACCGTCCCCAGACCGTTCAGAAGCACCGTTGTCGATGGCTGGGACTTTGATATCGAAGCCAGTAGTGGCAACCAGTATTATCAATACTTGATTGCCAAGCTTCGCTCAAATTTCAACGGCGGCAACTACGTGATTACCGGTGCTCCTCAGTGCCCTATTCCGGAGCCTAACATGCAGCAAATCATTACCACTTCTCAGTTTGACTATCTTTGGGTCCAGTTCTACAACAATCCCTCGTGCTCAGTTGGAACGTCGACACCAAACTTCCAAGATTGGGTTTCCAACATTGCCAACACTCCTTCTGCCAATGCCAAGATCTTCCTTGGTGTGCCTGCAAGCCCGCTCGGCGCTACTGGAACTGAATCTGGCGCCCAATATTACCTCGAGCCTTCTGCTCTCAACACTCTCGTCGGCCAGTTCTCATCCAACCCTGCGTTTGGCGGTATCATGATGTGGGCTGCCGGTTTCTCCGATGCCAACGTGAACAATGGATGCACTTATGCTCAAGAGGCTAAGAAGATCCTTACTTCTGGTCAAATCTGCTAA |
| 49 | MIC-54347 | ATGCTTTCCCACGCTATCCTTGCTGGCCTCGGCCTTGCTGGTCTCGCTGCCGCTGCGCCTACCAGGACGATTGCGACTCGTCAAGCTTCCGGTTATCAGAACGCTGTCTACTGGGGTGCCACTGGCAAACAGAACCCTAACCTCGCTGAATACTGCACGTCCACCTCGGGCATTGATATCCTGATCCTGTCCTTCTTGGACGTCTACGGTGCCACTGGCAACTTCCCCTCTGGCAACTTTGGCAACGACTGCTTCGTCGGCACCACGGGTGTTCCCCAGTCATGCTCTGACCTGGCCTCCCAGATCAAGACCTGCCAGAACGCTGGTGTCAAGATTATTGTTTCTCTCGGTGGTGCCGCCGGTTCATACTCTGTCACGTCCCAGCAGCAGGCCCAGACCATCGGTCAATACCTCTGGGATGCCTACGGTAACTCTGGCAGCACCTCTGTCCAGCGTCCCTTTGGCGATGTCTTTGTTAACGGTTGGGACTTTGACATCGAGGCCAACGGCGGCTTCAGCCAGTACTACCAGTACATGATTGGCACCCTGCGCTCCAACTTCGCCAAGGACTCCGCCAACACGTACTACATCACCGGTGCTCCCCAGTGCCCCCTGCCCGAGGAGAACATGGGCGATATGATCCAGCACTCCGTCTTCGACTACCTCTTCATCCAGTTCTACAACAACAACCCCACCTGCTCTCTTGGTCTGTCTGGCCAGGCTCCCCTCAACTACGACGACTGGACCAACTTTGTCTCCACCACCCAGTCCAAGAACGCGAAGCTCTTCCTCGGTGCCCCTGCCGGACCTCTCGCCTCCAACGGAAACCCAAACGGTGCCGTCTACTACGCTACCCCCCTCGGATCTGGCCCCCATCGTCAACAAGGCCAAGACGAAGTCAAACTTTGGCGGTGTCATGCTCTGGGACGCTGGTTACTCTGATGAGAACTCCAGCGGCGGTTGCAACTACGCCCAGCAGGTCAAGAGCATCCTCACCACCGGCGCCCCTTGCAACGGCACCCCCGTCAGCGGTGGTGGCTCTCCTCCCGCTACTTCTTCCACTGCTTCTTCTCCTCCCGCTACTTCTTCCACTGCTTCTTCTCCTCCTGCTACTTCTTCCCTTCCTGCCGATGGAAGCACCGGAAGCACCGGTAACAGCGGCGTTGGCAGCGTTGCCCAGTGGGGACAGTGCGGCGGTATTGGTTACACTGGTCCTACCCAGTGCCAGTCCCCATTCAAGTGCGTTAACGAGGGCCCGTATTGGTCTTCTTGCCAATAA |
| 50 | MIC-54347 | ATGGCCGGTTCACTTACAGCAGACGCTCACGAAGCTGTTCGGTGCATCATGTATCTCACAGGGCAACATGTGGTAGTCCCTTCAGACCATGATCTCGTGGGTTCCATAACACATGTGATACTGGCATTCATGCGCTCTGATGTCTTCAATGTGGATAAAACGCCTGCCGAGTTCCCGTTTTTTACAACCGTTGCTGAAACACGGCAGAAGTTCAATGCGAATACTAAAATCATGGTCGCAATTGGGGGTTGGGGGGATTCTGCAGGATTTGAAGAAGCTGCGCGTGACGATTCGTCGAGAAAGCGGTGGGCTAACCAAGTAAAGGCCATGGTTGACCTGACAGGAGCTGATGGCATTGACATTGACTGGGAATATCCGGGGGGAAATCGTGACGACTATAAACTTATTCCGAATTCTCAGCGGGAATGGGAGATAGAGGCATTCGTGCTTCTTCTTCGAGAACTTCGTTTGGTTTTGGGAGAAGAAAAACTACTCACAATTGCGGTGCCAGCGCTAGAACGCGATTTGATGGCTTTCACAAACTCAACTATTCCGTCC |

TABLE 3-continued

Exemplary sequences of endophytes of the present invention

| SEQ ID | MIC ID | Sequence |
|---|---|---|
| | | ATCGTGAATCAGGTTGACTTCATTAGTGTAATGACTTACGATATGATGAATCGACGTGATAC<br>CATTGTCAAGCACCATAGTGGTGTGGCCGACTCTCAGGAAGCAATGGAGCGATATATAGATC<br>GTGGGGCCCCTCCGCACAAATTGAACTTCGGACTTGGTTACTATGCCAAATGGTTCATGACC<br>GAGCAATGCGATTTACAGCACCCATTGGGGTGCCGCACTCAACTGCTAGAAGACCCCGCCAA<br>TGGAGCCGACCTTGGCAAGACTGCAGCTTTTAGCTGGCATGACGAGGTTCCCGTGGAATTGG<br>CTAATTCTTTCGAGAAAGCTCATACTCATGGCCGCTACTATGAAGATGGAAGCTACGGGTAT<br>TGGGATGATGAAGAGAAGAGATGGTGGTCCTACGACACGCCTCTCGCCATCAAAACTAAAGT<br>CCCTCGGTTTCTCGGCGAACTGCAATTGGGCGGTGTGTTTGCCTGGGGGCTGGGGGAGGATG<br>CTCCGCAGTTTATTCACTTGAAGGCCACTACTGATGGGATTCGGGCTTTGCGCGGAGGCCAG<br>AGCTCACGGGATTCGGTGAAAGATGAACTGTAA |
| 51 | MIC-54347 | ATGGCGCCTTTCAATACTATGCTTGGGTATCTCCTGTTAGTGGTAGCCCCTTTGGCGGCTGC<br>CCTGCCGTTCCGTGGCCATGGCCCCAACACCCATAACCACATCAACTTGAACTTCAACCTCA<br>CCGAAACCATCAACGAGATCAATGAAAACTTGGCTGGCCTAGTTGGATACATCACCAACCCT<br>CACGCCAAGCACATCGTCGCCAACCGCTACATTGTCGTCTACAACAACACCTTCGGCTCCGA<br>GGCCATCGCCGCCAAGCAGGCCGAGTTCGCTGCCACCATCCAGAAGCGCAACCTTGGAAAGC<br>GAAGCCTCGGCGGCAACATGCTGTCCACTGAAATCCACTCCTTCCAGATGCACACCTGGCGC<br>GCCATGGCTCTCGACGCTGACGATGAGATGATCAAGTCCATTTTCGCCGCGAAGGAGGTCGC<br>CTATATCGAGGCTGATACCGTCGTCCAGACCAAGGCTCTCGTTGCCCAGACCAACGCTACCC<br>CCGGCCTCATCCGTCTCTCTAACCAAAACATTGGTGGCAAGAACTACATCTTTGACAACTCT<br>GCCGGCGCTGGTATCACTGCCTACGTTGTCGACACTGGTATTAGAATCACCCACACTGAGTT<br>TGAGGGCCGTGCTTCTTTCGGTGCCAACTTTGTCAACTCCAACAACACTGATGAGAACGGCC<br>ACGGCAGCCACGTTTCTGGTACCATTGGTGGTGCTACCTTCGGCGTTGCCAAGAACATCAAG<br>CTCGTTGCCGTCAAGGTCCTTGATGCCTCTGGTGCCGGTAGCAACTCTGGCGTTCTGAACGG<br>CATGCAGTTCGTCGTCAACGACGTCCAGGCCAAGGGCCTCTCCGGCAAGGCTGTCATGAACA<br>TGTCTCTCGGTGGCTCCCTGTCCGCTGCTGTCAACAACGCTATTGCTGCCATTGCCAACGCT<br>GGTGTCGTCCCTGTTGTTGCTGCTGGTAACGAGAACCAAGATACTGCCAACACCTCTCCCGG<br>CTCTGCCCCTCAGGCCATCACCGTCGGTGCTATCGATGCCACCACCGATATCCGTGCTAGCT<br>TCTCCAACTTTGGCGCTGATGTCGATATCTACGCCCCCGGTGTCAATGTTCTCAGCGTTGGC<br>ATCAAGTCTGATACCGATACTGCCGTTCTCAGCGGCACCAGCATGGCCACTCCTCACGTTGC<br>CGGTCTCACTGGCTACCTGATGGCTCTCAAGGGTGTTACCAACGTCAACGATGTCACCAACC<br>TCATCAAGAACCTCGCCACTGCTTCCGGCGCCTCGGTCCAGCAGAACGTTGCCGGAACCACC<br>AACCTCATCGCCAACAACGGTGAACTGTAA |
| 52 | MIC-54347 | ATGGGCTATAGCCGCAAAGATAAATCGAGGTACATCAACACAATTCAAGAAGCACTTGACAT<br>CTCTACAGCTTTCGTTGCCAGCAGCCGAAAAAGAATAGCTTTAACTTGGAAGATTATCATTC<br>AAATTCAATCCAATCTATCTAGAATGCAATTCTTCGCTCTCCTCCCTCTGTTATACACCACC<br>GCTGCAGCCCTTGGCATCAATTGTCGTGGGAACAGCAACTGCGTCGGTACTCCAGAATGCAG<br>ACTCGCCGATCTGATCTTGCAAGTCAGCCAGCAAGATCCCAGCACATCATACAGCCCTGGTC<br>AGCACATTGCTTGTTGCGGCATACCTGGCGGCAATATCTGTGCATTCACTCAGGGCATTAGC<br>AATTCGATTACAGCTGGAGAAGCCCTGGGTATGCTGCAGGGGCTATCCGCCCACGGTTGTGG<br>CCAATGCGGCAGTATTCCCTTCAAGGATAACAATGTCGCTGAGGGACAATTGACAGTCAACT<br>GGACCGATCACTAA |
| 53 | MIC-54347 | ATGGGCTCCTTTAAAGCCATTATCGCAGCATCTCTAGCTGCCCTAGGACAGTTCGCTGCAGC<br>TGCTCCAGCGGAAGGCCAATCCAAGCGAGCTGGCATCTCTTCCATCGTCAAGGGAACACCGG<br>TAGGCTTTGCGTCTTCAGTCACGGGTGGTGGGACCGTTGCCCCGGTATATCCAACCACGATC<br>GCGCAGCTGAAGAGCTACCTCACCTCAACTAGCCCGCAGAACATTGTCATCTCTGGTACTTT<br>CAACTTTGCTGGTACTGAGGGCACAACAACTCTTCCAGCTTGTAACGCATACCCATGTACAC<br>CCTCCAACGGTGGACAGGCGTTGCTAAACACACTGGGTGGATGCGGGTCGCTATCTACGTAC<br>AACGTAAATCTCGACACCGCTGCATATAACGCTATCAATGTCCAGTCAGACAAGACACTTGT<br>TGGGATTAACGGTGCAACTCTCAATGGCAAAGGCTTACGCCTTTCTGGCGTTTCTAATGTCA<br>TTATCCAAAACATTGCAATCACTAATCTAAACCCGCAGTATGTCTGGGGTGGTGATGCCATT<br>AGTCTCAGCAATACTAACAATGTCTGGATTGACCATGTGAAGACATCCAACCTCGGCCGTCA<br>GCACTATAGCTTCGGTACTGGCTCCAATAACGCAGTCACCATCTCTAACAGCTTCATCAGTG<br>GTCAGACCTCTTACTCAGCTAGCTGTGATGGCCACTCGTACTGGGGTCTCGAACTGGTTGGA<br>AGCGGTGACCAAATCACATTTTACAAGAACTATGTCTACTACACATCTGGACGTACCCCTGC<br>TTTGTCCGGCAATACCCTCTTCCATGCAGTTAACAACGTCTGGTCCTCAAACTCCGGACACG<br>CAATTGAAGGTACTTCGAACGGCATGGGCTTGTATGAGGGTAACTACTTTGTGAACGTTCCG<br>ACCATTGTCGCTTCAGGCTTCGTAGGTCGTCTCTTCAGCTCACAGTCATCTGCTGTGTCGCA<br>GTGCGCGCAATATTTAGGACGCAACTGTGTCTCGAATTCTTTATCAAACTCGGGTACTTTCA<br>CCAATAGCGACACGAGCTTCCTTTACCTGTTTCAAGGCAAGGCCAATATTGTTTCCGCCGCT<br>TCTGCCTCGTCTATTCAGTCGAGTGTCGTTTCGTCGGCAGGAAATACGCTTTAA |
| 54 | MIC-54347 | ATGGTTCAATCTGCGGCTTATCTAGGAGCCTTGCTGGCCACCCTGCCCTTGGCACGTGCCGG<br>TTTCAACGCTAGCTCGACGCAAAACATTGCCGTGTACTGGGGTCAAAACTCGGCAAATCAAG<br>CAACCTCTCAGCAGCGATTGTCTACTTACTGTGCCAATGCTGATATAGATATCATCCCAATT<br>GGGTTCATGAACGGCATCAGCCCGGTCATTACCAACTTTGCCAATGCAGGCGACAATTGCAC<br>GGCTTTTGCAGATAATCAGAATGCACTTAATTGTCCCCAAATCGAGCAAGACATCATTACAT<br>GCCAGCAAACATATGGCAAGACAATCCTGATTTCGCTGGGGGGCGGATCTTATACCCAGGGC<br>GGCTTCTCGTCCACTGGTGTCGCCACATCAGCGGCTCAGACGGTTTGGAACATGTTTGGCCC<br>TGTCAATCCAAACAGCAACGTAGACCGTCCATTTGGTTCCGCAGTGGTTGATGGCGTTGACT<br>TTGACTTTGAATCTGGCGTCAATAACTTGGCCACTTTTGCCACTGAGCTGCGGAGCTTGATG<br>GACGCTTCTGCGTCTTCTGCGAACAGGAAGTTCTACCTGTCTGCTGCGCCGCAATGCGTCTA<br>TCCCGATTTCGCTGACAACCCGGCCCTGAATGGTTCGGTTTTCTTCGATTTCATTATGATTC |

TABLE 3-continued

| Exemplary sequences of endophytes of the present invention | | |
|---|---|---|
| SEQ ID | MIC ID | Sequence |
| | | AATATTACAATAATGGATGCGGAGTCAGCAGCTATGTCCCTGGAGCAACTACCCAGTGGAAC TACAACTTTGATGTCTGGGACAACTGGGCGCATACCGTCAGCAAGAACCCTAACGTGAGGAT TCTGCTTGGTATCGCCGCCAACACTGGTGCTGCCAGTGGATACGTGTCCGGAACACAGCTTT CTGCGGTCATCTCATTTACCAAGCAATACTCAAGCTTTGCGGGTATCATGATGTGGGATATG TCCCAATTGTATCAGAATTCCGGCTTCTTGGGCCAGGTTGTCAGTGATCTCGCCGCCTCTGG TTCAACCCCCCCGGCTACTACTTCTAGTGGAGCTTCCAAGACTACCACTTCTAGTGGCGGTT CTACAAGCCCAACTGGCGGCAGTGTGCCGCAATGGGGTCAATGTGGAGGCGAAGGATACACT GGCCCTACGCAATGCCAGTCGCCTTACAAGTGCGTTTTTAGCAGTCAGTGGTGGTCATCTTG CCAGTAA |
| 55 | MIC-54347 | ATGTTACTGAAACAGATTCTCGTTGCCACGTTGCTTTCCTTGAGCTCTGTCAAGGCTTTCCC TAACCCGAATCACGCCCAAGATCTCGAGGCCAGGGAAGCTGAAGATAATCTCGTTGCTCGCG GCGGTCACGACTGCGGCTCTTACGCTACCTGGAACTACGGAAAGAACTGCTGTGTCTGCAAA GATAACGGCAAGAACTACGATTCTAAGTCCAAGACATGCAGTTGTCCACACGGGCAAGTCTG GAATGGCAAGCAATGCGTTGTGGACTGTGGCAAAGATGCGACTTATGATTGGAAGCAAAAGA AATGCGTCTGCAAGAAACAAGGCGAGGTCTATAACTCTAATACGAAGACTTGCAGCTGCCCG CCTGGAACTGTTTGGAACGGCTACGGATGTGTTGTCGACTGTGGCAAGGAAGCGCACTTTGA TAAATGGCAGAAGAAGTGCGTCTGCAATAACAACGGCGAAGTCTATGATTCCAAGAGCAAAA CCTGCAGTTGCCCTGGTGGCCAATACTGGAACGGCAAGAAATGCGTATGCCCTTATGGCAAG GTCTGGAACGGCAAGCAGTGCATAGAGGACTGTGGTAAAGACGCACACTTCGACTATAACCA AAAGAAGTGCGTATGCAACAAGAATGGACAGGTCTACAACTCCAACAGCAAGACCTGCAAAT GTCCAGGTGGCCAGTATTGGGACGGCAAGCATTGTGTCTGCCCATATGGTCAAGTCTTTAAT GGCAAGCAGTGTGTTCCTGATTGCGGTAAAGAAGCCCACTTTGATTATAAGCAAAAGAAGTG CGTATGCAACAACTACGGCGAAATCTACAATTCCAAGAGCAAGACTTGCGCCTGTCCTGACG GCCAGTATTGGAATGGAAAGCAATGCGTTTGCCCTTACGGCAAGATCTGGAATGGCAAACAG TGTGTTCCTGATTGCGGTAAAGACGCCCACTTTGACTACAACCAAAAGAAGTGTGTTTGCAA CAAGAATGGAGAGATCTATGACTCTAAGAGCAAGACTTGCGCCTGTCCTGACGGCCAGTATT GGAATGGAAAACAGTGTGCCTGCCCGTACGGCAAGATTTGGAATGGCAAACAGTGTGTTCCT GATTGCGGCAAAGAAGCCCACTTCGATTACAACCAGAAGCAGTGCGTTTGCAACAATAAGGG AGAGATCTATGATTCTAAGAGCAAGACTTGCGCCTGTCCTGACGGCCAATACTGGAATGGAA AGCAGTGTGCCTGCCCGTACGGCAAGATCTGGAACGGCAAGCAGTGTGTAGAAGATTGCGGC AAAGAAGCACACTTCGATTACAACCAGAAGCAATGTGTTTGCAATAACAAGGGAGAAATCTA TGATTCTAAGAGCAAGACTTGCAAGTGCCCTGATGGCCAATACTGGGACGGAAAGCAGTGCG CTTGTCCATACGGAAAGATCTGGAATGGTAAGCAGTGTGTAGAGGACTGTGGCAAGGACGCA CACTTCGATTATAACCAGAAGCAGTGTGTTTGCAATAACAAGGGAGAGATTTACGATTCTAA GAGCAAGACTTGCAAGTGCCCTGACGGCCAATACTGGGACGGAAAACAATGTGCTTGTCCCT ACGGCCAAATTTGGGACGGAAAGCAATGCACACCAAACTGCGGCAAAGACGCTACCTATGAC AGTAAGCAGAAGCAATGCGTGTGCAACAAGAAGGGCCAAGTCTTTGATTCCAAGCACTTGAC ATGCAGCTGCCCGGCTGGAACGAGTTGGAACGGCTATGCTTGTGTCCCAGATTGTGGCAAGG ATGCGCACTACGATACCAATCAGAAGTGCTGCGTGTGCAATAACAAGGGCCAGATATTTAAT TCTGGAAGCAAGACATGCAGCTGCCCAGGCAACCAATACTGGGACGGCAATAAATGCACATG CCCCTATGGATCGACATGGGACAGCAGTAAGAAGACGTGCAAGCAGACACCCATACATTAA |
| 56 | MIC-54347 | ATGTTGGGCTTCCTCGGAAAATCCGTGGCCTTGCTTGCTGCGCTGCAGGCCACCCTCACCTC TGCATCTCCTCTGTCTACAAACGACGTCACAGTTGAGAAGAGAGCCAGCGGATATGCGAACG CTGTCTACTTCACTAACTGGGGTATCTACGGCCGCAACTTTCAACCCCAGGACCTGGTTGCG TCGGACATCACTCATGTCATCTACTCGTTCATGAACTTCCAAGCAGACGGCACTGTCGTCTC TGGAGATGCTTACGCCGATTACCAGAAGCACTATTCCGATGATTCTTGGAATGATGTCGGCA ACAACGCGTACGGTTGTGTCAAGCAACTGTTCAAGTTGAAGAAGGCCAACCGCAACTTGAAG GTTATGCTTTCTATAGGTGGCTGGACCTGGTCCACCAACTTCCCTTCTGCCGCAAGCACCGA TGCCAACCGCAAGAACTTTGCCAAGACAGCCATTACTTTCATGAAGGACTGGGGTTTTGATG GTATTGACGTCGACTGGGAGTATCCTGCCGATAACACCCAGGCCACCAACATGGTTCTTCTG CTTAAGGAGATCCGATCTCAGCTAGATGCTTATGCGGCCCAATACGCTCCAGGATACCACTT CCTTCTCTCCATCGCTGCCCCCGCTGGCCCAGAGCACTACTCTGCCCTGCACCTGGCCGACC TTGGTCAAGTTCTCGACTATATCAACCTTATGGCTTATGACTATGCTGGTTCTTGGAGCAGC TTCTCCGGACATGATGCCAACTTGTTTGCCAACCCCTCCAACCCCAACTCTTCACCATACAA CACCGATCAGGCTATCAAGGCTTATATCAACGGAGGTGTTCCTGCACGCAAGATCGTTCTTG GCATGCCCATCTATGGACGATCTTTCGAGAGCACCGGTGGAATTGGCCAGTCTTACAGCGGA ATTGGATCTGGAAGCTGGGAGAACGGTATCTGGGACTACAAGGTTCTTCCCAAGGCCGGTGC TACAGTCCAGTACGACTCTGTCGCACAGGCATACTACAGCTATGACCCTAGCTCCAAGGAGC TCATCTCCTTCGATACCCCTAGCATGATCAACACCAAGGTCTCTTACCTCAAGAACCTCGGC CTGGGAGGCAGTATGTTCTGGGAGGCTTCTGCTGACAAGACTGGCTCCGACTCCTTGATCGG AACAAGCCACAGAGCGCTTGGAAGCCTGGACTCAACTCAGAACTTGCTGAGCTACCCCAACT CCCAGTACGATAACATCCGAAGCGGTCTTAACTAA |
| 57 | MIC-54347 | ATGTTTTTCAGCAAAGCACTGGCTGCTACCGGCCTTTTGGCCACTGCTGCTCTCGCTGCACC CACCGTGGAGAAGCGTGCCGCTGGAGGCAAGCTCGTCATCTACTGGGGTGCTGAAGACGACA GCACTACTCTCGCCAACGTCTGTGCCGATTCCTCTTACGACATTGTCAACTTGGCTTTCCTT GACAAGTTCTCTGCTGGTGGTGGCTACCCCTCGCTCTCTCTGAGCACCCTGGGCGGCCCATC TGCCGCTCAGAAGGCTGCTGGTGCCACCAACCTCCAGGATGGTTCTTCTTTGGTTCCCGCCA TCAAGGCCTGCCAGGCCGCCGGCAAGCTGGTCATCCTCTCTATGGGTGGTGCTACCGACTTC TCTGCAGTCTCCCTTTCGGGCGATGCTCAGGGACAGTCTGTTGCCGACATGGTTTGGAACCT GTTCTTGGGTGGTACTGCCAACCCCACTCTCCGTCCTTTCGGATCAGTCAAGCTCGACGGTG TTGATCTCGACAACGAGACTGGCAACCCCACTGGTTACCTGGCCATGACTCAACGCTTCCGA TCCAACTTTGCCAAGGACACCAGCAAGAGGTACTACCTCACTGCTGCTCCCCAGTGCCCCTT |

TABLE 3-continued

Exemplary sequences of endophytes of the present invention

| SEQ ID | MIC ID | Sequence |
|---|---|---|
| | | CCCCGATGCCTCTGAGCCTCTCAACGTCTGCCAGCTCCTTGATTACGTCTGGGTCCAGTTCT<br>ACAACAACGGCAACTGCAACGTTGGCCAGTCCGGCTTCAACACTGCTGTCAAGAACTGGAGC<br>AAGAACATTGGTAACGCTACTCTGTTCATTGGTGCGCTGGCCAGCGGTGCCGATGGTGACCA<br>GGGCTACATCTCTCCCAGCGCTCTGATCTCTGCTTACAACGGTGTCTCTGCTCTTAACCTGC<br>CCAACGTTGGCGGTATCATGCTTTGGGAGGCTCAGCTCGCTGTCAAGAACAGCAACTTCCAG<br>AAGACCATCAAGGCTGCCATCGGCTCCGGCTCCACTCCTCCTCCTCCTCCTCCCGCCTCTTC<br>CACCACTCCTGCCGGAAGCACCCCCACCTGCTCTTGGGCCGGCCACTGCGCTGGCGCTACTT<br>GCAGCACTGACAATGACTGCTCCGACTCCCTCACCTGCAACAGCGGCAAGTGCGGTACCGCT<br>GGCAGCACTGCTCCTCCTCCTACCACTTGCTCTTGGGCGGGCCACTGCCTCGGCGCTTCTTG<br>CGGTAACGACAACGACTGCTCTGACCCTTACTTCTGCTCCAACGGCGTCTGCTCTCAGTAA |
| 58 | MIC-54347 | ATGTTTTTCCGCAACGCCGTCGCCGTAACCAGCCTTTTGGCTGCACTTTCTAGTGCCCAACC<br>CTCCGGCCCCGAATTGGCCGTGTACTGGGGTGCTGAAGATGATAGCACGACTCTCAGCGACG<br>TGTGTTCAGACAACTCTTATGGCATTGTGAATCTTGCCTTCCTCGACACATTTTTTGCTGCA<br>GGAGGCTTTCCTCAACTCAGCGTCAGCGGGTTAGATGGCCCATCCCAAGCTCAGCAAAGCGC<br>TGGTGCCACTGGCCTCAAGGATGGTAGCAGTCTTGTAGACGCTATTAAGCAGTGCCAGTCGG<br>CCGGGAAGCTGGTCCTTCTCAGCCTTGGTGGCGCTGGCGCCGATGTCACTCTTCAATCAGAC<br>TCTGATGGAGAGAAAATTGCTGATACACTCTGGAATCTGTTCGGTGGTGGCACTGATAACCA<br>AGAGCTGCGTCCCTTTGGAGATGTCAAGCTCGATGGCTTCGACTTGGACAATGAATCTGGCA<br>ACCCCACAGGTTACCTAGCTATGGTAAAGCGTTTCAAGTCCAACTTCCAGTCGGACACGAGC<br>AAAACTTATTTCCTTACTGCGGCTCCTCAATGCCCATTCCCCGATGCTTCGCAGCCTCAAGA<br>TGTTTGCAGTGAATTGGACTTTGTCTGGGTCCAGTTTTACAACAACGGCGATTGCAACATTG<br>CGCAATCTGATTTCTTAAACTCCGTCCAGACTTGGAGCAGCGGCATTGGCAACGCTAAGCTC<br>TACATCGGTGCTTTGGCTAGTGGTGCTGACGGCGATCAGGGCTTTGCTGATGCTGATACGCT<br>ATTGGGTGCTATTCAGGATGTCAAGAATATGAACCTTCCCAATTATGGAGGTGCCATGCTTT<br>GGGAAGCCCAACTGGCTGTTAAAAACGGCAACTTTCAGCAGAAGATTGCCCCCGGTCTATAA |
| 59 | MIC-54347 | ATGAAATCAAGTCTCTTGTCTCTTATTGCCATTGCAATTAATGGTGCCTTGGCTGGCATTAA<br>CTGTAATGGCAGCGGAGACTGTGCCGGGACTCCTGGTACTCTAGGCGATCTTATTGCTGATG<br>CATACCAAATTGACCCAAATCGTTGGTATAACAATGGAGAACATATCGCCTGCTCGGATAAT<br>CGAGGCGGCGGTGGCCTTTGTGCTTTCTTCCAGAATACTCTCGGTGGCCCTGGAAGCTCAGT<br>TCTGACTTTGCTTCAAAACCTGCAAGCTCACGGCTGCAATAAGTGCGGCAGTATTCCGGTAA<br>ATTTCCCTCAGGGAGATAACAGTGAAAATCATGGGGAGCTTACTGTCAACTTTGTTGTTTCG<br>GCTGGCTGCACTGGGCTTTGCTAG |
| 60 | MIC-54347 | ATGAAGTTCAGCTTTACGTCCGCTATCGCCATTGCAAGCATTGGAATCACTGGCGCCAGAGC<br>CGGCATTAACTGCAATGGCAGTGGCAACTGCCCTGGAGTAGCTGGCGACCTCAGCACCCTTA<br>TTTCATTTGGATGGTCAATCGACCCCAACCGTTGGTATAACAACGGGGAACACATTGTTTGC<br>GTGCAAAGTCAACTTGGGACTGGACTTTGTGCCTTCCTCCAGAACACCGGCGGTGCCCCTGG<br>TAGTTCGATTCAGCCGTTGCTCCAGGCATTGCAAGGCCACGGATGCAATAAATGTGGCAGTG<br>TTCCGCTGAACTTCCTTCAGGGAGATAACAGCGAAGATCACGGGGAGCTTACTGTTAATGCT<br>GTTGGCTCAACTGCCGGCTGCAGTGGGATTTGCTAG |
| 61 | MIC-54347 | ATGACACGCCTCCTCGACGCCAGCTTTCTGCTGCTACCTGCCATCGCATCGACGCTATTTGG<br>CACTGCCTCTGCACAAAATGCGACATGTGCACTCAAGGGAAAGCCGGCAGGCAAAGTCCTAA<br>TGGGATATTGGGAAAACTGGGATGGATCAGCCAACGGTGTGCACCCTGGATTTGGCTGGACA<br>CCGATCGAGAACCCCATCATTAAACAGAATGGTTACAATGTGATCAACGCCGCCTTCCCCGT<br>TATTCTATCAGATGGCACAGTGTTATGGGAAAACGACATGGCTCCTGGCACTCAGGTCGCAA<br>CCCCAGCTGAAATGTGCGCGGCTAAAGCAGCTGGAGCCACAATTCTTTTGTCAATTGGAGGT<br>GCTACTGCTGGCATAGATCTCAGCTCAAGTACAGTCGCTGATAAGTTCATCGCGACCATTGT<br>ACCAATCTTGAAGCAATACAATTTTGACGGTATTGATATTGACATTGAGACCGGCTTGGTCA<br>ACAGCGGCAATATCAAAACACTTTCCACATCACAGGCCAACTTGATTCGCATCATTGATGGT<br>GTTCTTGCTCAGATGCCTTCCAACTTCGGCTTGACCATGGCACCTGAGACAGCATACGTTAC<br>AGGTGGTAGCATCACGTACGGCTCTATTTGGGGATCCTACCTACCTATCATTCAGAAATATG<br>TTCAGAACGGCCGGCTGTGGTGGCTAAACATGCAATATTACAACGGCGACATGTACGGCTGC<br>TCTGGCGACTCATATGCCGCTGGCACTGTTCAAGGATTCATCGCTCAGACTGATTGCTTAAA<br>TGCAGGTCTTACCGTCCAAGGCACCACAATCAAGGTTCCATATAGCATGCAAGTACCCGGTC<br>TACCTGCGCAATCAGGAGCTGGCGGTGGCTACATGAACCCGAGCTTGGTTGGACAAGCCTGG<br>GATCACTACAACGGTGCTCTGAAAGGCTTGATGACGTGGTCAATCAACTGGGATGGAGCAGG<br>CGGCTGGACGTTTGGCGACAATTTGCTTACTCGTATTGGTTAG |
| 62 | MIC-54347 | ATGCACCTCCACTCTCTCTTTACGGCGCTTGCGCTGGCGAGCCCTGCGCTCGCTGCTTCAAT<br>CCCTCGCAGCAGCAGCAGCTCCTCATCATCAACTATCACCGTCTGGGCGACTCCCCACGACA<br>GCTACTCATCCTCCGTCGGCGTCTTGGGCTGCAAGGTCGACACCAATCGCATCGCCTACTGG<br>CCAGACTCCGTCGACTGCACCAACATCTGCGTGTCTCTTTCGTACCAGGACCGACAGGTCTA<br>CCTCCTTCGCGTCGACCAATCACAGGGCGCGCACGACATCAGCTACGATGCCTGGAATTACC<br>TCGTTACCGGCTATCCAGCCACGGAAAAGCCCGTTGCGGGAGGGCCCATGGAAATGACGACG<br>GAAAACGTCGATGCGTCCAAATGCGCCGACCTCATCTACACAGCGGGCGGCAAGCTTCCCCT<br>CAGTGCGGCAAATAGCATGAATTTCTTGGCCAGCTGCTTGGAGCAAGAGAATTCATGGGTTG<br>CAAGCAACTACGTGTTATACAACATCTTGGATGCAATTTGCACCGTTGGCCAAAACCAGGTC<br>TGCTCTTTGAACTGGCCCACTGCCAACCAGCCCACCTGTCCGGGCACCCTAGGATTGCCCGA<br>CGCACTCAAAGGCGAACCTGTCTACAATATCGAGTATCCTTCCGGCGTCAAGGTACTTGCAG<br>GGGCGCCACCAACTGTACCAACTGGAGTACCTGTTCCAGTACCGGCGCCTTCTACCAACGAC<br>GATGAGAAGAGCGCTGCACGGAGTTTAAGGCATTCAGACTCTCTCGTCTGGATACCAGTCCT<br>TTCATTAACTTCCATTATATATTCTTGGATGCTGTGGTAA |

TABLE 3-continued

Exemplary sequences of endophytes of the present invention

| SEQ ID | MIC ID | Sequence |
|---|---|---|
| 63 | MIC-54347 | ATGCGTTTCAACAGTTTCATCGCCGTCGCGGCTGCGACCGCTCAAAGCGCCGCCGGCCTGGG<br>AATCAACTGCCTGGGCGACACTCTCTGCGGAATCTCGTACATGAGCGGCGGACGCCTGACCC<br>AGTTCCAGACCATCTTCGACAACATCTTTGAGAAGCGGATATACGACAACGGCGACGACATC<br>GGCTGCATCGAGGTCCACTCAATCAACTTCAAGGGCTCCTTCAAAGGCACATACTGCGCCTA<br>CGTCCAAAACCTGGATGGCAGCGTCAACGGCGCCACCCTCAAGACCCTTTACACCGAGCTGG<br>TCAACTATGGCTGTGGAATCTGCGGCTCCATCCCCATCCACTACAGCAAGGGCGACAACGAC<br>TCCAACCACGGAGAGCTCTCTTTCAACATGGTGGACAGCCTGCCGGACAACTGCGAGCTCGG<br>CAAGCCTTGCGCAGCGACCTCCTAA |
| 64 | MIC-54347 | ATGTACTTCGCCAACACCCTACTCTCCATCGCCGGTGCTGCATCAATAGCCAATGCCTTGGG<br>CAGCAATTGTCAAGACAGCGGTGTTTGCGCGGATATCAACGCTAACCTGAGTTTTGCCATTG<br>AACAACTAAAAGGAATGGACCAGCTCCAGAGATTCTCGGACGGACAACACATCACCTGCGTT<br>GATACGGACAGTGAGGGCAACTCTTCCCTCTGTCTCTCATACCAGGACACTGGCCGATCATG<br>GACTGTATTCCAGACTGCCTGGTTTGCCCAGTCCTTGGTAGAGCAGGGATGCCAGGCCTGTG<br>GAAGCCTGTCTATGGGCTCTCATCATGGCGAGCTGGTCGCCAGCGTCATCACAAAGAGTACC<br>AGCGGCCTGGATACCTCTGGAGCTCGTCGTGGGATGGACATGGTTCAACTGGCTGTAAGAGC<br>TGGGGACCGATGA |
| 65 | MIC-54347 | ATGTTGTTTAAAATTGCCATCGTTGTGATCGCCTCCACAGCACGTGTTTCCGCCTTTGGTAT<br>CAACTGCGAAGGCAGTGGCTACTGCTCTCCATTGTTCAATCCTGGAGCCAACAACCACCCGC<br>TGCTAGAGATGGTGGACGTTATCGACTTTGGAATTGATGACAATCGATGGTATGCAGCAGGA<br>GAGCATATTGCCTGTGATCAGAGTTCTGGTGTCTGCGCTTTTGTACAGAAGATTGGCGGTGC<br>TTCAGGTGGCGATATTGCTCGAGCTGTCCGCTATCTCGCAGACCATGGCTGCACTACCTGTG<br>GAAGCGTACCCTTGGACTTCCCTAACACCAACGATGTCAACAACGGAGAGGTGACTTTCAAC<br>TTTGTTGGGTTGGAAGATATGGGTAGCTGCAGCGATCTTTGCTAA |
| 66 | MIC-54347 | ATGAAAATGCTTATTACTGCCGCTCTTTTCACCCTGGCCCTCGCCGCCCCTGTCGCCGAGAC<br>TAAGCCTCATAGCATTGCTGCTCGCGATCCCTTTACTTGCCCCGGCGGCCTGACCAACAGCA<br>CCCCCATGTGCTGCAGCGTTAATGTCCTTGGCCTGCTAGCCCTTGATTGCCAGCAACGTATG<br>GGTTACTTTGCTTCATATTTATCCTTTCAATATATGGGGAACTTGAATAGCTGACATTTTCA<br>TCGCTCATTAGCTGGCGCGGACGGCTGTAGTGGCAGCTCCAAGCCCAATTGTTGCACCCTTG<br>GAGCGGTATGTTTTTTAATGATTGGTCACGCCAACAGTTTTGAGCATTTACTGATAGAATTT<br>CTCAATACAGGCCGGACAGGGTGTTATTTGCAACGCACTGTAA |
| 67 | MIC-54347 | ATGAAGTCGGCCATTCTTCTTGGGCTCACTGGCCTCGCTGCCAATGTGAATGCCCATCCTGC<br>TAAGCAGCCAGAGACCGGCAACGGCCTGACTAAGCGTGGCGTTGATATTAGCAAGTATAGCT<br>TGCCTAATCTTTCAAAGTACACGTCTTCGCCAAACATCGAACAAGAGGCCTCTCTGCAGTCT<br>TTGGCTTTCAAGCGCAACTATGTGGATACAGCCACACGAGCTGTCAAGAAAGCTGCCCCCAA<br>GGCCGAATTCCGCGTCGTGGATGACCACTATATCGATGTTGACGGCATTGGTCACGTCCACT<br>TTAAGCAGACAGTGCACGGAATTGACATTGACAACGGTGACTTCAAGGTTAACGTGAGTGGA<br>AGGCAAAATCACCTCACCTAGAAAACCAGAAACTTACAAATAATATGAACTTAGATTGGCAA<br>AGACGGTAGAGTCTTCTCTCATGGAAACAGCTTCTTTTCTGGCAAGCTGCCCCAGCAGAACC<br>CCTTGAGGAAGCGTGATTTCTCTGACCCCACCACTGCGCTCAAGGGTGCAATTGATATCCTG<br>GGCCTCCCGGTTCAGGCTGATGGCGCCACCGCCGAAGCTCAGGAAGGCACTGAGAAGTACAC<br>GTTGAAGGGTACATCCGGAGCTGTCAGCGATCCTAAGGCTCACCTCGTTTACCTCGTCAAGG<br>GAGACGGAACTCTGGCTCTGACTTGGCGGGTCGAGACCGATATCATGGACAACTGGCTTCTC<br>ACCTACGTTGACGCAACAACCAACCAAGAGATTCATGGTGTTGTAGACTACGTCTCCGACCT<br>TGCCACCTTCCAGGTTTACCCCTGGGGCCTCAATGACCCCACCGAGGGAGATCGTAAAGTCC<br>TGACCGACCCGTGGAGAACCGATGCCTCCCCATTCACTTGGCTCAGCGACGGAACCACCAAC<br>TATACTGTAACTCGCGGAAACAATGCTATTGCGCAGGATAATCCTTCTGGGGGGGACAGTTA<br>TCTCAATAATCACCGTCCATCCAGCTCGACTCGGGACTTTCAATATCCCTTTACGCTGACTC<br>AGACCAACCCTACAGATTATAGGGATGCTGCCATCACACAGCTCTTTTACACAGTCAACAAG<br>TACCACGATTTGCTATATGTCCTTGGCTTCAACGAGGTAGCAGGAAACTTCCAAGCAAATAA<br>CAACGGAAAGGGCGGCAAGGCCAATGATTTCGTTATTGTTAACGCTCAAGACGGCAGTGGAA<br>CGAACAATGCCAACTTTGCTACCCCGGCCGATGGAAGCAATGGCCGTATGAGAATGTACATC<br>TGGACTACTGCTAACCCCAAGCGAGATGGCGATCTCGAGGCGGGCATTGTTATCCACGAATA<br>CACTCACGGATGTAAGTCTCTCTCATTTCAACTTCGTATCTACTCTTTCTAACGCTTGAAAC<br>AGTGTCTACCCGTCTTACCGGCGGCCCTGCCAACTCTGGATGCCTTACTGGCACTGAAGCCG<br>GCGGCATGGGTGAAGGCTGGGGTGATTTCTTCGCCACCGCTATCCGCTTAAAGGCTGGTGAC<br>ACCCGCAGCAAGGACTATCCTATGGGAGTCTGGGCCGATAACAACGTCAAGGGTATCCGCCA<br>GTATCCTTATTCAACAAGCCTTACTACCAATCCTCTTACTTATAAAACCGTCAATACGCAAA<br>ATGAAGTCCACTCAGCCGGTACTACATGGGCCACCATTTTGTACGAAGTCCTGTGGAACCTC<br>ATTGACAAGTACGGCAAGAATGACGACGATTTCCCTACCTTTGATAGCCAGGGCGTCCCCAC<br>CGACGGCAAGTATCTTACCTTGAAACTCGTCCTCAATGGATTGGCTCTGCAGCCCTGCACGC<br>CAACTTTTGTTTCTGCCCGTGATGCCATCTTGGATGCTGATCGTGCTTTGACCGGAGGGGAG<br>AATCTTTGTGAATTATGGACAGGATTCGCCAAGAGAGGTCTTGGATCCGGCGCCAAATATTC<br>TTCCACCGCTCGCGTTGAAAGCTTCACTATCCCATCTGGGGTTTGCTAA |
| 68 | MIC-54347 | ATGAAGTTCTTCGCCGCCACCGCTCTCCTTGCCGCCACTACCATTGCTGGACCTCTTGAGGT<br>TCGCACTGGAGACGGTAACATTTGTCCTAGCGGCGGCCTCTACGGCAACCCTCAGTGCTGCT<br>CCTCTCTCCTCCTTGGTCTCATTGGTCTTGACTGCAACGTCCGTAAGTTAAAAACAAAGCTC<br>ATTCAAAGCCTATTGATGCAATACATTCTCATACTGGTGTCCTATAGCCAACCAAACGCCCC |

TABLE 3-continued

| SEQ ID | MIC ID | Sequence |
|---|---|---|
| | | GTGACGGCGCTGACTTTAGAAACATCTGCGCTAAGACTGGTGACGAGGCCCTTTGCTGTGTT GCTCCCGTTGTAAGTAATCACCCAGCTTCAAGTTGCCCTTGCCCTTGCCCTTGTGCTGTTGC TAATTTCTACACTATCTTTAGGCCGGCCAAGCTCTTCTCTGCCAGGTCGCCGTTGGTGCCAG CTAA |
| 69 | MIC-54347 | ATGAAGTTCTTTGCTGTTGCCACTCTCTTTGTCACTGGCGTCATCTCCGCCCCGTCACCCAA TGCCCTAAATTCCCGCAGTCTTCTTTGCAGCCCTGGCCTTTACTCCACCGCGCAGTGCTGTG GTGTTGATGTATTGGGAGTTGCTGATTTGGACTGTGCGGCTCGTAAGTAGTCTCTCAAAGCC CAATCATATTTATTGATTTGAAGATGCTGATACTGGGAATTTAGCTACTGGCACTATTACCA ACGCCCAAGGATTTCAGGCTGCCTGTGCTAAGAAAGGCCAAGAGGCTCGCTGTTGTGTTCTA CCTGTTGTAAGTTATCCTAAGATACGTGTAATGCGGCTGCTTTTATAGACTGGCAATACTAA CAATTTTTGTCCCTTTAGGCCGGCCAAGATGTCCTGTGCCAGGACCCCCCTGGTTTGTAA |
| 70 | MIC-54347 | ATGACCAGCATTCGTCGTCTTGCTCTCTATCTCGGAGCTTTGCTCCCGGCTGTCCTCGCCGC TCCAGCAGCCCTTCACAAGAAGCCTGAGGCTGCACCTAACAAGTTTATTGTCACTCTTAAAG AGGGCGCTTCAATTGATACCGACTCTCATCTCGCCTGGGTGAATGACATCCACCGTCGTTCT TTGACCAAGCGTAGCACTGCTGGTGTTGAAAAGACTTATAACATTCATACTTGGAGTGCTTA TGCGGGTGAATTTGATGCAGAGACGATTGAGCAGATCAAGTCTAGCCCCGATGTACGTGCTC TCCGTATCCTAACGAAAAGAAGAAAAGCTAATCACGCTGTCAGGTCGCGTCTGTGGAGCCAG ACTACATCATGTACCTGTCGGACATTGTTGAAGACAAGCGTGCTCTGACCACACAATCTGGA GCTCCTTGGGGCCTTGGCACTGTTTCCCACCGCACATCTGGGTCTACGAGCTACATTTACGA TAGCTCAGCTGGCTCTGGAACCTTTGCCTATGTGGTTGACTCCGGCATCAACACCTCTCATC AGCAATTCGGCGGGCGCGCCAGTCTTGGCTACAATGCTGCAGGAGGACAGCACGTCGACACT CTTGGCCATGGTACTCATGTTTCTGGAACAATTGGTGGATCTACATACGGCGTTGCTAAACA GGTGAGTGATTCCAATGTTGTTGTTATCACATACAAGTGCATTCAAGACTGACTCGGTACTA TTCATAGGCCAGCCTAATCTCCGTCAAAGTCTTTGCTGGAGAGAGCGCTACCACCTCTGTTA TCCTTGACGGCTATAACTGGGCTGTAAACGACATTGTCTCGAGGAATCGTGCTAGCAAATCT GCCATTAACATGTCGCTTGGAGGACCTGCCTCATCCACCTGGACGACCGCCATTAACGCAGC CTTTAACCAGGGTGTGCTTACCATTGTCGCCGCTGGTAATGGCGACAGTTTCGGAAACCCCC AGCCAGTTTCCGGCACTTCTCCTGCTAATGTTCCTAATGCTATCACTGTTGCGGCGCTGGAC ATCAACTGGCGCACTGCTTCCTTCACCAACTACGGTGCTGGCGTTGATGTCTTTGCCCCTGG TGTTAACATTCTGTCGTCATGGATTGGATCCAACACTGCTACCAACACAATCAGCGGCACCT CTATGGCGACACCTCACGTTGTTGGTCTGGCTCTCTATCTTCAATCCCTTGAAGGCCTCACC ACTCCTACCGCTGTCACTAATCGGATCAAGGCTCTGGCTACCGCTGGCCGTATAACTGGCAG CCTTAACGGCAGCCCCAACACTCTCATCTTCAACGGAAACAGTGCTTAA |
| 71 | MIC-54347 | ATGAGAACATCTACCGCTATTATATCTCTTGCCCTTGTGGTGATGGGAATTGCCGCCCCTGC TGGTCATGTATCGAGCAACCAGCCGCGGAGCGTGGAAGGTTGAGCTCATCAAAGGAGCAGCC GAGGCCGGCTCTGTTGTCAGCGAAGCCGGCTTTGTTGTCAGCGAAGCCCAATTCAACGCCAT ATTTCCCGGTCGAAACCCTTTTTACTCCTATAGGGCATTGACCGGCGCCCTCGGATCTTATC CCAGCTTCACCAACACTGCTGATAACGCCACTAGGCTCCGCGAGGCCGCCGCTTTCTTCGCC AATGTGGATCATGAAACCGATGGGCTCAAGTTCGTCGTGGAATAA |
| 72 | MIC-54347 | ATGAGCGCCGCATCCCGCAAGTCACGCATAGCTACGAGTGTGGCGAGAGTTATGTACACCAA TGCAGTCTATTTCCCTAGCAGCAGAATATATCAAGGTGATTCGCCGGGAATGCTCAATTACA GCTGCATCAACCACGTGTATTATGCTTATGCCAGCGTGACGGCGGACGGCAATGTGTTTGTG AGTTTTGATCAAGTCCCGGAGACCACACATATGGCAAAGTGGCTTCTTTTCCCGTGCCATGG TTCGGAAAAGTTGAGAATATTTCACCTGCATGATGTTGCTCGGCTGCTGACTTGTGACGTGT GGCCCAGCTCGGCGATGAGTGGGCCGATGCAAGAGCGCCAGTGGATGGTGTTCAGGGTGGCT TAGGATCCTTGATGCATCTCAAGCAGAGGCACCCTCACCTGCAGGTTGTCTTATCTATTGGT GGCAGCACTGCATCAGAGGTATTTCCCATTGTTGCATCAAGCACTCTCCTCAGAGACAACTT TGCCCGGTCTGCCCTTGGCCTCGTGGAAGCATCCGGGCTTGATGGTATTGACAGTAAGTACG AACGAACAAGAGGAAGACGAACAAAGAAGGAGGTAGAGGAAGCATGGATGTCAAGTTCACAC ACGCGCGCTCGCACATACACCCGCCACAAACAAGAGTCTTCAGCTAATTACTCGTCTCCCTA AATAGTTGCCTGGGAGTTCCCATCCCAAGCTAAACATGGCCACGATTTCCTAGCCTTGCTGG CAGCAGTGCGGATTCATATGCCTGAAGACCGCTTCATTCTAACAGCTGTCCTCCCTGCGGCG AAGGAGGTTCTACAACTCATCGACCTCAGCACAGCGGCCGAGTACCTTGACTACATCAACCT TGTGGCATATGATTTCTTCGGCACGTGGACGTCCAAAACTGGTCATCACGCACAGTTATATA CTATGAACAAGGACGAACCCTCGGCATCGACAGGTGTGGCGTATGTCATGTCCCAAGGATTC CCTGCGAAGAGTATCCTGCTCGGGATCCCAACCTACGGACGAAGCTTCCTCAAGGCCAATGG GCCGGGCCAGGATTTTAACGGCGTTGGCGGCCAAGATGGCACATTCGAATACGGCGAATTAC CACGAAAGGGATGCAAAGAGATTGTGGATAGGCGCTATATTGCGGCCCAATGTGTCGGTGGT GATGGGGGGTTTGTCACGTACGACAACCCCGAGACGGTCAAGGTTAAGGCGGAATTTTGCAA GCAAAAGGGATTAGGGGTTTGTGGAGCTCAAATTTATCCAATCTCTGTGAGACACAAATTGG TTGCTAACTATCAAATTTTTAATATTGCAGGGGCTTTTTTACTGGAACGGACCGGCTGACTC TCGAGATCAAGCACGAAGTCTGATTGCGGCTGGATTCCGCGCTCTACACACCTCGTGA |
| 73 | MIC-54347 | ATGCAATTGACCACAGTCGTCGCGCTCTTCGCCTCTCTGGCCGGCGCCGCGCCTGCCCCTGA ACCCGCTGCTGAGCTTGTTGCTCGTGATGGTCCTTGCTCCTCTGGTGTCACCAATAACGTCC CTCAATGCTGCGGTACTGGTATCCTCAGTGTTGTCTACGTGGACTGCAAGACTCGTAAGTCT TTCAACGCTCTCGCTTGATGAGAAATCCCCATTGCATGCTAAGCCTTGACTTAGCCACTCAA GCTCCCTCTGCCACTAACCAGTTGAGCGCCATCTGCGCTCGAGTAGGTCTCCAGGCCAAGTG TTGCACCGTCGGCATTGTAAGTTCTTCGTCCTAGAATCGGATTTGCAAAAGGGATTCTAATT ATTGTATCAGGCTGGCGTTGGCGTTCTTTGCCAGGATGCTATTCCCCAGTAA |

Exemplary sequences of endophytes of the present invention

TABLE 3-continued

| Exemplary sequences of endophytes of the present invention | | |
|---|---|---|
| SEQ ID | MIC ID | Sequence |
| 74 | MIC-54347 | ATGCAATTGTCCAACCTCTTCAAGCTTGCTCTCTTCACCGCCGCTGTCTCTGCTGATACCGG<br>TATGATGAATCACTACCTGTATTCGATGCTCTCGTTTTGCTAACACAGATTCACTCACACAG<br>TCTCGTACGATACTGGCTACGATGACGCATCTCGCTCTCTGACCGTCGTCTCCTGCTCCGAC<br>GGCCCCAACGGCCTCATCACCAGATACCACTGGCAGACCCAGGGCCAGATCCCTCGCTTCCC<br>ATACATTGGTGGTGTCCAGGCCGTCGCCGGCTGGAACTCCCCTAGCTGCGGCACCTGCTGGA<br>AGCTCACTTACAGCGGCAAGACCATCTACGTCTTGGCTGTTGACCACGCCGGTGCTGGCTTC<br>AACATTGGCCTCGACGCCATGAATGCTCTCACCAACGGCCAGGCTGTTGCCCTCGGACGTGT<br>CTCTGCCACTGCCTCTCAGGTGGCTGTGAGCAACTGCGGTCTCTAG |
| 75 | MIC-54347 | ATGCATTCAACAACTTTCTTTGCCAGTCTGGGACTCGCAGGCCTGGTTGCCGGCGCCCCTTC<br>GGCCCCGCACAACGTTAAAGCTCGCCAAGCTTCCGGTGCCCAAAACGTCGTCTATTGGGGAG<br>GCACTAACAATGAAAGCGACGACCTTTCTACCTATTGTACGCCCACCGCAGGCATTGACATC<br>CTTGTTCTGTCTTTCTTGGACATTTACGGCACAACTGGCAACATTCCAGCAGGTAATATTGG<br>CAATTCTTGCTATATCGGAACAAATGGCACACCTCAACTATGTGATAATCTTGCTGCTTCAA<br>TAGCCAGCTGCCAGGCCGCTGGTATTAAAATTATCTTGTCTCTCGGAGGAGCGGCCGGCTCC<br>TATTCTCTACAATCGCAGTCACAGGCTGTGGCTATTGGCCAGTATCTCTGGGAGGCTTACGG<br>CAACTCTGGCAGCACTTCTGTCCAGCGGCCCTTTGGCAATGTCTTTGTTAATGGTTTTGACT<br>TTGACCTTGAGCTGAACGCCGGCAACCAATACTACCAGTATCTGATATCAACCCTCCGTTCC<br>AACTTTGCCAGTGACCCGAAACATACGTATTATATCACTGGAGCGCCCCAGTGTCCTCTCCC<br>GTTGAGTATTCCTCAAATCCGTAGTTAGATGGGTGACTCATGGCTTGCTAACAACACTAATG<br>GAACAAATAGAGAACCAAATATGGGAGAGATTATAAGTGCCTCACAGTTCGACTATCTCTGG<br>ATTCAATTCTATAACAACAACGCTTATGCACCAGACCCCTGTTCTCTTGGTCTGCCTGGCGA<br>TGCACCCTTCAACTACAACAACTGGACGTCATTTATTGCTACTACCCCTTCAAAAAACGCAG<br>TATGTGTATTTCGGCCCCTGGTATTATCTTGCATACCAAATTTCTAACAATTTCTACTAGAA<br>ACTATTTATTGGAGTCCCTGCGAATACTTTAGCTGCTAATGGCAATTCAGGTGGTGCCGTTT<br>ACTATGCTTCGCCATCCCAGCTTGCTTCCATTGTCGCGAATACAAAATCTAGCCCAGATTTT<br>GGAGGAATTATGATGTGGGATGCTGGGTACTCTGATGCTAATGTCAACAACGGATGCAACTA<br>CGCTCAGGAGGCCAAAAACATCCTCCTTACCGGCGCTCCCTGTGGAGGCTCACCCCCACCGG<br>TTAGCAGCAGCAAGCCTACATCCACTGCAACCAAATCCGCTACTAGCACTTCATCAGCCTCG<br>GGAACAGGCCCGACAGGAGGCGGCACAGTACCTCAGTGGGGCCAGGTGAGTCACTAGAGGCC<br>TTGGGGCTTACATATGACCTGGGGAAAAGAGCCCTAGCTAATTGATGTTTTAGTGCGGCGGA<br>GAGGGATACACGGGCCCGACGCAGTGCGTTTCTCCCTACAAATGCGTCGAATCAAGTCAATG<br>GTGGTCGTCTTGCCAATAA |
| 76 | MIC-54347 | ATGCCCTCTTTGATCACGGTTGCGAGCGTGCTCGCTCTTGTTCCATCCGCCTTCGCGGGCTG<br>GAATGTCAACTCGAAGCAAAACATTGCTGTGTACTGGGGTAATGACTCTTGTAAATATTTCT<br>AATTTATAGAAAGAAAGCATCTAACATGCTATCTGTATAGGACAAAACTCCGCCAACCAACA<br>GAGCACACAGCAGCGTCTTTCAGCCTACTGCAATGGTACGTTTGTGCTTTATTTCCTGACCG<br>AAACCTACGATTGGGTTGAGAAACAGCGAAGATTGAATCTGACAGTTGCGATGTAGATGCCA<br>ACATCAATGTCATTGACATTGCTTTCCTGAATGGAATTACTCCTCCTATGACCAACTTTGCC<br>AATGCTGGTGACCGATGCACTCCCTTCTCCGACAACCCTTGGCTCTTGAGCTGCCCTGAAAT<br>TGAGTGAGTCTTCTGTTGAAGAAATGCTTTTCTGTTGTAAATAGATATGGACTAACCATGGT<br>TGAATTAAAGGGCGGATATCAAGACTTGCCAGGCTAATGGCAAGACCATTCTCATTTCTCTT<br>GGTGGTGATTCTTACACTCAAGGTGGCTGGAGCTCTACCAGTGCTGCTCAGGCCGCAGCCAA<br>ACAGGTCTGGGCCATGTTTGGTCCTGTCCAATCCGGCAGCTCCACCGAGCGTCCCTTTGGCA<br>GCGCCGTTGTTGACGGTTTTGACTTCGACTTTGAAGCGACGACTAACAATCTCGCGGCCTTT<br>GGCGCTCAGCTCAAGAGCCTCTCGAGCGCTGCCGGTGGCAAGAAGTACTACTTCTCTGCTGC<br>TCCCCAGTGCTTCTTCCCCGACGCTGCTGTCGGTGCACTGATCAACGCCGTCCCCATGGACT<br>GGATCCAGATTCAATTCTATAACAACCCTTGCGGCGTCAGCGGCTACACCCCCGGCACCAGC<br>AACCAGAACAACTACAACTACCAGACCTGGGATACCTGGGCCAAGACAAGCCCCAACCCCAA<br>CGTCAAGCTTCTTGTCGGCATTCCCGCTGGCCCAGGTGCTGGTCGCGGCTACGTGTCTGGCT<br>CTCAGCTCACTTCAGTCTTCCAGTACTCGAAGGGCTTCAGCAGCACTTTTGCCGGTGCTATG<br>ATGTGGGATATGTCCCAGCTCTTCCAGAACACTGGCTTCGAGGCCCAGGTTGTCAATGCTTT<br>GAAATAA |
| 77 | MIC-54347 | ATGCCGCTTAAGGTCTTCGAGTCAGCTTCGCCTGCGCCGTCGCATCCCTCCTTATCGCACCT<br>CTGCCTGCTCGTCTTCGAAGCTGTTCTAGAAGTAGTCTGTGTGAGCTTGCCGGGATACATCG<br>TTGCGCGCCTTGGCCATTTCGATGCCGATAAGCAAAAGTTCCTGGCTAATCTCAATGTGATG<br>CTCTTCACGCCCTGTCTTAGTACGTTGCTCCCTCTTGCCATGTCTCTGTTATTCTCCTTTGA<br>ACGCCGTCTGACCCATTTCTCTCCTCAGTCTTCACCAAGCTAGCATCTCAGCTCAATGCCGA<br>AAAACTATCCGATCTCGCCATCATCCCCGCCATCTTTATCGTGCAAACTCTTGTATCATGGA<br>TAGTTTCGATCCTGGTCGCCAAGGGGTTCCGATTCAATAAGCGAGCTTCCAACTTCGTTACT<br>GCTATGGGCGTCTTTGGCAATTCAAATTCACTGCCCATCTCTCTCGTTCTTTCTCTCTCGCA<br>AACAATCAAGGGCCTCCACTGGGACAGGATACCAGGCGACAACGATGACGAAGTCGGCGCTC<br>GCGGTATCTTATATCTACTGATTTTCCAGCAACTTGGCCAGCTTGTCAGATGGAGCTGGGGA<br>TATCACGTTCTGCTAGCCCCCAAGGATAAATACGCCGAGTATCAAGACGAAATTGCCGAAGA<br>AGGCCAGTACAGATACAGAGACGAAGAGCCGAACGAACAGGAGCCGGAGATTCTCATTACTG<br>GTTTGGACGGTGATACCGAAGATGATGGCGAGAGCAATGCTTCTGAAGATTATATACCTGCT<br>GGACGAACACCTCTTGCGAGCAATTCCCGGGCTTCACTGGCTGGCTCTTCCGTCGACAATGA<br>CGACATGCTGAATTTCAAAAAGGGCAACTACACTCGTGGAAGCTCGCTCGCCAACACAGACT<br>TGGAAGATGATATTCTTTCATTCCCTCGTATTCGTCTTCGAGATGAGGCTGAAGTCGAGCAC<br>GGAGTTACTGCTCGTATCAAGAAATCACTATATTCTCTGAAAGACAAAGCTTCTGCGGCCAT<br>GACTCGCCAATATCAGCGACTTCCTCAACCTGTTCAAACCTGCCTTTCCTTCATTCATAAGT<br>CAATCACAAAGACTCTCGGATTTGTATGGGATTTCATGAATCCACCTTTGTGGGCTATGCTC<br>ATCGCGGTCATCGTGGCGTCCATCCCGAGTCTCCAACAGTTGTTCTTCGAAGATGGTTCATT |

TABLE 3-continued

Exemplary sequences of endophytes of the present invention

| SEQ ID | MIC ID | Sequence |
|---|---|---|
| | | CGTGAAAAATAGCGTCACCAACGCTGTTTCGTCTAGTGGAGGCGTTGCAGTGCCTTTGATCT<br>TGGTTGTTCTCGGCGCCAACTTGGCGCGCAACACTGCCGCTCACGATTCTCCCATAGACCCG<br>GAGGAGGAAAAGATTGGCACCAAGCTCTTGATCGCTTCGTTGCTGAGCAGGATGGTTCTGCC<br>AACTTTGATTATGGCACCCATTCTGGCTATTACGGCAAAATACTTGCCCATCAGCATTCTAG<br>ATGATCCCATCTTTATTGTCGTATGCTTTCTTCTTACTGGCGCACCCAGTGCGCTCCAGCTT<br>GCGCAAATTTGCCAAATCAACAATGTTTATGAGCAGACTATGGGAAGAATCCTCTTTCAGAG<br>CTATGTTATCTGGTAAGCATTTCAACACCCTTAATTTTGTCTATCGTGCATTTCACTAATAC<br>ACATATTAGGATTCTTCCCTCTACTCTTTTCCTTGTCATGATGGCACTCGAGGTGATTGAGT<br>GGGCAACAGTGAATTAA |
| 78 | MIC-54347 | ATGCTACCGTCGAGCCTTTGCCGGATTGCCGCTGTTATCAGCGTGGCTTCTGCGGAAATGGT<br>TTCGGGTGAGTACAATATAAACCCTCCAACATGTGATCTGTCTCACACTTATACATCATAGT<br>AACATTTGATACCGCTTACGACGATCCTTCTCGTTCACTGAGTGAAGTCGCTTGTTGGAGGA<br>AGGGCACGGGATTCATGCCTAACTTGGATTGGAAACTTCAAAAAGATGCATTGGAATTTATT<br>GGAATCAAAGCAATTCGTGGCTTCAGTTCTGCCCAATGTTTTTCCTGCTGGAAAATTGAGTA<br>TGGAGATAAGCAGATATCACTGTTCGCAATTGACAGCGCCGACTCGGGCATTGTTCTCTCTC<br>TGAGCACCATGCAATATCTTACAGGTGGCCAGGCTCGCGAGCTGGCCCGAATTGATGCAAAG<br>GCAACCCAAGTCGACGCATCAAACTGTGGGATTTCTGCGGCTGAACTGCACAAATACGATTT<br>CTAGTTAGTCGTATCCACTTTTAGGCTACCAAGCAAGCGTTCAAGTAGTTTCAAAGATAAGT<br>CAAGCTTTGTATCTTCGCCCCTATTACCTGGAGTTGAGACTATTTGTTACGTTTTTTTTGGT<br>GAGACTACGGCTACATATAGCCCCAAACGTTCACTTCTACTGCGGCATTAGTTTTTATACAA<br>TGCATTATTTACGCCAATATCTTGTATCAAGGTCTGAGTAGTGTCAACCTCCACTCTTGAGA<br>GAGCATCTATAGCTTAAGAGTATACTCATTACGACCGAAATATATTGATATTTTATTCAAAC<br>ACATAACTAGCAATGATAAAAGTCGCCTTAGAGGACGTAAGAGTAATAAAATGTAAAAATTT<br>CAGATCTGGACACATATACTGCACACACATACATTTATAACTCCGCAATTAACCATTTTTGG<br>TTAAGTACAGCTGAGATAACTTACTTTCATACATCGATTTTACCGTAGTTGAGAATATCTTG<br>GTATTTAATTATCTTTACATTCGGTTCGTCATTCAACAAAAGATGCGCAATTGAAGTTGTCA<br>CATTATCTGTTTAATTATGAGTCTTATGGACAGATAGAGATGCAATTTTGTGGTGAAGAGAG<br>GTATTTTTATCATCAACAGCACTAACAGATCACTGCCTTACTGAAATTAGCAGTACCAATGG<br>TAGTGGAAATAGCGATGGCTCTAGGAGCAACACTGGAGCTATTGTTGGAGGAGTTCTCGGTG<br>GTGTGGCTGGGCTTGCTTTAACTGGGCTTGCTGTTTTTTTCTTCCCCCGCTATAAGAATTTA<br>GCTGCTGGACATAAGCCAGTGAGCCAGAATACTCCTCCTGCTGCTTATCAATCCTCTCTGAT<br>GCAGCAGGACCCCAAGGCTCACTATGATCCTAAATATTTCGCAGAGATGGATACACAGCCAT<br>ACACGCCCCCTGATTAG |
| 79 | MIC-54347 | ATGCTCCGTACTCCTACAATCCCCTGGCTTCTAAATATCATCCTAGAAGAAAACCCTACTAT<br>GATTCCTTCAATGAAAAAGTGCGGCCGCAAGTTATGGGCTGGCCTGGCATTGCTAGCCTTGC<br>CTGTAATTGCAAGCGCATCATGCGCGCTTCCTAGCACCTACAAATGGACTTCGACTGGCCCG<br>CTGGCAAACCCCAAGTCGGGCTGGGTTTCGCTTAAAGATTTCAGCCATGTTCCATACAATGG<br>CCAGCATCTGGTCTATTCTTCGACTGTGAACTCGGCAGGTTCCTATGGCTCGATGAATTTTG<br>GTCTCGTCTCAAACTGGACCAACCTCAGCACAGCCAGCCAAAACACAATGAACCTTGGCACG<br>GTAGCGCCAACTCTCTTCTATTTCTCTCCCAAGAAGATCTGGGTTCTTGCATACGAATGGGC<br>TGCTACTCCATTTGCCTATGTCACGTCGACCGATCCTACCAATGCCAATGGTTGGTCAGCTT<br>CGCAACCGCTCTTCAGCGGAAGCATATCTCCCTCTAGCCCTATCGACCCAGCACTCATCAGC<br>GATGGCACGAATATGTACCTTTTCTTTGCAGGAGATAATGGCAAAATCTACCGGTCCAGTAT<br>GCCCATTGGCCAGTTCCCATCCAGCTTCGGCACATCGTACACAACGATCATGAGCGCCGCAA<br>CCAACGATCTGTTTGAAGCGATACAGGTGTACACTGTCTCAGGCCAGAATCAATATCTTATG<br>ATTGTTGAGTGTATCGGATCTGTTGGACGGTATTTCCGCTCATTTACGGCCACATCCCTGAG<br>CGGTACATGGACGCCGCAAGCTGCAACCGAGAGCAATCCCTTTGCAGGCCATGCTAACAGCG<br>GAGCTACTTGGACTAACGATATCAGCTCTGGAGATCTTATTCGCAGCACAAACGATGAGACG<br>ATGACCATTGATCCCTGCAACCTCCAGCTGCTGTACCAAGGAATGGCCGTTGGTTCCACCGG<br>AGACTATAACTCCCTGCCATGGCGACCCGCCGTCTTGACTCTAACCAACCCCGGCTCGAGCA<br>CAGGCAACGGCAACGGCACTGGAAGCGGCGGCTCAGGCGGCAGCGGATCTGGACAAGCATCG<br>CAGTATGCTCAGTGCGGCGGTTTGGGCTATACTGGACCCACGGTTTGCCAGGCACGTAATGC<br>TGTTCCAAGTTTCTTGATAATGAAATTGCTAACACGAGATCAGAGCCCGTACAAATGCACGT<br>TTGTCAACGAATACTACTCCCAGTGTCTATAG |
| 80 | MIC-54347 | ATGCTCTACACTGCTGCTCTGGCCGGCCTTATGGCCACTGCTGCCCTTGCTGCCCCCTACCG<br>CCGACAGGCTACTGGCCAAAACGTTGTATACTGGGGCCAAAACGGCGGCGGCGTTACTGAAA<br>GTAACAATTTGTCTGATTATTGCGATGCTGAAGCAGGCATCGATCTACTTGTTCTTAGTTTC<br>CTCTACGAGTATGGTTAGTTTCACCCCGTTGTGCCTTTGCAAATTGCAATCTTGTGTACTAC<br>TCTTACTAACCATTTTGTAGGCAATGGAAATACTATTCCTTCAGGCACTATCGGCCAGAGCT<br>GCTCCATTGATACCTCCGGAAACCCTTCAAACTGTGATGCCCTTGCCTCGGCCATTGCTACC<br>TGCAAGTCCAATGGAGTCAAGGTTGTCTTGTCTCTCGGCGGCGCCGTTGGAGCCTACTCTCT<br>CTCCTCTCAGCAGGAGGCCGAGACAATTGGCCAAAACCTCTGGGACGCATACGGTGCCGGCA<br>ATGGAACCGTCCCCAGACCGTTCAGAAGCACCGTTGTCGATGGCTGGGACTTTGATATCGAA<br>GCCAGTAGTGGCAACCAGTATTATCAATACTTGATTGCCAAGCTTCGCTCAAATTTCAACGG<br>CGGCAACTACGTGATTACCGGTGCTCCTCAGTGCCCTATTCCGGAGCCTAACATGCAGCAAA<br>TCATTACCACTTCTCAGTTTGACTATCTTTGGGTCCAGTTCTACAACAATCCCTCGTGCTCA<br>GTTGGAACGTCGACACCAAACTTCCAAGATTGGGTTTCCAACATTGCCAACACTCCTTCTGC<br>CAATGCCAAGATCTTCCTTGGTGTGCCTGCAAGCCCGCTCGGCGCTACTGGAACTGAATCTG<br>GCGCCCAATATTACCTCGAGCCTTCTGCTCTCAACACTCTCGTCGGCCAGTTCTCATCCAAC<br>CCTGCGTTTGGCGGTATCATGATGTGGGCTGCCGGTTTCTCCGATGCCAACGTGAACAATGG<br>ATGCACTTATGCTCAAGAGGCTAAGAAGATCCTTACTTCTGGTCAAATCTGCTAA |

TABLE 3-continued

Exemplary sequences of endophytes of the present invention

| SEQ ID | MIC ID | Sequence |
|---|---|---|
| 81 | MIC-54347 | ATGCTTTCCCACGCTATCCTTGCTGGCCTCGGCCTTGCTGGTCTCGCTGCCGCTGCGCCTAC<br>CAGGACGATTGCGACTCGTCAAGCTTCCGGTTATCAGAACGCTGTCTACTGGGGTGCCACTG<br>GCAAACAGAACCCTAACCTCGCTGAATACTGCACGTCCACCTCGGGCATTGATATCCTGATC<br>CTGTCCTTCTTGGACGTCTACGGTGCCACTGGCAACTTCCCCTCTGGCAACTTTGGCAACGA<br>CTGCTTCGTCGGCACCACGGGTGTTCCCCAGTCATGCTCTGACCTGGCCTCCCAGATCAAGA<br>CCTGCCAGAACGCTGGTGTCAAGATTATTGTTTCTCTCGGTGGTGCCGCCGGTTCATACTCT<br>GTCACGTCCCAGCAGCAGGCCCAGACCATCGGTCAATACCTCTGGGATGCCTACGGTAACTC<br>TGGCAGCACCTCTGTCCAGCGTCCCTTTGGCGATGTCTTTGTTAACGGTTGGGACTTTGACA<br>TCGAGGCCAACGGCGGCTTCAGCCAGTACTACCAGTACATGATTGGCACCCTGCGCTCCAAC<br>TTCGCCAAGGACTCCGCCAACACGTACTACATCACCGGTGCTCCCCAGTGCCCCCTGCCCGA<br>GGAGAACATGGGCGATATGATCCAGCACTCCGTCTTCGACTACCTCTTCATCCAGTTCTACA<br>ACAACAACCCCACCTGCTCTCTTGGTCTGTCTGGCCAGGCTCCCCTCAACTACGACGACTGG<br>ACCAACTTTGTCTCCACCACCCAGTCCAAGAACGCGAAGCTCTTCCTCGGTGCCCCTGCCGG<br>ACCTCTCGCCTCCAACGGAAACCCAAACGGTGCCGTCTACTACGCTACCCCCTCGGATCTGG<br>CCCCCATCGTCAACAAGGCCAAGACGAAGTCAAACTTTGGCGGTGTCATGCTCTGGGACGCT<br>GGTTACTCTGATGAGAACTCCAGCGGCGGTTGCAACTACGCCCAGCAGGTCAAGAGCATCCT<br>CACCACCGGCGCCCCTTGCAACGGCACCCCCGTCAGCGGTGGTGGCTCTCCTCCCGCTACTT<br>CTTCCACTGCTTCTTCTCCTCCCGCTACTTCTTCCACTGCTTCTTCTCCTCCTGCTACTTCT<br>TCCCTTCCTGCCGATGGAAGCACCGGAAGCACCGGTAACAGCGGCGTTGGCAGCGTTGCCCA<br>GTGGGGACAGGTAAGATAATTTTCTTCCTATTAGTTATAGAAAGACATTTTTGCTAACAGTT<br>GTTTGATAATAGTGCGGCGGTATTGGTTACACTGGTCCTACCCAGTGCCAGTCCCCATTCAA<br>GTGCGTTAACGAGGGCCCGTATTGGTCTTCTTGCCAATAA |
| 82 | MIC-54347 | ATGGCCGGTTCACTTACAGCAGACGCTCACGAAGCTGTTCGGTGCATCATGTATCTCACAGG<br>GTGAGCTTCTTTTTGGCCCGGCTTCTACTTGGCTTACAGAATATCTAACGCTTTCGTAGGCA<br>ACATGTGGTAGTCCCTTCAGACCATGATCTCGTGGGTTCCATAACACATGTGATACTGGCAT<br>TCATGCGCTCTGATGTCTTCAATGTGGATAAAACGCCTGCCGAGTTCCCGTTTTTACAACC<br>GTTGCTGAAACACGGCAGAAGTTCAATGCGAATACTAAAATCATGGTCGCAATTGGGGGTTG<br>GGGGGATTCTGCAGGATTTGAAGAAGCTGCGCGTGACGATTCGTCGAGAAAGCGGTGGGCTA<br>ACCAAGTAAAGGCCATGGTTGACCTGACAGGAGCTGATGGCATTGACATTGACTGGGAATAT<br>CCGGGGTAAGTTGATGGTGAATCGCAGTACCCACCGCAGAGCAGTTTTCATCTAACATTATT<br>TCCAGGGGAAATCGTGACGACTATAAACTTATTCCGAATTCTCAGCGGGAATGGGAGATAGA<br>GGCATTCGTGCTTCTTCTTCGAGAACTTCGTTTGGTTTTGGGAGAAGAAAAACTACTCACAA<br>TTGCGGTGCCAGCGCTAGAACGCGATTTGATGGCTTTCACAAACTCAACTATTCCGTCCATC<br>GTGAATCAGGTTGACTTCATTAGTGTAATGACTTACGATATGATGAATCGACGTGATACCAT<br>TGTCAAGCACCATAGTGGTGTGGCCGACTCTCAGGAAGCAATGGAGCGATATATAGATCGTG<br>GGGCCCCTCCGCACAAATTGAACTTCGGACTTGGTTACTATGCCAAATGGTTCATGACCGAG<br>CAATGCGATTTACAGCACCCATTGGGGTGCCGCACTCAACTGCTAGAAGACCCCGCCAATGG<br>AGCCGACCTTGGCAAGACTGCAGCTTTTAGCTGGCATGACGAGGTTCCCGTGGAATTGGCTA<br>ATTCTTTCGAGAAAGCTCATACTCATGGCCGCTACTATGAAGATGGAAGCTACGGGTATTGG<br>GATGATGAAGAGAAGAGATGGTGGTCCTACGACACGCCTCTCGCCATCAAAACTAAAGTCCC<br>TCGGTTTCTCGGCGAACTGCAATTGGGCGGTGTGTTTGCCTGGGGGCTGGGGGAGGATGCTC<br>CGCAGTTTATTCACTTGAAGGCCACTACTGATGGGATTCGGGCTTTGCGCGGAGGCCAGAGC<br>TCACGGGATTCGGTGAAAGATGAACTGTAA |
| 83 | MIC-54347 | ATGGCGCCTTTCAATACTATGCTTGGGTATCTCCTGTTAGTGGTAGCCCCTTTGGCGGCTGC<br>CCTGCCGTTCCGTGGCCATGGCCCCAACACCCATAACCACATCAACTTGAACTTCAACCTCA<br>CCGAAACCATCAACGAGATCAATGAAAACTTGGCTGGCCTAGTTGGATACATCACCAACCCT<br>CACGCCAAGCACATCGTCGCCAACCGCTACATTGTCGTCTACAACAACACCTTCGGCTCCGA<br>GGCCATCGCCGCCAAGCAGGCCGAGTTCGCTGCCACCATCCAGAAGCGCAACCTTGGAAAGC<br>GAAGCCTCGGCGGCAACATGCTGTCCACTGAAATCCACTCCTTCCAGATGCACACCTGGCGC<br>GCCATGGCTCTCGACGCTGACGATGAGATGATCAAGTCCATTTTCGCCGCGAAGGAGGTCGC<br>CTATATCGAGGCTGATACCGTCGTCCAGACCAAGGCTCTCGTTGCCCAGACCAACGCTACCC<br>CCGGCCTCATCCGTCTCTCTAACCAAAACATTGGTGGCAAGAACTACATCTTTGACAACTCT<br>GCCGGCGCTGGTATCACTGCCTACGTTGTCGACACTGGTATTAGAATCACCCACACTGAGTT<br>TGAGGGCCGTGCTTCTTTCGGTGCCAACTTTGTCAACTCCAACGTATGTAACATGCCCTCCT<br>CATACGCCCAAACTGGTGAATGAAGTTTGCCCATCATGAACAAAAAGCTAACAATAGCGCTT<br>AGAACACTGATGAGAACGGCCACGGCAGCCACGTTTCTGGTACCATTGGTGGTGCTACCTTC<br>GGCGTTGCCAAGAACATCAAGCTCGTTGCCGTCAAGGTCCTTGATGCCTCTGGTGCCGGTAG<br>CAACTCTGGCGTTCTGAACGGCATGCAGTTCGTCGTCAACGACGTCCAGGCCAAGGGCCTCT<br>CCGGCAAGGCTGTCATGAACATGTCTCTCGGTGGCTCCCTGTCCGCTGCTGTCAACAACGCT<br>ATTGCTGCCATTGCCAACGCTGGTGTCGTCCCTGTTGTTGCTGCTGGTAACGAGAACGTACG<br>TTTATATCCTTCCCACTCGTCTCCTCTGAAAAAAACGTTGTTTTTAACTCGCATTATAGCAA<br>GATACTGCCAACACCTCTCCCGGCTCTGCCCCTCAGGCCATCACCGTCGGTGCTATCGATGC<br>CACCACCGATATCCGTGCTAGCTTCTCCAACTTTGGCGCTGATGTCGATATCTACGCCCCCG<br>GTGTCAATGTTCTCAGCGTTGGCATCAAGTCTGATACCGATACTGCCGTTCTCAGCGGCACC<br>AGCATGGGTAAGAACCCAAACCCTTACATAAAAAAACCTTTGTATCCTAAACTAATCCGCGT<br>TCTTCATATAGCCACTCCTCACGTTGCCGGTCTCACTGGCTACCTGATGGCTCTCAAGGGTG<br>TTACCAACGTCAACGATGTCACCAACCTCATCAAGAACCTCGCCACTGCTTCCGGCGCCTCG<br>GTCCAGCAGAACGTTGCCGGAACCACCAACCTCATCGCCAACAACGGTGAACTGTAA |
| 84 | MIC-54347 | ATGGGCTATAGCCGCAAAGATAAATCGAGGTACATCAACACAATTCAAGAAGCACTTGACAT<br>CTCTACAGCTTTCGTTGCCAGCAGCCGAAAAAGAATAGCTTTAACTTGGAAGATTATCATTC<br>AAATTCAATCCAAGTAAGAATTACAATCTGAAGTATTACTAGGATTACATTTAAACAGTCTA<br>TCTAGAATGCAATTCTTCGCTCTCCTCCCTCTGTTATACACCACCGCTGCAGCCCTTGGCAT |

TABLE 3-continued

Exemplary sequences of endophytes of the present invention

| SEQ ID | MIC ID | Sequence |
|---|---|---|
| | | CAATTGTCGTGGGAACAGCAACTGCGTCGGTACTCCAGAATGCAGACTCGCCGATCTGATCT<br>TGCAAGTCAGCCAGCAAGATCCCAGCACATCATACAGCCCTGGTCAGCACATTGCTTGTTGC<br>GGCATACCTGGCGGCAATATCTGTGCATTCACTCAGGGCATTAGCAATTCGATTACAGCTGG<br>AGAAGCCCTGGGTATGCTGCAGGGGCTATCCGCCCACGGTTGTGGCCAATGCGGCAGTATTC<br>CCTTCAAGGATAACAATGTCGCTGAGGGACAATTGACAGTCAACTGGACCGATCACTAA |
| 85 | MIC-54347 | ATGGTTCAATCTGCGGCTTATCTAGGAGCCTTGCTGGCCACCCTGCCCTTGGCACGTGCCGG<br>TTTCAACGCTAGCTCGACGCAAAACATTGCCGTGTACTGGGGTGAGCTGAACATATTCTTGC<br>TGAATATGAGCTTCCAATTAATACATTGCGTTCAGGTCAAAACTCGGCAAATCAAGCAACCT<br>CTCAGCAGCGATTGTCTACTTACTGTGCCAGTAAGTTCAAGATCGTCCTAGAACAATTCATG<br>ACAGCTAACGATTATTTCTAGATGCTGATATAGATGTGGGCATTACCAAAAACCTTGGATGT<br>CACTCTGTAGCCTGGCTGACCTCTCACAGATCATCCCAATTGGGTTCATGAACGGCATCAGC<br>CCGGTCATTACCAACTTTGCCAATGCAGGCGACAATTGCACGGCTTTTGCAGATAATCAGAA<br>TGCACTTAATTGTCCCCAAATCGAGTAAGTTGCCCCCAGACTCTCAGTGAATTTCGCCAGTA<br>TACGATGCTTAGATATCCTTTAGGCAAGACATCATTACATGCCAGCAAACATATGGCAAGAC<br>AATCCTGATTTCGCTGGGGGGCGGATCTTATACCCAGGGCGGCTTCTCGTCCACTGGTGTCG<br>CCACATCAGCGGCTCAGACGGTTTGGAACATGTTTGGCCCTGTCAATCCAAACAGCAACGTA<br>GACCGTCCATTTGGTTCCGCAGTGGTTGATGGCGTTGACTTTGACTTTGAATCTGGCGTCAA<br>TAACTTGGCCACTTTTGCCACTGAGCTGCGGAGCTTGATGGACGCTTCTGCGTCTTCTGCGA<br>ACAGGAAGTTCTACCTGTCTGCTGCGCCGCAATGCGTCTATCCCGATTTCGCTGACAACCCG<br>GCCCTGAATGGTTCGGTTTTCTTCGATTTCATTATGATTCAATATTACAATAATGGATGCGG<br>AGTCAGCAGCTATGTCCCTGGAGCAACTACCCAGTGGAACTACAACTTTGATGTCTGGGACA<br>ACTGGGCGCATACCGTCAGCAAGAACCCTAACGTGAGGATTCTGCTTGGTATCGCCGCCAAC<br>ACTGGTGCTGCCAGTGGATACGTGTCCGGAACACAGCTTTCTGCGGTCATCTCATTTACCAA<br>GCAATACTCAAGCTTTGCGGGTATCATGATGTGGGATATGTCCCAATTGTATCAGAATTCCG<br>GCTTCTTGGGCCAGGTTGTCAGTGATCTCGCCGCCTCTGGTTCAACCCCCCCGGCTACTACT<br>TCTAGTGGAGCTTCCAAGACTACCACTTCTAGTGGCGGTTCTACAAGCCCAACTGGCGGCAG<br>TGTGCCGCAATGGGGTCAATGTGGAGGCGAAGGATACACTGGCCCTACGCAATGCCAGTCGC<br>CTTACAAGTGCGTTTTTAGCAGTCAGTGGTGGTCATCTTGCCAGTAA |
| 86 | MIC-54347 | ATGTTACTGAAACAGATTCTCGTTGCCACGTTGCTTTCCTTGAGCTCTGTCAAGGCTTTCCC<br>TAACCCGAATCACGCCCAAGATCTCGAGGCCAGGGAAGCTGAAGATAATCTCGTTGCTCGCG<br>GCGGTCACGACTGCGGCTCTTACGCTACCTGGAACTACGGAAAGAACTGCTGTGTCTGCAAA<br>GATAACGGCAAGAACTACGATTCTAAGTCCAAGACATGCAGTTGTCCACACGGGCAAGTCTG<br>GAATGGCAAGCAATGCGTTGTGGACTGTGGCAAAGATGCGACTTATGATTGGAAGCAAAAGA<br>AATGCGTCTGCAAGAAACAAGGCGAGGTCTATAACTCTAATACGAAGACTTGCAGCTGCCCG<br>CCTGGAACTGTTTGGAACGGCTACGGATGTGTTGTCGACTGTGGCAAGGAAGCGCACTTTGA<br>TAAATGGCAGAAGAAGTGCGTCTGCAATAACAACGGCGAAGTCTATGATTCCAAGAGCAAAA<br>CCTGCAGTTGCCCTGGTGGCCAATACTGGAACGGCAAGAAATGCGTATGCCCTTATGGCAAG<br>GTCTGGAACGGCAAGCAGTGCATAGAGGACTGTGGTAAAGACGCACACTTCGACTATAACCA<br>AAAGAAGTGCGTATGCAACAAGAATGGACAGGTCTACAACTCCAACAGCAAGACCTGCAAAT<br>GTCCAGGTGGCCAGTATTGGGACGGCAAGCATTGTGTCTGCCCATATGGTCAAGTCTTTAAT<br>GGCAAGCAGTGTGTTCCTGATTGCGGTAAAGAAGCCCACTTTGATTATAAGCAAAAGAAGTG<br>CGTATGCAACAACTACGGCGAAATCTACAATTCCAAGAGCAAGACTTGCGCCTGTCCTGACG<br>GCCAGTATTGGAATGGAAAGCAATGCGTTTGCCCTTACGGCAAGATCTGGAATGGCAAACAG<br>TGTGTTCCTGATTGCGGTAAAGACGCCCACTTTGACTACAACCAAAAGAAGTGTGTTTGCAA<br>CAAGAATGGAGAGATCTATGACTCTAAGAGCAAGACTTGCGCCTGTCCTGACGGCCAGTATT<br>GGAATGGAAAACAGTGTGCCTGCCCGTACGGCAAGATTTGGAATGGCAAACAGTGTGTTCCT<br>GATTGCGGCAAAGAAGCCCACTTCGATTACAACCAGAAGCAGTGCGTTTGCAACAATAAGGG<br>AGAGATCTATGATTCTAAGAGCAAGACTTGCGCCTGTCCTGACGGCCAATACTGGAATGGAA<br>AGCAGTGTGCCTGCCCGTACGGCAAGATCTGGAACGGCAAGCAGTGTGTAGAAGATTGCGGC<br>AAAGAAGCACACTTCGATTACAACCAGAAGCAATGTGTTTGCAATAACAAGGGAGAAATCTA<br>TGATTCTAAGAGCAAGACTTGCAAGTGCCCTGATGGCCAATACTGGGACGGAAAGCAGTGCG<br>CTTGTCCATACGGAAAGATCTGGAATGGTAAGCAGTGTGTAGAGGACTGTGGCAAGGACGCA<br>CACTTCGATTATAACCAGAAGCAGTGTGTTTGCAATAACAAGGGAGAGATTTACGATTCTAA<br>GAGCAAGACTTGCAAGTGCCCTGACGGCCAATACTGGGACGGAAAACAATGTGCTTGTCCCT<br>ACGGCCAAATTTGGGACGGAAAGCAATGCACACCAAACTGCGGCAAAGACGCTACCTATGAC<br>AGTAAGCAGAAGCAATGCGTGTGCAACAAGAAGGGCCAAGTCTTTGATTCCAAGCACTTGAC<br>ATGCAGCTGCCCGGCTGGAACGAGTTGGAACGGCTATGCTTGTGTCCCAGATTGTGGCAAGG<br>ATGCGCACTACGATACCAATCAGAAGTGCTGCGTGTGCAATAACAAGGGCCAGATATTTAAT<br>TCTGGAAGCAAGACATGCAGCTGCCCAGGCAACCAATACTGGGACGGCAATAAATGCACATG<br>CCCCTATGGATCGACATGGGACAGCAGTAAGAAGACGTGCAAGCAGACACCCATACATTAA |
| 87 | MIC-54347 | ATGTTGGGCTTCCTCGGAAAATCCGTGGCCTTGCTTGCTGCGCTGCAGGCCACCCTCACCTC<br>TGCATCTCCTCTGTCTACAAACGACGTCACAGTTGAGAAGAGAGCCAGCGGATATGCGAACG<br>CTGTCTACTTCACTAACTGGTGAGTGAAGCTAATTTGTGATTATGAATTTTAGTGCTAACTA<br>TTGGTGATTAAAGGGGTATCTACGGCCGCAACTTTCAACCCCAGGACCTGGTTGCGTCGGAC<br>ATCACTCATGTCATCTACTCGTTCATGAACTTCCAAGCAGACGGCACTGTGTAAGTTTTGTA<br>ACCAAGAGATGGTGTATCCTAAATATCTATTTTCAGTTGCTGATCGTTTCCTCTATAGCGTC<br>TCTGGAGATGCTTACGCCGATTACCAGAAGCACTATTCCGATGATTGTACGATAACCCCCCC<br>TTTAAGTGCTCTTAATTCTAAGCTTTGCAAATATACTAACATCTATCTCAGCTTGGAATGAT<br>GTCGGCAACAACGCGTACGGTTGTGTCAAGCAACTGTTCAAGTTGAAGAAGGCCAACCGCAA<br>CTTGAAGGTTATGCTTTCTATAGGTGGCTGGACCTGGTCCACCAACTTCCCTTCTGCCGCAA<br>GCACCGATGCCAACCGCAAGAACTTTGCCAAGACAGCCATTACTTTCATGAAGGACTGGGGT<br>TTTGATGGTATTGACGTCGACTGGGAGTATCCTGCCGATAACACCCAGGCCACCAACATGGT |

TABLE 3-continued

Exemplary sequences of endophytes of the present invention

| SEQ ID | MIC ID | Sequence |
|---|---|---|
| | | TCTTCTGCTTAAGGAGATCCGATCTCAGCTAGATGCTTATGCGGCCCAATACGCTCCAGGATACCACTTCCTTCTCTCCATCGCTGCCCCCGCTGGCCCAGAGCACTACTCTGCCCTGCACCTGGCCGACCTTGGTCAAGTTCTCGACTATATCAACCTTATGGCTTATGACTATGCTGGTTCTTGGAGCAGCTTCTCCGGACATGATGCCAACTTGTTTGCCAACCCCTCCAACCCCAACTCTTCACCATACAACACCGATCAGGCTATCAAGGCTTATATCAACGGAGGTGTTCCTGCACGCAAGATCGTTCTTGGCATGCCCATCTATGGACGATCTTTCGAGAGCACCGGTGGAATTGGCCAGTCTTACAGCGGAATTGGATCTGGAAGCTGGGAGAACGGTATCTGGGACTACAAGGTTCTTCCCAAGGCCGGTGCTACAGTCCAGTACGACTCTGTCGCACAGGCATACTACAGCTATGACCCTAGCTCCAAGGAGCTCATCTCCTTCGATACCCCTAGCATGATCAACACCAAGGTCTCTTACCTCAAGAACCTCGGCCTGGGAGGCAGTATGTTCTGGGAGGCTTCTGCTGACAAGACTGGCTCCGACTCCTTGATCGGAACAAGCCACAGAGCGCTTGGAAGCCTGGACTCAACTCAGAACTTGCTGAGCTACCCCAACTCCCAGTACGATAACATCCGAAGCGGTCTTAACTAA |
| 88 | MIC-54347 | ATGTTTTTCAGCAAAGCACTGGCTGCTACCGGCCTTTTGGCCACTGCTGCTCTCGCTGCACCCACCGTGGAGAAGCGTGCCGCTGGAGGCAAGCTCGTCATCTACTGGGGTGCTGAAGACGACAGCACTACTCTCGCCAACGTCTGTGCCGATTCCTCTTACGACATTGTCAACTTGGCTTTCCTTGACAAGTTCTCTGCTGGTGGTGGCTACCCCTCGCTCTCTCTGAGCACCCTGGGCGGCCCATCTGCCGCTCAGAAGGCTGCTGGTGCCACCAACCTCCAGGATGGTTCTTCTTTGGTTCCCGCCATCAAGGCCTGCCAGGCCGCCGGCAAGCTGGTCATCCTCTCTATGGGTGGTGCTACCGACTTCTCTGCAGTCTCCCTTTCGGGCGATGCTCAGGGACAGTCTGTTGCCGACATGGTTTGGAACCTGTTCTTGGGTGGTACTGCCAACCCCACTCTCCGTCCTTTCGGATCAGTCAAGCTCGACGGTGTTGATCTCGGTGAGTAAAAGTCATTCCTAACATGATCTATGAATTCTACCTTTACTGACATCTCATCCTGCAATATAGACAACGAGACTGGCAACCCCACTGGTTACCTGGCCATGACTCAACGCTTCCGATCCAACTTTGCCAAGGACACCAGCAAGAGGTACTACCTCACTGCTGCTCCCCAGTGCCCCTTCCCCGATGCCTCTGAGCCTCTCAACGTCTGCCAGCTCCTTGATTACGTCTGGGTCCAGTTCTACAACAACGGCAACTGCAACGTTGGCCAGTCCGGCTTCAACACTGCTGTCAAGAACTGGAGCAAGAACATTGGTAACGCTACTCTGTTCATTGGTGCGCTGGCCAGCGGTGCCGATGGTGACCAGGGCTACATCTCTCCCAGCGCTCTGATCTCTGCTTACAACGGTGTCTCTGCTCTTAACCTGCCCAACGTTGGCGGTATCATGCTTTGGGAGGCTCAGCTCGCTGTCAAGAACAGCAACTTCCAGAAGACCATCAAGGCTGCCATCGGCTCCGGCTCCACTCCTCCTCCTCCTCCTCCCGCCTCTTCCACCACTCCTGCCGGAAGCACCCCCACCTGCTCTTGGGCCGGCCACTGCGCTGGCGCTACTTGCAGCACTGACAATGACTGCTCCGACTCCCTCACCTGCAACAGCGGCAAGTGCGGTACCGCTGGCAGCACTGCTCCTCCTCCTACCACTTGCTCTTGGGCGGGCCACTGCCTCGGCGCTTCTTGCGGTAACGACAACGACTGCTCTGACCCTTACTTCTGCTCCAACGGCGTCTGCTCTCAGTAA |
| 89 | MIC-54347 | ATGTTTTTCCGCAACGCCGTCGCCGTAACCAGCCTTTTGGCTGCACTTTCTAGTGCCCAACCCTCCGGCCCCGAATTGGCCGTGTACTGGGGTGCTGAAGATGATAGCACGACTCTCAGCGACGTGTGTTCAGACAACTCTTATGGCATTGTGAATCTTGCCTTCCTCGACACATTTTTTGCTGCAGGAGGCTTTCCTCAACTCAGCGTCAGCGGGTTAGATGGCCCATCCCAAGCTCAGCAAAGCGCTGGTGCCACTGGCCTCAAGGATGGTAGCAGTCTTGTAGACGCTATTAAGCAGTGCCAGTCGGCCGGGAAGCTGGTCCTTCTCAGCCTTGGTGGCGCTGGCGCCGATGTCACTCTTCAATCAGACTCTGATGGAGAGAAAATTGCTGATACACTCTGGAATCTGTTCGGTGGTGGCACTGATAACCAAGAGCTGCGTCCCTTTGGAGATGTCAAGCTCGATGGCTTCGACTTGGGTGAGTAACATTAATGAATTAACACGATCAATGTGGCTAACTCTATGCAGACAATGAATCTGGCAACCCCACAGGTTACCTAGCTATGGTAAAGCGTTTCAAGTCCAACTTCCAGTCGGACACGAGCAAAACTTATTTCCTTACTGCGGCTCCTCAATGCCCATTCCCCGATGCTTCGCAGCCTCAAGATGTTTGCAGTGAATTGGACTTTGTCTGGGTCCAGTTTTACAACAACGGCGATTGCAACATTGCGCAATCTGATTTCTTAAACTCCGTCCAGACTTGGAGCAGCGGCATTGGCAACGCTAAGCTCTACATCGGTGCTTTGGCTAGTGGTGCTGACGGCGATCAGGGCTTTGCTGATGCTGATACGCTATTGGGTGCTATTCAGGATGTCAAGAATATGAACCTTCCCAATTATGGAGGTGCCATGCTTTGGGAAGCCCAACTGGCTGTTAAAAACGGCAACTTTCAGCAGAAGATTGCCCCCGGTCTATAA |
| 90 | MIC-54347 | CATCGAGAAGTTCGAGAAGGTAAGCTCATTTCGCTGCTTTTTTCATTCCTTTTGGGCACAATTGTGCCAGACAATTCTGTTCTCAGTCTTGTCACCATTTTTGCCCACCAAGCATCGCACCCCGCTTTGTCTACCTACCCCTCCTTTGGCACAGCAAAATTTTTCTGGCTGCCTGGGTTGGTTTTTAGTGGGGTGCCAAATTTTTGGCAGTGACCCCGCCATCGCCACTGTTCCTCATCTCATGCATTACCCAACATAATCTTCAGTCAATTGCTTGGTTCATTGTGCTAATCATACTTTAATCAATAGGAAGCCGCCGAACTCGGCAAGGGTTCCTTCAAGTATGCGTGGGTTCTTGACAAGCTCAAGGCCGAGCGTGAGCGTGGTATCACCATCGACATTGCCCTGTGGAAGTTCGAGACTCCCAAGTACTATGTCACCGTCATTGGTATGTTTTCAGTCCGACTGGTCACTATCCCATCATCATCATGCTAACGTGCGACTCTACAGACGCTCCCGGTCACCGTGATTTCATCAAGAACATGATCACTGGTACCTCCCAGGCCGATTGCGCTATCCTCATTATCGCTGCCGGTACTGGTGAGTTCGAGGCTGGTATCTCCAAGGATGGCCAGACTCGTGAGCACGCTCTGCTCGCCTACACCCTGGGTGTCAAGCAGCTCATTGTTGCCATCAACAAGATGGACACTGCCAACTGGGCCGAGGCTCGTTACCTTGAGATCATCAAGGAGACCTCCAACTTCATCAAGAAGGTCGGCTTCAACCCCAAGACCGTTGCCTTTGTCCCCATCTCTGGCTTCAACGGTGACAACATGCTCCAGGCCTCCACCAACTGCCCCTGGTACAAGGGTTGGGAGAAGGAGACCAAGGCTGGCAAGTCCACCGGTAAGACCCTCCTCGAGGCCATTGACGCCATCGAGCCCCCCAAGCGTCCCACAGACAAGCCCCTCCGTCTGCCCCTTCAGGATGTCTACAAGATCGGTGGTATCGGAACAGTCCCTGTCGGCCGTATCGAGACTGGTGTCCTCAAGCCCGGTATGGTCGTTACCTTCGCTCCTTCCAACGTCACCACTGAAGTCAAGTCCGTCGAGATGCACCACGAGCAGCTCGTTGAGGGTGTCCCCGGTGACAACGTTGGATTCAACGTCAAGAACGTCTCCGTCAAGGATATCCGCCGTGGTAACGTTGCCGGTGACTCCAAGAACGACCCCCCCATGGGTGCCGCTTCTTTCAACGCCCAGGTCATCGTCATGAACCACCCTGGCCAGGTCGGTGCCGGATACGCTCC |

TABLE 3-continued

Exemplary sequences of endophytes of the present invention

| SEQ ID | MIC ID | Sequence |
|---|---|---|
| 91 | MIC-54347 | CCGAGGAGCACCCCGTCCTGCTCACCGAGGCCCCCATCAACCCCAAGTCCAACCGTGAGAAGATGACCCAGATCGTCTTCGAGACCTTCAACGCTCCCGCTTTCTACGTCTCTATCCAGGCCGTTCTGTCCCTGTACGCCTCTGGTCGTACCACCGGTATCGTTCTCGACTCCGGTGATGGTGTTACCCACGTTGTCCCCATCTACGAGGGTTTCGCTCTTCCTCACGCCATTGCTCGTGTTGACATGGCTGGTCGTGATCTTACCGACTACCTGATGAAGATCCTGGCTGAGCGTGGTTACACTTTCTCCACCACCGCCGAGCGAGAAATTGTTCGTGACATCAAGGAGAAGCTCTGCTACGTCGCTCTCGACTTCGAGCAGGAGATCCAGACCGCTGCTCAGAGCTCCAGCCTGGAGAAGTCATACGAGCTTCCCGACGGTCAGGTCATCACCATCGGCAACGAGCGATTCCGTGCTCCTGAGGCTCTGTTCCAGCCTTCTGTCCTTGGTCTTGAGAGCGGTGGTATCCACGTCACCACTTTCAACTCCATCATGAAGTGCGATGTTGACGTCCGAAAGGACCTGTACGGCAACATTGTCATGGTAAGTGAATTTCCGCATTCAACAATTGATTTTTATAGCGGCGCTAATGTATTTCTCAATCTAGTCTGGTGGTACCACCATGTACCCCGGTCTCTCCGACCG |
| 92 | MIC-54347 | TCTCTCTTTGTGAGTCTCTAGACAGTCTTTTGCGACAAATCTGCTGGCGATTTGGGTACTAATCTGCTGGCTACAGGACAAGGACGGCGATGGTACGTAGTACCTAGTGACGCGATACTCCTCTTTTCCCCTCCTCCTCACCGTCCCCCTATTTTGTGCGAGCTATCACTAGAGCGCCTGAACCTGCGATACCGATCGAAATATCCCCGGCTGGCAATTTTTATGACGAATAAACGGACAAGAAACTAACAGACTTGACTTGGCAGGCCAGATCACCACCAAGGAGCTGGGCACTGTCATGCGCTCTTTGGGCCAGAACCCCTCCGAGTCAGAGCTGCAGGACATGATCAACGAGGTTGATGCCGACAACAACGGATCCATCGATTTCCCTGGTATGTCAATAGCAGAAACACATAGACAGCTGCCGGATACAGGCTAATCTAGAGCGGTGAAGAGTTCCTTACCATGA |
| 93 | MIC-54347 | TGGCCAAGCTGTTCCGTGGTATCATGCGCAGGATGAATACCGAGTTGGCCAACTACCTGAGACGATGTGTTGAGGGCAACCGCCACTTCAACCTTGCTGTTGGCATCAAGCCCGGCACACTCTCCAACGGATTGAAGTATTCACTTGCTACCGGAAACTGGGGTGACCAGAAGAAGGCAATGAGCTCGACTGCAGGTGTATCACAGGTGCTTAACCGTTACACTTTTGCCTCGACACTTTCTCATTTGCGTCGTACCAACACACCCATTGGAAGAGATGGTAAGCTGGCGAAGCCTCGACAGCTTCACAACACACATTGGGGTTTGGTGTGCCCAGCCGAGACCCCTGAAGGACAAGCTTGTGGTCTGGTCAAAAACTTGTCTCTGATGTGCTACGTCAGTGTCGGATCTCCTTCTGAGCCTTTGATCGAGTTTATGATCAATAGGGGTATGGAGGTTGTTGAGGAGTACGAACCACTGAGGTATCCCCATGCTACAAAGATCTTTGTGAATGGTGTCTGGGTTGGAATCCACCAAGACCCCAAGCATCTGGTAAACCAAGTTTTGGACACTCGTCGTAAATCCTATCTGCAGTACGAAGTCTCTCTGATCAGAGATATTCGTGACCAAGAATTCAAAATCTTCTCTGACGCCGGTCGTGTTATGCGTCCTGTCTTTACTGTACAGCAAGAAGATGACCCGGAAACGGGTATCAACAAGGGCCACTTGGTATTGACCAAGGACCTCGTCAACAGACTTGCCAAAGAGCAGGCTGAGCCTCCAGAAGACCCAAGCATGAAGCTTGGATGGGAGGGGTTAATTAGGGCTGGTGCGGTGGAATATCTCGACGCCGAGGAAGAAGAAACGGCTATGATTTGCATGACACCGGAGGACCTTGAACTTTATCGTCTTCAGAAAGCTGGTATTTCCACGGATGAAGACATGGGAGACGATCCAAACAAGCGTCTCAAGACCAAGACAAATCCGACAACTCACATGTACACGCATTGCGAGATTCACCCAAGTATGATCTTAGGTATCTGTGCTAGTATCATTCCTTTCCCCGATCA |
| 94 | MIC-54347 | MAGSLTADAHEAVRCIMYLTGQHVVVPSDHDLVGSITHVILAFMRSDVENVDKTPAEFPFFTTVAETRQKFNANTKIMVAIGGWGDSAGFEEAARDDSSRKRWANQVKAMVDLTGADGIDIDWEYPGGNRDDYKLIPNSQREWEIEAFVLLLRELRLVLGEEKLLTIAVPALERDLMAFTNSTIPSIVNQVDFISVMTYDMMNRRDTIVKHHSGVADSQEAMERYIDRGAPPHKLNFGLGYYAKWFMTEQCDLQHPLGCRTQLLEDPANGADLGKTAAFSWHDEVPVELANSFEKAHTHGRYYEDGSYGYWDDEEKRWWSYDTPLAIKTKVPRFLGELQLGGVFAWGLGEDAPQFIHLKATTDGIRALRGGQSSRDSVKDEL |
| 95 | MIC-54347 | MAPFNTMLGYLLLVVAPLAAALPFRGHGPNTHNHINLNFNLTETINEINENLAGLVGYITNPHAKHIVANRYIVVYNNTFGSEAIAAKQAEFAATIQKRNLGKRSLGGNMLSTEIHSFQMHTWRAMALDADDEMIKSIFAAKEVAYIEADTVVQTKALVAQTNATPGLIRLSNQNIGGKNYIFDNSAGAGITAYVVDTGIRITHTEFEGRASFGANFVNSNNTDENGHGSHVSGTIGGATFGVAKNIKLVAVKVLDASGAGSNSGVLNGMQFVVNDVQAKGLSGKAVMNMSLGGSLSAAVNNAIAAIANAGVVPVVAAGNENQDTANTSPGSAPQAITVGAIDATTDIRASFSNFGADVDIYAPGVNVLSVGIKSDTDTAVLSGTSMATPHVAGLTGYLMALKGVTNVNDVTNLIKNLATASGASVQQNVAGTTNLIANNGEL |
| 96 | MIC-54347 | MFFRNAVAVTSLLAALSSAQPSGPELAVYWGAEDDSTTLSDVCSDNSYGIVNLAFLDTFFAAGGFPQLSVSGLDGPSQAQQSAGATGLKDGSSLVDAIKQCQSAGKLVLLSLGGAGADVTLQSDSDGEKIADTLWNLFGGGTDNQELRPFGDVKLDGFDLDNESGNPTGYLAMVKRFKSNFQSDTSKTYFLTAAPQCPFPDASQPQDVCSELDFVWVQFYNNGDCNIAQSDELNSVQTWSSGIGNAKLYIGALASGADGDQGFADADTLLGAIQDVKNMNLPNYGGAMLWEAQLAVKNGNFQQKIAPGL |
| 97 | MIC-54347 | MFFSKALAATGLLATAALAAPTVEKRAAGGKLVIYWGAEDDSTTLANVCADSSYDIVNLAFLDKFSAGGGYPSLSLSTLGGPSAAQKAAGATNLQDGSSLVPAIKACQAAGKLVILSMGGATDFSAVSLSGDAQGQSVADMVWNLFLGGTANPTLRPFGSVKLDGVDLDNETGNPTGYLAMTQRFRSNFAKDTSKRYYLTAAPQCPFPDASEPLNVCQLLDYVWVQFYNNGNCNVGQSGFNTAVKNWSKNIGNATLFIGALASGADGDQGYISPSALISAYNGVSALNLPNVGGIMLWEAQLAVKNSNFQKTIKAAIGSGSTPPPPPPASSTTPAGSTPTCSWAGHCAGATCSTDNDCSDSLTCNSGKCGTAGSTAPPPTTCSWAGHCLGASCGNDNDCSDPYFCSNGVCSQ |

TABLE 3-continued

| SEQ ID | MIC ID | Sequence |
|---|---|---|
| 98 | MIC-54347 | MGSFKAIIAASLAALGQFAAAAPAEGQSKRAGISSIVKGTPVGFASSVTGGGTVAPVYPTTI AQLKSYLTSTSPQNIVISGTFNFAGTEGTTTLPACNAYPCTPSNGGQALLNTLGGCGSLSTY NVNLDTAAYNAINVQSDKTLVGINGATLNGKGLRLSGVSNVIIQNIAITNLNPQYVWGGDAI SLSNTNNVWIDHVKTSNLGRQHYSFGTGSNNAVTISNSFISGQTSYSASCDGHSYWGLELVG SGDQITFYKNYVYYTSGRTPALSGNTLFHAVNNVWSSNSGHAIEGTSNGMGLYEGNYFVNVP TIVASGFVGRLFSSQSSAVSQCAQYLGRNCVSNSLSNSGTFTNSDTSFLYLFQGKANIVSAA SASSIQSSVVSSAGNTL |
| 99 | MIC-54347 | MGYSRKDKSRYINTIQEALDISTAFVASSRKRIALTWKIIIQIQSNLSRMQFFALLPLLYTT AAALGINCRGNSNCVGTPECRLADLILQVSQQDPSTSYSPGQHIACCGIPGGNICAFTQGIS NSITAGEALGMLQGLSAHGCGQCGSIPFKDNNVAEGQLTVNWTDH |
| 100 | MIC-54347 | MHLHSLFTALALASPALAASIPRSSSSSSSSTITVWATPHDSYSSSVGVLGCKVDTNRIAYW PDSVDCTNICVSLSYQDRQVYLLRVDQSQGAHDISYDAWNYLVTGYPATEKPVAGGPMEMTT ENVDASKCADLIYTAGGKLPLSAANSMNFLASCLEQENSWVASNYVLYNILDAICTVGQNQV CSLNWPTANQPTCPGTLGLPDALKGEPVYNIEYPSGVKVLAGAPPTVPTGVPVPVPAPSTND DEKSAARSLRHSDSLVWIPVLSLTSIIYSWMLW |
| 101 | MIC-54347 | MHSTTFFASLGLAGLVAGAPSAPHNVKARQASGAQNVVYWGGTNNESDDLSTYCTPTAGIDI LVLSFLDIYGTTGNIPAGNIGNSCYIGTNGTPQLCDNLAASIASCQAAGIKIILSLGGAAGS YSLQSQSQAVAIGQYLWEAYGNSGSTSVQRPFGNVFVNGFDFDLELNAGNQYYQYLISTLRS NFASDPKHTYYITGAPQCPLPLSIPQIRKPNMGEIISASQFDYLWIQFYNNNAYAPDPCSLG LPGDAPFNYNNWTSFIATTPSKNAKLFIGVPANTLAANGNSGGAVYYASPSQLASIVANTKS SPDFGGIMMWDAGYSDANVNNGCNYAQEAKNILLTGAPCGGSPPPVSSSKPTSTATKSATST SSASGTGPTGGGTVPQWGQCGGEGYTGPTQCVSPYKCVESSQWWSSCQ |
| 102 | MIC-54347 | MKFFAATALLAATTIAGPLEVRTGDGNICPSGGLYGNPQCCSSLLLGLIGLDCNVPNQTP RDGADFRNICAKTGDEALCCVAPVAGQALLCQVAVGAS |
| 103 | MIC-54347 | MKFFAVATLFVTGVISAPSPNALNSRSLLCSPGLYSTAQCCGVDVLGVADLDCAAPTGTITN AQGFQAACAKKGQEARCCVLPVAGQDVLCQDPPGL |
| 104 | MIC-54347 | MKFSFTSAIAIASIGITGARAGINCNGSGNCPGVAGDLSTLISFGWSIDPNRWYNNGEHIVC VQSQLGTGLCAFLQNTGGAPGSSIQPLLQALQGHGCNKCGSVPLNFLQGDNSEDHGELTVNA VGSTAGCSGIC |
| 105 | MIC-54347 | MKMLITAALFTLALAAPVAETKPHSIAARDPFTCPGGLTNSTPMCCSVNVLGLLALDCQQPG ADGCSGSSKPNCCTLGAAGQGVICNAL |
| 106 | MIC-54347 | MKSAILLGLTGLAANVNAHPAKQPETGNGLTKRGVDISKYSLPNLSKYTSSPNIEQEASLQS LAFKRNYVDTATRAVKKAAPKAEFRVVDDHYIDVDGIGHVHFKQTVHGIDIDNGDFKVNIGK DGRVFSHGNSFFSGKLPQQNPLRKRDFSDPTTALKGAIDILGLPVQADGATAEAQEGTEKYT LKGTSGAVSDPKAHLVYLVKGDGTLALTWRVETDIMDNWLLTYVDATTNQEIHGVVDYVSDL ATFQVYPWGLNDPTEGDRKVLTDPWRTDASPFTWLSDGTTNYTVTRGNNAIAQDNPSGGDSY LNNHRPSSSTRDFQYPFTLTQTNPTDYRDAAITQLFYTVNKYHDLLYVLGFNEVAGNFQANN NGKGGKANDFVIVNAQDGSGTNNANFATPADGSNGRMRMYIWTTANPKRDGDLEAGIVIHEY THGLSTRLTGGPANSGCLTGTEAGGMGEGWGDFFATAIRLKAGDTRSKDYPMGVWADNNVKG IRQYPYSTSLTTNPLTYKTVNTQNEVHSAGTTWATILYEVLWNLIDKYGKNDDDFPTFDSQG VPTDGKYLTLKLVLNGLALQPCTPTFVSARDAILDADRALTGGENLCELWTGFAKRGLGSGA KYSSTARVESFTIPSGVC |
| 107 | MIC-54347 | MKSSLLSLIAIAINGALAGINCNGSGDCAGTPGTLGDLIADAYQIDPNRWYNNGEHIACSDN RGGGGLCAFFQNTLGGPGSSVLTLLQNLQAHGCNKCGSIPVNFPQGDNSENHGELTVNFVVS AGCTGLC |
| 108 | MIC-54347 | MLFKIAIVVIASTARVSAFGINCEGSGYCSPLFNPGANNHPLLEMVDVIDFGIDDNRWYAAG EHIACDQSSGVCAFVQKIGGASGGDIARAVRYLADHGCTTCGSVPLDFPNTNDVNNGEVTFN FVGLEDMGSCSDLC |
| 109 | MIC-54347 | MLGFLGKSVALLAALQATLTSASPLSTNDVTVEKRASGYANAVYFTNWGIYGRNFQPQDLVA SDITHVIYSFMNFQADGTVVSGDAYADYQKHYSDDSWNDVGNNAYGCVKQLFKLKKANRNLK VMLSIGGWTWSTNFPSAASTDANRKNFAKTAITFMKDWGFDGIDVDWEYPADNTQATNMVLL LKEIRSQLDAYAAQYAPGYHFLLSIAAPAGPEHYSALHLADLGQVLDYINLMAYDYAGSWSS FSGHDANLFANPSNPNSSPYNTDQAIKAYINGGVPARKIVLGMPIYGRSFESTGGIGQSYSG IGSGSWENGIWDYKVLPKAGATVQYDSVAQAYYSYDPSSKELISFDTPSMINTKVSYLKNLG LGGSMFWEASADKTGSDSLIGTSHRALGSLDSTQNLLSYPNSQYDNIRSGLN |
| 110 | MIC-54347 | MLLKQILVATLLSLSSVKAFPNPNHAQDLEAREAEDNLVARGGHDCGSYATWNYGKNCCVCK DNGKNYDSKSKTCSCPHGQVWNGKQCVVDCGKDATYDWKQKKCVCKKQGEVYNSNTKTCSCP PGTVWNGYGCVVDCGKEAHFDKWQKKCVCNNNGEVYDSKSKTCSCPGGQYWNGKKCVCPYGK VWNGKQCIEDCGKDAHFDYNQKKCVCNKNGQVYNSNSKTCKCPGGQYWDGKHCVCPYGQVFN GKQCVPDCGKEAHFDYKQKKCVCNNYGEIYNSKSKTCACPDGQYWNGKQCVCPYGKIWNGKQ CVPDCGKDAHFDYNQKKCVCNKNGEIYDSKSKTCACPDGQYWNGKQCACPYGKIWNGKQCVP DCGKEAHFDYNQKQCVCNNKGEIYDSKSKTCACPDGQYWNGKQCACPYGKIWNGKQCVEDCG |

TABLE 3-continued

Exemplary sequences of endophytes of the present invention

| SEQ ID | MIC ID | Sequence |
|---|---|---|
| | | KEAHFDYNQKQCVCNNKGEIYDSKSKTCKCPDGQYWDGKQCACPYGKIWNGKQCVEDCGKDAHFDYNQKQCVCNNKGEIYDSKSKTCKCPDGQYWDGKQCACPYGQIWDGKQCTPNCGKDATYDSKQKQCVCNKKGQVFDSKHLTCSCPAGTSWNGYACVPDCGKDAHYDTNQKCCVCNNKGQIFNSGSKTCSCPGNQYWDGNKCTCPYGSTWDSSKKTCKQTPIH |
| 111 | MIC-54347 | MLPSSLCRIAAVISVASAEMVSVTFDTAYDDPSRSLSEVACWRKGTGFMPNLDWKLQKDALEFIGIKAIRGFSSAQCFSCWKIEYGDKQISLFAIDSADSGIVLSLSTMQYLTGGQARELARIDAKATQVDASNCGISAAELHKYDFYTNGSGNSDGSRSNTGAIVGGVLGGVAGLALTGLAVFFFPRYKNLAAGHKPVSQNTPPAAYQSSLMQQDPKAHYDPKYFAEMDTQPYTPPD |
| 112 | MIC-54347 | MLRTPTIPWLLNIILEENPTMIPSMKKCGRKLWAGLALLALPVIASASCALPSTYKWTSTGPLANPKSGWVSLKDFSHVPYNGQHLVYSSTVNSAGSYGSMNFGLVSNWTNLSTASQNTMNLGTVAPTLFYFSPKKIWVLAYEWAATPFAYVTSTDPTNANGWSASQPLFSGSISPSSPIDPALISDGTNMYLFFAGDNGKIYRSSMPIGQFPSSFGTSYTTIMSAATNDLFEAIQVYTVSGQNQYLMIVECIGSVGRYFRSFTATSLSGTWTPQAATESNPFAGHANSGATWTNDISSGDLIRSTNDETMTIDPCNLQLLYQGMAVGSTGDYNSLPWRPAVLTLTNPGSSTGNGNGTGSGGSGGSGSGQASQYAQCGGLGYTGPTSPYKCTFVNEYYSQCL |
| 113 | MIC-54347 | MLSHAILAGLGLAGLAAAAPTRTIATRQASGYQNAVYWGATGKQNPNLAEYCTSTSGIDILILSFLDVYGATGNFPSGNFGNDCFVGTTGVPQSCSDLASQIKTCQNAGVKIIVSLGGAAGSYSVTSQQQAQTIGQYLWDAYGNSGSTSVQRPFGDVFVNGWDFDIEANGGFSQYYQYMIGTLRSNFAKDSANTYYITGAPQCPLPEENMGDMIQHSVFDYLFIQFYNNNPTCSLGLSGQAPLNYDDWTNFVSTTQSKNAKLFLGAPAGPLASNGNPNGAVYYATPSDLAPIVNKAKTKSNFGGVMLWDAGYSDENSSGGCNYAQQVKSILTTGAPCNGTPVSGGGSPPATSSTASSPPATSSTASSPPATSSLPADGSTGSTGNSGVGSVAQWGQCGGIGYTGPTQCQSPFKCVNEGPYWSSCQ |
| 114 | MIC-54347 | MLYTAALAGLMATAALAAPYRRQATGQNVVYWGQNGGGVTESNNLSDYCDAEAGIDLLVLSFLYEYGNGNTIPSGTIGQSCSIDTSGNPSNCDALASAIATCKSNGVKVVLSLGGAVGAYSLSSQQEAETIGQNLWDAYGAGNGTVPRPFRSTVVDGWDFDIEASSGNQYYQYLIAKLRSNFNGGNYVITGAPQCPIPEPNMQQIITTSQFDYLWVQFYNNPSCSVGTSTPNFQDWVSNIANTPSANAKIFLGVPASPLGATGTESGAQYYLEPSALNTLVGQFSSNPAFGGIMMWAAGESDANVNNGCTYAQEAKKILTSGQIC |
| 115 | MIC-54347 | MPLKVFESASPAPSHPSLSHLCLLVFEAVLEVVCVSLPGYIVARLGHFDADKQKFLANLNVMLFTPCLIFTKLASQLNAEKLSDLAIIPAIFIVQTLVSWIVSILVAKGFRENKRASNFVTAMGVFGNSNSLPISLVLSLSQTIKGLHWDRIPGDNDDEVGARGILYLLIFQQLGQLVRWSWGYHVLLAPKDKYAEYQDEIAEEGQYRYRDEEPNEQEPEILITGLDGDTEDDGESNASEDYIPAGRTPLASNSRASLAGSSVDNDDMLNFKKGNYTRGSSLANTDLEDDILSFPRIRLRDEAEVEHGVTARIKKSLYSLKDKASAAMTRQYQRLPQPVQTCLSFIHKSITKTLGFVWDFMNPPLWAMLIAVIVASIPSLQQLFFEDGSFVKNSVTNAVSSSGGVAVPLILVVLGANLARNTAAHDSPIDPEEEKIGTKLLIASLLSRMVLPTLIMAPILAITAKYLPISILDDPIFIVVCELLTGAPSALQLAQICQINNVYEQTMGRILFQSYVIWILPSTLFLVMMALEVIEWATVN |
| 116 | MIC-54347 | MPSLITVASVLALVPSAFAGWNVNSKQNIAVYWGQNSANQQSTQQRLSAYCNAKIESDSCDVDANINVIDIAFLNGITPPMTNFANAGDRCTPFSDNPWLLSCPEIEADIKTCQANGKTILISLGGDSYTQGGWSSTSAAQAAAKQVWAMFGPVQSGSSTERPFGSAVVDGFDFDFEATTNNLAAFGAQLKSLSAAGGKKYYFSAAPQCFFPDAAVGALINAVPMDWIQIQFYNNPCGVSGYTPGTSNQNNYNYQTWDTWAKTSPNPNVKLLVGIPAGPGAGRGYVSGSQLTSVFQYSKGFSSTFAGAMMWDMSQLFQNTGFEAQVVNALK |
| 117 | MIC-54347 | MQLSNLFKLALFTAAVSADTVSYDTGYDDASRSLTVVSCSDGPNGLITRYHWQTQGQIPRFPYIGGVQAVAGWNSPSCGTCWKLTYSGKTIYVLAVDHAGAGENIGLDAMNALTNGQAVALGRVSATASQVAVSNCGL |
| 118 | MIC-54347 | MQLTTVVALFASLAGAAPAPEPAAELVARDGPCSSGVTNNVPQCCGTGILSVVYVDCKTPTQAPSATNQLSAICARVGLQAKCCTVGIAGVGVLCQDAIPQ |
| 119 | MIC-54347 | MRFNSFIAVAAATAQSAAGLGINCLGDTLCGISYMSGGRLTQFQTIFDNIFEKRIYDNGDDIGCIEVHSINFKGSFKGTYCAYVQNLDGSVNGATLKTLYTELVNYGCGICGSIPIHYSKGDNDSNHGELSFNMVDSLPDNCELGKPCAATS |
| 120 | MIC-54347 | MRTSTAIISLALVVMGIAAPAAEAGSVVSEAGFVVSEAQFNAIFPGRNPFYSYRALTGALGSYPSFTNTADNATRLREAAAFFANVDHETDGLKFVVE |
| 121 | MIC-54347 | MSAASRKSRIATSVARVMYTNAVYFPSSRIYQGDSPGMLNYSCINHVYYAYASVTADGNVFLGDEWADARAPVDGVQGGLGSLMHLKQRHPHLQVVLSIGGSTASEVFPIVASSTLLRDNFARSALGLVEASGLDGIDIAWEFPSQAKHGHDFLALLAAVRIHMPEDRFILTAVLPAAKEVLQLIDLSTAAEYLDYINLVAYDFFGTWTSKTGHHAQLYTMNKDEPSASTGVAYVMSQGFPAKSILLGIPTYGRSFLKANGPGQDFNGVGGQDGTFEYGELPRKGCKEIVDRRYIAAQCVGGDGGFVTYDNPETVKVKAEFCKQKGLGGLFYWNGPADSRDQARSLIAAGFRALHTS |
| 122 | MIC-54347 | MTRLLDASFLLLPAIASTLFGTASAQNATCALKGKPAGKVLMGYWENWDGSANGVHPGFGWTPIENPIIKQNGYNVINAAFPVILSDGTVLWENDMAPGTQVATPAEMCAAKAAGATILLSIGGATAGIDLSSSTVADKFIATIVPILKQYNEDGIDIDIETGLVNSGNIKTLSTSQANLIRIIDGVLAQMPSNFGLTMAPETAYVTGGSITYGSIWGSYLPIIQKYVQNGRLWWLNMQYYNGDMYGC |

TABLE 3-continued

| SEQ ID | MIC ID | Sequence |
|---|---|---|
| Exemplary sequences of endophytes of the present invention | | |
| | | SGDSYAAGTVQGFIAQTDCLNAGLTVQGTTIKVPYSMQVPGLPAQSGAGGGYMNPSLVGQAW<br>DHYNGALKGLMTWSINWDGAGGWTFGDNLLTRIG |
| 123 | MIC-54347 | MTSIRRLALYLGALLPAVLAAPAALHKKPEAAPNKFIVTLKEGASIDTDSHLAWVNDIHRRS<br>LTKRSTAGVEKTYNIHTWSAYAGEFDAETIEQIKSSPDVASVEPDYIMYLSDIVEDKRALTT<br>QSGAPWGLGTVSHRTSGSTSYIYDSSAGSGTFAYVVDSGINTSHQQFGGRASLGYNAAGGQH<br>VDTLGHGTHVSGTIGGSTYGVAKQASLISVKVFAGESATTSVILDGYNWAVNDIVSRNRASK<br>SAINMSLGGPASSTWTTAINAAFNQGVLTIVAAGNGDSFGNPQPVSGTSPANVPNAITVAAL<br>DINWRTASFTNYGAGVDVFAPGVNILSSWIGSNTATNTISGTSMATPHVVGLALYLQSLEGL<br>TTPTAVTNRIKALATAGRITGSLNGSPNTLIFNGNSA |
| 124 | MIC-54347 | MTSLYLTSALGLLCLLPAAQAGWNPNSKNNIVVYWGQDAGSIGQNRLSYYCENAPDVDVINI<br>SFLVGITDLNLNLANVGNNCTSFAQDPNLLNCPQVAADIVECQQTYGKTIMMSLFGSTYTES<br>GFSSSSTAVSAAQEIWAMFGPVQSGNSTPRPFGNAVIDGFDFDLEDPIENNMEPFAAELRSL<br>TSAATSKKFYLSAAPQCVYPDASDQTFLQGEVAFDWLNIQFYNNGCGTSYYPSGYNYATWDN<br>WVKTVSANPNTKLLVGTPASVHAVNFANYFPTNDQLAGAISSSKSYGSFAGVMLWDMAQLFG<br>NPGYLDLIVADLGGASTPPPPASTTLSTVTRSSTASSGPTSPPPSGGGSVPQWGQCGGQGYT<br>GPTQCQSPYTCVVESQWWASCQ |
| 125 | MIC-54347 | MVQSAAYLGALLATLPLARAGFNASSTQNIAVYWGQNSANQATSQQRLSTYCANADIDIIPI<br>GFMNGISPVITNFANAGDNCTAFADNQNALNCPQIEQDIITCQQTYGKTILISLGGGSYTQG<br>GFSSTGVATSAAQTVWNMFGPVNPNSNVDRPFGSAVVDGVDFDFESGVNNLATFATELRSLM<br>DASASSANRKFYLSAAPQCVYPDFADNPALNGSVFFDFIMIQYYNNGCGVSSYVPGATTQWN<br>YNFDVWDNWAHTVSKNPNVRILLGIAANTGAASGYVSGTQLSAVISFTKQYSSFAGIMMWDM<br>SQLYQNSGFLGQVVSDLAASGSTPPATTSSGASKTTTSSGGSTSPTGGSVPQWGQCGGEGYT<br>GPTQCQSPYKCVESSQWWSSCQ |
| 126 | MIC-54347 | MYFANTLLSIAGAASIANALGSNCQDSGVCADINANLSFAIEQLKGMDQLQRFSDGQHITCV<br>DTDSEGNSSLCLSYQDTGRSWTVFQTAWFAQSLVEQGCQACGSLSMGSHHGELVASVITKST<br>SGLDTSGARRGMDMVQLAVRAGDR |
| 127 | MIC-67967 | TTACCGACTTCAGGTCCCCCCGGCTTTCATGGCTTGACGGGCGGTGTGTACAAGGTCCGGGA<br>ACGTATTCACCGTATCATTGCTGATATACGATTACTAGCGATTCCAGCTTCATGAGGGCGAG<br>TTGCAGCCCTCAATTCGAACTGAGATAGGATTTTTGAGATTAGCATCCTGTTACCAGGTAGC<br>AGCCCTTTGTTCCTACCATTGTAGCACGTGTGTAGCCCTGGGCATAAAGGCCATGATGACTT<br>GACATCATCCCCTCCTTCCTCGCGTCTTACGACGGCAGTTTCTTTAGAGTTCCCAGCTTAAC<br>CTGTTGGCAACTAAAGATAGGGGTTGCGCTCGTTGCGGGACTTAACCCAACACCTCACGGCA<br>CGAGCTGACGACAGCCATGCAGCACCTTACAAAATGTGTATTGCTACAAAATCTGCTTTCAC<br>AGACGGGCATCTTGCATTCTAGCCCAGGTAAGGTTCCTCGCGTATCATCGAATTAAACCACA<br>TGCTCCACCGCTTGTGCGGACCCCCGTCAATTCCTTTGAGTTTCAACCTTGCGGTCGTACTT<br>CCCAGGTGGATTACTTAATGCTTTCGCTCAGACACTTACTGTATATCGCAAATGTCGAGTAA<br>TCATCGTTTAGGGCGTGGACTACCAGGGTATCTAATCCTGTTTGATCCCCACGCTTTCGTGC<br>CTCAGCGTCAATATTTGTGTAGCCAGCTGCCTTCGCAATTGGTGTTCTATGTCATATCTATG<br>CATTTCACCGCTACATGACATATTCCGCTAACCTCCACAATATTCAAGACTTATAGTATCCA<br>TGGCAGTTTCCAGGTTAAGCCTGGAGATTTCACCACGGACTTACAAATCCGCCTACGCACCC<br>TTTAAACCCAGTGAATCCGGATAACGCTTGCACCCTCCGTATTACCGCGGCTGCTGGCACGG<br>AGTTAGCCGGTGCTTATTCCTCTGGTACCGTCAACACTCTTAGAAAAAGGTGATTTCGTCCC<br>AGATAAAAGAAGTTTACAATCCAGAGGACCTTCATCCTTCACGCGGCATGGCTGGTTCAGAC<br>TTGCGTCCATTGACCAATATTCCTTACTGCTGCCTCCCGTAGGAGTCGGGCCCGTGTCTCAG<br>TGCCCGTGTGACTGGTCGCGCTCTCACGCCAGTTACTGATCGTCGGCTTGGTGAGCCGTTAC<br>CTCACCAACTACCTAATCAGGCGCACGCCCATCTTCAAGCGAAATTCTTTAATCATTAAGTG<br>ATGCCACCCTGTGATTTTACGATGTATTAATCCGAATTTCTTCGGGCTATCCATCTCTTGAA<br>GGAAGGTTGCGTACGTGTTCCGCACCCGTTTGCCGGTCGCCACCCAGTATTGCTACCTGTGC<br>TGCCCCTCGACTTGCA |
| 128 | MIC-67967 | MKIAIINGPNLNLLGKREPGIYGNEPFEDYFEKLKVLFADVELEYYQNNSEGNIIDILHEIG<br>FTYDGILLNAGAYTHYSIAIRDAIAAIKTPVLEIHISNVHAREEFRHKSVIAPVCKGMIAGL<br>GMKGYALGINYFL |
| 129 | MIC-67967 | MKQVEVGIIMGSSSDAPIMRQAIDVLKKFDIGYEFNVVSAHRSPQRMEDYAGTAEERGLKVI<br>IAGAGGAAHLPGMVAAITTLPVVGVPIKSSNSLDGWDSLLSIVQMPGDIPVATVSVNGARNA<br>GLLAVQILATCNPELRQKLADMKRENNEKVNQMNETLDRS |
| 130 | MIC-67967 | MNSFGRLFRVNVFGESHGASVGVNIDGVPAGIPLKQEDFLPDLDRRKAGAKGTTPRKEDDLP<br>YIKSGVFNDHTTGAPITILFENNNTRSTDYEKLREFPRPGHADFVATHKYGGFEDYRGGGHF<br>SGRLTLNLVAAGVIAKKILGESIKVTATLKEVAGLPDAEQGLEAAIAAKDSVGGIVECVVEG<br>LPIGLGEPFFDSVESTIAHAVFAIPAIKGIEFGAGFAAAKMKGIEHNDAILDASGKTATNNA<br>GGVVGGITNGNPLVFRVAVKPTSSTPKEQHTLNIKSGQVEAFSVKGRHDLCIALRVPVVLEA<br>VAAMALADLMMVEQRSPRIWK |
| 131 | MIC-67967 | MSGQLKEVRNRIKSTQSNLQITKAMKMVSAAKLRRAQDAILLMRPYAVKLQEMLQNIVSNSE<br>GSIDLALAAERPVEKVLLVVITSDRGLCGAYNSNLIKLTKQVIREKYQEQFEKGHVTILPIG<br>KKGWEHFGKNGYKMNDTYWHLFAHLDEDHVKEAAAVATDGETSGQYDAVEIIYSQFKNAATQ<br>FYISEQFLPIAKPQEVETGKGKKAAKADFIFEPEKQTLIAELMPKILNTQLYKAMLDANASE<br>HGARMTAMDKATENANELLRNYKITYNRARQAAITTELTEIVSGAAALEG |

TABLE 3-continued

Exemplary sequences of endophytes of the present invention

| SEQ ID | MIC ID | Sequence |
|---|---|---|
| 132 | MIC-84302 | GGGAGCTTGCTCCCTGATGTTAGCGGCGGACGGGTGAGTAACACGTGGGTAACCTGCCTGTAAGACTGGGATAACTCCGGGAAACCGGGGCTAATACCGGATGGTTGTTTGAACCGCATGGTTCAGACATAAAAGGTGGCTTCGGCTACCACTTACAGATGGACCCGCGGCGCATTAGCTAGTTGGTGAGGTAACGGCTCACCAAGGCAACGATGCGTAGCCGACCTGAGAGGGTGATCGGCCACACTGGGACTGAGACACGGCCCAGACTCCTACGGGAGGCAGCAGTAGGGAATCTTCCGCAATGGACGAAAGTCTGACGGAGCAACGCCGCGTGAGTGATGAAGGTTTTCGGATCGTAAAGCTCTGTTGTTAGGGAAGAACAAGTGCCGTTCAAATAGGGCGGCACCTTGACGGTACCTAACCAGAAAGCCACGGCTAACTACGTGCCAGCAGCCGCGGTAATACGTAGGTGGCAAGCGTTGTCCGGAATTATTGGGCGTAAAGGGCTCGCAGGCGGTTTCTTAAGTCTGATGTGAAAGCCCCCGGCTCAACCGGGGAGGGTCATTGGAAACTGGGGAACTTGAGTGCAGAAGAGGAGAGTGGAATTCCACGTGTAGCGGTGAAATGCGTAGAGATGTGGAGGAACACCAGTGGCGAAGGCGACTCTCTGGTCTGTAACTGACGCTGAGGAGCGAAAGCGTGGGGAGCGAACAGGATTAGATACCCTGGTAGTCCACGCCGTAAACGATGAGTGCTAAGTGTTAGGGGGTTTCCGCCCCTTAGTGCTGCAGCTAACGCATTAAGCACTCCGCCTGGGGAGTACGGTCGCAAGACTGAAACTCAAAGGAATTGACGGGGGCCCGCACAAGCGGTGGAGCATGTGGTTTAATTCGAAGCAACGCGAAGAACCTTACCAGGTCTTGACATCCTCTGACAATCCTAGAGATAGGACGTCCCCTTCGGGGGCAGAGTGACAGGTGGTGCATGGTTGTCGTCAGCTCGTGTCGTGAGATGTTGGGTTAAGTCCCGCAACGAGCGCAACCCTTGATCTTAGTTGCCAGCATTCAGTTGGGCACTCTAAGGTGACTGCCGGTGACAAACCGGAGGAAGGTGGGGATGACGTCAAATCATCATGCCCCTTATGACCTGGGCTACACACGTGCTACAATGGGCAGAACAAAGGGCAGCGAAACCGCGAGGTTAAGCCAATCCCACAAATCTGTTCTCAGTTCGGATCGCAGTCTGCAACTCGACTGCGTGAAGCTGGAATCGCTAGTAATCGCGGATCAGCATGCCGCGGTGAATACGTTCCCGGGCCTTGTACACACCGCCCGTCACACCACGAGAGTTTGTAACACCCGAAGTCGGTGAGGTA |
| 133 | MIC-84302 | MAITAQQVKELRQKTGAGMMDCKKALTETDGDMDKAIDLLREKGIAKAAKKADRIAAEGSTLIKTDGNKGVILEVNSETDFVAKNEGFKELLNTLADHLLANAPADLEEAMGQKMENGSTVEEYITSNVAKIGEKITLRRFAVITKEDSEAFGAYLHMGGRIGVLSVLSGTDEDLAKDIAMHVAAVNPRYISRDQVSEEEANHERQILTQQALQEGKPENIVAKMVEGRLNKFFEEICLLDQAFVKNPDEKVKQVVAAKNASVKTYVRYEVGEGIEKRQENFAEEVMNQVKK |
| 134 | MIC-84302 | MKTVKVNIVTPDGPVYDADIEMVSVRAESGDLGILPGHIPTVAPLKIGAVRLKKDGQTELAAVSGGFLEVRPDQVTILAQAAETAESIDKERALAAKKRAEDRINKRSDDTDIRRAELALQRAVNRLDVAGN |
| 135 | MIC-84302 | MNFETVIGLEVHVELKTKSKIFSSSPTPFGAEANTQTSVIDLGYPGVLPVLNKEAVEFAMKAAMALNCEIATDTKFDRKNYFYPDNPKAYQISQFDKPIGENGWIEIEVGGKTKKIGITRLHLEEDAGKLTHTGDGSLVDENRQGTPLVEIVSEPDIRTPEEAYAYLEKLKSIIQYTGVSDCKMEEGSLRCDANISLRPIGQEKFGTKTELKNLNSFAFVQKGLEYEEKRQEQVLLSGGVIQQETRRYDEATKKTILMRVKEGSDDYRYFPEPDLVELYIDDEWKERVRATIPELPDERRKRYIEELGLPAYDAMVLTLTKEMADFFEETVNKGAEAKQASNWLMGEVSAYLNAEQKELEDVALTPEGLAGMIKLIEKGTISSKIAKKVFKELIEKGGDAEKIVKEKGLVQISDESVLLKLVTDALDSNPQSIEDFKNGKDRAIGFLVGQIMKASKGQANPPMVNKILLEEIKKR |
| 136 | MIC-84302 | MSYLIKNGWMLNEQGEKVAQDIRVTGEFITETGLLTAKDGETVIDAEGLFVSPGLVDLHVHFREPGGEKKETIETGSKAAARGGFTTVAAMPNTRPVPDTKEQMEWLQNRIKETSSVRVLPYASITIRQIGEEMTDFEALHEAGAFAFTDDGVGVQTAGMMYEAMKRAASMNKAIVAHCEDNSLIYGGSVHEGSFSKANGLNGIPSICEAVHIARDVLLAEAADCHYHVCHISTKESVRAVRDAKKAGIRVTAEVSPHHLLLCDEDIPGLDTNFKMNPPLRSKEDREALIEGLLDGTIDFIATDHAPHTEEEKNTDMKLAPFGIVGLETAFPLLYTHFVKNGTWTLKQLVDFMTVKPCEAFGLPYGTLAPGAPADITLIDLEKEAAIDKDTFLSKGKNTPFNKMKCFGWPVATMAAGKLAYEEGRLV |

Example 2. Taxonomic Classification of Endophytes

Classification of strains was done by the following methodology.

To accurately characterize isolated bacterial endophytes, colonies were submitted for marker gene sequencing, and the sequences were analyzed to provide taxonomic classifications. Colonies were subjected to 16S rRNA gene PCR amplification using a primer pair 27f (5'-AGAGTTTGATYMTGGCTCAG-3') (SEQ ID NO: 1) and 1492r (5'-GGTTACCTTGTTACGACTT-3') (SEQ ID NO: 2). Sequencing reactions were performed using primers: 27f (5'-AGAGTTTGATYMTGGCTCAG-3') (SEQ ID NO: 1), 515f (5'-GTGYCAGCMGCCGCGGTAA-3') (SEQ ID NO: 3), 806r (5'-GGACTACNVGGGTWTCTAAT-3') (SEQ ID NO: 4), and 1492r (5'-GGTTACCTTGTTACGACTT-3') (SEQ ID NO: 2). To accurately characterize isolated fungal endophytes, genomic DNA isolated as above was submitted for marker gene sequencing, and the sequences were analyzed to provide taxonomic classifications. PCR was used to amplify the nuclear ribosomal internal transcribed spacers (ITS) region using the primer pair ITS_1 (5'-CTTGGTCATTTAGAGGAAGTAA-3') (SEQ ID NO: 5) and LR5 (5'-TCCTGAGGGAAACTTCG-3') (SEQ ID NO: 6). Each 25 microliter-reaction mixture included 22.5 microliters of Invitrogen Platinum Taq supermix, 0.5 microliter of each primer (10 micromolar), and 1.5 microliters of DNA template (~2-4 ng). Cycling reactions were run with MJ Research PTC thermocyclers and consisted of 94° C. for 5 min, 35 cycles of 94° C. for 30 s, 54° C. for 30 s, and 72° C. for 1 min, and 72° C. for 10 min. Sanger sequencing of was performed at Genewiz (South Plainfield, NJ) using primers: ITS_1 (5'-CTTGGTCATTTAGAGGAAGTAA-3') (SEQ ID NO: 5), ITS_2 (5'-GCTGCGTTCTTCATCGATGC-3') (SEQ ID NO: 7), ITS_3 (5'-GCATCGAT- GAAGAACGCAGC-3') (SEQ ID NO: 8), and LR5 (5'-TCCTGAGGGAAACTTCG-3') (SEQ ID NO: 6). Preferably sequencing primers were chosen so that overlapping regions are sequenced. Sanger sequencing of marker genes was performed at Genewiz (South Plainfield, NJ). Raw chromatograms were converted to sequences, and corresponding quality scores were assigned using TraceTuner v3.0.6beta (U.S. Pat. No. 6,681,186). These sequences were quality filtered, aligned and a consensus sequence generated using Geneious v 8.1.8 (Biomatters Limited, Auckland NZ).

Taxonomic classifications were assigned to the sequences using the highest probability of assignment based on the results of industry standard taxonomic classification tools: LCA (runs USEARCH (Edgar, R. C., 2010) with option search_global, then for all best match hits, returns lowest taxonomic rank shared by all best hits for a query), RDP Naive Bayesian rRNA Classifier version 2.11, September 2015 (Wang et al., 2007), SPINGO version 1.3 (32 bit) (Allard et al. (2015) BMC Bioinformatics 16:324 DOI: 10.1186/s12859-015-0747-1), and UTAX version v8.1.1861_i86linux64 (Edgar, R. C. (2016) available online at drive5.com/usearch/manual/utax_algo.html), using reference databases: RDP 16S rRNA training set 15 (Cole et al. (2014) Nucleic Acid Research, 42 (Database issue): D633-D642), and SILVA version 119 (Quast et al. (2013) Nucleic Acid Research, 41 (Database issue): D590-D596). The classifier and database combinations listed in Table 4 were used to assign taxonomy to bacterial sequences.

TABLE 4

The classifier and database combinations used to classify 16S rRNA gene or ITS sequences

| Classifier | Database |
|---|---|
| LCA (Bacteria) | SILVA, version 119 |
| RDP (Bacteria) | RDP, 16S rRNA training set 15 |
| SPINGO (Bacteria) | RDP, 16S rRNA training set 15 |
| UTAX (Bacteria) | RDP, 16S rRNA training set 15; SILVA, version 119 |
| LCA (Fungi) | UNITE, Fungal ITS trainset Jul. 4, 2014 |
| RDP (Fungi) | UNITE, Fungal ITS trainset Jul. 4, 2014; WARCUP, Fungal ITS trainset 1 |
| SPINGO (Fungi) | UNITE, Fungal ITS trainset Jul. 4, 2014 |
| UTAX (Fungi) | UNITE, Fungal ITS trainset Jul. 4, 2014; WARCUP, Fungal ITS trainset 1 |

TABLE 5

Taxonomic classification of endophytes of the present invention

| MIC ID | MIC-67967 | MIC-84302 | MIC-18905 | MIC-54347 |
|---|---|---|---|---|
| Kingdom | Bacteria | Bacteria | Bacteria | Fungi |
| Phylum | Bacteroidetes | Firmicutes | Proteobacteria | Ascomycota |
| Class | Chitinophagia | Bacilli | Gammaproteobacteria | Sordariomycetes |
| Order | Chitinophagales | Bacillales | Pseudomonadales | Hypocreales |
| Family | Chitinophagaceae | Bacillaceae | Pseudomonadaceae | Hypocreaceae |
| Genus | *Chitinophaga* | *Bacillus* | *Pseudomonas* | *Trichoderma* |
| Species | *oryzae* | *velenzensis* | *glycinis* | *hamatum* |

Example 3. Assessment of Improved Plant Characteristics: Vigor Assay

Assay of Soy Seedling Vigor

Seed preparation: The lot quality of soybean seeds is first assessed by testing germination of 100 seeds. Seeds are placed, 8 seeds per petri dish, on filter paper in petri dishes, 12 ml of water is added to each plate and plates are incubated for 3 days at 24° C. The process should be repeated with a fresh seed lot if fewer than 95% of the seeds have germinated. One thousand soybean seeds are then surface sterilized by co-incubation with chlorine gas in a 20×30 cm container placed in a chemical fume hood for 16 hours. Percent germination of 50 seeds, per sterilization batch, is tested as above and confirmed to be greater than 95%.

Preparation of endophyte treatments: Spore solutions are made by rinsing and scraping spores from agar slants which have been growing for about 1 month. Rinsing is done with 0.05% Silwet. Solutions are passed through Miracloth to filter out mycelia. Spores per ml are counted under a microscope using a hemocytometer. The stock suspension is then diluted into 10^6 spores/ml utilizing water. 3 μl of spore suspension is used per soy seed (~10^3 CFUs/seed is obtained). Control treatments are prepared by adding equivalent volumes of sterile water to seeds.

Assay of seedling vigor: Two rolled pieces of germination paper are placed in a sterile glass gar with 50 ml sterile water, then removed when completely saturated. Then the papers are separated, and inoculated seeds are placed at approximately 1 cm intervals along the length of one sheet of moistened germination paper, at least 2.5 cm from the top of the paper and 3.8 cm from the edge of the paper. The second sheet of is placed on top of the soy seeds and the layered papers and seeds are loosely rolled into a tube. Each tube is secured with a rubber band around the middle and placed in a single sterile glass jar and covered loosely with a lid. For each treatment, three jars with 15 seeds per jar are prepared. The position of jars within the growth chamber is randomized. Jars are incubated at 60% relative humidity, and 22° C. day, 18° ° C. night with 12 hours light and 12 hours dark for 4 days and then the lids are removed, and the jars incubated for an additional 7 days. Then the germinated soy seedlings are weighed and photographed, and root length and root surface area are measured.

Dirt, excess water, seed coats and other debris is removed from seedlings to allow accurate scanning of the roots. Individual seedlings are laid out on clear plastic trays and trays are arranged on an Epson Expression 11000XL scanner (Epson America, Inc., Long Beach CA). Roots are manually arranged to reduce the amount of overlap. For root measurements, shoots are removed if the shape of the shoot causes it to overlap the roots.

The WinRHIZO software version *Arabidopsis* Pro2016a (Regents Instruments, Quebec Canada) is used with the following acquisition settings: greyscale 4000 dpi image, speed priority, overlapping (1 object), Root Morphology: Precision (standard), Crossing Detection (normal). The scanning area is set to the maximum scanner area. When the scan is completed, the root area is selected, and root length and root surface area are measured.

Statistical analysis is performed using R (R Core Team, 2016. R: A language and environment for statistical computing. R Foundation for Statistical Computing, Vienna, Austria. R-project.org/) or a similar statistical software program.

Assay of Rice Seedling Vigor

Seed preparation: The lot of rice seeds is first evaluated for germination by transfer of 100 seeds and with 8 ml of water to a filter paper lined petri dish. Seeds are incubated for 3 days at 24° C. The process should be repeated with a fresh seed lot if fewer than 95% of the seeds have germinated. Rice seeds are then surface sterilized by co-incubation with chlorine gas in a 20×30 cm container in a chemical fume hood for 12 hours. Percent germination of 50 seeds, per sterilization batch, is tested as above and confirmed to be greater than 95%.

Optional reagent preparation: 7.5% polyethylene glycol (PEG) is prepared by adding 75 g of PEG to 1000 ml of water, then stirring on a warm hot plate until the PEG is fully dissolved. The solution is then autoclaved.

Preparation of endophyte treatments: Spore solutions are made by rinsing and scraping spores from agar slants which have been growing for about 1 month. Rinsing was done with 0.05% Silwet. Solutions are passed through Miracloth to filter out mycelia. Spores per ml are counted under a microscope using a hemocytometer. The stock suspension is then diluted into 10^6 spores/ml utilizing water. 3 μl of spore suspension is used per rice seed (~10^3 CFUs/seed was obtained). Seeds and spores are combined in a 50 ml falcon tube and gently shaken for 5-10 seconds until thoroughly coated. Control treatments are prepared by adding equivalent volumes of sterile water to seeds.

Assay of seedling vigor: Petri dishes are prepared by adding four sheets of sterile heavy weight seed germination paper, then adding either 50 ml of sterile water or, optionally, 50 ml of PEG solution as prepared above, to each plate then allowing the liquid to thoroughly soak into all sheets. The sheets are positioned and then creased so that the back of the plate and one side wall are covered, two sheets are then removed and placed on a sterile surface. Along the edge of the plate across from the covered side wall 15 inoculated rice seeds are placed evenly at least one inch from the top of the plate and half an inch from the sides. Seeds are placed smooth side up and with the pointed end of the seed pointing toward the side wall of the plate covered by germination paper. The seeds are then covered by the two reserved sheets, and the moist paper layers smoothed together to remove air bubbles and secure the seeds, and then the lid is replaced. For each treatment, at least three plates with 15 seeds per plate are prepared. The plates are then randomly distributed into stacks of 8-12 plates and a plate without seeds is placed on the top. The stacks are incubated at 60% relative humidity, and 22° C. day, 18° C. night with 12 hours light and 12 hours dark for 24 hours, then each plate is turned to a semi-vertical position with the side wall covered by paper at the bottom. The plates are incubated for an additional 5 days, then rice seeds are scored manually for germination, root and shoot length.

Statistical analysis is performed using R or a similar statistical software program.

Assay of Corn Seedling Vigor

Seed preparation: The lot quality of corn seeds is first evaluated for germination by transfer of 100 seeds with 3.5 ml of water to a filter paper lined petri dish. Seeds are incubated for 3 days at 24° C. The process should be repeated with a fresh seed lot if fewer than 95% of the seeds have germinated. One thousand corn seeds are then surface sterilized by co-incubation with chlorine gas in a 20×30 cm container in a chemical fume hood for 12 hours. Percent germination of 50 seeds, per sterilization batch, is tested as above and confirmed to be greater than 95%.

Optional reagent preparation: 7.5% PEG 6000 (Calbiochem, San Diego, CA) is prepared by adding 75 g of PEG to 1000 ml of water, then stirred on a warm hot plate until the PEG is fully dissolved. The solution is then autoclaved.

Preparation of endophyte treatments: Spore solutions are made by rinsing and scraping spores from agar slants which have been growing for about 1 month. Rinsing is done with 0.05% Silwet. Solutions are passed through Miracloth to filter out mycelia. Spores per ml are counted under a microscope using a hemocytometer. The stock suspension is then diluted into 10^6 spores/ml utilizing water. 3 μl of spore suspension is used per corn seed (~10^3 CFUs/seed is obtained). Control treatments are prepared by adding equivalent volumes of sterile water to seeds.

Assay of seedling vigor: Either 25 ml of sterile water or, optionally, 25 ml of PEG solution as prepared above, is added to each Cyg™ germination pouch (Mega International, Newport, MN) and place into pouch rack (Mega International, Newport, MN). Sterile forceps are used to place corn seeds prepared as above into every other perforation in the germination pouch. Seeds are fitted snugly into each perforation to ensure they do not shift when moving the pouches. Before and in between treatments forceps are sterilized using ethanol and flame and workspace wiped down with 70% ethanol. For each treatment, three pouches with 15 seeds per pouch are prepared. The germination racks with germination pouches are placed into plastic tubs and covered with perforated plastic wrap to prevent drying. Tubs are incubated at 60% relative humidity, and 22° ° C. day, 18° C. night with 12 hours light and 12 hours dark for 6 days to allow for germination and root length growth. Placement of pouches within racks and racks/tubs within the growth chamber is randomized to minimize positional effect. At the end of 6 days the corn seeds are scored manually for germination, root and shoot length.

Statistical analysis is performed using R or a similar statistical software program.

Assay of Wheat Seedling Vigor

Seed preparation: The lot of wheat seeds is first evaluated for germination by transfer of 100 seeds and with 8 ml of water to a filter paper lined petri dish. Seeds are incubated for 3 days at 24° C. The process should be repeated with a fresh seed lot if fewer than 95% of the seeds have germinated. Wheat seeds are then surface sterilized by co-incubation with chlorine gas in a 20×30 cm container in a chemical fume hood for 12 hours. Percent germination of 50 seeds, per sterilization batch, is tested as above and confirmed to be greater than 95%.

Optional reagent preparation: 7.5% polyethylene glycol (PEG) is prepared by adding 75 g of PEG to 1000 ml of water, then stirring on a warm hot plate until the PEG is fully dissolved. The solution is then autoclaved.

Preparation of endophyte treatments: Spore solutions are made by rinsing and scraping spores from agar slants which have been growing for about 1 month. Rinsing is done with 0.05% Silwet. Solutions are passed through Miracloth to filter out mycelia. Spores per ml are counted under a microscope using a hemocytometer. The stock suspension is then diluted into 10^6 spores/ml utilizing water. 3 μl of spore suspension is used per wheat seed (~10^3 CFUs/seed was obtained). Seeds and spores are combined a 50 ml falcon tube and gently shaken for 5-10 seconds until thoroughly coated. Control treatments are prepared by adding equivalent volumes of sterile water to seeds.

Assay of seedling vigor: Petri dishes are prepared by adding four sheets of sterile heavy weight seed germination paper, then adding either 50 ml of sterile water or, optionally, 50 ml of PEG solution as prepared above, to each plate then allowing the liquid to thoroughly soak into all sheets. The sheets are positioned and then creased so that the back of the plate and one side wall are covered, two sheets are then removed and placed on a sterile surface. Along the edge of the plate across from the covered side wall 15 inoculated wheat seeds are placed evenly at least one inch from the top of the plate and half an inch from the sides. Seeds are placed smooth side up and with the pointed end of the seed pointing toward the side wall of the plate covered by germination paper. The seeds are then covered by the two reserved sheets, and the moist paper layers smoothed together to remove air bubbles and secure the seeds, and then the lid is replaced. For each treatment, at least three plates with 15 seeds per plate are prepared. The plates are then randomly distributed into stacks of 8-12 plates and a plate without seeds is placed on the top. The stacks are incubated at 60% relative humidity, and 22° C. day, 18° C. night with 12 hours light and 12 hours dark for 24 hours, then each plate is turned to a semi-vertical position with the side wall covered by paper at the bottom. The plates are incubated for an additional 5 days, then wheat seeds are scored manually for scored manually for germination, root and shoot length, root and shoot surface area, seedling mass, root and shoot and seedling length.

Statistical analysis is performed using R or a similar statistical software program.

Example 4. Method of Preparation of Endophytes and Heterologous Disposition of Endophytes on Seeds Seeds are heterologously disposed to each endophyte according to the following seed treatment protocol.

Preparation of Seeds

The average weight of seeds is calculated by weighing 3 samples of 100 size selected seeds each and calculating the average weight of a seed. This value is used to calculate the target dose of endophyte per seed. The target dose is generally between 10^0-10^6 CFU per seed, in some cases at least 10^3 CFU per seed, or at least 10^4 CFU per seed. Table Z lists the target dose for endophytes of the present invention as applied to larger seeds (for example corn, soy and cotton) and smaller seeds (for example, wheat, rice, barley, oats). Other types of plants may be treated, and dosage determined based on the similarity of those seeds to the seeds listed in Table Z.

TABLE Z

Target doses in for endophytes of the present invention by crop type.

| | Target dose (CFU per seed) | |
|---|---|---|
| | Large seeds: Corn/Soy/Cotton | Small seeds: Wheat/Rice/Barley/Oat |
| MIC-67967 | 1.00E+05 | 2.25E+04 |
| MIC-18905 | 1.00E+05 | 2.25E+04 |
| MIC-84302 | 1.00E+05 | 1.00E+04 |
| MIC-54347 | 1.00E+04 | 1.00E+03 |

Preparation of Bacterial and Fungal Endophytes

MIC-54347 is produced by solid state fermentation. A seed flask containing potato dextrose broth (PDB) is inoculated with MIC-54347 and incubated for 7 days. Soil substrate consisting of 33% millet, 9.4% vermiculite, 9.4% clay, 2.8% wheat bran, 0.6% yeast extract, 45% water is inoculated with the seed culture, and the culture grown for approximately 14 days at 24 C. Total biomass is collected. The total volume of inoculum needed to treat the seeds with the desired dose was calculated based on the target dose. The target dose is generally between 10^0-10^6 CFU per seed, in some cases at least 10^3 CFU per seed, or at least 10^4 CFU per seed. The inoculum is diluted with sterile 1×PBS so that the total volume of inoculum per seed is about 2.5 μl/seed for corn, about 1.5 microliters/seed for wheat and soy, and about 1.5 microliters/seed for cotton. Control treatments were prepared using equivalent volumes of sterile 1×PBS. The inoculum solution is combined with a treatment formulation containing talc and mineral oil and is applied to the prepared seeds and mixed well.

MIC-67967, MIC-84302, and MIC-18905 are produced by liquid state fermentation. A seed flask containing trypticase soy broth (TSB) is inoculated with the endophyte and incubated for 24 hours. Liquid fermentation is completed in a bioreactor. Total biomass is collected. The target dose is generally between 10^0-10^6 CFU per seed, in some cases at least 10^3 CFU per seed, or at least 10^4 CFU per seed. The biomass suspension is diluted with sterile 1×PBS so that the total volume of inoculum per seed is about 2.5 μl/seed for corn, about 1.5 μl/seed for wheat and soy, and about 1.5 μl/seed for cotton. Control treatments were prepared using equivalent volumes of sterile 1×PBS. For MIC-67967 and MIC-84302 the diluted biomass suspension is applied to the prepared seeds directly and mixed well. For MIC-67967 and MIC-84302 the biomass suspension is dried and combined with a treatment formulation containing talc and mineral oil and is applied to the prepared seeds and mixed well.

Example 5. Greenhouse Assessment of Improved Plant Characteristics Under Water Deficit This example describes an exemplary method by which improved plant health of endophyte treated plants may be shown in a growth environment comprising a water deficit.

Greenhouse assay setup: This greenhouse assay is conducted in individual plastic pots, filled with moistened potting soil. This greenhouse assay is conducted using seeds (optionally, chemically treated) coated with one or more endophytes described herein and formulation control (lacking the one or more heterologously disposed endophytes) and untreated controls (lacking formulation and the one or more heterologously disposed endophyte) as described in Example 4. Seeds are placed onto each pot and lightly covered with potting mix. Replicated pots of each treatment are set up and placed on a greenhouse bench using a random block design. For example, 18 replicates are planted for each treatment and control. Plants are monitored daily for emergence and watered as necessary to maintain a moist but not saturated soil surface (for example, plants are watered with 125 ml Hoagland's solution (8 mM N) (Hoagland, D. R. and D. I. Arnon. 1950. The water culture method for growing plant without soil. California Agri. Exp. Sta. Cir. No. 347. University of California Berkley Press, CA., pp: 347) per pot on every Monday, Wednesday and Friday).

The following growth and vigor metrics are measured for each treatment: percentage emergence at Day 4, 5, 7 (for soybean, winter wheat and cotton) or Day 3, 4, 5 (for corn), leaf count (the number of fully expanded leaves on the main stem) at Days 10, 17 and 24.

At Day 14 after planting, the potting mix in each pot is fully saturated (for example, 150 ml Hoagland's solution is added to each pot and the soil given time to fully absorb the solution, before an additional 150 ml Hoagland's solution). On subsequent days plants are observed and assigned a wilt score. Wilt scores range from 1-9 and are more fully described in the following table.

TABLE A

Description of phenotypes for each wilt scores

| Wilt score | Description of wilt phenotype |
|---|---|
| 9 | Normal no wilting - turgid green healthy |
| 8 | Leaves start losing turgor but are not soft yet no folding or rolling or change of leaf surface some small area of leaves becomes pale between the minor veins |
| 7 | Leaves further lose turgor become soft and pale at least one leaf starts slightly rolling |
| 6 | Leaves are further soft and pale all leaves are rolling except the center growing leaf |
| 5 | All leaves are very soft and pale with rolling - one leaf may be completely closed |
| 4 | Whole plant looks very bad - center leaves are very pale and rolling badly - all leaves may be completely closed - leaf sheath starts losing turgor |
| 3 | Leaf base is still fresh - leaf sheath loses turgor 2 lower leaves start drying |
| 2 | Center leaf starts drying - leaf base is not fresh anymore - all leaves are dried |
| 1 | For any plant that is worse than score 2 - the wilting score will be 1 |

Watering is withheld until 80% of plants have a wilt score of at least 4. Pots are then fully saturated and a normal watering schedule resumed. Additional vigor and growth metrics may be measured during recovery including shoot height, area of chlorosis, turgor pressure of leaves, number of live leaves, etc. After a recovery period, for example 1 week, plants are gently removed from pots, washed with tap water to remove dirt, and photographed. Optionally, plant tissue is collected for nutrient composition analysis. Plants are put into a paper bag and dried in an oven. Optionally, the plant is separated into shoot and root tissue prior to drying. The dry weight of each individual plant, or shoot or root thereof, is recorded.

Example 6. Greenhouse Assessment of Improved Plant Characteristics Under Nitrogen Deficit This example describes an exemplary method by which improved plant health of endophyte treated plants may be shown in a growth environment comprising a nitrogen deficit.

Greenhouse assay setup: This greenhouse assay is conducted in individual plastic pots, filled with moistened potting soil. This greenhouse assay is conducted using seeds (optionally, chemically treated) coated with one or more endophytes described herein and formulation control (lacking the one or more heterologously disposed endophytes) and untreated controls (lacking formulation and the one or more heterologously disposed endophyte) as described in Example 4. Seeds are placed onto each pot and lightly covered with potting mix. Replicated pots of each treatment are set up and placed on a greenhouse bench using a random block design. For example, 18 replicates are planted for each treatment and control. Nitrogen deficit is introduced by reducing the Nitrogen in the Hoagland's solution (3 mM N), which is used to water the plants. Plants are monitored daily for emergence and watered as necessary to maintain a moist but not saturated soil surface (for example, plants are watered with 125 ml Hoagland's solution (3 mM N) per pot on every Monday, Wednesday and Friday).

The following growth and vigor metrics are collected for each treatment: percentage emergence at Day 4, 5, 7 (for soybean, winter wheat and cotton) or Day 3, 4, 5 (for corn), leaf count (the number of fully expanded leaves on the main stem) at Days 10, 17 and 24.

Additional vigor and growth metrics may be collected including shoot height, leaf area, number of chlorotic leaves, chlorophyll content, number of live leaves, etc. At harvest plants are gently removed from pots, washed with tap water to remove dirt, and photographed. Plant tissue is collected for nutrient composition analysis. Plants are put into a paper bag and dried in an oven. Optionally, the plant is separated into shoot and root tissue prior to drying. The dry weight of each individual plant, or shoot or root thereof, is recorded.

Example 7. Greenhouse Assessment of Improved Plant Characteristics Under Phosphorus Deficit This example describes an exemplary method by which improved plant health of endophyte treated plants may be shown in a growth environment comprising a phosphorus deficit.

This greenhouse assay is conducted in individual plastic pots, filled with moistened potting soil. This greenhouse assay is conducted using seeds (optionally, chemically treated) coated with one or more endophytes described herein and formulation control (lacking the one or more heterologously disposed endophytes) and untreated controls (lacking formulation and the one or more heterologously disposed endophyte) as described in Example 4. Seeds are placed onto each pot and lightly covered with potting mix. Replicated pots of each treatment are set up and placed on a greenhouse bench using a random block design. For example, 16 replicates are planted for each treatment and control. Phosphorus deficit is introduced by removing Phosphorus from the Hoagland's solution (0 mM P), which is used to water the plants. Plants are monitored daily for emergence and watered as necessary to maintain a moist but not saturated soil surface (for example, plants are watered with 125 ml Hoagland's solution (0 mM P) per pot on every Monday, Wednesday and Friday).

The following growth and vigor metrics are collected for each treatment: percentage emergence at Day 4, 5, 7 (for soybean, winter wheat and cotton) or Day 3, 4, 5 (for corn), leaf count (the number of fully expanded leaves on the main stem) at Days 10, 17 and 24.

Additional vigor and growth metrics may be collected including shoot height, leaf area, coloration of leaves, number of live leaves, etc. At harvest plants are gently removed from pots, washed with tap water to remove dirt, and photographed. Plant tissue is collected for nutrient composition analysis. Plants are put into a paper bag and dried in an oven. Optionally, the plant is separated into shoot and root tissue prior to drying. The dry weight of each individual plant, or shoot or root thereof, is recorded.

Example 8. Greenhouse Assessment of Improved Plant Health Under Biotic Stress

This example describes an exemplary method by which improved plant health of endophyte treated plants was shown in a growth environment comprising the crop pathogen *Rhizoctonia solani* or *Pythium ultimum*, causal agents of seedling damping off disease. This assay may utilize dicots or monocots, though results for soybean, cotton and wheat are described here.

Preparation of pathogen inoculum A stock of *Rhizoctonia solani* anastomosis group 4 or *Pythium ultimum* var. *ultimum* was grown on a standard potato dextrose agar plate. Plugs of fresh mycelium were then transferred into standard potato dextrose broth. After sufficient growth was achieved, the culture was poured though cheesecloth to capture the fungal biomass, which was subsequently rinsed with water. After removing excess rinse water, a roughly equivalent volume of water was added to the fungal biomass before blending to create a slurry. The resulting slurry was further diluted to the required concentration necessary to observe desired level of symptoms.

Greenhouse assay setup The greenhouse assay was conducted in a commercial potting mix. A divot was placed in the center of a pot containing wetted soil using a standardized dibble. An appropriate volume of slurry was added to the center of each divot.

This greenhouse assay was conducted using seeds coated with one or more endophytes described herein and formulation control (lacking the one or more heterologously disposed endophytes) and untreated controls (lacking formulation and the one or more heterologously disposed endophyte) as described in Example 4. Seeds were placed onto each divot after addition of the inoculum. The seeds were then covered with uninoculated soil and again watered. High soil moisture levels were maintained throughout the course of the experiment. Replicates were included in a randomized design to obtain sufficient statistical power for analysis. Plants were grown in a controlled environment until approximately 4 days post emergence of control plants. At this point fresh shoot weight was measured on a per plant basis. The assay was repeated multiple times for some endophytes, results are shown in Tables 6 and 7.

TABLE 6

Greenhouse screening of endophytes with activity against *Pythium*, each line in the table represents an experiment

| MIC ID # | Crop | Stressor | Metric | % Delta relative to Control |
|---|---|---|---|---|
| MIC-84302 | Winter wheat | *Pythium* | Shoot Fresh Weight | −1.02 |
| MIC-84302 | Winter wheat | *Pythium* | Shoot Fresh Weight | −4.07 |
| MIC-67967 | Winter wheat | *Pythium* | Shoot Fresh Weight | −42.78 |
| MIC-18905 | Winter wheat | *Pythium* | Shoot Fresh Weight | 136.15 |
| MIC-18905 | Winter wheat | *Pythium* | Shoot Fresh Weight | 68.75 |
| MIC-18905 | Winter wheat | *Pythium* | Shoot Fresh Weight | 92.09 |
| MIC-54347 | Winter wheat | *Pythium* | Shoot Fresh Weight | −9.53 |
| MIC-84302 | Soybean | *Pythium* | Shoot Fresh Weight | 88.86 |
| MIC-67967 | Soybean | *Pythium* | Shoot Fresh Weight | 22.32 |
| MIC-67967 | Soybean | *Pythium* | Shoot Fresh Weight | −1.76 |
| MIC-18905 | Soybean | *Pythium* | Shoot Fresh Weight | 4.53 |
| MIC-18905 | Soybean | *Pythium* | Shoot Fresh Weight | 7.21 |
| MIC-18905 | Soybean | *Pythium* | Shoot Fresh Weight | 43.16 |
| MIC-18905 | Soybean | *Pythium* | Shoot Fresh Weight | 81.68 |
| MIC-54347 | Soybean | *Pythium* | Shoot Fresh Weight | 0.4 |
| MIC-54347 | Soybean | *Pythium* | Shoot Fresh Weight | 14.19 |
| MIC-54347 | Soybean | *Pythium* | Shoot Fresh Weight | 68.62 |
| MIC-54347 | Soybean | *Pythium* | Shoot Fresh Weight | 113.51 |
| MIC-54347 | Soybean | *Pythium* | Shoot Fresh Weight | −4.15 |
| MIC-54347 | Soybean | *Pythium* | Shoot Fresh Weight | −41.18 |
| MIC-18905 | Cotton | *Pythium* | Shoot Fresh Weight | 14.23 |
| MIC-18905 | Cotton | *Pythium* | Shoot Fresh Weight | −41.34 |

TABLE 7

Greenhouse screening of endophytes with activity against *Rhizoctonia*, each line in the table represents an experiment

| MIC # | Crop | Stressor | Metric | Experiment ID | % Delta relative to Control |
|---|---|---|---|---|---|
| MIC-84302 | Winter wheat | *Rhizoctonia* | Shoot Fresh Weight | FSV0014_13 | 12.45 |
| MIC-84302 | Winter wheat | *Rhizoctonia* | Shoot Fresh Weight | FSV0145_22 | −12.46 |
| MIC-67967 | Winter wheat | *Rhizoctonia* | Shoot Fresh Weight | FSV0032_12 | −14.04 |
| MIC-67967 | Winter wheat | *Rhizoctonia* | Shoot Fresh Weight | FSV0034_14 | −10.37 |
| MIC-67967 | Winter wheat | *Rhizoctonia* | Shoot Fresh Weight | FSV0041_16 | −21.83 |
| MIC-18905 | Winter wheat | *Rhizoctonia* | Shoot Fresh Weight | FSV0040_12 | 72.48 |
| MIC-18905 | Winter wheat | *Rhizoctonia* | Shoot Fresh Weight | FSV0145_22 | −18.22 |
| MIC-18905 | Winter wheat | *Rhizoctonia* | Shoot Fresh Weight | FSV0146_21 | −2.9 |
| MIC-54347 | Winter wheat | *Rhizoctonia* | Shoot Fresh Weight | FSV0008_18 | 1.07 |
| MIC-54347 | Winter wheat | *Rhizoctonia* | Shoot Fresh Weight | FSV0023_16 | 26.72 |
| MIC-54347 | Winter wheat | *Rhizoctonia* | Shoot Fresh Weight | FSV0133_64 | −8.13 |
| MIC-54347 | Winter wheat | *Rhizoctonia* | Shoot Fresh Weight | FSV0142_61 | 143.96 |
| MIC-84302 | Soybean | *Rhizoctonia* | Shoot Fresh Weight | FSV0145_02 | −7.28 |
| MIC-67967 | Soybean | *Rhizoctonia* | Shoot Fresh Weight | FSV0032_11 | 35.61 |
| MIC-67967 | Soybean | *Rhizoctonia* | Shoot Fresh Weight | FSV0041_11 | 1.95 |
| MIC-18905 | Soybean | *Rhizoctonia* | Shoot Fresh Weight | FSV0040_11 | 10.42 |
| MIC-18905 | Soybean | *Rhizoctonia* | Shoot Fresh Weight | FSV0133_42 | 29.2 |
| MIC-18905 | Soybean | *Rhizoctonia* | Shoot Fresh Weight | FSV0145_02 | −37.67 |

TABLE 7-continued

Greenhouse screening of endophytes with activity against *Rhizoctonia*, each line in the table represents an experiment

| MIC # | Crop | Stressor | Metric | Experiment ID | % Delta relative to Control |
|---|---|---|---|---|---|
| MIC-54347 | Soybean | *Rhizoctonia* | Shoot Fresh Weight | FSV0008_17 | 32.73 |
| MIC-54347 | Soybean | *Rhizoctonia* | Shoot Fresh Weight | FSV0030_11 | 56.17 |
| MIC-54347 | Soybean | *Rhizoctonia* | Shoot Fresh Weight | FSV0034_15 | 33.48 |
| MIC-54347 | Soybean | *Rhizoctonia* | Shoot Fresh Weight | FSV0142_21 | 202.2 |
| MIC-54347 | Soybean | *Rhizoctonia* | Shoot Fresh Weight | FSV0153_43 | 2.73 |
| MIC-84302 | Cotton | *Rhizoctonia* | Shoot Fresh Weight | FSV0132_22 | −14.36 |
| MIC-18905 | Cotton | *Rhizoctonia* | Shoot Fresh Weight | FSV0069_02 | −51.71 |
| MIC-18905 | Cotton | *Rhizoctonia* | Shoot Fresh Weight | FSV0112_16 | −30.19 |
| MIC-54347 | Cotton | *Rhizoctonia* | Shoot Fresh Weight | FSV0112_13 | 16.66 |

Example 9. Soybean Cyst Nematode Preparation

The eggs of *Heterodera glycines* are extracted from soybean stock culture and are used as inoculum for in vitro, growth chamber, greenhouse, and microplot experiments.

In one embodiment, the following method is used. Eggs are extracted from a 60-day-old soybean stock culture maintained in, e.g., 500 ml polystyrene pots. The soil is gently washed from the soybean roots and cysts and females are dislodged from the roots. Water with the cyst and female suspension is poured through nested 850-μm-pore and 250-μm-pore sieves to separate trash from cysts and females. Cysts and females are ground with a mortar and pestle to release the eggs. Eggs are washed with water, collected on a 25-μm-pore sieve, transferred to two 50 ml centrifuge tubes, and spun for 5 minutes at 1,750 r.p.m. The supernatant liquid is then poured off and a sugar solution added (1 lb. cane sugar, 1 liter water), thoroughly mixing sugar solution and sediment. The suspension is centrifuged at 240 g for 1 minute. The supernatant containing the nematodes is poured on to the 25-μm-pore sieve. After rinsing the sugar away with water, the nematodes are ready for use. For in vitro tests, *H. glycines* eggs are placed in a modified Baermann funnel (Castillo J D., Lawrence K S., Kloepper J W. Biocontrol of the reniform nematode by *Bacillus firmus* GB126 and *Paecilomyces lilacinus* 251 on cotton. Plant Disease. 2013; 97: 967-976) on a Slide Warmer (Model 77) (Marshall Scientific, Brentwood, NH) and incubated at 31° C. for 5 to 7 days to obtain the J2. The J2 are collected on a 25-μm-pore sieve, transferred to 1.5 ml microcentrifuge tubes, centrifuged at 5,000 g for 1 minute, rinsed with sterile distilled water, and centrifuged at 5,000 g for 1 minute. The J2 suspensions are adjusted to 30 to 40 J2 per 10 μl of water. Eggs are enumerated at 40× magnification with an inverted TS100 Nikon microscope and standardized to 2,000 eggs per 500 ml polystyrene pot.

Example 10. Greenhouse Assessment of Improved Plant Health Under Biotic Stress (Soybean Cyst Nematode)

This example describes an exemplary method by which improved plant health of endophyte treated plants may be shown in a growth environment comprising the crop pest soybean cyst nematode (*Heterodera glycines*).

Greenhouse assays are conducted using soybean seeds (optionally, chemically treated soybean seeds) coated with one or more of the endophytes described herein and formulation control (lacking the one or more heterologously disposed endophytes) and untreated controls (lacking formulation and the one or more heterologously disposed endophyte) as described in Example 4. Microbe treated soybean seeds are planted, infected with nematodes, maintained, and phenotyped in grow rooms.

In one embodiment, the following method is used. 98 cones are placed in each cone-tainer to obtain the needed number of cone-tainers. Masks are placed over cones and cones are filled with soil. The cone-tainer is place in a deep pan and water is added until the soil in the cones is saturated. Two soybean seeds are planted 2.5 cm deep in each cone-tainer. Each cone-tainer is placed in a growth tub and watered.

One ml containing 2,000 *H. glycines* eggs is pipetted into each cone-tainer at planting or the desired number of days after planting. Seedlings are thinned to one per cone-tainer after emergence and watered as appropriate.

Phenotyping is performed as follows. The height of each plant is measured, e.g., by placing the ruler on the lip of a cell and measuring the plant's height to the nearest millimeter. The mass of each plant is measured, e.g., by cutting the plant at the soil surface, placing the shoot in the weighing container, allowing the weight to stabilize, and autorecording the mass via the scale's software. The number of *H. glycines* cysts may be counted after extraction from soybean roots as described herein. The water suspension containing 150 cm^3 of soil is poured through nested 75-μm and 25-μm-pore sieves to extract vermiform stages (juveniles and males). Vermiform stages are collected on the 75-μm-pore sieve and centrifuged using, e.g., the sucrose centrifugation-flotation method.

Example 11. Greenhouse Assessment of Improved Plant Health Under Biotic Stress (Soybean Aphid)

This example describes an exemplary method by which improved plant health of endophyte treated plants may be shown in a growth environment comprising the crop pest soybean aphid (*Aphis glycines*).

Greenhouse assays are conducted using soybean seeds (optionally, chemically treated soybean seeds) coated with one or more of the endophytes described herein and formulation control (lacking the one or more heterologously disposed endophytes) and untreated controls (lacking formulation and the one or more heterologously disposed endophyte) as described in Example 4. Microbe treated soybean seeds are planted, infected with soybean aphids (*Aphis glycines*), maintained in grow rooms, and phenotyped.

In one embodiment, the following method is used. 98 cones are placed in each cone-tainer to obtain the needed number of cone-tainers. Masks are placed over cones and cones are filled with potting medium or soil. The cone-tainer is place in a deep pan and water is added until the soil in the cones is saturated. One soybean seed is planted in each cone-tainer. Each cone-tainer is placed in a growth tub and watered.

A community of soybean aphids is maintained on a stock of soybean plants. To prepare for infestation of the experimental plants, leaves are removed from infested soybean plants from the stock community. One or more leaves are examined under a stereoscope to make sure the aphids are alive and vigorous. Infested leaf cutlets are placed in square plates to maintain leaves alive until the treatment plants are infested with aphids. In some embodiments, 20 infested leaf cutlets are used per each 98 cone tray used in the experiment. The infested leaf cutlets are introduced to the growth environment of the experimental plants at planting or the desired number of days after planting, in some embodiments, 9 days after planting. The experimental cone-tainers are infested following an infestation pattern to allow for aphid choice feeding in planta. The infested experimental plants are maintained in their growth environment until phenotyping.

The plants may be phenotyped at one or more times after infestation, for example 1 day, 4 days, 7 days or more after infestation. Measurement of one or more traits of agronomic importance is performed as follows. The height of each plant is measured, e.g., by placing the ruler on the lip of a cell and measuring the plant's height to the nearest millimeter or using an automated tool such as a Phenospex PlantEye 3D laser scanner (Phenospex B.V., Heerlen, The Netherlands). Other traits of agronomic importance may be measured either manually or using a tool such as the Phenospex PlantEye 3D laser scanner, for example the greenness of the plants and the leaf and/or above ground plant area. The mass of each plant may be measured for example via destructive sampling, e.g., by cutting the plant at the soil surface, placing the shoot in the weighing container, allowing the weight to stabilize, and autorecording the mass via the scale's software. The experimental plants may be maintained through their reproductive stages, and traits of agronomic importance such as number of flowers, number of pods and number of seeds per pod may be measured.

Example 12. Greenhouse Assessment of Improved Plant Health Under Biotic Stress This example describes an exemplary method by which improved plant health of endophyte treated plants was shown in a growth environment comprising the crop pathogen *Fusarium* sp., one of the causal agents of seedling damping off disease. This assay may utilize dicots or monocots, including, for example, soybean and wheat as shown here.

Preparation of *Fusarium* sp. inoculum A stock of *Fusarium* sp. was grown on a standard potato dextrose agar plate. Plugs of fresh mycelium were then transferred into breathable bag containing a sterile mixture of water and grain such as sorghum or millet. After sufficient growth is achieved, the culture was removed from the bags and dried. After drying the biomass was coarsely ground.

Greenhouse assay setup The greenhouse assay was conducted in a media mixture consisting of a commercial potting mix and a minimum of 50% inert inorganic material. An appropriate volume of ground pathogen was added to the soil mixture to obtain moderate to severe symptoms.

This greenhouse assay was conducted using seeds coated with one or more endophytes described herein and formulation control (lacking the one or more heterologously disposed endophytes) and untreated controls (lacking formulation and the one or more heterologously disposed endophyte) as described in Example 4. A seed was added to the surface of the infested media. The seed was then covered with media lacking pathogen and again watered. High soil moisture levels were maintained throughout the course of the experiment. Replicates were included in a randomized design to obtain sufficient statistical power for analysis. Plants were grown in a controlled environment until approximately 4 days post emergence of control plants. At this point shoot fresh weight was measured on a per plant basis. The assay was repeated multiple times for some endophytes, results are shown in Table 8.

TABLE 8

Greenhouse screening of endophytes with activity against *Fusarium*, each line in the table represents an experiment

| MIC ID# | Crop | Stressor | Metric | % Delta relative to Stress Control |
|---|---|---|---|---|
| MIC-84302 | Winter wheat | *Fusarium* | Shoot Fresh Weight | 64.34 |
| MIC-84302 | Winter wheat | *Fusarium* | Shoot Fresh Weight | 46.2 |
| MIC-67967 | Winter wheat | *Fusarium* | Shoot Fresh Weight | 34.97 |
| MIC-67967 | Winter wheat | *Fusarium* | Shoot Fresh Weight | −9.15 |
| MIC-67967 | Winter wheat | *Fusarium* | Shoot Fresh Weight | 11.37 |
| MIC-67967 | Winter wheat | *Fusarium* | Shoot Fresh Weight | 4.91 |
| MIC-18905 | Winter wheat | *Fusarium* | Shoot Fresh Weight | 3.79 |
| MIC-18905 | Winter wheat | *Fusarium* | Shoot Fresh Weight | −15.23 |
| MIC-18905 | Winter wheat | *Fusarium* | Shoot Fresh Weight | −42.18 |
| MIC-18905 | Winter wheat | *Fusarium* | Shoot Fresh Weight | 29.41 |
| MIC-54347 | Winter wheat | *Fusarium* | Shoot Fresh Weight | 41.74 |
| MIC-54347 | Winter wheat | *Fusarium* | Shoot Fresh Weight | 66.32 |
| MIC-54347 | Winter wheat | *Fusarium* | Shoot Fresh Weight | −8.71 |
| MIC-54347 | Winter wheat | *Fusarium* | Shoot Fresh Weight | 29.77 |
| MIC-54347 | Winter wheat | *Fusarium* | Shoot Fresh Weight | 52.66 |
| MIC-84302 | Soybean | *Fusarium* | Shoot Fresh Weight | 28.41 |
| MIC-84302 | Soybean | *Fusarium* | Shoot Fresh Weight | −29.38 |
| MIC-84302 | Soybean | *Fusarium* | Shoot Fresh Weight | −12.55 |
| MIC-67967 | Soybean | *Fusarium* | Shoot Fresh Weight | 16.92 |
| MIC-67967 | Soybean | *Fusarium* | Shoot Fresh Weight | 59.68 |
| MIC-67967 | Soybean | *Fusarium* | Shoot Fresh Weight | 2.8 |
| MIC-67967 | Soybean | *Fusarium* | Shoot Fresh Weight | 4.76 |
| MIC-18905 | Soybean | *Fusarium* | Shoot Fresh Weight | 69.36 |
| MIC-18905 | Soybean | *Fusarium* | Shoot Fresh Weight | 46.11 |
| MIC-18905 | Soybean | *Fusarium* | Shoot Fresh Weight | 74.47 |
| MIC-18905 | Soybean | *Fusarium* | Shoot Fresh Weight | 39.84 |
| MIC-54347 | Soybean | *Fusarium* | Shoot Fresh Weight | 14.7 |
| MIC-54347 | Soybean | *Fusarium* | Shoot Fresh Weight | 9.11 |
| MIC-54347 | Soybean | *Fusarium* | Shoot Fresh Weight | 31.04 |
| MIC-54347 | Soybean | *Fusarium* | Shoot Fresh Weight | 13.63 |

Example 13. Field Assessment of Improved Plant Health of Soy Under Biotic Stress This example describes an exemplary method by which improved plant health of endophyte treated plants may be shown in a growth environment comprising the crop pests root knot nematode (*Meloidogyne incognita*), Reniform nematode (*Rotylenchulus reniformis*), and, opportunistically, the fungal pathogen *Fusarium virguliforme*.

Field trials are conducted using chemically treated soy seeds coated with one or more of the endophytes described herein and formulation control (lacking the one or more heterologously disposed endophytes) and untreated controls (lacking formulation and the one or more heterologously disposed endophyte) as a flowable powder described in Example 4. Plots for in-field assessment harbor populations of root knot nematode and Reniform nematode, respectively, at an approximately 1.0+E04 eggs per gram of fresh root weight. Opportunistically, these plots are infected with natural inoculum of *Fusarium virguliforme*, the causal agent of *Fusarium* Sudden Death Syndrome (SDS). Replicate plots, preferably at least 4 replicate plots, are planted per endophyte or control treatment in a randomized complete block design. Each plot consists of a 7.62 m (25 ft.) by 0.76 m (2.5 ft.) row. The following early growth metrics are measured: percent emergence at 14 days post planting, standing count at 28 and 45 days post planting, plant vigor at 14, 28, and 45 days post planting, plant height at 45 days post planting, fresh shoot weight, fresh root weight, disease rating at a 0-3 scale (3 denotes strong disease symptoms) using the split-root scoring system at 45 days post planting, nematode count at 45 days post planting, and yield parameters.

At the end of the field trial employing endophyte treatment and control treatment plants, plants (preferably at least 4 plants) are randomly dug out from each row, kept in a plastic bag, and brought back to lab. For each seedling, shoot and root are separated by cutting the seedling 3 cm from the first branch of the root. The heights of the separated shoot of each plant are measured, followed by fresh shoot weight, and fresh root weight. The main root is vertically split into two halves and discoloration of xylem is scored as described above. To extract and count nematode eggs on root, roots are place in a container prefilled with 100 ml 10% sucrose and incubated on a shaker at room temperature overnight. The supernatant is then collected and nematode eggs are counted under a stereomicroscope.

The percentage of survival plants, fresh root weight, and nematode egg count are plotted as bar graph of mean±95% confidence interval from the mean using the ggplot2 package of R (R Core Team, 2016. R: A language and environment for statistical computing. R Foundation for Statistical Computing, Vienna, Austria. R-project.org/). Plant heights, fresh shoot weight, and disease scores are plotted as jittered dot of mean±nonparametric bootstrap (1000) of 95% confidence interval from the mean using the ggplot2 package of R.

Example 14. Field Assessment of Improved Plant Health of Cotton Under Biotic Stress This example describes an exemplary method by which improved plant health of endophyte treated plants may be shown in a growth environment comprising the crop pests root knot nematode (*Meloidogyne incognita*), Reniform nematode (*Rotylenchulus reniformis*), and, opportunistically, the fungal pathogen *Fusarium virguliforme*.

Field trials are conducted using chemically treated cotton seeds coated with one or more of the endophytes described herein and formulation control (lacking the one or more heterologously disposed endophytes) and untreated controls (lacking formulation and the one or more heterologously disposed endophyte) as described in Example 4. Plots for in-field assessment harbor populations of root knot nematode and Reniform nematode, respectively, at an approximately 1.0+E04 eggs per gram of fresh root weight. Opportunistically, these plots are infected with natural inoculum of *Fusarium virguliforme*, the causal agent of *Fusarium* SDS. Replicate plots, preferably at least 4 replicate plots, are planted per endophyte or control treatment in a randomized complete block design. Each plot consists of a 7.62 m (25 ft.) by 0.76 m (2.5 ft.) row. The following early growth metrics are measured: percent emergence at 14 days post planting, standing count at 28 and 45 days post planting, plant vigor at 14, 28, and 45 days post planting, plant height at 45 days post planting, fresh shoot weight, fresh root weight, disease rating at a 0-3 scale (3 denotes strong disease symptoms) using the split-root scoring system at 45 days post planting, nematode count at 45 days post planting, and yield parameters.

At the end of the field trial employing endophyte treatment and control treatment plants, plants (preferably at least 4 plants) are randomly dug out from each row, kept in a plastic bag, and brought back to lab for metric measurements. For each seedling, shoot and root are separated by cutting the seedling 3 cm from the first branch of the root. The heights of the separated shoot of each plant are measured, followed by fresh shoot weight, and fresh root weight. The main root is vertically split into two halves and discoloration of xylem is scored as described above. To extract and count nematode eggs on root, roots are placed in a container prefilled with 100 ml 10% sucrose and incubated on a shaker at room temperature overnight. The supernatant is then collected and nematode eggs are counted under a stereomicroscope.

The percentage of survival plants, fresh root weight, and nematode egg count are plotted as bar graph of mean±95% confidence interval from the mean using the ggplot2 package of R (R Core Team, 2016. R: A language and environment for statistical computing. R Foundation for Statistical Computing, Vienna, Austria. R-project.org/). Plant heights, fresh shoot weight, and disease scores are plotted as jittered dot of mean±nonparametric bootstrap (1000) of 95% confidence interval from the mean using the ggplot2 package of R.

Example 15. Field Assessment of Improved Plant Health of Winter Wheat Under Biotic Stress This example describes a method for detection of improved plant health of endophyte treated winter wheat in a growth environment comprising the crop pathogens *Rhizoctonia* spp., *Pythium* spp., and *Fusarium* spp (causal agents of damping-off disease).

Field trials were conducted using winter wheat seeds coated with MIC-84302 and untreated controls (lacking formulation and the heterologously disposed endophyte). *Rhizoctonia, Fusarium*, and *Pythium* inoculant were applied per standard practice to each seed packet before planting. Five replicate plots were planted per endophyte treatment and control treatment in a randomized complete block design. Each plot consisted of a 6 ft. by 20 ft. block. Irrigation was applied pre-planting and in early season to maximize disease pressure.

Plots were harvested by machine, and yield was calculated by the on-board computer.

TABLE 9

Yield of endophyte treated winter wheat under biotic stress.

| MIC# | SEQ ID NO: | Crop | Metric | % Delta relative to Control |
|---|---|---|---|---|
| MIC-84302 | 132-136 | Winter wheat | Yield | 7.3 |

Example 16. Field Assessment of Improved Plant Health of Corn Under Biotic Stress This example describes a method for detection of improved plant health of endophyte treated corn in a growth environment comprising the crop pathogen *Fusarium* spp.

Field trials were conducted using corn seeds coated with MIC-67967, a control treated with chemical fungicide (lacking formulation and the heterologously disposed endophyte), and untreated controls (lacking formulation and the heterologously disposed endophyte). *Fusarium* inoculant was applied per standard practice to each seed packet before planting, targeting moderate level of disease infestation; enough to affect plant stand, but not to a level resulting in total loss. Five replicate plots were planted per endophyte treatment and control treatment in a randomized complete block design. Each plot consisted of a 25 ft. long, 2-4 row block.

Plots were harvested by machine, and yield was calculated by the on-board computer.

TABLE 10

Yield of endophyte treated corn under biotic stress.

| MIC# | SEQ ID NO: | Crop | Metric | % Delta relative to Control |
|---|---|---|---|---|
| MIC-67967 | 127-131 | Corn | Yield | 8.3 |
| MIC-67967 | 127-131 | Corn | Emergence | −8.6 |
| MIC-67967 | 127-131 | Corn | Plant Height | 11.2 |
| MIC-67967 | 127-131 | Corn | Shoot Weight | 33.7 |
| MIC-67967 | 127-131 | Corn | Root Weight | 51.5 |

Example 17. Field Assessment of Improved Plant Health of Corn Under Biotic Stress This example describes a method for detection of improved plant health of endophyte treated cotton in a growth environment comprising the crop pathogen *Fusarium* spp.

Field trials were conducted using cotton seeds coated with MIC-84302, a control treated with chemical fungicide (lacking formulation and the heterologously disposed endophyte), and untreated controls (lacking formulation and the heterologously disposed endophyte). *Fusarium* inoculant is applied per standard practice to each seed packet before planting, targeting moderate level of disease infestation; enough to affect plant stand, but not to a level resulting in total loss. Five replicate plots are planted per endophyte treatment and control treatment in a randomized complete block design. Each plot consists of a 25 ft. long, 2-4 row block. moderate level of disease infestation; enough to affect plant stand, but not to a level resulting in total loss.

Plots were harvested by machine, and yield was calculated by the on-board computer.

TABLE 11

Yield of endophyte treated cotton under biotic stress.

| MIC# | SEQ ID NO: | Crop | Metric | % Delta relative to Control |
|---|---|---|---|---|
| MIC-84302 | 132-136 | Cotton | Yield | −46.6 |
| MIC-84302 | 132-136 | Cotton | Shoot weight | 21.1 |
| MIC-84302 | 132-136 | Cotton | Root weight | 33.1 |
| MIC-84302 | 132-136 | Cotton | Plant height | 14.1 |
| MIC-84302 | 132-136 | Cotton | Stand count | 16.1 |

Example 18. Field Assessment of Improved Plant Health of Soybean Under Biotic Stress This example describes a method for detection of improved plant health of endophyte treated soybean in a growth environment comprising the crop pathogen *Pythium* sp., *Rhizoctonia* sp., and *Fusarium* sp.

Field trials were conducted using soybean seeds coated with a heterologously disposed endophyte treatment (MIC-54347), a control treated with chemical fungicide (lacking formulation and the heterologously disposed endophyte), and untreated controls (lacking formulation and the heterologously disposed endophyte). *Pythium ultimum* inoculant was applied in furrow, targeting moderate level of disease infestation; enough to affect plant stand, but not to a level resulting in total loss. Twelve data points were obtained from trials inoculated with the pathogen where stand reduction of at least 5% (or significant loss) occurred in the non-treated control relative to the chemically treated control. At least four replicate plots were planted per endophyte treatment and control treatment in a randomized complete block design. Each plot consisted of approximately a 25 ft. long, 2-4 row block.

Plots are harvested by machine, and yield is calculated by the on-board computer.

Early emergence is the number of emerged plants per acre, measured 0-2 days after the beginning of emergence. Full emergence is the number of emerged plants per acre, measured 10 days after the beginning of emergence. Plant height is the height of five plants per plot, measured 14-21 days after full emergence. Root weight is the weight of roots (cut at the soil line) of five plants per plot, measured 14-21 days after full emergence. Shoot weight is the weight of shoots (cut at soil line) of five plants per plot, measured 17 days after full emergence.

Soybean plants treated with MIC-54347 showed a 13.9% increase in shoot weight over untreated controls, with a 83.5% win-rate.

TABLE 12

Yield of endophyte treated soybean under biotic stress (*Pythium*)

| MIC# | SEQ ID NO: | Crop | Metric | % Delta relative to untreated control |
|---|---|---|---|---|
| Chemical control | | Soybean | Early emergence | −9.4 |
| Chemical control | | Soybean | Full emergence | 14.1 |
| Chemical control | | Soybean | Plant height | 1.6 |
| Chemical control | | Soybean | Root weight | 17.0 |
| Chemical control | | Soybean | Shoot weight | 7.4 |
| Chemical control | | Soybean | Yield | 2.1 |
| MIC-54347 | 32-126 | Soybean | Early emergence | 1.5 |
| MIC-54347 | 32-126 | Soybean | Full emergence | 7.6 |
| MIC-54347 | 32-126 | Soybean | Plant height | 2.6 |
| MIC-54347 | 32-126 | Soybean | Root weight | 11.8 |
| MIC-54347 | 32-126 | Soybean | Shoot weight | 13.9 |
| MIC-54347 | 32-126 | Soybean | Yield | 3.4 |

Field trials were conducted using soybean seeds coated with a heterologously disposed endophyte treatment (MIC-54347), a control treated with chemical fungicide (lacking formulation and the heterologously disposed endophyte), and untreated controls (lacking formulation and the heterologously disposed endophyte). *Rhizoctonia solani* inoculant was applied per standard practice to each seed packet before planting, targeting moderate level of disease infestation; enough to affect plant stand, but not to a level resulting in total loss. Twelve data points were obtained from trials inoculated with the pathogen where stand reduction of at least 5% (or significant loss) occurred in the non-treated control relative to the chemically treated control (only six data points were obtained for yield data). At least four replicate plots were planted per endophyte treatment and control treatment in a randomized complete block design. Each plot consisted of approximately a 25 ft. long, 2-4 row block.

Plots are harvested by machine, and yield is calculated by the on-board computer.

Early emergence is the number of emerged plants per acre, measured 0-2 days after the beginning of emergence. Full emergence is the number of emerged plants per acre, measured 10 days after the beginning of emergence. Plant height is the height of five plants per plot, measured 14-21 days after full emergence. Root weight is the weight of roots (cut at the soil line) of five plants per plot, measured 14-21 days after full emergence. Shoot weight is the weight of shoots (cut at soil line) of five plants per plot, measured 14-21 days after full emergence.

TABLE 12

Yield of endophyte treated soybean under biotic stress (*Rhizoctonia*).

| MIC# | SEQ ID NO: | Crop | Metric | % Delta relative to untreated control |
|---|---|---|---|---|
| Chemical control | | Soybean | Early emergence | 12.6 |
| Chemical control | | Soybean | Full emergence | 58.3 |
| Chemical control | | Soybean | Plant height | 2.6 |
| Chemical control | | Soybean | Root weight | −6.4 |
| Chemical control | | Soybean | Shoot weight | 13.4 |
| Chemical control | | Soybean | Yield | 34.5 |
| MIC-54347 | 32-126 | Soybean | Early emergence | −2.0 |
| MIC-54347 | 32-126 | Soybean | Full emergence | −10.7 |
| MIC-54347 | 32-126 | Soybean | Plant height | −0.2 |
| MIC-54347 | 32-126 | Soybean | Root weight | 5.8 |
| MIC-54347 | 32-126 | Soybean | Shoot weight | 8.3 |
| MIC-54347 | 32-126 | Soybean | Yield | 17.6 |

Field trials were conducted using soybean seeds coated with a heterologously disposed endophyte treatment (MIC-54347), a control treated with chemical fungicide (lacking formulation and the heterologously disposed endophyte), and untreated controls (lacking formulation and the heterologously disposed endophyte). *Fusarium graminearum* inoculant was applied in furrow, targeting moderate level of disease infestation; enough to affect plant stand, but not to a level resulting in total loss. Twelve data points were obtained from trials inoculated with the pathogen where stand reduction of at least 5% (or significant loss) occurred in the non-treated control relative to the chemically treated control. At least four replicate plots were planted per endophyte treatment and control treatment in a randomized complete block design. Each plot consisted of approximately a 25 ft. long, 2-4 row block.

Plots are harvested by machine, and yield is calculated by the on-board computer.

Early emergence is the number of emerged plants per acre, measured 0-2 days after the beginning of emergence. Full emergence is the number of emerged plants per acre, measured 10 days after the beginning of emergence. Plant height is the height of five plants per plot, measured 14-21 days after full emergence. Root weight is the weight of roots (cut at the soil line) of five plants per plot, measured 14-21 days after full emergence. Shoot weight is the weight of shoots (cut at soil line) of five plants per plot, measured 14-21 days after full emergence.

Soybean plants treated with MIC-54347 showed a 2.9% (1.77 bu/acre) increase in yield over untreated controls, with a 75% win-rate.

TABLE 12

Yield of endophyte treated soybean under biotic stress (*Fusarium*).

| MIC# | SEQ ID NO: | Crop | Metric | % Delta relative to untreated control |
|---|---|---|---|---|
| Chemical control | | Soybean | Early emergence | −25.7 |
| Chemical control | | Soybean | Full emergence | −3.1 |
| Chemical control | | Soybean | Plant height | −4.4 |
| Chemical control | | Soybean | Root weight | 5.3 |
| Chemical control | | Soybean | Shoot weight | 9.3 |
| Chemical control | | Soybean | Yield | 3.0 |
| MIC-54347 | 32-126 | Soybean | Early emergence | −18.6 |
| MIC-54347 | 32-126 | Soybean | Full emergence | −3.5 |
| MIC-54347 | 32-126 | Soybean | Plant height | −0.2 |
| MIC-54347 | 32-126 | Soybean | Root weight | 2.2 |
| MIC-54347 | 32-126 | Soybean | Shoot weight | 1.1 |
| MIC-54347 | 32-126 | Soybean | Yield | 2.9 |

Example 19. Method of Preparation of Endophytes and Heterologous Disposition of Endophytes on Seeds for Field Trials

Preparation of Endophytes

Bacteria: An agar plug of each bacterial strain is transferred using a transfer tube to 4 ml of potato dextrose broth (PDB) in a 24 well plate and incubated at room temperature at 675 rpm on a shaker for 3 days. After growth of bacteria in broth, 200 μl is transferred into a spectrophotometer reading plate and bacteria OD is read at 600 nm absorbance. All bacteria strains are then normalized to 0.05 OD utilizing PBS 1× buffer.

Fungi: Preparation of molasses broth and potato dextrose agar: Molasses broth is prepared by dissolving 30 g molasses and 5 g yeast extract per liter deionized water in an autoclavable container and autoclaving (15 psi, 121° C.) for 45 min. Potato dextrose agar (PDA) plates are prepared by dissolving 39.0 g PDA powder per liter deionized water in an autoclavable container and autoclaving (15 psi, 121° C.) for 45 min. The agar is allowed to cool to 50-60° C., before pouring into sterile petri plates (30 ml per 90 mm plate). Fungal endophyte treatments may be applied as either a dry or liquid formulation.

Liquid biomass: All equipment and consumables are thoroughly sterilized and procedures performed in a biosafety cabinet. The inoculant is prepared by placing 1 plug from a cryopreserved stock on a fresh PDA plate, sealing the plate with Parafilm® and incubating at room temperature in the dark for 5-10 days. Then ~5×5 mm plugs are cut from the PDA plates and 10-12 plugs are transferred into flasks containing the sterile molasses broth, covered, secured in a shaker and incubated for at least 10 days with shaking at ~130 rpm. Then the culture is placed in a blender for 5 seconds and 1 ml of the blended culture is centrifuged and the supernatant is discarded. The pellet is resuspended in 0.5 ml 1× Phosphate Buffered Saline (PBS) to generate inoculum.

Dry biomass: All equipment and consumables are thoroughly sterilized and procedures performed in a biosafety cabinet. The inoculant is prepared by placing 1 plug from a cryopreserved stock on a fresh PDA plate, sealing the plate with Parafilm® and incubating at room temperature in the dark for 5-10 days. Then ~5×5 mm plugs are cut from the PDA plates and 10-12 plugs are transferred into flasks containing the sterile molasses broth, covered, secured in a shaker and incubated for at least 10 days with shaking at ~130 rpm. In sterile conditions, the liquid culture is carefully decanted using 150 mm sterile filter paper on a sterilized Buchner funnel over a sterile flask. Once all liquid passes through the funnel, the pellet is rinsed with sterile water until the filtrate runs clear. When dry, the pellet is transferred to a drying cabinet and dried until brittle. The pellet is then ground into a fine powder, and sample is used to generate CFU counts.

Preparation of Formulation for Seed Treatments

A 2% weight/volume solution of sodium alginate for the seed coatings is prepared by the following method. An Erlenmeyer flask is filled with the appropriate volume of deionized water and warmed to 50 degrees Celsius on a heat plate with agitation using a stir bar. The appropriate mass of sodium alginate powder for the desired final concentration solution is slowly added until dissolved. The solution is autoclaved at 121 degrees Celsius at 15 PSI for 30 minutes to sterilize.

Talc for the powdered seed coatings is prepared by the following method. Talc is aliquoted into bags or 50 ml Falcon tubes and autoclaved in dry cycle (121 degrees Celsius at 15 PSI for 30 minutes) to sterilize.

Heterologous Disposition of Endophytes on Seeds

Seeds treated were heterologously disposed to each endophyte according to the following seed treatment protocol.

Liquid formulation: Liquid culture is added to the seeds at a rate of 23 (for fungal endophyte treatments) or 8.4 (for bacterial endophyte treatments) ml per kg of seeds, with equivalent volumes of the prepared sodium alginate. Control treatments are prepared using equivalent volumes of sterile broth. The seeds are then agitated to disperse the solution evenly on the seeds. For fungal endophytes, 15 g per kg of seed of talc powder as prepared above is added and the seeds are agitated to disperse the powder evenly on the seeds. Then 16.6 ml (for fungal endophyte treatments) or 2.4 ml (for bacterial endophyte treatments) per kg of seed of Flo-Rite® 1706 (BASF, Ludwigshafen, Germany) is added and the seeds are agitated to disperse the powder evenly on the seeds. Slightly less Flo-Rite® is used for small grains and canola seeds, slightly more Flo-Rite® is used for seeds such as corn, soy, cotton and peanut seeds. The target dose is generally between 10^0-10^6 CFU per seed, in some cases at least 10^3 CFU per seed, or at least 10^4 CFU per seed. Treated seeds are allowed to dry overnight in a well-ventilated space before planting.

Dry formulation: The 2% sodium alginate solution prepared above is added to the seeds at a rate of 23 ml per kg of seeds. Equal parts of dry biomass and talc prepared as above are mixed. The solution is applied so that an equivalent of 10 g of powdered dry biomass is applied per kg of seeds. Control treatments are prepared using equivalent volumes of talc. The seeds are then agitated to disperse the solution evenly on the seeds. Then 16.6 ml per kg of seed of Flo-Rite® 1706 (BASF, Ludwigshafen, Germany) is added and the seeds are agitated to disperse the powder evenly on the seeds. Slightly less Flo-Rite® is used for small grains and canola seeds, slightly more Flo-Rite® is used for seeds such as corn soy, cotton and peanut seeds. The target dose is generally between 10^0-10^6 CFU per seed, in some cases at least 10^3 CFU per seed, or at least 10^4 CFU per seed. Treated seeds are allowed to dry overnight in a well-ventilated space before planting.

Example 20. Field Assessment of Improved Plant Characteristics

Rice

Field trials are conducted, preferably, at multiple locations. In some embodiments, rice seeds are treated with commercial fungicidal and insecticidal treatment. Seeds are heterologously disposed with the endophyte treatments and formulation control (lacking the one or more heterologously disposed endophytes) as described in Example 18, untreated seeds (lacking formulation and the one or more heterologously disposed endophyte) are also planted. Seeds are sown in regularly spaced rows in soil at 1.2 million seeds/acre seeding density. At each location at least 3 replicate plots are planted for each endophyte or control treatments in a randomized complete block design. For example, each plot may consist of seven, 15.24 m (40 ft.) rows.

At the end of the field trial employing endophyte treatment and control treatment plants, plots are harvested, for example, by machine with a 5-ft research combine and yield is calculated by the on-board computer.

Wheat

Field trials are conducted at multiple locations with multiple plots per location. Wheat seeds (optionally treated with commercial fungicidal and insecticidal treatments) are heterologously disposed with the endophyte treatments as described in Example 18; untreated seeds (lacking formulation and the one or more heterologously disposed endophyte) are also planted. Seeds are sown in regularly spaced rows in soil at 1.2 million seeds/acre seeding density. At each location at least 3 replicate plots are planted for each endophyte or control treatments in a randomized complete block design. Each plot consists of seven, 15.24 m (40 ft.) rows.

Plots are harvested by machine, for example with a 5-ft research combine and yield was calculated by the on-board computer.

Corn

Field trials are conducted at multiple locations, preferably with multiple plots per location. Plots may be irrigated, non-irrigated (dryland), or maintained with suboptimal irrigation at a rate to target approximately 25% reduction in yield. In some embodiments, corn seeds are treated with commercial fungicidal and insecticidal treatment. Seeds are heterologously disposed with the endophyte treatments as described in Example 18; untreated seeds (lacking formulation and the one or more heterologously disposed endophyte) are also planted. Seeds are sown in regularly spaced rows in soil at planting densities typical for each region. At each location at least 3 replicate plots are planted per endophyte or control treatment in a randomized complete block design. For examples, each plot may consist of four 15.24 m (40 ft.) rows, each separated by 76.2 cm (30 in).

At the end of the field trial employing endophyte treatment and control treatment plants, plots are harvested, for example, by machine with a 5-ft research combine and yield is calculated by the on-board computer. Only the middle two rows of the 4 row plots are harvested to prevent border effects.

Soy

Field trials were conducted according to the following methodology. Seeds were heterologously disposed with the endophyte treatment (MIC-54347) as described in Example 18, untreated seeds (lacking formulation and the one or more heterologously disposed endophyte) are also planted. At each location at least 3 replicate plots were planted per endophyte or control treatment in a randomized complete block design), a total of 18 data points were collected. Each plot consisted of four 15.24 m (40 ft.) rows, each separated by 76.2 cm (30 in).

At the end of the field trial employing endophyte treatment and control treatment plants, plots were harvested, by machine with a 5-ft research combine and yield is calculated by the on-board computer. Only the middle two rows of the 4 row plots are harvested to prevent border effects.

Treatment with MIC-54347 was associated with a 10.8% decrease in yield where the natural disease pressure in the fields was low, with a win rate of 28%.

Canola

Field trials are conducted at multiple locations, preferably in diverse geographic regions. Plots may be irrigated, non-irrigated (dryland) or maintained with suboptimal irrigation at a rate to target approximately 25% reduction in yield. In some embodiments, canola seeds are treated with commercial fungicidal and insecticidal treatment. Seeds are heterologously disposed with the endophyte treatments as described in Example 18, untreated seeds (lacking formulation and the one or more heterologously disposed endophyte) are also planted. At each location, at least 3 replicate plots are planted for each endophyte or control treatment in a randomized complete block design.

At the end of the field trial employing endophyte treatment and control treatment plants, plots are harvested, for example, by machine with a 5-ft research combine and yield is calculated by the on-board computer.

Peanut

Field trials are conducted at multiple locations, preferably in diverse geographic regions. Optionally, plots are non-irrigated (dryland) or maintained with suboptimal irrigation at a rate to target approximately 25% reduction in yield. In some embodiments, peanut seeds are treated with commercial fungicidal and insecticidal treatment. Seeds are heterologously disposed with the endophyte treatments as described in Example 18, untreated seeds (lacking formulation and the one or more heterologously disposed endophyte) are also planted.

At the end of the field trial employing endophyte treatment and control treatment plants, plots are harvested, for example, by machine with a 5-ft research combine and yield is calculated by the on-board computer.

Example 21. Method of Determining Seed Nutritional Quality Trait Component: Fat Seed samples from harvested plants are obtained as described in Example 20. Analysis of fat is conducted on replicate samples according to the Association of Official Agricultural Chemists Reference Method AOAC 920.39, of the Official Methods of Analysis of AOAC International, 20th Edition (2016), herein incorporated by reference in its entirety. Samples are weighed onto filter paper, dried, and extracted in hot hexane for 4 hrs. using a Soxlhet system. Oil is recovered in pre-weighed glassware, and % fat is measured gravimetrically. Mean percent changes between the treatment (endophyte-treated seed) and control (seed treated with the formulation but no endophyte) are calculated.

Example 22. Method of Determining Seed Nutritional Quality Trait Component: Ash Seed samples from harvested plants are obtained as described in Example 20. Analysis of ash is conducted on replicate samples according to the Association of Official Agricultural Chemists Reference Method AOAC 920.39, of the Official Methods of Analysis of AOAC International, 20th Edition (2016). Samples are weighed into pre-weighed crucibles, and ashed in a furnace at 600° C. for 3 hr. Weight loss on ashing is calculated as % ash. Mean percent changes between the treatment (one or more heterologously disposed endophytes) and control (lacking the one or more heterologously disposed endophytes) with the formulation but no endophyte are calculated.

Example 23. Method of Determining Seed Nutritional Quality Trait Component: Fiber Seed samples from harvested plants are obtained as described in Example 20. Analysis of fiber is conducted on replicate samples according to the Association of Official Agricultural Chemists Reference Method AOAC 920.39, of the Official Methods of Analysis of AOAC International, 20th Edition (2016). Samples are weighed into filter paper, defatted and dried, and hydrolyzed first in acid, then in alkali solution. The recovered portion is dried, weighed, ashed at 600° C., and weighed again. The loss on ashing is calculated as % Fiber. Mean percent changes between the treatment (one or more heterologously disposed endophytes) and control (lacking the one or more heterologously disposed endophytes) with the formulation but no endophyte are calculated.

Example 24. Method of Determining Seed Nutritional Quality Trait Component: Moisture Seed samples from harvested plants are obtained as described in Example 20. Analysis of moisture is conducted on replicate samples according to the Association of Official Agricultural Chemists Reference Method AOAC 920.39, of the Official Methods of Analysis of AOAC International, 20th Edition (2016). Samples are weighed into pre-weighed aluminum dishes, and dried at 135° C. for 2 hrs. Weight loss on drying is calculated as % Moisture. Mean percent changes between the treatment (one or more heterologously disposed endophytes) and control (lacking the one or more heterologously disposed endophytes) with the formulation but no endophyte are calculated.

Example 25. Method of Determining Seed Nutritional Quality Trait Component: Protein Seed samples from harvested plants are obtained as described in Example 20. Analysis of protein is conducted on replicate samples according to the Association of Official Agricultural Chemists Reference Method AOAC 920.39, of the Official Methods of Analysis of AOAC International, 20th Edition (2016). Samples are combusted and nitrogen gas is measured using a combustion nitrogen analyzer (Dumas). Nitrogen is multiplied by 6.25 to calculate % protein. Mean percent changes between the treatment (one or more heterologously disposed endophytes) and control (lacking the one or more heterologously disposed endophytes) with the formulation but no endophyte) are calculated.

Example 26. Method of Determining Seed Nutritional Quality Trait Component: Carbohydrate Seed samples from harvested plants are obtained as described in Example 20. Analysis of carbohydrate is determined for replicate samples as a calculation according to the following formula: Total Carbohydrate=100%−% (Protein+Ash+Fat+Moisture+Fiber), where % Protein is determined according to the method of Example 25, % Ash is determined according to the method of Example 22, % Fat is determined according to the method of Example 21, % Moisture is determined according to the method of Example 24, and % Fiber is determined according to the method of Example 23. Mean percent changes between the treatment (one or more heterologously disposed endophytes) and control (lacking the one or more heterologously disposed endophytes) are calculated.

Example 27. Method of Determining Seed Nutritional Quality Trait Component: Calories Seed samples from harvested plants are obtained as described in Example 20. Analysis of Calories is determined for replicate samples as a calculation according to the following formula: Total Calories=(Calories from protein)+(Calories from carbohydrate)+Calories from fat), where Calories from protein are calculated as 4 Calories per gram of protein (as determined according to the method of Example 25), Calories from carbohydrate are calculated as 4 Calories per gram of carbohydrate (as determined according to the method of Example 26), and Calories from fat are calculated as 9 Calories per gram of fat (as determined according to the method of Example 21). Mean percent changes between the treatment (one or more heterologously disposed endophytes) and control (lacking the one or more heterologously disposed endophytes) are calculated.

Example 28. Additional Methods for Creating Synthetic Compositions

Osmopriming and Hydropriming

One or more endophytes are inoculated onto seeds during the osmopriming (soaking in polyethylene glycol solution to create a range of osmotic potentials) and/or hydropriming (soaking in de-chlorinated water) process. Osmoprimed seeds are soaked in a polyethylene glycol solution containing one or more endophytes for one to eight days and then air dried for one to two days. Hydroprimed seeds are soaked in water for one to eight days containing one or more endophytes and maintained under constant aeration to maintain a suitable dissolved oxygen content of the suspension until removal and air drying for one to two days. Talc and or flowability polymer are added during the drying process.

Foliar Application

One or more endophytes are inoculated onto aboveground plant tissue (leaves and stems) as a liquid suspension in dechlorinated water containing adjuvants, sticker-spreaders and UV protectants. The suspension is sprayed onto crops with a boom or other appropriate sprayer.

Soil Inoculation

One or more endophytes are inoculated onto soils in the form of a liquid suspension, either; pre-planting as a soil drench, during planting as an in-furrow application, or during crop growth as a side-dress. One or more endophytes are mixed directly into a fertigation system via drip tape, center pivot or other appropriate irrigation system.

Hydroponic and Aeroponic Inoculation

One or more endophytes are inoculated into a hydroponic or aeroponic system either as a powder or liquid suspension applied directly to the rockwool substrate or applied to the circulating or sprayed nutrient solution.

Vector-Mediated Inoculation

One or more endophytes are introduced in power form in a mixture containing talc or other bulking agent to the entrance of a beehive (in the case of bee-mediation) or near the nest of another pollinator (in the case of other insects or birds. The pollinators pick up the powder when exiting the hive and deposit the inoculum directly to the crop's flowers during the pollination process.

Root Wash

The method includes contacting the exterior surface of a plant's roots with a liquid inoculant formulation containing one or more endophytes. The plant's roots are briefly passed through standing liquid microbial formulation or liquid formulation is liberally sprayed over the roots, resulting in both physical removal of soil and microbial debris from the plant roots, as well as inoculation with microbes in the formulation.

Seedling Soak

The method includes contacting the exterior surfaces of a seedling with a liquid inoculant formulation containing one or more endophytes. The entire seedling is immersed in standing liquid microbial formulation for at least 30 seconds, resulting in both physical removal of soil and microbial debris from the plant roots, as well as inoculation of all plant surfaces with microbes in the formulation. Alternatively, the seedling can be germinated from seed in or transplanted into media soaked with the microbe(s) of interest and then allowed to grow in the media, resulting in soaking of the plantlet in microbial formulation for much greater time, for example: hours, days or weeks. Endophytic microbes likely need time to colonize and enter the plant, as they explore the plant surface for cracks or wounds to enter, so the longer the soak, the more likely the microbes will successfully be installed in the plant.

Wound Inoculation

The method includes contacting the wounded surface of a plant with a liquid or solid inoculant formulation containing one or more endophytes. Plant surfaces are designed to block entry of microbes into the endosphere, since pathogens attempt to infect plants in this way. One way to introduce beneficial endophytic microbes into plant endospheres is to provide a passage to the plant interior by wounding. This wound can take a number of forms, including pruned roots, pruned branches, puncture wounds in the stem breaching the bark and cortex, puncture wounds in the tap root, puncture wounds in leaves, puncture wounds seed allowing entry past the seed coat. Wounds can be made using tools for physical penetration of plant tissue such as needles. Microwounds may also be introduced by sonication. Into the wound can then be contacted the microbial inoculant as liquid, as powder, inside gelatin capsules, in a pressurized capsule injection system, or in a pressurized reservoir and tubing injection system, allowing entry and colonization by microbes into the endosphere. Alternatively, the entire wounded plant can be soaked or washed in the microbial inoculant for at least 30 seconds, giving more microbes a chance to enter the wound, as well as inoculating other plant surfaces with microbes in the formulation—for example pruning seedling roots and soaking them in inoculant before transplanting is a very effective way to introduce endophytes into the plant.

Injection

The method includes injecting microbes into a plant in order to successfully install them in the endosphere. Plant surfaces are designed to block entry of microbes into the endosphere, since pathogens attempt to infect plants in this way. In order to introduce beneficial endophytic microbes to endospheres, we need a way to access the interior of the plant which we can do by puncturing the plant surface with a needle and injecting microbes into the inside of the plant. Different parts of the plant can be inoculated this way including the main stem or trunk, branches, tap roots, seminal roots, buttress roots, and even leaves. The injection can be made with a hypodermic needle, a drilled hole injector, or a specialized injection system, and through the puncture wound can then be contacted the microbial inoculant as liquid, as powder, inside gelatin capsules, in a pressurized capsule injection system, or in a pressurized reservoir and tubing injection system, allowing entry and colonization by microbes into the endosphere.

Example 29. Identification of Sequence Variants Across Core Genes

Phylogenomic analysis of whole genome sequences of endophytes can be used to identify distinguishing sequence variants. Sets of genes suitable for phylogenomic analysis as well as methods for identifying the same are well known in the art, for example Floutas et al. (2012) The Paleozoic origin of enzymatic lignin decomposition reconstructed from 31 fungal genomes. Science, 336(6089): 1715-9. doi: 10.1126/science. 1221748 and James T Y, Pelin A, Bonen L, Ahrendt S, Sain D, Corradi N, Stajich J E. Shared signatures of parasitism and phylogenomics unite Cryptomycota and microsporidia. Curr Biol. 2013; 23(16):1548-53. doi: 10.1016/j.cub.2013.06.057. Orthologous genes to the reference set are identified in protein data bases derived from the genome of each species. Orthologous genes can be identified in the genomes using methods well known including reciprocal best hits (Ward N, Moreno-Hagelsieb G. Quickly Finding Orthologs as Reciprocal Best Hits with BLAT, LAST, and UBLAST: How Much Do We Miss? de Crécy-Lagard V, ed. PLOS ONE. 2014; 9(7): e101850. doi: 10.1371/journal.pone.0101850) and Hidden Markov Models (HMMs). The best hits are extracted and a multiple sequence alignment generated for each set of orthologous genes. The alignments are used to build phylogenetic trees using methods well known in the art including Bayesian inference and maximum likelihood methods, for example using software tools MrBayes (Huelsenbeck, J. P. & Ronquist (2001) MRBAYES: Bayesian inference of phylogenetic trees. Bioinformatics, 17(8): 754-755) and RAxML (Stamatakis, A. (2014) RAXML version 8: a tool for phylogenetic analysis and post-analysis of large phylogenies. Bioinformatics, 30 (9): 1312-1313. doi: 10.1093/bioinformatics/btu033). Sequence variants which distinguish between closely related species are identified.

Example 30. Identification of Unique Genes in an Endophyte of Interest

Whole genome analysis of endophytes can be used to identify genes whose presence, absence or over or under representation ("differential abundance") are associated with desirable phenotypes. To identify genes with differential abundance in the genome of an endophyte of interest, protein sequences predicted from the genomes of the endophyte and closely related species are compared in an all-vs-all pairwise comparison (for example, using BLAST) followed by clustering of the protein sequences based on alignment scores (for example, using MCL: Enright A. J., Van Dongen S., Ouzounis C. A. An efficient algorithm for large-scale detection of protein families. Nucleic Acids Research 30(7): 1575-1584 (2002)). Additional software tools useful for this analysis are well known in the art and include OMA, OrthoMCL and TribeMCL (Roth A C, Gonnet G H, Dessimoz C. Algorithm of OMA for large-scale orthology inference. BMC Bioinformatics. 2008; 9:518. doi: 10.1186/1471-2105-9-518, Enright A J, Kunin V, Ouzounis C A. Protein families and TRIBES in genome sequence space. Nucleic Acids Res. 2003; 31(15):4632-8; Chen F, Mackey A J, Vermunt J K, Roos D S. Assessing performance of orthology detection strategies applied to eukaryotic genomes. PLOS One. 2007; 2(4):e383). The protein clusters are queried to identify clusters with differential abundance of proteins derived from endophytes having desirable phenotypes. Proteins of these clusters define the unique properties of these endophytes, and the abundance of genes encoding these proteins may be used to identify endophytes of the present invention.

Example 31. In Vitro Assessment of Production of Antibiotic Metabolites

This example describes an exemplary method by which microbes may be shown to produce metabolites that inhibit the growth of hyphal phytopathogens in vitro. Such phytopathogens can be members of the "true" fungi, phylum Eumycota, or from other taxonomic groups with a similar growth habit such as members of the phylum Oomycota. Hyphal growth can be described as organism growth along thread-like structures composed of connected cells. Such growth is found commonly among fungi and oomycetes, and even some genera of bacteria. In this assay, the hyphal growth should be in a roughly uniform, radial manner. This assay is comprised of a Petri plate containing an agar-based media and a hyphal phytopathogen grown concomitantly with either a live test microbe or in the presence of the spent media from a previously grown test microbe.

Testing with Live Endophyte Cultures

Preparation of Hyphal Phytopathogen Petri plates containing a media suitable for the growth of the target hyphal pathogens (*Fusarium graminearum, Rhizoctonia solani, Pythium* sp.) were inoculated with the target hyphal pathogen. After inoculation on the media-containing Petri plate, the culture was allowed to grow until reaching the edge of the Petri plate.

Preparation of the test sample Microbial samples for testing endophytes MIC-84302, MIC-18905, and MIC-67967 were produced by liquid culture.

Assay Set-Up Petri dishes, also referred to as test plates, containing solid agar test media (see Use of Multiple Growth Media for a description of media used) were prepared. A sterile instrument was used to remove a test pathogen plug from the hyphal pathogen plate culture and placed centrally on the test plate. Next a test sample was applied to the test plate at a distance such that the test sample and test plate came into physical contact after more than one day of growth. A drop of overnight liquid culture of the endophyte to be tested was applied to each test plate. A drop of Metconazole, a chemical fungicide capable of impeding the growth of *Fusarium* and *Rhizoctonia* was applied to each test plate containing those pathogens as a control. A drop of Mefenoxam, a chemical fungicide capable of impeding the growth of *Pythium* was applied to each test plate containing *Pythium*. For an example of the relative position of the test sample, pathogen sample, and chemical control refer to FIG. 1C.

Use of Multiple Growth Media Various environmental conditions can result in differential production of metabolites and pathogens grown under various environmental conditions show differential sensitivity to those metabolites, therefore the assay was performed on multiple media types: half strength Potato Dextrose Agar (0.5×PDA), yeast extract peptone dextrose agar (YEPD), tryptic soy agar (TSA), and Reasoner's 2A agar (R2A). Medias were chosen to vary important growth inputs such as carbon source, presence and concentration of various salts, and presence of extracts from different plant species or organs.

Assessment After setting up, hyphal pathogens were allowed to grow for sufficient time such that the hyphal front meets or just passes the test sample. In cases where anti-pathogen metabolites are produced and secreted, a restriction of growth of the hyphal front around the test sample is commonly observed. Often this will also result in an area of clearing around the test sample. In these cases, the morphology of the hyphal pathogen near the test sample will often also be dissimilar from areas away from the test sample. Alternatively, when anti-pathogen metabolites are not produced and secreted, the hyphal pathogen will grow over the test sample with little to no visible effect on growth.

Exemplary images of test plates treated with endophytes, chemical fungicides and pathogens are shown in FIG. 1A-C, FIG. 2A-B, FIG. 3A-C, FIG. 4A-B, FIG. 5A-C, and FIG. 6A-B.

Figure 1B:
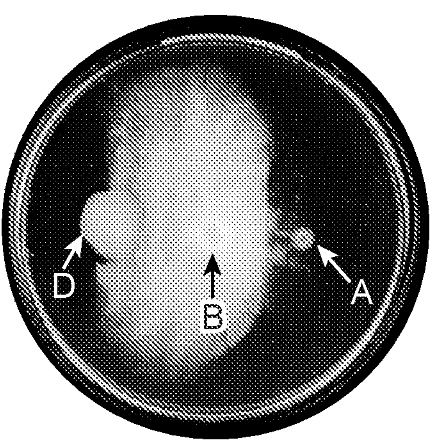
FIG. 1B shows an exemplary photo a TSA plate inoculated with *Fusarium graminearum* (B), MIC-18905 (D), and metconazole (A) a chemical fungicide. The lack of growth of *Fusarium graminearum* around MIC-18905 is notable in comparison to the control plate shown in FIG. 1C.
Figure 1C:
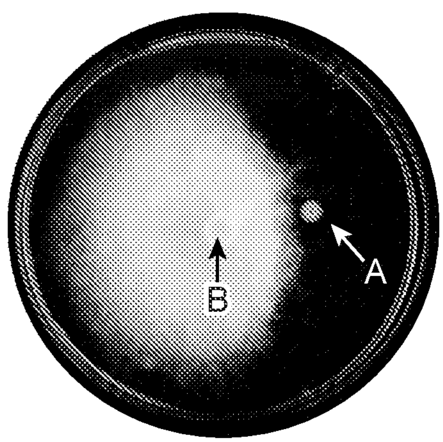
FIG. 1C shows an exemplary photo a TSA plate inoculated with *Fusarium graminearum* (B) and metconazole (A) a chemical fungicide; of note is the uninterrupted edge of pathogen growth on the left side of the plate.
Figure 2A:
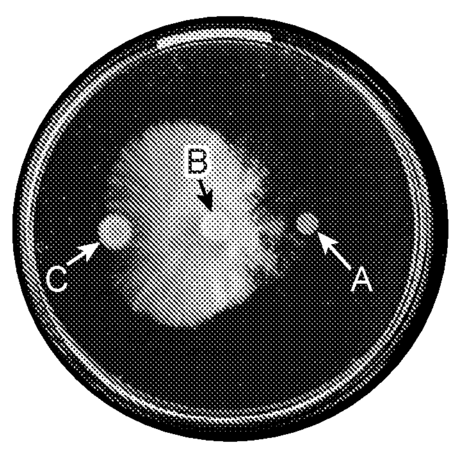
FIG. 2A shows an exemplary photo a Reasoner's 2A Agar (R2A) plate inoculated with *Fusarium graminearum* (B), MIC-67967 (C), and metconazole (A) a chemical fungicide. The lack of growth of *Fusarium graminearum* around MIC-67967 is notable in comparison to the control plate shown in FIG. 2B.
Figure 2B:
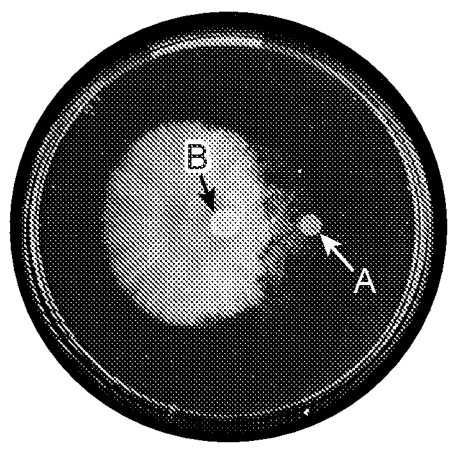
FIG. 2B shows an exemplary photo a R2A plate inoculated with *Fusarium graminearum* (B) and metconazole (A) a chemical fungicide; of note is the uninterrupted edge of pathogen growth on the left side of the plate.

MIC-18905 and MIC-84302 showed significant pathogen-free zones around the test samples of these endophytes on TSA test plates inoculated with *Fusarium graminearum* (see for example FIG. 1A, FIG. 1B, and FIG. 1C). MIC-67967 showed pathogen-free zones around the test samples of this endophyte on R2A test plates inoculated with *Fusarium graminearum* (see for example FIG. 2A and FIG. 2B).

Figure 3A:
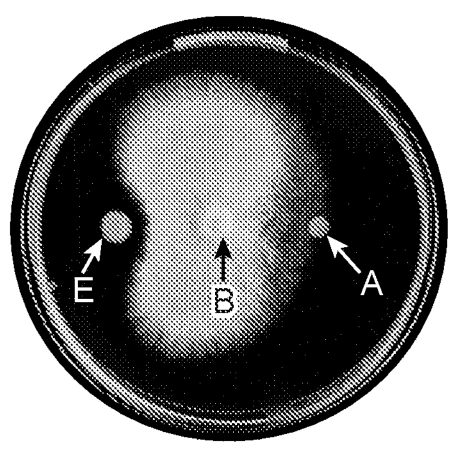
FIG. 3A shows an exemplary photo a half strength potato dextrose agar (0.5×PDA) plate inoculated with *Rhizoctonia solani* (B), MIC-18905 (E), and metconazole (A) a chemical fungicide. The lack of growth of *Rhizoctonia solani* around MIC-18905 is notable in comparison to the control plate shown in FIG. 3C.
Figure 3B:
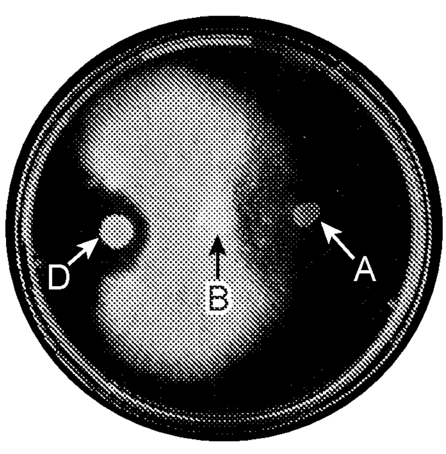
FIG. 3B shows an exemplary photo a 0.5×PDA plate inoculated with *Rhizoctonia solani* (B), MIC-84302 (D), and metconazole (A) a chemical fungicide. The lack of growth of *Rhizoctonia solani* around MIC-84302 is notable in comparison to the control plate shown in FIG. 3C.
Figure 3C:
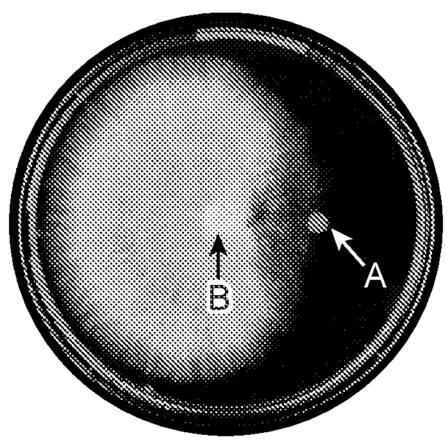
FIG. 3C shows an exemplary photo a 0.5×PDA plate inoculated with *Rhizoctonia solani* (B) and metconazole (A) a chemical fungicide; of note is the uninterrupted edge of pathogen growth on the left side of the plate.
Figure 4A:
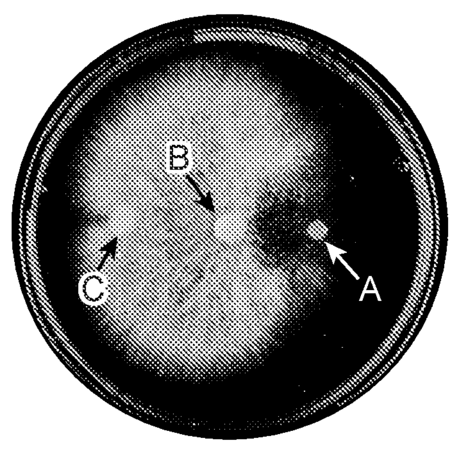
FIG. 4A shows an exemplary photo a half strength potato dextrose agar (0.5×PDA) plate inoculated with *Rhizoctonia solani* (B), MIC-67967 (C), and metconazole (A) a chemical fungicide. The lack of growth of *Rhizoctonia solani* around MIC-67967 is notable in comparison to the control plate shown in FIG. 4B.
Figure 4B:
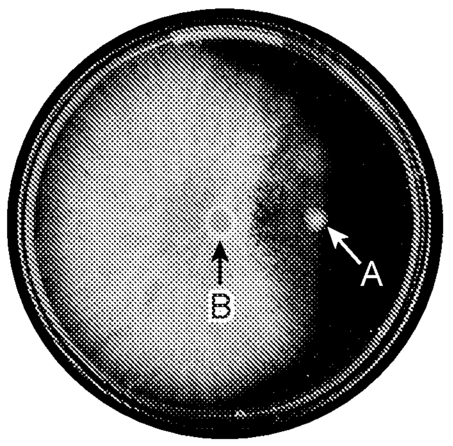
FIG. 4B shows an exemplary photo a 0.5×PDA plate inoculated with *Rhizoctonia solani* (B) and metconazole (A) a chemical fungicide; of note is the uninterrupted edge of pathogen growth on the left side of the plate.

MIC-18905 and MIC-84302 showed significant pathogen-free zones around the test samples of these endophytes on 0.5×PDA test plates inoculated with *Rhizoctonia solani* (see for example FIG. 3A, FIG. 3B, and FIG. 3C). MIC-67967 showed pathogen-free zones around the test samples of this endophyte on 0.5×PDA test plates inoculated with *Rhizoctonia solani* (see for example FIG. 4A and FIG. 4B).

Figure 5A:
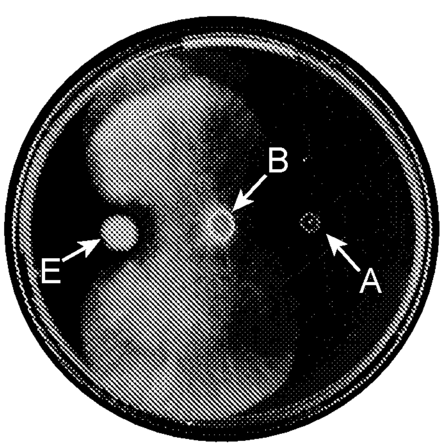
FIG. 5A shows an exemplary photo a half strength potato dextrose agar (0.5×PDA) plate inoculated with *Pythium* sp. (B), MIC-18905 (E), and mefenoxam (A) a chemical fungicide. The lack of growth of *Pythium* sp. around MIC-18905 is notable in comparison to the control plate shown in FIG. 5C.
Figure 5B:
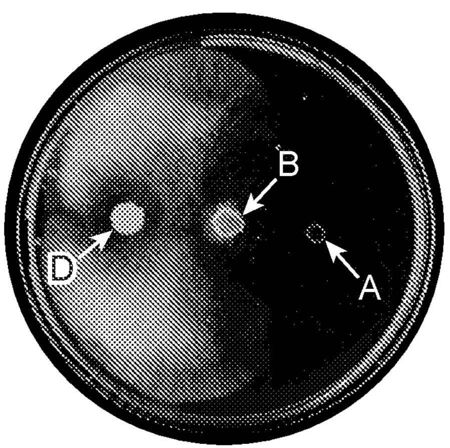
FIG. 5B shows an exemplary photo a 0.5×PDA plate inoculated with *Pythium* sp. (B), MIC-84302 (D), and mefenoxam (A) a chemical fungicide. The lack of growth of *Pythium* sp. around MIC-84302 is notable in comparison to the control plate shown in FIG. 3C.
Figure 5C:
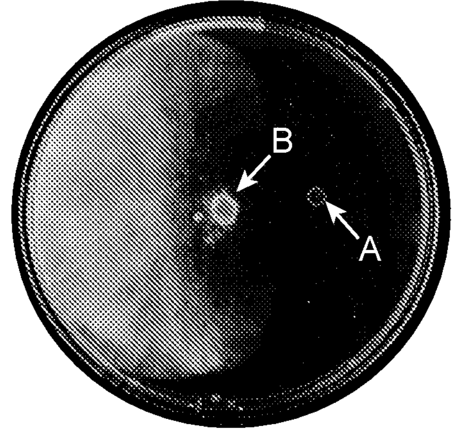
FIG. 5C shows an exemplary photo a 0.5×PDA plate inoculated with *Pythium* sp. (B) and mefenoxam (A) a chemical fungicide; of note is the uninterrupted edge of pathogen growth on the left side of the plate.
Figures 6A, 6B:
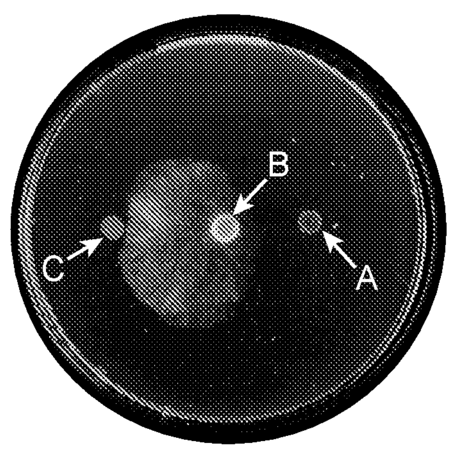
FIG. 6A shows an exemplary photo a yeast extract peptone dextrose agar (YEPD) plate inoculated with *Pythium* sp. (B), MIC-67967 (C), and mefenoxam (A) a chemical fungicide. The lack of growth of *Pythium* sp. around MIC-67967 is notable in comparison to the control plate shown in FIG. 4B.
FIG. 6B shows an exemplary photo a YEPD plate inoculated with *Pythium* sp. (B) and mefenoxam (A) a chemical fungicide; of note is the uninterrupted edge of pathogen growth on the left side of the plate.

MIC-18905 and MIC-84302 showed significant pathogen-free zones around the test samples of these endophytes on 0.5×PDA test plates inoculated with *Pythium* (see for example FIG. 5A, FIG. 5B, and FIG. 5C). MIC-67967 showed significant pathogen-free zones around the test samples of this endophyte on YEPD test plates inoculated with *Pythium* (see for example FIG. 6A and FIG. 6B).

Testing with Filtered or Dead Endophyte Cultures

Pathogen samples are prepared as described above. A microbial sample for testing, also referred to as a test sample, can be produced in multiple ways. A liquid culture of hyphal or colony forming microbe is grown in liquid culture, and viable material is removed by various methods including, but not limited to, filtration. Alternately, or in addition to filtration a test sample may be autoclaved and a non-viable test sample may be used. This later method of testing a non-viable test sample is used when the test microbe displays a much faster rate of radial growth than the hyphal pathogen being tested, to identify production of antimicrobial metabolites, for example not as a part an active biological process such a mycophagy.

Assay Set-Up A Petri dish containing a solid agar test media is obtained. This will be referred to as the test plate. A sterile instrument is used to remove a test pathogen plug from the hyphal pathogen plate culture and placed on the test plate. For assaying a non-viable test sample, an agar plug is removed from the test plate using a sterile instrument to create a well to hold the test sample. The well is then filled with the non-viable test sample, and the sample is absorbed into the agar media. A chemical compound capable of impeding the growth of the pathogen is included as a control. For an example of the relative position of the test sample, pathogen sample, and chemical control refer to FIG. 1.

Use of Multiple Growth Media Test microbe growth under various environmental conditions are expected to result in differential production of metabolites. Similarly, pathogens grown under various environmental conditions are expected to show differential sensitivity to those metabolites. For this reason, this assay is performed on multiple media types. Medias are chosen to vary important growth inputs such as carbon source, presence and concentration of various salts, and presence of extracts from different plant species or organs.

Assessment After setting up, hyphal pathogens are allowed to grow for sufficient time such that the hyphal front meets or just passes the test sample. In cases where anti-pathogen metabolites are produced and secreted, a restriction of growth of the hyphal front around the test sample is commonly observed. Often this will also result in an area of clearing around the test sample. In these cases, the morphology of the hyphal pathogen near the test sample will often also be dissimilar from areas away from the test sample. Alternatively, when anti-pathogen metabolites are not produced and secreted, the hyphal pathogen will grow over the test sample with little to no visible effect on growth.

Having illustrated and described the principles of the present invention, it should be apparent to persons skilled in the art that the invention can be modified in arrangement and detail without departing from such principles. It is to be understood that while the invention has been described in conjunction with the detailed description thereof, the foregoing description is intended to illustrate and not limit the scope of the invention, which is defined by the scope of the appended claims. Other embodiments, advantages, and modifications are within the scope of the following claims.

The invention claimed is:

1. A synthetic composition, comprising one or more endophytes heterologously disposed to a treatment formulation, wherein the one or more endophytes comprise at least one polynucleotide sequence that is at least 97% identical to SEQ ID NOs. 64, 66, 68, 69, 71, 73, 81, or 86, and the one or more endophytes comprise one or more open reading frames encoding proteins whose amino acid sequences are at least 97% identical to one or more of SEQ ID NOs. 98, 102, 103, 105, 110, 113, 118, 120, and 124.

2. The synthetic composition of claim 1, wherein the synthetic composition additionally comprises one or more plant elements.

3. The synthetic composition of claim 2, wherein the one or more plant elements are seeds.

4. The synthetic composition of claim 2, wherein the one or more plant elements are soybean, cotton, or wheat.

5. The synthetic composition of claim 2, wherein the synthetic composition comprises a least 1E+02 colony forming unit (CFU) endophytes per plant element.

6. The synthetic composition of claim 2, wherein the one or more endophytes are capable of improving one or more traits of agronomic importance in a plant relative to a reference plant, wherein the one or more traits of agronomic importance comprise one or more of biotic stress tolerance, shoot fresh weight, root weight, shoot weight, yield, early emergence, full emergence, and/or plant height.

7. The synthetic composition of claim 6, wherein the biotic stress is a growth environment comprising one or more species of *Pythium, Rhizoctonia*, and/or *Fusarium.*

8. The synthetic composition of claim 1, wherein the one or more endophytes comprises at least one polynucleotide region having at least 97% sequence identity to SEQ ID NO. 8, and at least one polynucleotide region having at least 97% sequence identity to SEQ ID NO. 64, and at least one polynucleotide region having at least 97% sequence identity to one or more polynucleotide sequences selected from the group consisting of SEQ ID NOs. 66, 68, 73, and 86.

9. The synthetic composition of claim 1, wherein the one or more endophytes are of the genus *Trichoderma.*

10. The synthetic composition of claim 1, wherein the treatment formulation comprises a solid carrier and adherent.

11. The synthetic composition of claim 10, wherein the solid carrier is talc and the adherent is mineral oil.

12. A method of improving plant health, comprising applying a one or more heterologously disposed endophytes to one or more plant elements, wherein the one or more endophytes comprise at least one polynucleotide sequence that is at least 97% identical to SEQ ID NOs. 64, 66, 68, 69, 71, 73, 81, or 86, and the one or more endophytes comprise one or more open reading frames encoding proteins whose amino acid sequences are at least 97% identical to one or more of SEQ ID NOs. 98, 102, 103, 105, 110, 113, 118, 120, and 124.

13. The method of claim 12, wherein the one or more plant elements are soybean or wheat.

14. The method of claim 12, wherein the one or more heterologously disposed endophytes are present in an average abundance of a least 1E+02 CFU endophytes per plant element.

15. The method of claim 12, wherein the one or more endophytes are capable of improving one or more traits of agronomic importance in a plant relative to a reference plant, wherein the one or more traits of agronomic importance comprise one or more of biotic stress tolerance, shoot fresh weight, root weight, shoot weight, yield, early emergence, full emergence, and/or plant height.

16. The method of claim 15, wherein the biotic stress is a growth environment comprising one or more of species of *Pythium, Rhizoctonia*, and/or *Fusarium.*

17. The method of claim 12, wherein the one or more endophytes comprises at least one polynucleotide region having at least 97% sequence identity to SEQ ID NO. 81, and at least one polynucleotide region having at least 97% sequence identity to SEQ ID NO. 64, and at least one polynucleotide region having at least 97% sequence identity to one or more polynucleotide sequences selected from the group consisting of SEQ ID NOs. 66, 68, 73, and 86.

18. The method of claim 12, wherein the one or more endophytes are applied in a treatment formulation comprising a solid carrier and an adherent.

19. The method of claim 18, wherein the solid carrier is talc and the adherent is mineral oil.

20. A synthetic composition, comprising one or more endophytes heterologously disposed to a treatment formulation, wherein the one or more endophytes comprise at least one polynucleotide sequence that is at least 99% identical to SEQ ID NOs. 59, 60, 64, 66, 67, 68, 69, 71, 73, 74, 76, 78-81, 83-85, 86, 89, or 90.

* * * * *